United States Patent
Lee et al.

(10) Patent No.: US 10,348,767 B1
(45) Date of Patent: Jul. 9, 2019

(54) CLOUD OVER IP SESSION LAYER NETWORK

(71) Applicant: Zentera Systems, Inc., San Jose, CA (US)

(72) Inventors: Jaushin Lee, Saratoga, CA (US); Wei-Chin Chu, New Taipei (TW); Quan Li, Longquan Town (CN); Hung Chuen Jason Lee, Palo Alto, CA (US)

(73) Assignee: Zentera Systems, Inc., San Jose, CA (US)

( * ) Notice: Subject to any disclaimer, the term of this patent is extended or adjusted under 35 U.S.C. 154(b) by 307 days.

(21) Appl. No.: 15/442,469

(22) Filed: Feb. 24, 2017

Related U.S. Application Data

(63) Continuation-in-part of application No. 15/396,227, filed on Dec. 30, 2016, which is a continuation-in-part of application No. 15/347,414, filed on Nov. 9, 2016, now Pat. No. 9,712,624, which is a continuation of application No. 14/187,091, filed
(Continued)

(51) Int. Cl.
*H04L 29/06* (2006.01)
*H04L 12/741* (2013.01)

(52) U.S. Cl.
CPC .............. *H04L 63/20* (2013.01); *H04L 45/54* (2013.01); *H04L 63/029* (2013.01); *H04L 63/1416* (2013.01); *H04L 63/1433* (2013.01); *H04L 63/1441* (2013.01); *H04L 63/02* (2013.01); *H04L 63/101* (2013.01); *H04L 67/42* (2013.01)

(58) Field of Classification Search
None
See application file for complete search history.

(56) References Cited

U.S. PATENT DOCUMENTS

| 5,386,417 | A | 1/1995 | Daugherty |
| 6,717,956 | B1 | 4/2004 | Fan |

(Continued)

FOREIGN PATENT DOCUMENTS

| EP | 1443701 A1 | 8/2004 |
| WO | WO 2012130523 | 10/2012 |

OTHER PUBLICATIONS

Cisco, Understanding Issues Related to inter-VLAN Bridging, Sep. 9, 2005, www.cisco.com. 11072.

*Primary Examiner* — Malcolm Cribbs
(74) *Attorney, Agent, or Firm* — Staniford Tomita LLP

(57) ABSTRACT

Cloud endpoints are secured using agents and a controller connected to the agents. A whitelist identifies components and processes of an authorized multi-tiered application for the cloud. An application profile for the application specifies valid computing flows between components of a tier and components of another tier, where components of the tier are executed at an endpoint and the other components of the other tier are executed at another endpoint. Endpoints are provisioned with static routing tables identifying at least one subnet destination. A request is received at a first endpoint to connect to a second endpoint. If the second endpoint falls within the at least one subnet destination, the controller performs one or more further security checks including checking the application profile flow, whitelist, and endpoint quarantine list. A network kernel table at an endpoint that includes the static routing table may be periodically checked to detect tampering.

15 Claims, 45 Drawing Sheets

Related U.S. Application Data on Feb. 21, 2014, now Pat. No. 9,525,564, application No. 15/442,469, which is a continuation-in-part of application No. 14/817,874, filed on Aug. 4, 2015, now Pat. No. 9,634,990, which is a continuation of application No. 14/190,019, filed on Feb. 25, 2014, now Pat. No. 9,130,901.

(60) Provisional application No. 62/299,124, filed on Feb. 24, 2016, provisional application No. 62/274,287, filed on Jan. 2, 2016, provisional application No. 61/770,320, filed on Feb. 28, 2013, provisional application No. 61/769,713, filed on Feb. 26, 2013, provisional application No. 61/769,691, filed on Feb. 26, 2013.

(56) References Cited

U.S. PATENT DOCUMENTS

| | | | | |
|---|---|---|---|---|
| 6,757,281 | B1* | 6/2004 | Irish | H04L 29/12009 370/389 |
| 6,914,905 | B1 | 7/2005 | Yip | |
| 6,957,274 | B2* | 10/2005 | Trace | H04L 12/2856 370/351 |
| 7,013,345 | B1 | 3/2006 | Brown | |
| 7,043,757 | B2 | 5/2006 | Hoefelmeyer | |
| 7,966,388 | B1 | 6/2011 | Pugaczewski | |
| 8,230,149 | B1* | 7/2012 | Long | G06F 21/85 710/305 |
| 8,250,642 | B2 | 8/2012 | Bartholomy et al. | |
| 8,640,218 | B2 | 1/2014 | Bartholomy et al. | |
| 9,224,003 | B2 | 12/2015 | Andersen | |
| 9,240,962 | B2 | 1/2016 | Jung | |
| 9,253,166 | B2 | 2/2016 | Gauda | |
| 2002/0073210 | A1 | 6/2002 | Low | |
| 2002/0188862 | A1 | 12/2002 | Trethewey | |
| 2003/0016664 | A1 | 1/2003 | MeLampy | |
| 2003/0016678 | A1 | 1/2003 | Maeno | |
| 2003/0043853 | A1* | 3/2003 | Doyle | H04L 29/12009 370/489 |
| 2003/0051169 | A1 | 3/2003 | Sprigg | |
| 2003/0169726 | A1* | 9/2003 | Larsson | H04Q 3/66 370/352 |
| 2004/0024903 | A1 | 2/2004 | Costatino | |
| 2004/0047322 | A1 | 3/2004 | O'Neill | |
| 2004/0059827 | A1 | 3/2004 | Chiang | |
| 2004/0078485 | A1* | 4/2004 | Narayanan | H04L 45/742 709/242 |
| 2004/0100951 | A1* | 5/2004 | O'neill | H04L 29/12009 370/389 |
| 2004/0181694 | A1 | 9/2004 | Cox | |
| 2005/0257264 | A1 | 11/2005 | Stolfo et al. | |
| 2006/0031472 | A1 | 2/2006 | Rajavelu et al. | |
| 2007/0019622 | A1 | 1/2007 | Alt | |
| 2007/0192910 | A1* | 8/2007 | Vu | B25J 5/007 700/245 |
| 2008/0060055 | A1 | 3/2008 | Lau | |
| 2008/0165957 | A1 | 7/2008 | Kandasamy et al. | |
| 2008/0168523 | A1 | 7/2008 | Ansari | |
| 2008/0276313 | A1 | 11/2008 | Kummu et al. | |
| 2008/0295114 | A1 | 11/2008 | Argade | |
| 2009/0006538 | A1 | 1/2009 | Risney, Jr. | |
| 2009/0016358 | A1 | 1/2009 | Lee | |
| 2009/0037382 | A1 | 2/2009 | Ansari | |
| 2009/0264095 | A1 | 10/2009 | Khetawat | |
| 2010/0037321 | A1* | 2/2010 | Oz | G06F 21/57 726/24 |
| 2010/0131960 | A1 | 5/2010 | Suganthi | |
| 2010/0325419 | A1 | 12/2010 | Kanekar | |
| 2010/0325420 | A1 | 12/2010 | Kanekar | |
| 2010/0325429 | A1 | 12/2010 | Saha | |
| 2011/0090911 | A1 | 4/2011 | Hao | |
| 2011/0162062 | A1 | 6/2011 | Kumar | |
| 2011/0191442 | A1 | 8/2011 | Ovsiannikov | |
| 2011/0202609 | A1 | 8/2011 | Chaturved | |
| 2012/0005724 | A1 | 1/2012 | Lee | |
| 2012/0084423 | A1* | 4/2012 | McGleenon | H04L 61/1511 709/223 |
| 2012/0124566 | A1 | 5/2012 | Federighi et al. | |
| 2012/0284770 | A1 | 11/2012 | Bartholomy | |
| 2012/0290732 | A1 | 11/2012 | Suganthi | |
| 2012/0307682 | A1 | 12/2012 | Johnsen | |
| 2013/0091198 | A1 | 4/2013 | Yu | |
| 2013/0152156 | A1 | 6/2013 | Allison | |
| 2013/0182604 | A1 | 7/2013 | Moreno | |
| 2013/0188514 | A1 | 7/2013 | Jain | |
| 2013/0191883 | A1* | 7/2013 | Tung | H04W 12/08 726/4 |
| 2013/0198304 | A1 | 8/2013 | Jung | |
| 2013/0227286 | A1 | 8/2013 | Brisson | |
| 2014/0068698 | A1 | 3/2014 | Burchfield et al. | |
| 2014/0068701 | A1 | 3/2014 | Burchfield et al. | |
| 2014/0122865 | A1 | 5/2014 | Ovsiannikov | |
| 2014/0136635 | A1 | 5/2014 | Jeng | |
| 2014/0304409 | A1 | 10/2014 | Kamath | |
| 2014/0337408 | A1 | 11/2014 | Workman | |
| 2015/0106489 | A1 | 4/2015 | Duggirala | |
| 2015/0113279 | A1 | 4/2015 | Andersen | |
| 2016/0057210 | A1* | 2/2016 | DeCusatis | H04L 67/10 709/203 |
| 2016/0373304 | A1 | 12/2016 | Sharma | |
| 2017/0012949 | A1 | 1/2017 | Boren | |

* cited by examiner

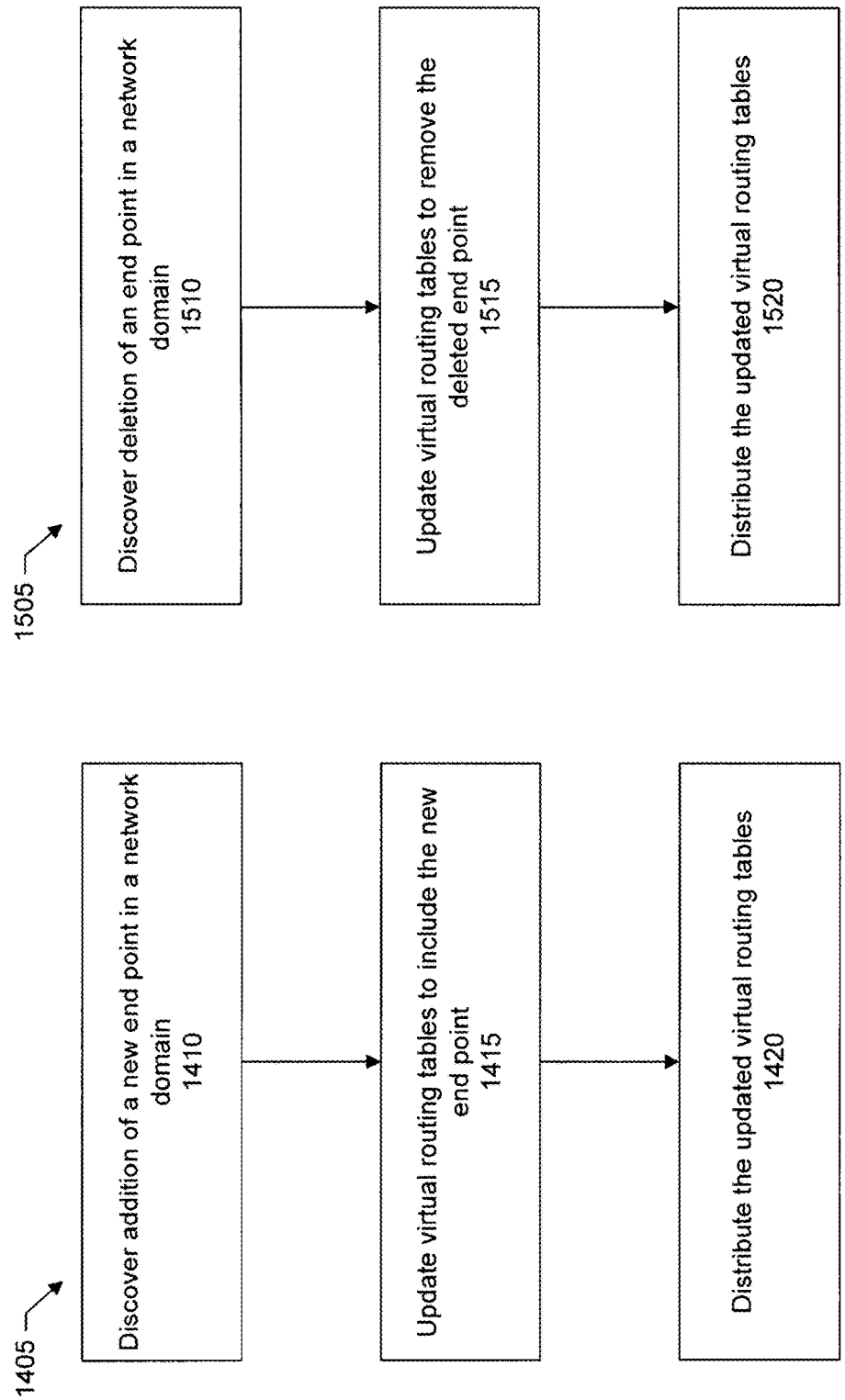

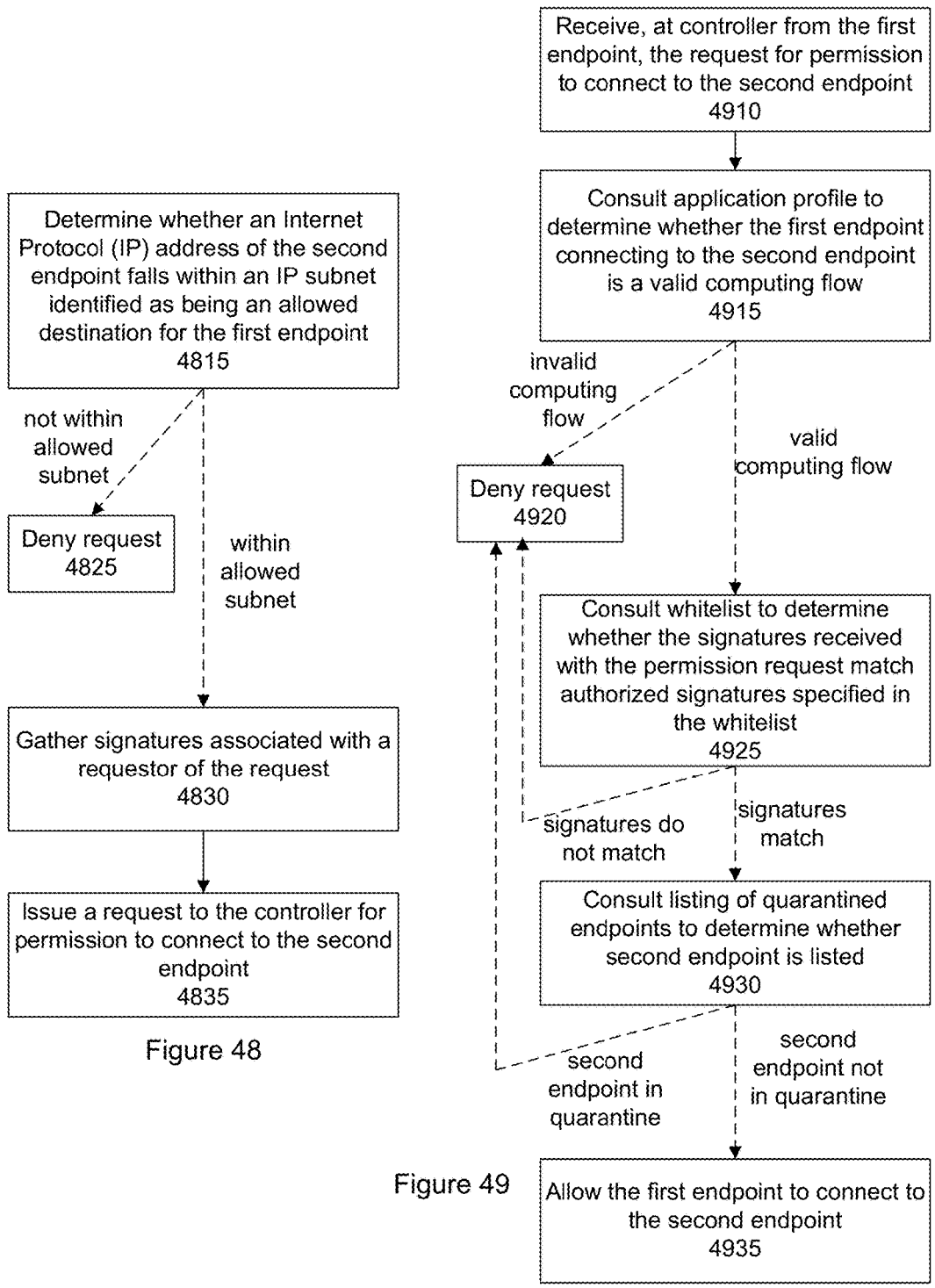

CLOUD OVER IP SESSION LAYER NETWORK

CROSS-REFERENCE TO RELATED APPLICATIONS

This patent application claims priority to U.S. provisional patent application 62/299,124, filed Feb. 24, 2016, and is a continuation-in-part of U.S. patent application Ser. No. 15/396,227, filed Dec. 30, 2016, which claims priority to U.S. provisional patent application 62/274,287, filed Jan. 2, 2016, and is a continuation-in-part of U.S. patent application Ser. No. 15/347,414, filed Nov. 9, 2016, which is a continuation of U.S. patent application Ser. No. 14/187,091, filed Feb. 21, 2014, now U.S. Pat. No. 9,525,564, issued Dec. 20, 2016, which claims priority to U.S. provisional patent application 61/769,691, filed Feb. 26, 2013, and U.S. provisional patent application 61/770,320, filed Feb. 28, 2013, and is a continuation-in-part of U.S. patent application Ser. No. 14/817,874, filed Aug. 4, 2015, which is a continuation of U.S. patent application Ser. No. 14/190,019, filed Feb. 25, 2014, now U.S. Pat. No. 9,130,901, issued Sep. 8, 2015, which claims priority to U.S. provisional patent application 61/769,713, filed Feb. 26, 2013. These applications along with other cited references in this application are incorporated by reference.

BACKGROUND

The present invention relates to the field of information technology, including, more particularly, to systems and techniques for securing communications in a cloud computing environment.

One serious obstacle to widespread adoption of the public cloud is the need for end-to-end security measures. In public cloud datacenters and many managed private cloud datacenters, the cyber security attack surface is migrating from the conventional enterprise perimeter firewall on premise to the endpoint computers (or virtual machines (VMs)) in the cloud. The endpoint computer is not only performing the necessary computing functionality, it is also at the forefront of the virtual corporate network boundary with the cloud. Security controls for applications, computing and networking are converging onto the endpoint as the next-generation attack surface. Endpoint security requirements, along with the necessary technology to fulfill such requirements, are becoming essential.

However, users are currently being faced with unsecured endpoints. Furthermore, hybrid networks can be compromised through root passwords on less-secure endpoint cloud resources as compared to a private network. This can cause a data leak through a breached network.

A cloud environment can be much more vulnerable to attack as compared to a traditional on premise private network of an enterprise. In the event a malicious actor is able to gain access to an unsecured cloud endpoint, the actor has many options for infiltrating and penetrating other cloud endpoints.

Therefore, there is a continuing need for better cloud computing security to protect against attacks and reduce network vulnerability.

BRIEF SUMMARY OF THE INVENTION

Cloud endpoints are secured using agents and a controller connected to the agents. A whitelist identifies components and processes of an authorized multi-tiered application for the cloud. An application profile for the application specifies valid computing flows between components of a tier and components of another tier, where components of the tier are executed at an endpoint and the other components of the other tier are executed at another endpoint. Endpoints are provisioned with static routing tables identifying at least one subnet destination. A request is received at a first endpoint to connect to a second endpoint. If the second endpoint falls within the at least one subnet destination, the controller performs one or more further security checks including checking the application profile flow, whitelist, and endpoint quarantine list. A network kernel table at an endpoint that includes the static routing table may be periodically checked to detect tampering.

Other objects, features, and advantages will become apparent upon consideration of the following detailed description and the accompanying drawings, in which like reference designations represent like features throughout the figures.

BRIEF DESCRIPTION OF THE FIGURES

FIG. 14 shows a flow diagram for discovering a new end point in a network domain.

FIG. 15 shows a flow diagram for discovering a deleted end point in a network domain.

FIG. 48 shows a flow for a preliminary security check at an endpoint according to a specific embodiment.

FIG. 49 shows a flow for the controller determining whether permission to connect should be ultimately granted or denied according to a specific embodiment.

DETAILED DESCRIPTION

Figure 1:
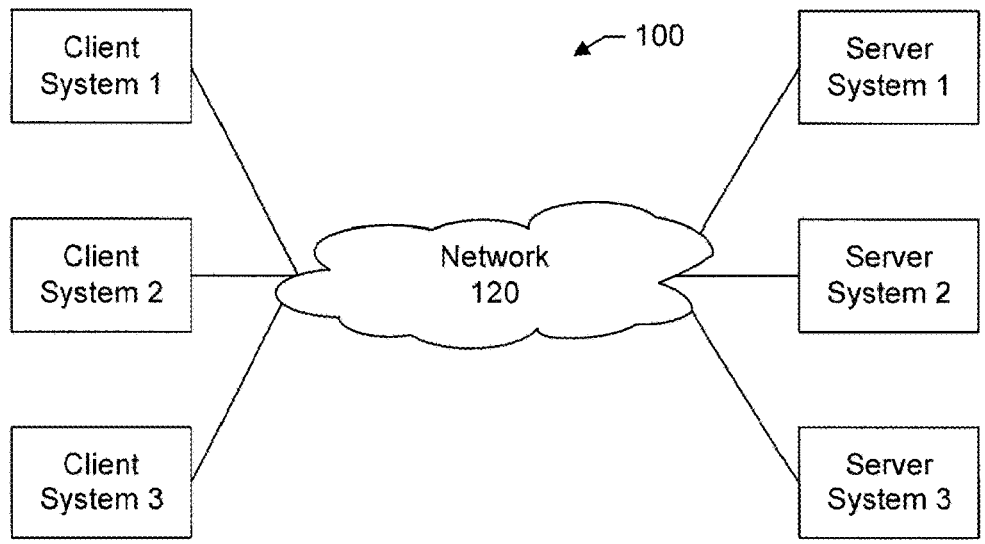
FIG. 1 shows a computer network system within which the present system may be embodied.

FIG. 1 shows a computer network system 100 within which the present system may be embodied. There may be any number of servers and clients in the system. For example, there may be hundreds, thousands, or even millions of servers and clients. In this system, there are three servers, server 1, server 2, and server 3, and there are three clients, client 1, client 2, and client 3. The client and server can represent application software. The hardware machine can be but is not limited to a server host machine or any type of client hardware machines such as desktop PC, laptop, and mobile devices. The servers communicate with the clients by exchanging packets over a network 120. The computer network system is representative of many different environments including a LAN (local area network) system, a wide area network (WAN) system, an Internet system, Ethernet, computer network, intranet, cellular phone network, or other.

Distributed computer network 100 in FIG. 1 is merely illustrative of an embodiment. One of ordinary skill in the art would recognize other variations, modifications, and alternatives. Client systems typically request information from server systems which provides the information. For this reason, server systems typically have more computing and storage capacity than client systems. However, a particular computer system may act as both a client or a server depending on whether the computer system is requesting or providing information.

Additionally, although some aspects of the system are described using a client-server environment or client-server application program, it should be apparent that the system may also be embodied in any environment where one system communicates with another system over a network. For example, in a hybrid cloud environment, there can be servers implementing the "client software" and other servers implementing the "server software." Those servers communicate with each other across cloud domains. Servers may communicate with each other in the same cloud domain. The communication can be facilitated via a virtual overlay network platform as discussed in this patent application.

As another example, there can be an access application where a "client machine" for a user is accessing servers in the "cloud." In this case, using GDB (GNU Debugger) as an example, the client software is then running on the client user machine. This client GDB software may to connect to the server GDB software that is running on the "server" in the cloud. The connection can be facilitated via a virtual network platform as discussed in this patent application.

A network generally includes: (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 7, 8, 10, or Windows Server 2012, Linux Red Hat 5, Ubuntu 13, Novell NetWare, AppleShare, or Artisoft LANtastic.

A network may include a hub, switch, or router. Hubs interconnect groups of users. Hubs can forward data packets—including e-mail, word-processing documents, spreadsheets, graphics, print requests—they receive over one port from one workstation to all their remaining ports.

Switches can offer more dedicated bandwidth to users or groups of servers. A switch can forward a data packet only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

Figure 2:
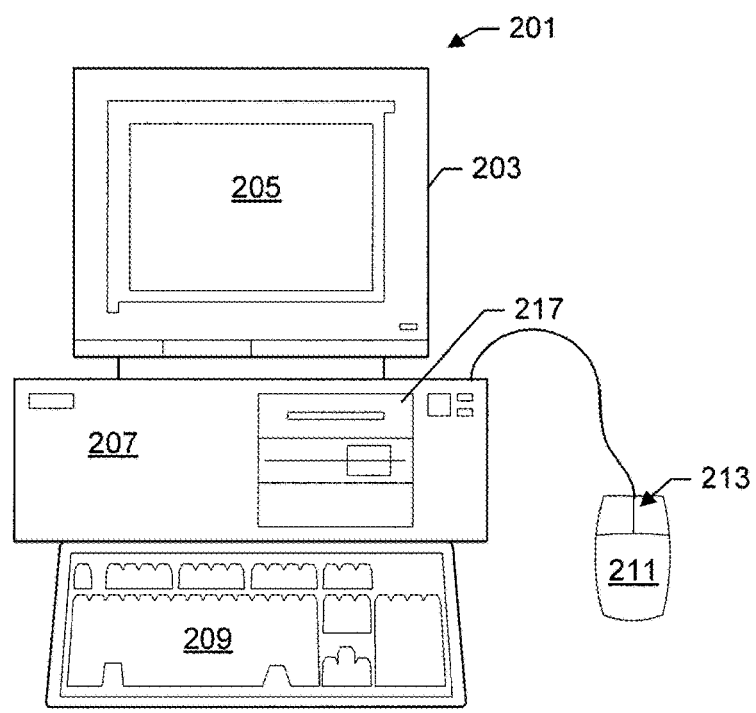
FIG. 2 shows a more detailed diagram of an example of a client or computer which may be used in an implementation of the system.

FIG. 2 shows an example of a client or server system that may be used to execute software of the present system. In an embodiment, a user interfaces with the system through a computer workstation system, such as shown in FIG. 2. FIG. 2 shows a computer system 201 that includes a monitor 203, electronic screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
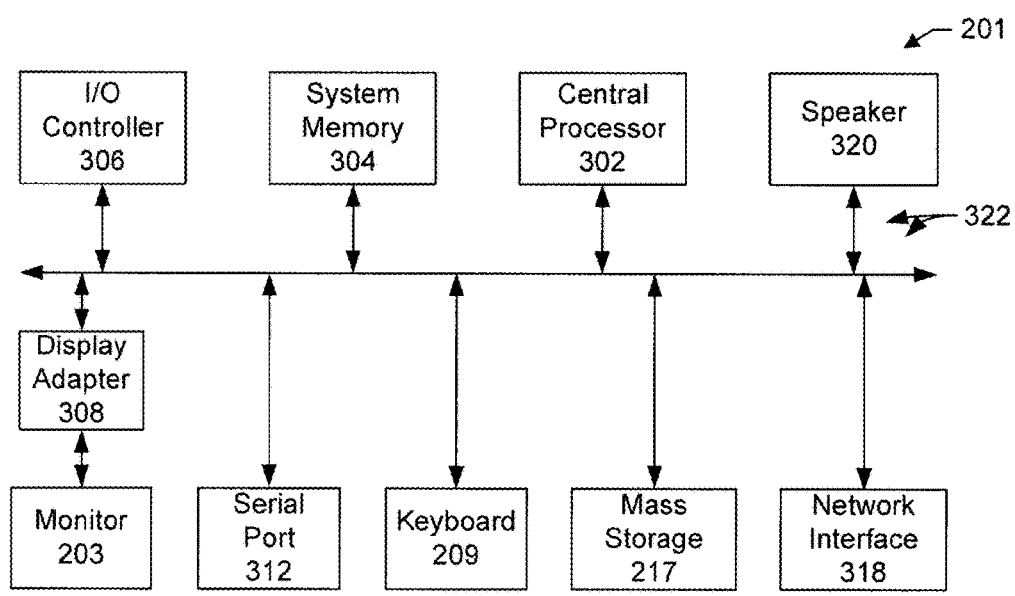
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, a computer program product is provided which stores instructions such as computer code to program a computer to perform any of the processes or techniques described.

An operating system for the system may be one of the Microsoft Windows® family of operating systems (e.g., Windows Server 2008, 2012, 2012 R2, 2016, Windows NT®, Windows 2000®, Windows XP®, Windows XP® x64 Edition, Windows Vista®, Windows 7®, Windows 8®, Windows 10®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
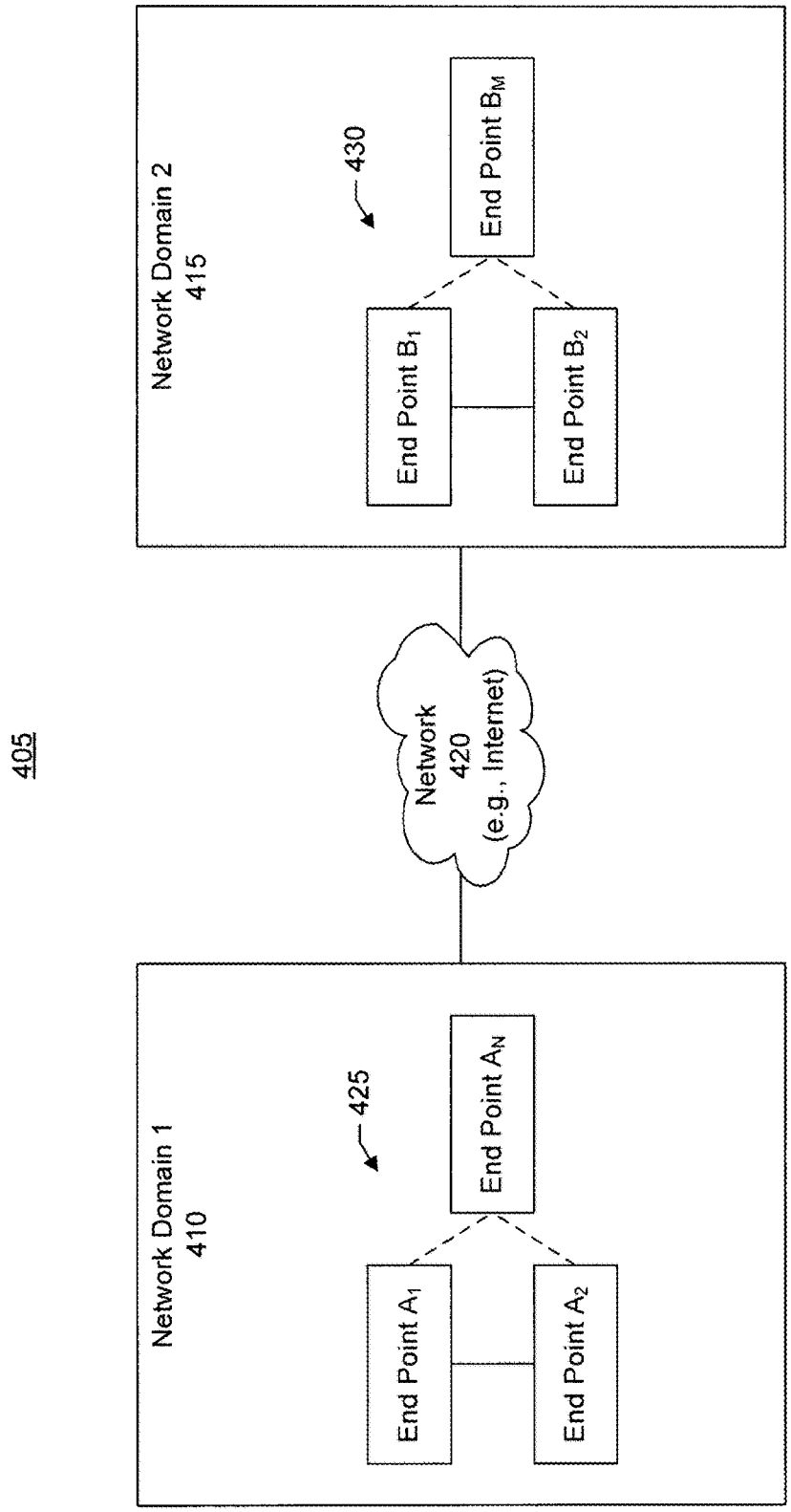
FIG. 4 shows a block diagram of end points within two network domains.

FIG. 4 shows a simplified block diagram of a distributed computing environment 405 in which a virtual network platform may be implemented. This environment includes a first network domain 410, a second network domain 415, and a network 420 that connects the first and second network domain. The first network domain includes a first set of end points (or endpoints) 425 (e.g., end point $A_1$, end point $A_2$, . . . end point $A_n$). The second network domain includes a second set of end points 430 (e.g., end point $B_1$, end point $B_2$, . . . end point $B_m$). The end points in a network domain may be interconnected themselves such as through a network or local network.

The network may be as shown in FIG. 1. An end point may be referred to as a node or computing node. In a specific embodiment, the first and second network domains are separate and interconnected via the Internet. One of the first or second network domains may include a private cloud infrastructure. Another of the first or second network domains may include a public cloud infrastructure. In this specific embodiment, the architecture shown in the example of FIG. 4 may be referred to as a hybrid cloud.

Security in a hybrid cloud environment is a concern because the underlying network and infrastructure are distributed, segregated, and owned by multiple authorities. Coordination among all parties for security re-provisioning can be overwhelming and prohibited, even if the change request is driven by a validated and approved business case. In a specific implementation, systems and techniques are provided for a secure virtual network platform that connects client and server applications deployed in two (or more) separate network domains interconnected via the Internet.

A network domain may include any number of end points. For example, there can be hundreds, thousands, or even millions of end points. An end point may include a physical device, a virtual device, or both. An end point can include a physical server (e.g., blade servers or rack-mounted servers), a virtual machine (VM), a virtual network edge gateway, or other physical or virtual appliance.

More particularly, an end point may include a general purpose computing system having one or more components such as that shown in FIGS. 2-3. For example, an end point may include a user interface, one or more processors, a network interface, mass storage, and memory. Alternatively, some embodiments may not include the user interface or the user interface may not be connected directly to the hardware platform. For example, user interaction may be automated or occur remotely in connection with data center administration. A first end point can include a client. A second end point, remote from the first end point, can include a server. The server may host application services for the client.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on the "host" hardware platform.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an internet protocol (IP) address.

An end point including a virtual network edge gateway provides a network entry point to services or applications behind the gateway. For example, an edge device can connect an internal local area network to the virtual network.

A network domain can be enterprise local area network (LAN), server farm environment, or an Infrastructure as a Service (IaaS) cloud datacenter, which can be protected by conventional peripheral firewalls. The two network domains can be interconnected via Internet or any TCP/IP network.

In an embodiment, the first network domain is different or separate from the second network domain. For example, the domains may be in different physical or geographic locations, have different capabilities, have different computer architectures, have different network environments, have different physical devices, networking infrastructure may be owned, operated, and administered by different entities, companies, enterprises, authorities, parties, or organizations, have different administrative policies, have different storage policies, have different security policies, or combinations of these.

Both domains may be owned by the same enterprise, but may be in different geographic locations. For example, one domain may be in San Francisco. Another domain may be in London. As another example, one domain or networking infrastructure may be privately owned such as by an enterprise. Another domain or networking infrastructure may be owned by a different or third-party that leases computing resources to the enterprise. A domain may be or be a part of a cloud computing or multi-tenant data center. There can be multiple private domains. There can be multiple public domains.

In a specific embodiment, the first and second domains are connected by the Internet. The Internet is a global system of interconnected computer networks that use the standard Internet protocol suite (TCP/IP) to serve users worldwide. It is a network of networks that includes millions of private, public, academic, business, and government networks, of local to global scope, that are linked by a broad array of electronic, wireless, and optical networking technologies.

In a specific embodiment, one of the first or second domains is a private cloud. Another of the first or second domains is a public cloud. A private cloud refers to a computing infrastructure (e.g., hardware, software, or both) that may be operated, controlled, or owned by a single enterprise. The computing infrastructure is internal to the enterprise. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time and network storage), resource pooling (e.g., the provider's computing resources are pooled to serve multiple consumers using a multi-tenant model, with different physical and virtual resources such as storage, processing, memory, and network bandwidth dynamically assigned and reassigned according to consumer demand), elasticity (e.g., capabilities can be elastically provisioned and released to scale outward and inward based on demand), and metering (e.g., resource usage can be monitored and reported for billing).

Some examples of cloud computing service providers include Amazon Web Services (AWS), Microsoft Azure, IBM SmartCloud, and many others. The number of computing end points in a private network domain for an enterprise may be different from the number of computing end points in a public cloud network domain. For example, the enterprise may include several thousand end points. The public cloud may include hundreds of thousands or millions of end points.

In this specific embodiment, the computing architecture may be referred to as a hybrid cloud. A hybrid cloud is a composition of two or more clouds such as a private cloud and a public cloud. A hybrid cloud allows an enterprise to extend its computing capabilities without having to make large capital investments in assets such as physical space and computing hardware. A hybrid cloud can also be used by an enterprise to accommodate spikes in demands for computing resources. An organization can pay for computing resources when they are needed. The organization may have a rental, lease, or other contractual agreement with a cloud services provider for the computing resources. An organization may utilize the services of multiple cloud service providers.

As discussed above, however, security and the network connection in a hybrid cloud environment is a concern because the underlying network and infrastructure are distributed, segregated, and owned by multiple authorities. Each authority may have different approaches and practices regarding security, privacy, administration, and compliance.

Figure 5:
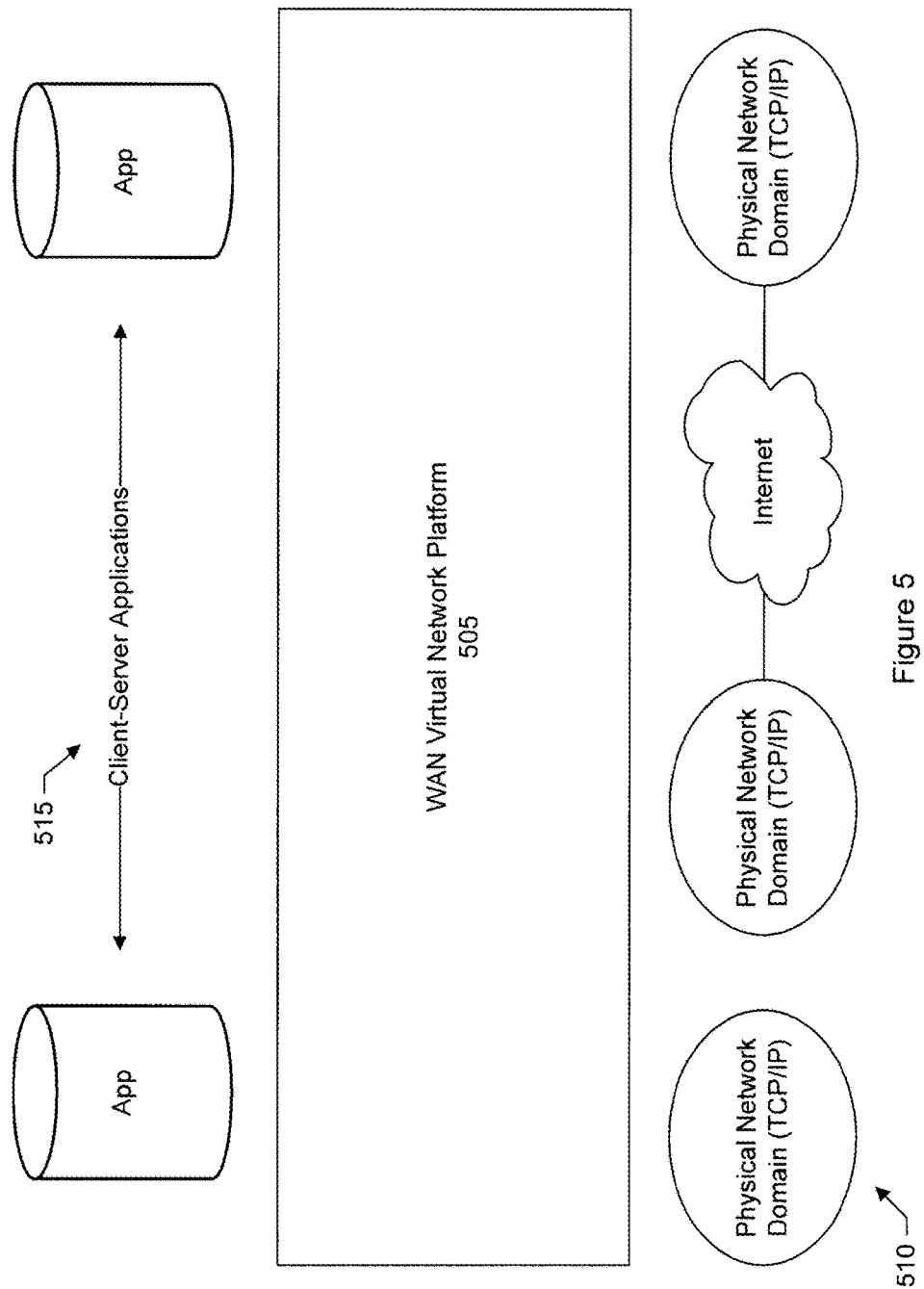
FIG. 5 shows a block diagram of a secure virtual network platform connecting the two or more network domains.

FIG. 5 shows a simplified block diagram of a secure virtual network platform or system 505. The virtual network platform may be referred to as a software-defined network (SDN), however, this SDN is not limited to an enterprise LAN (Local Area Network) or a local network in a cloud datacenter only. It is a WAN (Wide Area Network) based virtual network platform that is across multiple network domains. In a specific embodiment, the virtual network platform connects different physical network domains 510 in a hybrid cloud environment. The virtual network platform may be referred to as a wide area virtual network because it goes across or connects different network domains. As shown in the example of FIG. 5, the virtual network platform is layered on top of the physical network domains. The physical network domains may be running TCP/IP (Transmission Control Protocol/Internet Protocol). TCP/IP is one of several protocols that operating systems can use to process application requests for transmission over a network. The physical network domains may be controlled by different groups or IT departments.

Applications, such as client-server applications 515, are layered on top of the virtual network platform. In other words, the virtual network platform is positioned between the applications and the network domains. The applications can use the services provided by the virtual network platform to send and receive information across different domains. The virtual network platform helps to isolate the applications from the complexity of transmitting and receiving data across the different network domains.

For example, a client-server application may include a client application component and a server application component. The client application component may be executing on a first end point in a first network domain. The server application component may be executing on a second end point in a second network domain. The second network domain may be separate, remote, or different from the first network domain. In a specific implementation, the client application component can be a web browser. A client web browser requests an action or service from the provider of service (e.g., server or web server). In another specific implementation, the client application component executes independently of the web browser, such as an email client that connects to an email server.

When appropriate, the virtual network platform can be used to securely communicate or exchange information (e.g., data packets) between the network domains. For example, depending on the source of a particular data packet, destination of a particular data packet, security policy, application program, or combinations of these, it may or may not be appropriate to use the virtual network for the transport.

Figure 6:
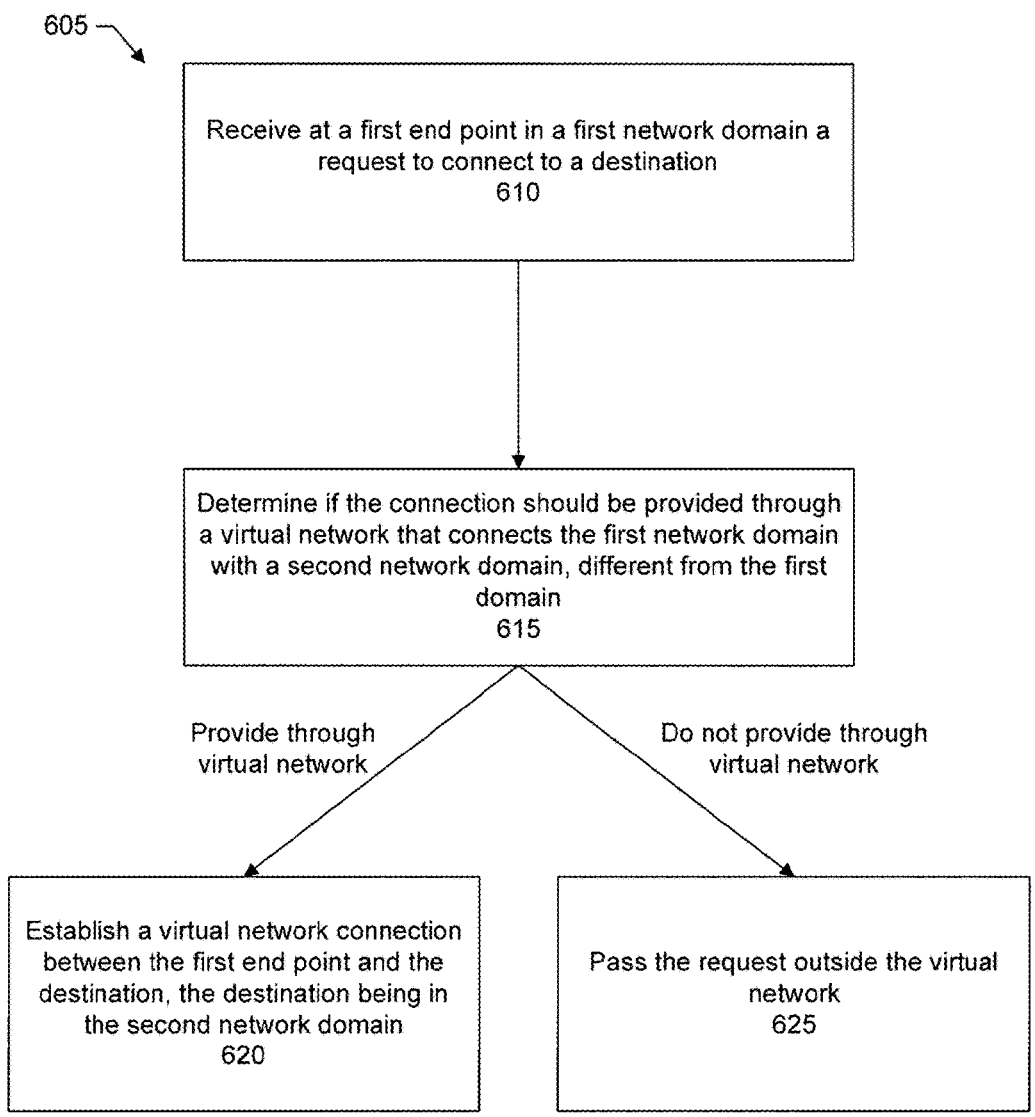
FIG. 6 shows an overall flow diagram for the virtual network platform.

FIG. 6 shows an example of an overall flow 605 for a specific implementation of the virtual network platform. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, a data packet (e.g., request) is received at a first end point in a first network domain to be sent to a destination. The data packet can indicate a request to connect to the destination. In a specific implementation, the request is from a client application component of an application program to connect with a server component of the application program.

It should be appreciated, however, that the request or connection can involve any type of source in one domain connecting to any type of destination in another domain and vice-versa. For example, in a hybrid cloud environment, there are servers implementing the "client software" and other servers implementing the "server software." The virtual network platform facilitates the servers communicating with each other across cloud domains. In another specific implementation, there is an access application where a "client machine" for a user is accessing servers in the "cloud." In this case, using GNU Debugger (GDB) as an example, the client software is then running on the client user machine. This client GDB software can connect to the server GDB software that is running on the "server" in the cloud.

In a step 615, a determination is made as to whether the connection should be provided through a virtual network that connects the first network domain with a second network domain, different or separate from the first network domain.

In a step 620, if the connection should be provided through the virtual network, a virtual network connection is established between the first end point in the first network domain and the destination, the destination being at a second end point in the second network domain.

Alternatively, in a step 625 if the connection should not be provided through the virtual network, the data packet is passed outside the virtual network. In other words, the data packet may be forwarded to a destination outside or external to the virtual network. In a specific implementation, the data packet is passed to the local TCP/IP network inside the first network domain. The local TCP/IP network can include a physical networking device (e.g., hardware router or hardware switch) within the first network domain. The physical networking device may include its own set of rules and logic for processing and forwarding the data packet. These rules and logic are separate from or independent of the rules and logic of the virtual network platform.

In a specific implementation, the decision as to whether the virtual network should be used can be made locally or without traversing the virtual network. For example, the decision can be made within the originating domain (e.g., the first domain). This feature helps to conserve the computing resources of the virtual network, reduce network traffic across the virtual network, and prevent bottlenecks. The virtual network platform provides IT administrators with the flexibility to decide the conditions, circumstances, or contexts for when the virtual network should be used (or not be used) to transmit data across two or more network domains. For example, the administrator can use the system to control which applications will use the virtual network, which applications will not use the virtual network, or both.

In a specific implementation, the system stores a list of applications that are authorized or allowed to use the virtual network. This list may be referred to as a white list. In various other specific implementations, the system stores a list of applications that are not authorized or allowed to use the virtual network. This list may be referred to as a black list. In a specific implementation, an application not listed in the black list is allowed to use the virtual network.

Figure 7:
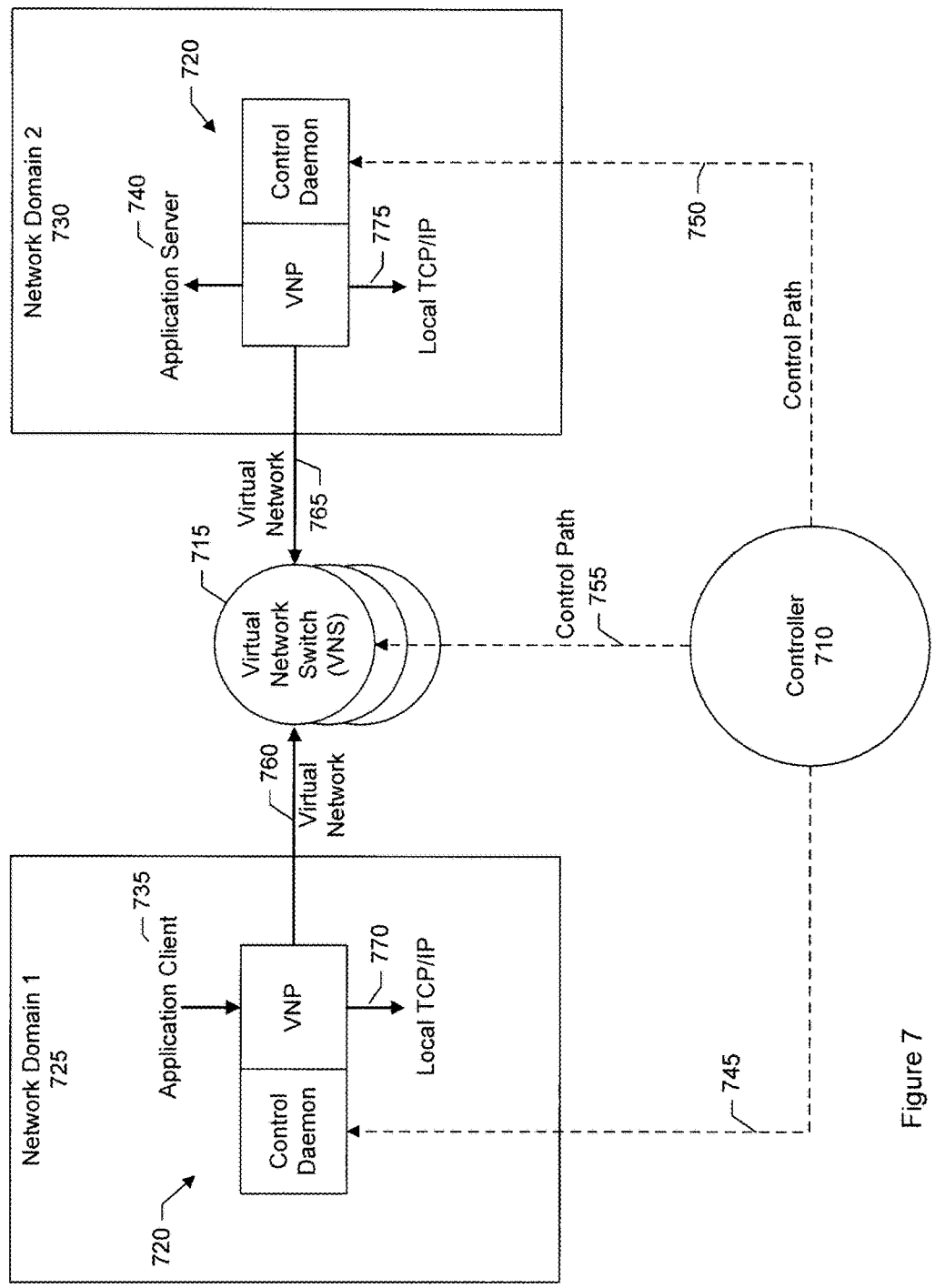
FIG. 7 shows a block diagram of a secure virtual network with L4 control paths.
Figure 8:
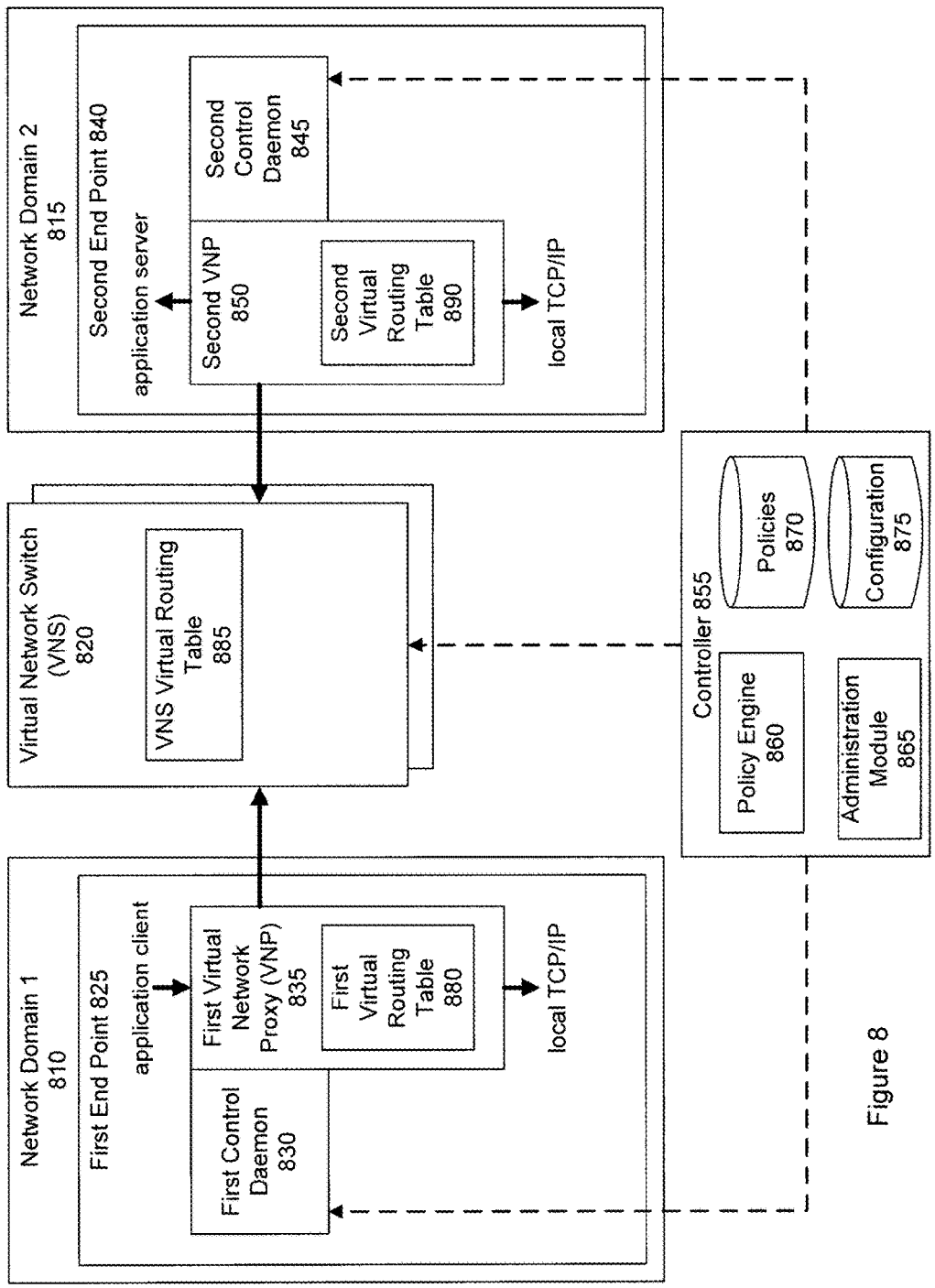
FIG. 8 shows a more detailed block diagram of the secure virtual network platform including virtual routing tables.

FIGS. 7 and 8 show more detailed block diagrams of the virtual network platform shown in FIG. 6. Referring now to FIG. 7, in a specific implementation, this secure virtual network platform design features a central controller 710, a virtual network switch (VNS) 715, and various end point modules 720 to form an end-to-end closed virtual network system. The controller, switch, and modules can include executable code, code components, or logic stored in memory of a hardware component.

In a specific implementation, the central controller is responsible for implementing and maintaining security policies in a central database, evaluating the security policies, approving (or denying) virtual network connections, directing the virtual switches to allow (or block) the virtual network connections, and directing the virtual network proxies to establish connections to the virtual switches. A specific example for such a security policy can be a rule for a GDB server application that is running on certain server machines in a network domain which can be accessed by a certain group of client machines running the GDB client software in a different network domain.

The virtual network switches are responsible for switching operations such as receiving a data packet and forwarding the data packet to the appropriate end point or port for the intended recipient. The virtual network switches can act as a bridge for exchanging communication between two different components of an application (e.g., a client component and a server component), where the application components are on two different end points in two different or separate network domains. Each network domain can remain independently configured. A virtual switch may execute within the virtualization software or firmware of a hardware component.

In a specific implementation, an end point module includes a control daemon and virtual network proxy. The control daemon, virtual network proxy, or both may be referred to as a virtual network agent. In a specific implementation, the end point modules are independent application programs or code modules. The modules may be external to the end point OS. A module may include code that is not native to the OS. In another specific implementation, the modules may function at the OS level or may be part of the OS. That is, a module may be internal to the OS. A module may include code that is native to the OS. A module may be implemented via add-ins, plug-ins, scripts, macros, extension programs, libraries, filters, device drivers, or combinations of these. Further discussion is provided below.

FIG. 7 shows a design with L4 (OSI layer 4) control paths between components that assure a tight security control for the use of the virtual network platform. The OSI (Open Systems Interconnection) Reference Model divides the functionality of the networking process into a seven-layer structure. The layers from top to bottom include application, presentation, session, transport, network, data link, and physical. The TCP/IP protocols are also divided into layers representing some of the same processes as their counterparts in the OSI model. There are four layers of the TCP/IP stack including application, transport, Internet, and link. The transmission of data from a source computer to a destination computer involves passing a request down through the various layers of the protocol stack.

The end point modules in a first network domain (e.g., network domain 1) 725 and a second network domain (e.g., network domain 2) 730 each include a virtual network proxy (VNP) and a control daemon connecting to the central controller. As discussed above, an example for an end point can be a physical server or a VM (virtual machine). Another example can be a virtual network edge gateway. In this specific implementation, a VNS is also or always connected to the controller. The network domain can be an enterprise LAN, server farm environment, or IaaS cloud datacenter, which can be protected by conventional peripheral firewalls. The two network domains can be interconnected via Internet or any TCP/IP network.

In a specific implementation, the enterprise IT defines a virtual routing table in the controller that defines how a client application 735 can find a server application 740 in a hybrid cloud environment. A set of virtual IP addresses is defined to connect a particular client-server application. This table is defined in the controller and the detail information is then pushed 745 and 750 to all control daemons and implemented in the VNPs.

In this specific implementation, when the application client software is making a connection to the application server in a separate network domain (e.g., the second network domain) in a hybrid cloud environment, it follows a TCP/IP routing table and requests a TCP connection with the VNP on the client side. The VNP confirms with the virtual routing table and then requests the control daemon to set up a virtual network connection.

The control daemon then makes the request to the central controller. The central controller checks the security policy, approves the connection, and then informs 755 VNS to allow virtual network connections 760 and 765 from both VNPs, respectively, and switch the packets. Once receiving the confirmation from the VNS, the controller requests both VNPs (via the control daemon) to establish a virtual network connection to VNS. The VNPs will then operate or function as a TCP proxy for data transfer. The VNS switches the data sent/received from the two virtual network connections.

In an implementation, the VNS only accepts virtual network connections when it is requested by the central controller for security control. The connections are always in pairs. When one connection is terminated by a VNP, the VNS will terminate the other virtual network in the same pair. In an implementation, the virtual network is always encrypted to protect the data transport.

The VNPs work as a TCP proxy and reverse proxy for the traffic defined in the virtual routing table. For the traffics not defined in the virtual routing table (i.e., traffic not using secure virtual network), the VNP will pass 770 and 775 the packets to the local TCP/IP network inside the respective network domain.

In an implementation, the virtual network connection (e.g., a TCP connection) is always initiated by the VNP at an end point to the central VNS. The data is then switched in the VNS. This architecture design is suitable for most of the TCP/IP network and peripheral firewall implementations in enterprise legacy networks. This architecture design allows the secure virtual network provisioning to be decoupled from the physical network and firewalls underneath and helps to avoid changing any legacy infrastructure. More specifically, the VNP initiates TCP traffic to the VNS, as this direction follows the typical enterprise firewall rules of "outbound first, inbound reply."

In a specific implementation, the virtual network switch (VNS) operates as a switching mechanism between the first and second network domains. In this specific implementation, the VNS can remove or extract a payload received from the first virtual network proxy in the first network domain and place the payload into return traffic to the second virtual network proxy in the second network domain.

The architecture of the virtual network platform allows the platform to be deployed without having to make extensive changes to the underlying network layer such as the legacy or exiting security firewall settings. For example, typically, as discussed an enterprise's firewall setting will allow outbound traffic to a destination gateway and then an inbound return. The virtual network switch between the domains provides an outbound traffic destination for end points in the first network domain, and an outbound traffic destination for end points in the second domain. This helps to reduce or eliminate the need for an enterprise to change their existing firewall settings. A new security policy can be implemented in the virtual network layer via the controller 710 as an easy add-on layer to the enterprise legacy network.

In other words, for many enterprises outbound traffic is allowed. The returning traffic for inbound is also allowed. The inbound first traffic is typically blocked by the corporate firewall for the reasons of protecting the corporate networks. That is, an enterprise may block unsolicited inbound traffic. The system architecture design shown in FIG. 7 recognizes such corporate firewall system policies by having the VNPs initiate outbound connections to the VNS for the establishment of a virtual network connection. An enterprise wishing to implement the virtual network platform will not have to make many changes to the corporate firewall because many corporate firewalls, while blocking unsolicited inbound traffic, will allow outbound network traffic and the subsequent inbound traffic associated with the outbound connections, e.g., return, response, or reply traffic.

In a specific implementation, a method for establishing a virtual connection between a first end point in a first network domain and a second end point in a second network domain, different from the first network domain, includes instructing a first virtual network proxy at the first end point to initiate a first connection outbound to a virtual network switch between the first and second network domains, the first connection thereby being outbound network traffic to the virtual network switch, instructing a second virtual network proxy at the second end point to initiate a second connection outbound to the virtual network switch, the second connection thereby being outbound network traffic to the virtual network switch, receiving at the virtual network switch a data packet from the first end point for the second end point, and forwarding a payload of the data packet to the second end point as return traffic associated with the second connection.

In another specific implementation, a method for establishing a virtual network connection between a first end point in a first network domain and a second end point in a second network domain, different from the first network domain, includes initiating or making a first connection from the first end point to a virtual network switch between the first and second network domains, initiating or making a second connection from the second end point to the virtual network switch, the second connection thereby including an outbound request from the second end point to the virtual network switch, receiving at the virtual network switch a data packet from the first end point via the first connection, and forwarding a payload of the data packet to the second end point as a response to the outbound request.

In another specific implementation, a method includes receiving at a virtual network switch between first and second network domains a data packet from the first end point, receiving at the virtual network switch outbound traffic from the second end point, and forwarding a payload of the data packet as return traffic associated with the outbound traffic.

In another specific implementation, the end points also always initiate the control traffic, connecting to the central controller. Again, a reason is because corporate firewalls typically block inbound traffics and allow outbound traffic and the inbound return traffic. The "control path" is designed for such firewalls in that the end points always initiate the control traffic to the central controller to avoid any corporate firewall issue. When the controller is communicating with the second end point, asking it to initiate a traffic to the VNS, the controller is using the "return traffic" to talk to the second end point (since the second end point initiates the traffic to the controller first).

In a hybrid cloud environment, the virtual routing table can be dynamically updated when end points are added to or deleted from the virtual network. The updated virtual routing table will be pushed by the controller to each involved control daemon and then implemented in each VNP.

FIG. 8 shows a more detailed diagram of a specific implementation of a virtual network platform. As shown in the example of FIG. 8, there is a first network domain 810, a second network domain 815, and a virtual network switch 820 between the first and second network domains. The first network domain includes a first end point 825. The first end point includes a first control daemon 830 and a first virtual network proxy 835.

Similarly, the second network domain includes a second end point 840. The second end point includes a second control daemon 845 and a second virtual network proxy 850. There is a controller 855 that is connected to the virtual network switch, and first and second control daemons. The controller includes a policy evaluation engine 860, an administration module 865, a database 870 for storing security policies, and a database 875 for storing configuration data. The VNPs and VNS include virtual routing tables for filtering and routing data packets between the two network domains. Further discussion is provided below.

Figure 9:
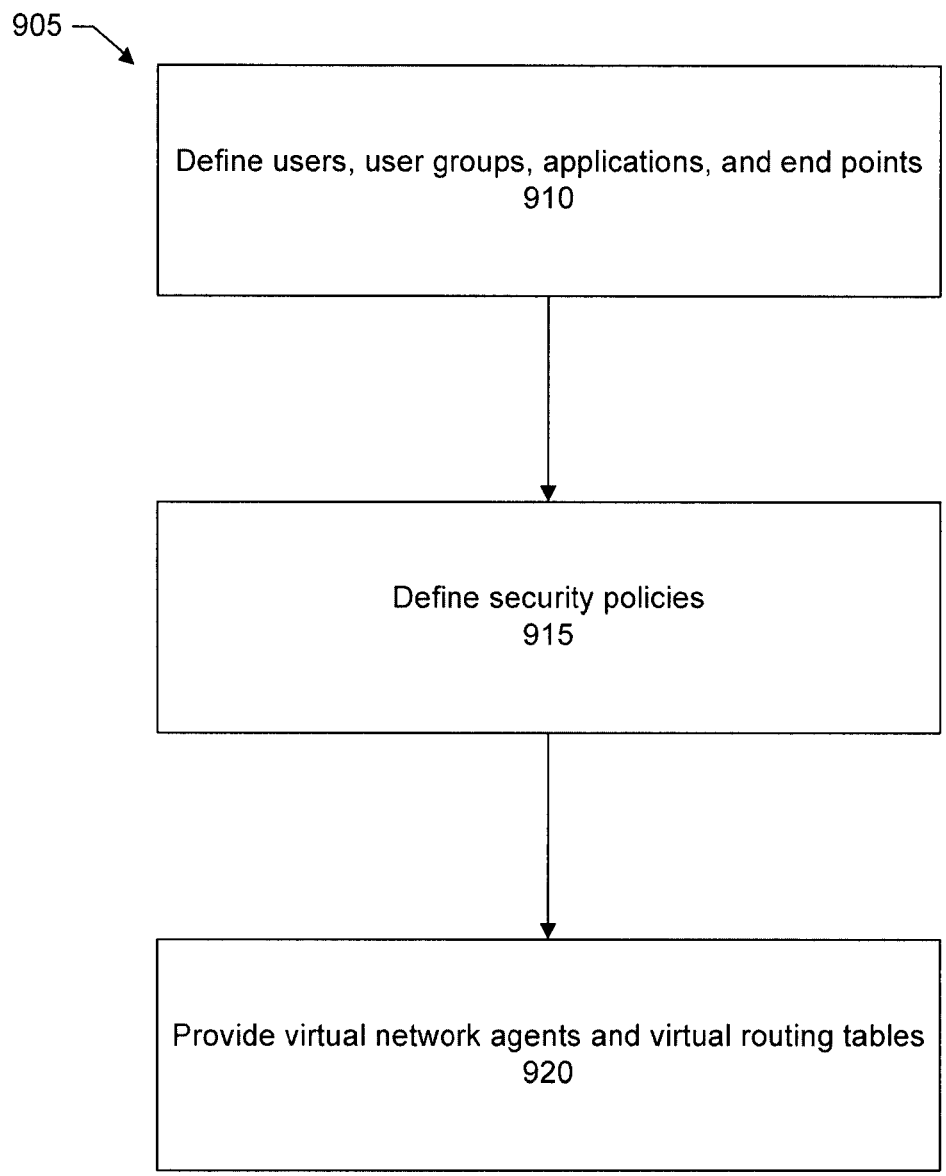
FIG. 9 shows a flow diagram for configuring the secure virtual network platform.

FIG. 9 shows a flow 905 for configuring a specific implementation of the virtual network. In this specific implementation, an IT administrator will program the central controller to define users and user groups (therefore, their computer (e.g., laptop computer) will automatically become end-points when they are on the computer and log in to the system), and the servers or VMs that are running some enterprise applications for access on the virtual network platform. And then the administrator will define the access rules (security) for who can access what, in what circumstances, and running what applications (e.g., what specific servers that have loaded these applications). Once these security rules are defined, users (e.g., their client computers as end-points) will be able to use the virtual network platform to securely access provisioned applications running on other end-points in segregated network domains.

More particularly, in a step 910, the IT administrator uses the administration module of the controller to define users, user groups, applications, and end points. The definitions may be stored in a configuration file or database. The administration module may include a graphical user interface (GUI) so that the administrator can easily manage the system. Using the administration module, an administrator can identify, create, add, update, delete, modify, alter, and remove users, groups, applications, and end points for the virtual network.

Table A below shows an example listing of users that may be defined through the administration module.

TABLE A

| Name | User Name |
|---|---|
| John Kent | jkent |
| Mark Smith | msmith |
| Ben Carver | bcarver |
| Violet Sun | vsun |

In table A above, a first column lists the user first and last name. A second column lists the user name corresponding to the user.

Table B below shows an example listing of user groups that may be defined through the administration module.

TABLE B

| Group | Users |
|---|---|
| Marketing | jkent, msmith |
| Engineering | bcarver, vsun |

In table B above, a first column lists the name of the group. A second column lists the users who belong to the corresponding group.

Table C below shows an example listing of applications that may be defined through the administration module.

TABLE C

| Application | Version |
|---|---|
| GDB Debug | 5.1.3 |
| VNC Access and Collaboration | 10.7 |
| Zshell Secure Access | 8.4.2 |

In table C above, a first column lists the name of an application. A second column lists the version of the application.

The administrator can use the administration module to define the virtual network routing tables. In a specific implementation, the virtual network routing tables identify the type of network traffic—based on traffic source, destination, or both—that will use the virtual network. Other traffic, e.g., traffic not identifying the specific IP destinations listed in the virtual routing tables, will be routed to the local or lower level TCP/IP network. The local TCP/IP network may then use a different set of routing tables to forward the traffic to the appropriate destination.

In a step 915, security policies are defined and stored in the policies database. As discussed above, a policy can include rules for who can access what, in what circumstances, and running what applications (e.g., what specific servers that have loaded these applications). A policy may include a programmatic expression to be evaluated, a conditional statement (e.g., if X then do Y else do Z), nested conditionals, multiple conditionals, boolean operators (e.g., OR, AND, or NOT), or combinations of these. For example, an access rule or policy may be structured or formatted as follows:

| If <condition> then ALLOW, else DENY |
|---|

In the above example, use of the virtual network is allowed when the <condition> evaluates to TRUE. Use of the virtual network is not allowed or denied when the <condition> evaluates to FALSE.

Consider, as an example, the following:

| If <X> accesses <Y> then ALLOW, else DENY |
|---|

The X and Y variables can identify users, user groups, application programs, application program versions, application program client components, application program server components, end points, physical machines, physical devices, virtual machines, virtual devices, network domains, or combinations of these that will be allowed to use the virtual network.

A policy can specify, for example, the end points in a particular network domain (e.g., private cloud) that will be allowed to connect to end points in another network domain (e.g., public cloud). Instead or additionally, there can be a policy that specifies the end points a particular network domain that will not be allowed to connect to end points in another network domain.

Below is an example of a policy:

---
If <user=vsun> accesses <end point=50.63.103.1> then ALLOW, else DENY
---

In this example, the user "vsun" (or "Violet Sun") will be allowed use of the virtual network to connect to the end point associated with IP address "50.63.103.1." Other users may be denied use of the virtual network. Another similar example is: If <end point=172.64.0.1> accesses <end point=50.63.103.1> then ALLOW, else DENY. In this example, it is one end-point server accessing another end-point server in a different network domain.

Below is another example of a policy:

---
If <user group=NOT Engineering> accesses <end point=50.63.103.1> then DENY, else ALLOW
---

In the above example, users not in the engineering group will be denied use of the virtual network to connect to the end point. Users in the engineering group will be allowed use of the virtual network to connect to the end point. From the example data in table B above, users "jkent" and "msmith" will be denied use of the virtual network because they are in the Marketing group which is not the Engineering group. Users "bcarver" and "vsun" will be allowed use of the virtual network.

As can be appreciated, an administrator can create very granular policies, very broad policies, or both that define the conditions in which use of the virtual network is allowed or not allowed. This allows enterprises to control communication across different network domains in a hybrid cloud environment without having to open their protected legacy networks. An add-on virtual network easily addresses new connection and business requirements.

Security can be specified based on specific computing nodes or machines (e.g., machine A in first domain can connect only to machine B in second domain) or groups of computing nodes or machines (e.g., all machines in machine group A in first domain can connect only to the machines in machine group B in second domain). Security can be specified based on specific application version (e.g., only application version 2.3 in first domain can connect to second domain) such that a security hack by altering application software can be blocked by virtual network access control. Security can be specified based on specific machines executing a specific version of an application (e.g., only application version 2.3 executing on machine A in first domain can connect to machine B in second domain). And so, forth.

As a specific example, consider a scenario where user-A can access a particular application that is running on server-A in the second network domain. When user-A is connected to the server-A and accessing the application, under that situation another user-B is allowed to access server-A at the same time and access a second application. In other words, there can be a policy such that the access right for user-B is only granted while user-A is conducting the access to the same server. Such a policy can be advantageous to security where user-A is an employee to the domain where server-A is deployed. User-B is a vendor who is helping user-A who is working on some application. According to the policy, the vendor, user-B, is never allowed to access the server-A alone. His access is only granted when user-A is connected to server-A. Thus, the "circumstances" for when the virtual network can (or cannot) be used can be a logical condition, a time condition, a geographical condition, a user role condition, a multiple user role condition, a dependency condition, or combinations of these.

Further, because the virtual network is decoupled from the physical network infrastructure, the control can be achieved without having to engage in extensive reconfiguration of the legacy infrastructure.

In a specific implementation, policy evaluation is centralized. In this specific implementation, policy evaluation is at the controller and is not at the individual end points and virtual switches. The policies are not distributed to the end points or switches. This centralized approach helps to reduce the resources needed to execute the end point modules (e.g., control daemon) and virtual switches because the logic for the policy evaluation will be the responsibility of the policy engine at the controller. The centralized approach is more secure as the controller can be strategically protected by enterprise IT and it is not easily reached or altered by users. Furthermore, there will be no storage space requirement at an end point for policies because the policies are stored at the controller. Such a centralized approach can also facilitate scaling and clustering of virtual network infrastructure.

In another specific implementation, policy evaluation is decentralized or a portion of policy evaluation is decentralized. In this specific implementation, there can be policy enforcement end point modules. Policies may be provided to the various end points so that policy evaluation can occur at an end point, virtual switch or both. In such a decentralized approach, it can be easier to scale the intelligence of security policies if there is a requirement for a complex security system.

In a step 920, virtual network agents (e.g., control daemons and virtual network proxies) and virtual routing tables are provided to the end points and virtual network switches. In a specific implementation, the agents, tables, or both are distributed from a central location (e.g., central control server) to the end points. In another specific implementation, the agents, tables, or both are provisioned in conjunction with the provisioning of an end point. For example, there can be a virtual machine template that provides for the installation of an agent, table, or both when a virtual machine is created or cloned from the template.

Figure 10:
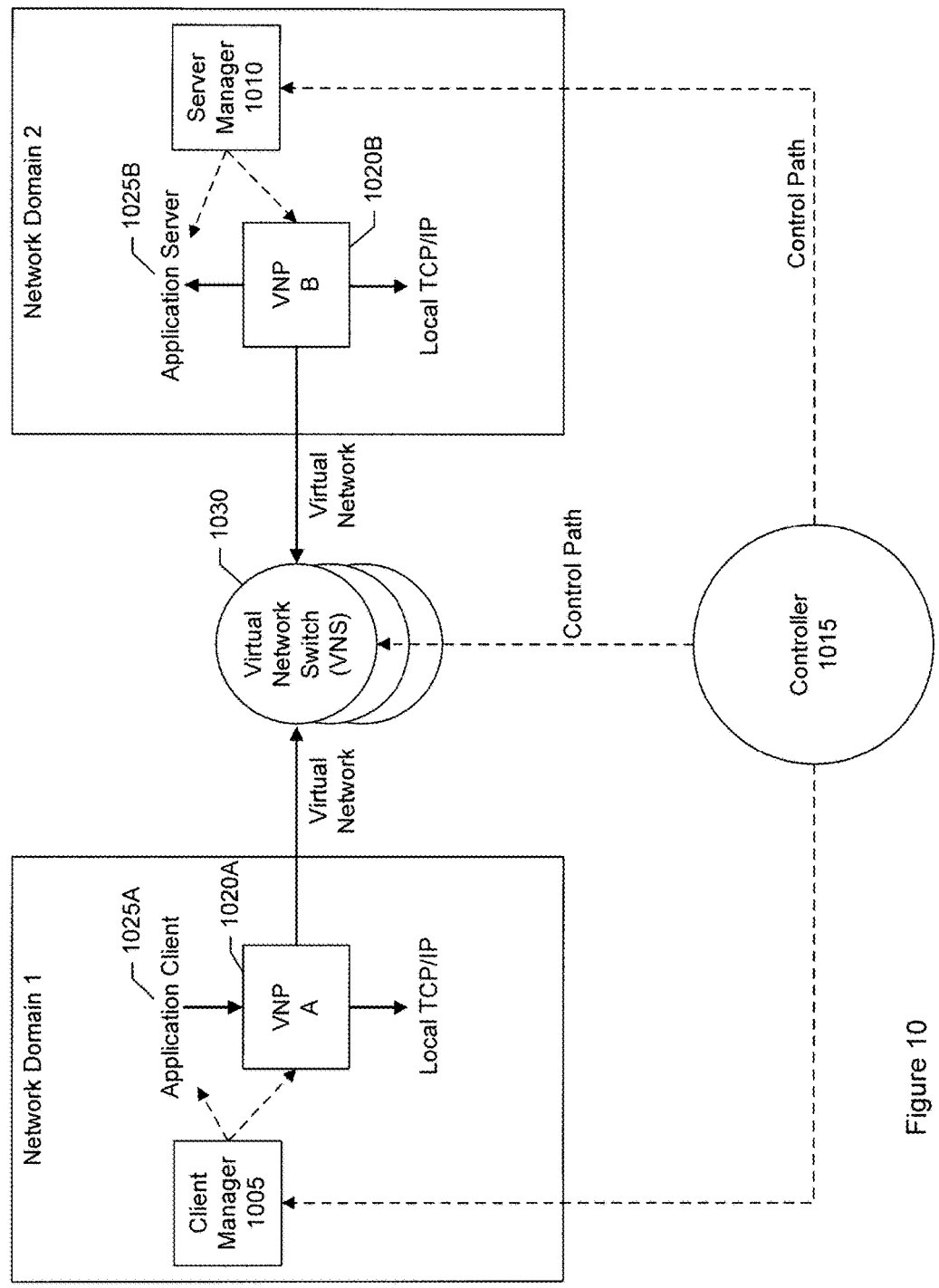
FIG. 10 shows a block diagram of a secure virtual network with L7 control paths.

FIG. 10 shows a block diagram of another specific implementation of a virtual network platform. The system shown in FIG. 10 is similar to the system shown in FIGS. 7-8. In the system of FIG. 10, however, the end points include a manager module to provide enhanced functionality. For example, as shown in FIG. 10, there is a client manager 1005 and a server manager 1010. The client manager is executing at the first end point in the first network domain. The server manager is executing at the second end point in the second network domain.

More particularly, FIG. 10 shows an example of a secure virtual network design with L7 (OSI Layer 7) control paths. The uniqueness of this virtual network design is the enhanced security control on the client-server applications using the virtual network platform. In this specific implementation, there is a client manager and a server manager that manage the client and server applications, as well as to interact with the central controller and control VNPs.

This design facilitates a feature that may be referred to as an "interlock" or "application interlock" or "computing interlock." The "interlock" mechanism helps to ensure that only the authorized client-server applications can use the virtual network for hybrid cloud connections. With the L7 management software at the end point, more intelligence can be built-in to support advanced security functions and application features in a hybrid cloud environment. When it comes to security control, it can be desirable to "integrate" or "interlock" the application level access with the network level access. In a specific implementation, the control is owned by the central controller. Therefore, in this case the virtual network access is then only available to specific applications that are provisioned by the controller at a higher level.

In this specific implementation, security can be implemented at the application layer, operating system layer, or both. The architecture of the platform allows for such security without having to program the network, the computing node on the network, and the application executing in the node.

The "interlock" mechanism facilitates vertical integration for security policy protection. For example, the system can be used to provision servers (or VMs) in two (or more) network domains such that the client-server applications can find each other using the virtual network platform. In this case, the IT administrator configures the central controller and defines an application profile that includes the valid computing flows among the end-points (as the security policy for communication). When a cloud manager adds more VMs into this application profile, the security rules (application profile and the computing flows) are automatically enforced in all end-points. When the end-points need to access each other (e.g., the client-server applications running inside these end-points are trying to reach each other), they will be able to use the pre-defined/allowed virtual networks.

Figure 11A:
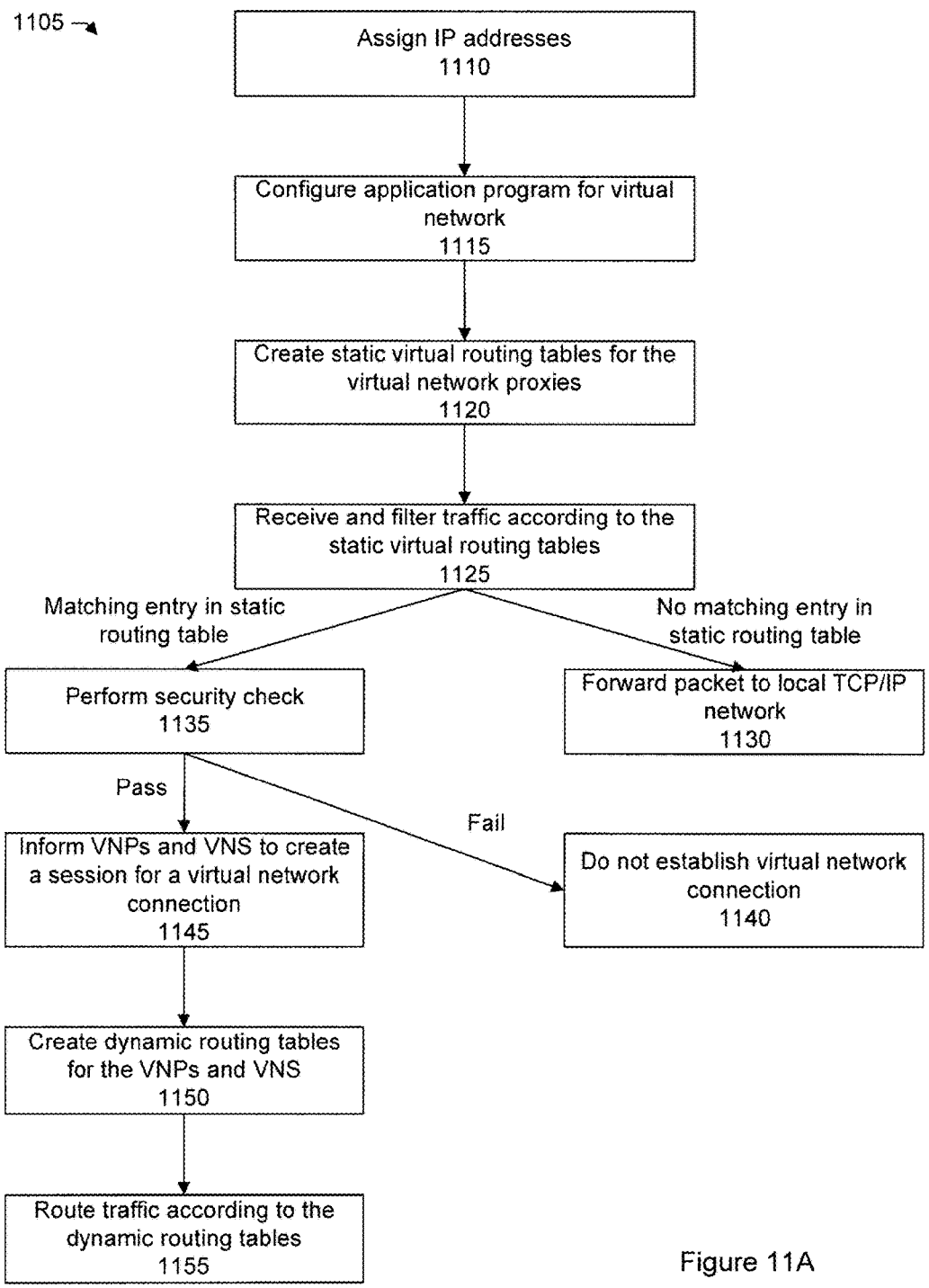
FIG. 11A shows a flow diagram of an operation of the secure virtual network platform.

FIG. 11A shows a flow diagram 1105 of a technique of a virtual network platform as shown in the example of FIG. 10. The virtual routing tables in the virtual network proxies and virtual network switches may be referred to as IP forwarding tables. In a specific implementation, there can be two types of end points when considering the virtual network connections. A first type of end point ("type-1") includes an end point machine where the application client software (or application server software) is a process that is in the same end point machine.

A second type of end point ("type-2") includes an end point gateway where the application client software (or application server software) is a process that is running on the network, not in the end-point gateway. In this specific implementation, in these two types of end points, the network routing considerations are different. The "virtual network routing table" and the way the connections are routed can be different. There can be a case where an end-point in a virtual network is a machine as well as a gateway.

A first type of end point can connect to another end point that is of the first type (e.g., "type-1" connects to "type-1"). A second type of end point can connect to another end point that is of the second type (e.g., "type-2" connects to "type-2"). As can be appreciated, the platform can support many more different connection conditions.

Regarding the first type of end point connections, in a step 1110, IP addresses are assigned. Consider, as an example, a specific implementation of the virtual network platform shown in FIG. 10. For this example, the virtual network will be provisioned to connect an end-point A in a network domain 1 to an end point B in a virtual domain 2. A controller 1015 assigns a first virtual IP address (e.g., "vIPa") to a first virtual network proxy ("VNPA") 1020A, a second virtual IP address (e.g., "vIPb") to a second virtual network proxy ("VNPB") 1020B. The first and second virtual IP address ("vIPa" and "vIPb") are virtual IP addresses which may or may not be routable in the physical TCP/IP network in domain 1 and domain 2.

In a step 1115, an application program is configured to use the virtual network. In this example, the application client software is configured so that it understands that the second virtual IP address ("vIPb") is the IP address to reach the application server software.

In a step 1120, static virtual routing tables are created for the virtual network proxies. These tables help the virtual network proxies (e.g., VNPA or VNPB) to filter traffic and decide whether to forward the packets via the virtual network or to the local TCP/IP network.

Figure 11B:
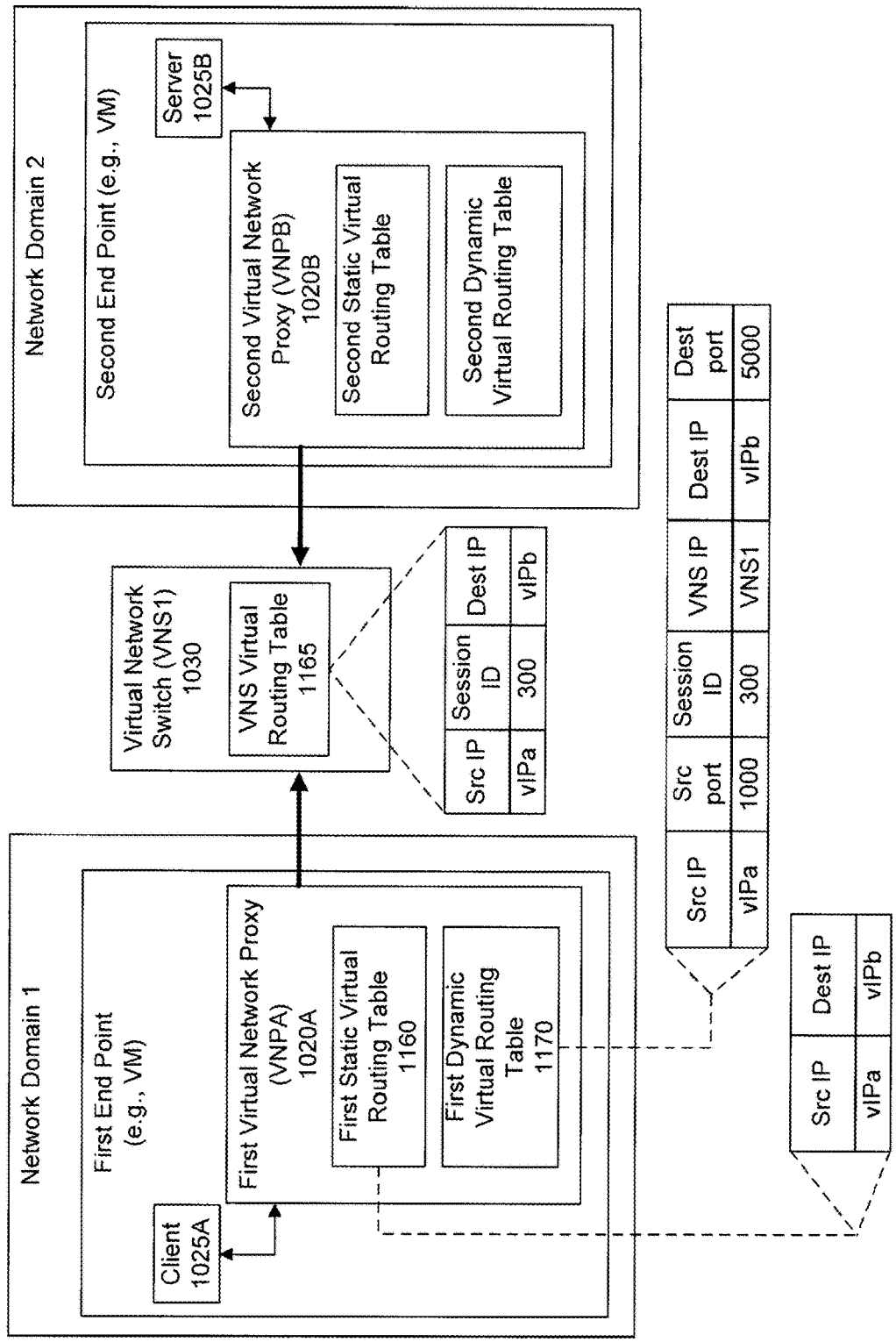
FIG. 11B shows an example of virtual routing tables being generated for a first type of connection across the virtual network.

Referring now to FIG. 11B, table D below shows an example of a static virtual routing table 1160 that may be created for first virtual network proxy (VNPA) 1020A.

TABLE D

| Source IP | Destination IP |
|---|---|
| vIPa | vIPb |

A first column of the table lists the source IP addresses. A second column of the table lists the destination IP addresses that correspond or map to the source IP addresses. In this example, the first virtual IP address ("vIPa") is mapped to the second virtual IP address ("vIPb"). A virtual routing table similar to the routing table shown in table D is created for the second virtual network proxy (VNPB) 1020B. In the type-1 case, both end points can initiate a network connection. That is, a client-server application can be deployed in both directions. In this case, for VNPB initiating a connection to VNPA, its routing table is a swapped version from what is shown in table D. Specifically, in this example, the source IP will be "vIPb" and the destination IP will be "vIPa."

As discussed above, in a specific implementation, the IT administrator uses the controller to create or generate the tables and distribute the tables to the virtual network proxies at the end points. For example, the controller may include a user interface that includes a set of input boxes. Using the input boxes, the administrator can input or enter the addresses and their corresponding address mappings. Alternatively, in another specific implementation, a virtual routing table may be created at an end point.

In a step 1125, traffic or data packets are received and filtered according to the static virtual routing tables. Data packets not having a routing address listed in the static routing table are forwarded to the local TCP/IP network (step 1130). In a specific implementation, determining if the connection should be provided through a virtual network connection includes comparing one or more than one Internet Protocol (IP) addresses associated with the second end point against a list of IP addresses stored at the first end point. In this specific implementation, when the one or more than one IP addresses associated with the second end point are not listed in the list of IP addresses, the connection should not be provided through the virtual network. One or more than one IP address can be associated with an end point. Each IP address can represent one "application server" in the other (e.g., second) network domain that the client wants to address.

Alternatively, if a data packet includes a routing address that matches an entry in the static virtual routing table, a security check 1135 is performed to determine whether a virtual network connection should be established. For example, assuming that an entry in the virtual routing table 1160 at first virtual network proxy (VNPA) 1020A can be found for a data packet, when application client 1025A is making a connection to application server 1025B, client manager 1005 checks with controller 1015 for security permission.

In other words, the manager will seek permission from the controller for the virtual network connection. There can be cases where a routing address is found in the static virtual routing table, but the controller denies the virtual network connection. This can be the result of a policy evaluation by the controller where, for example, one or more parameters of the policy have or have not been satisfied as described in the discussion of policies accompanying FIG. 9, step 915.

The local filtering via the static routing tables (step 1125) at the end points helps to reduce network congestion and bottlenecks. For example, a data packet will not have to be forwarded to a gateway device only to be returned because it is to be routed to the local TCP/IP network rather than the virtual network. The architecture helps to ensure that the system can be easily implemented without having to make expensive investments in upgrading, for example, the switching capacity of the existing network.

If the security check fails (step 1140), the application client is blocked from connecting to the application server. In other words, based on a policy evaluation by the controller, the controller may deny permission to use the virtual network. An alert such as an email, text message, or other notification for the administrator may be generated. The security failure may be recorded in a log.

Alternatively, if the security check passes (step 1145), the controller informs the virtual network proxies and virtual network switches to create a session for the virtual network connection. For example, when the security check is passing, the controller 1015 (FIG. 10) will inform first virtual network proxy (VNPA) 1020A, second virtual network proxy (VNPB) 1020B, and a first virtual network switch (VNS1) 1030, between the first and second virtual network proxies, to create a session for connection. It should be appreciated that there can be multiple (e.g., two or more) virtual network switch units for scalability.

In a step 1150, dynamic virtual network routing tables are created for the virtual network proxies and virtual network switch. Traffic between the first and second network domains is then routed according to the dynamic routing tables (step 1155). Dynamic virtual routing tables can refer to tables that are automatically generated, provisioned, or updated as part of establishing (or terminating) the virtual network connection. For example, the tables may be provisioned after a connection request is received. The tables can be created and updated without user intervention. Static virtual routing tables can refer to tables that are manually provisioned by an administrator as part of a configuration phase for the virtual network. For example, the tables may be provisioned before a connection request is received.

Table E below shows an example of a dynamic routing table 1165 (FIG. 11B) that may be created for first virtual network switch (VNS1) 1030.

TABLE E

| Source IP | Session ID | Destination IP |
|---|---|---|
| vIPa | 300 | vIPb |

A first column of the table lists the source IP address. A second column lists the corresponding session ID. A third column of the table lists the corresponding destination IP address. In a specific implementation, only the Controller is able to provision an entry in the virtual network switch (VNS) table. The restriction on access helps to ensure the security of the virtual network platform.

Table F below shows an example of a dynamic virtual network routing table 1170 (FIG. 11B) that may be created for first virtual network proxy (VNPA) 1020A.

TABLE F

| Source IP | Source Port | Session ID | VNS IP | Destination IP | Destination Port |
|---|---|---|---|---|---|
| vIPa | 1000 | 300 | VNS1 | vIPb | 5000 |

A first column of the table lists the source IP address. A second column lists the corresponding source port. A third column lists the session ID. A fourth column lists identifies the corresponding virtual network switch for the virtual connection. A fifth column lists the corresponding destination IP address. A sixth column lists the corresponding destination port. A similar table is also created in the second virtual network proxy (VNPB) 1020B.

In this example, application client software 1025A sends packets to the second virtual IP address ("vIPb") inside or within the end point machine A in the first network domain. The first virtual network proxy (VNPA) 1020A captures the packets via the static virtual routing table filter function (see table D above).

All packets captured in first virtual network proxy (VNPA) 1020A following the table above are forwarded to virtual network switch (VNS1) 1030 with the session ID, port information, as well as the destination IP information.

All packets received at virtual network switch (VNS1) 1030 are routed based on the dynamic VNS table above (see, e.g., table E). As discussed above, in a specific implementation, provisioning the dynamic VNS table is the responsibility of the controller. The VNS can compare the forwarded information from a VNP with the information provided in the dynamic VNS table to determine where a data packet should be routed. In a specific implementation, the session ID in the forwarded information and the session ID in the dynamic routing table help to identify the proper routing. If the session IDs do not match or correspond, the VNS may not transmit the data packet to the destination IP listed in the routing information forwarded by the VNP. The VNS (via the controller) thus helps to ensure the security of the virtual network.

It should be appreciated, however, that any competent technique may be used to determine whether or not routing information forwarded by a VNP to a VNS corresponds to routing information provisioned in the dynamic VNS table by the controller. Such techniques can include, for example, logic to identify a session, hashing, security tokens, encryption, cryptography, cookies, other variables instead of or in addition to session identifiers, or combinations of these.

All packets that arrive at second virtual network proxy (VNPB) 1020B with the destination IP address of "vIPb" will be forwarded to the process that owns port 5000 (destination port) on the same end point machine B in the second network domain.

In a specific implementation, a method includes storing at a first end point in a first network domain a static routing table including a list of virtual destination Internet Protocol (IP) addresses, receiving at the first end point a request from a client to connect to a destination, and scanning the static routing table to determine whether an IP address of the destination is listed in the static routing table. The method further includes if the IP address is not listed, passing the request to a TCP/IP network that is local to the first network domain, and if the IP address is listed, seeking permission from a controller to use a virtual network connecting the first network domain to a second network domain, different from the second network domain, the destination being in the second network domain, and upon a determination by the controller that use of the virtual network is permitted, establishing for the client a virtual network connection between the first end point and the destination.

In a specific implementation, the method further includes upon the determination that use of the virtual network is permitted, creating at the first end point a first dynamic routing table having first routing information, the first routing information including a first session identifier that identifies the virtual network connection, and forwarding the first routing information to a virtual network switch between the first and second network domains. The virtual network switch consults a second dynamic virtual routing table having second routing information. The second routing information includes a second session identifier. When the second session identifier corresponds to the first session identifier, the virtual network switch forwards a payload of a data packet from the client to the destination according to the second routing information.

Figure 11C:
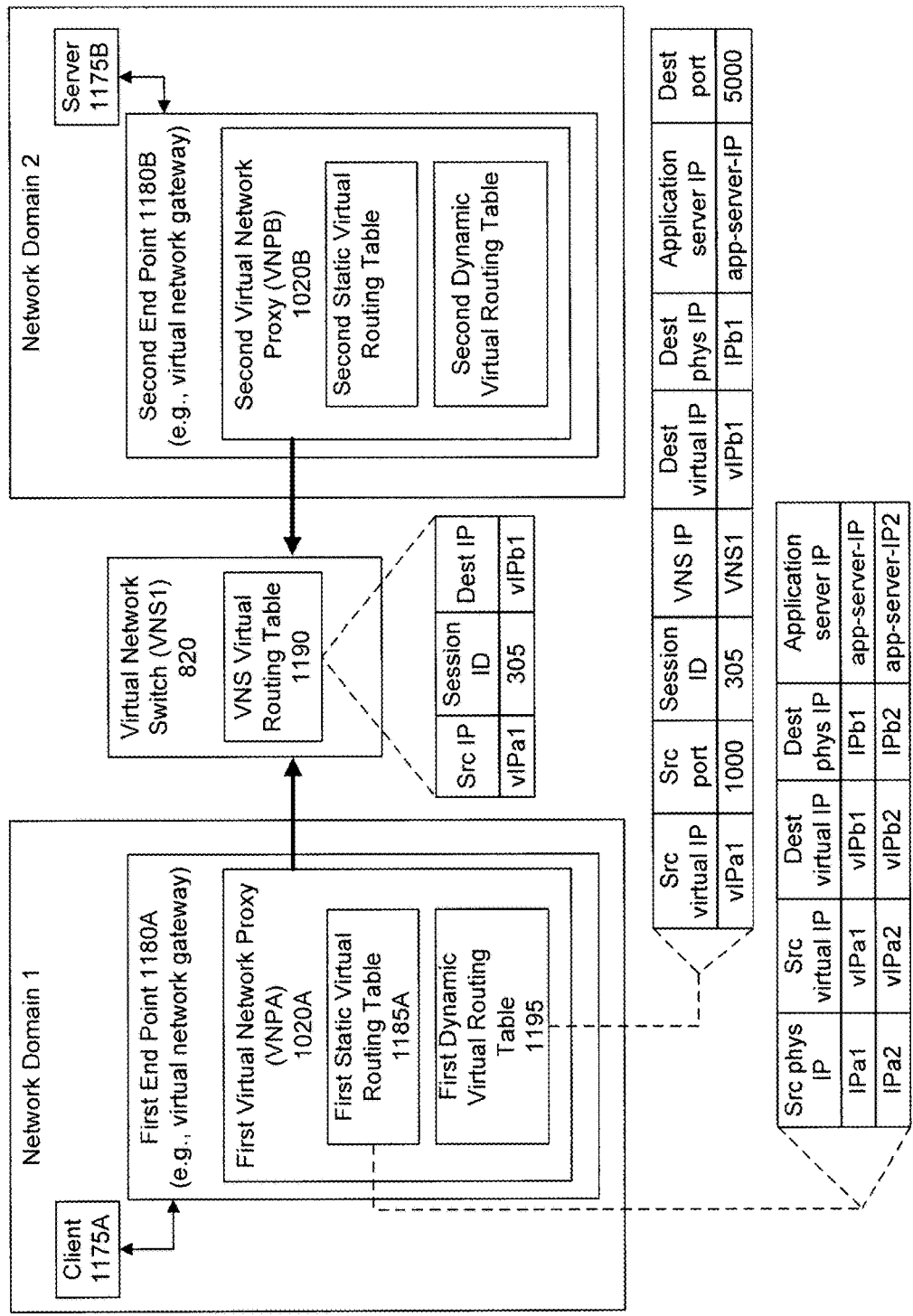
FIG. 11C shows an example of virtual routing tables being created for a second type of connection across the virtual network.

For the second type of end point connections, the application client software and application server software are running outside of or are external to the end-point machines. FIG. 11C shows an example of application client software and application server software 1175A and 1175B, respectively that are not located in end point machines 1180A and 1180B. The end-point machines in this case can be considered as virtual network gateways, not an end point server. In this case, each "client-server" application will be provisioned in the virtual network so that the routing can be accomplished.

Consider again, as an example, the virtual network platform and flow shown in FIG. 10-11A. In step 1110, IP addresses are assigned. When a first client-server application is provisioned on a virtual network that connects end point A as a virtual network gateway in network domain 1 to the end point B as a virtual network gateway in the virtual domain 2, controller 1015 assigns a first IP address ("IPa1") and a first virtual IP address ("vIPa1") to first virtual network proxy ("VNPA") 1020A. The controller assigns a second IP address ("IPb1") and a second virtual IP address ("vIPb1") to second virtual network proxy ("VNPB") 1020B, as well as the application server IP, app-server-IP.

The first virtual IP address ("vIPa1") and the second virtual IP address ("vIPb1") are virtual IP addresses which may or may not be routable in the physical TCP/IP network in first network domain 1 and second network domain 2. The first IP address ("IPa1"), second IP address ("IPb1"), and the address for the application server ("app-server-IP") are physical IP addresses.

In step 1115, the application program is configured for the virtual network. In this example, the application client software, is configured so that it understands the first IP address ("IPa1") is the physical IP address to reach the application server software running in network domain 2.

In step 1120, static virtual routing tables are created for the virtual network proxies. As discussed above, these tables helps the virtual network proxies to filter traffic and forward the packets via virtual network or to the local TCP/IP network (or drop the packets). Table G below shows an example of an entry in a static virtual routing table 1185A (FIG. 11C) that may be created for first virtual network proxy (VNPA) 1020A (which, in this example, is a virtual network gateway).

TABLE G

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |

A first column of the table lists a physical IP address of the source gateway. A second column lists the virtual IP address of the source gateway. A third column lists the virtual IP address of the destination gateway. A fourth column lists the physical IP address of the destination gateway. A fifth column lists the IP address of the application server. A similar virtual routing table is created in second virtual network proxy (VNPB) 1020B.

Entries may be added to the virtual routing tables as needed. For example, when a second client-server application is provisioned to route through the virtual network, another entry can be added to the static virtual table as shown in the example of table H below.

TABLE H

| Source Physical IP | Source Virtual IP | Destination Virtual IP | Destination Physical IP | Application Server IP |
|---|---|---|---|---|
| IPa1 | vIPa1 | vIPb1 | IPb1 | app-server-IP |
| IPa2 | vIPa2 | vIPb2 | IPb2 | app-server-IP2 |

In step 1125, as discussed above, traffic or data packets are received and filtered according to the static virtual routing tables. Data packets not having a routing address listed in the static routing table are forwarded to the local TCP/IP network (step 1130). Alternatively, data packets having an address listed in the static routing table trigger a security check. In a specific implementation, when the application client is making a connection to the application server, the IP network in first network domain 1 routes the packets to the first virtual network proxy (VNPA). Client manager 1005 then checks with controller 1015 for security permission, on demand (step 1135).

When security check passes, controller 1015 will inform the first virtual network proxy (VNPA), second virtual network proxy (VNPB), and the virtual network switch (VNS1) to create a session for connection (step 1145). There can be multiple VNS units for scalability.

In step 1150, dynamic routing tables are created. Table I below shows another example of a dynamic routing table 1190 (FIG. 11C) that may be created for the virtual network switch.

TABLE I

| Source IP | Session ID | Destination IP |
|---|---|---|
| vIPa1 | 305 | vIPb1 |

As discussed above, in a specific implementation, only the controller is able to provision an entry in the VNS table to ensure the security of the system. In other specific implementations, where, for example, security is not too high of a concern, the VNS table may be provisioned by a module other than the controller. Such provisioning can help to increase response time and network performance.

Table J below shows an example of a dynamic virtual network routing table 1195 (FIG. 11C) created for the first virtual network proxy (VNPA).

TABLE J

| Source Virtual IP | Source Port | Session ID | VNS IP | Destination Virtual IP | Destination Physical IP | Application Server IP | Destination Port |
|---|---|---|---|---|---|---|---|
| vIPa1 | 1000 | 305 | VNS1 | vIPb1 | IPb1 | app-server-IP | 5000 |

A first column of the table lists the virtual IP address of the source gateway. A second column lists the port of the source gateway. A third column lists the session ID. A fourth column lists the IP address of the virtual switch. A fifth column lists the virtual IP address of the destination gateway. A sixth column lists the physical IP address of the destination gateway. A seventh column lists the IP address of the application server. An eighth column lists the destination port. A similar table is also created in the second virtual network proxy (VNPB) 1020B.

In this example, all packets captured in the first virtual network proxy (VNPA) following the table above are forwarded to the virtual network switch (VNS1) with the session ID, the port information as well as the destination IP information. All packets received at the virtual network switch (VNS1) will be routed based on the dynamic VNS table above. All packets arriving at the second virtual network proxy (VNPB) with the destination virtual IP address of "vIPb1" will be forwarded to app-server-IP with port 5000. In this forwarding traffic, the source IP will be "IPb1," i.e., the physical IP address of the destination gateway from the table above.

Figure 12:
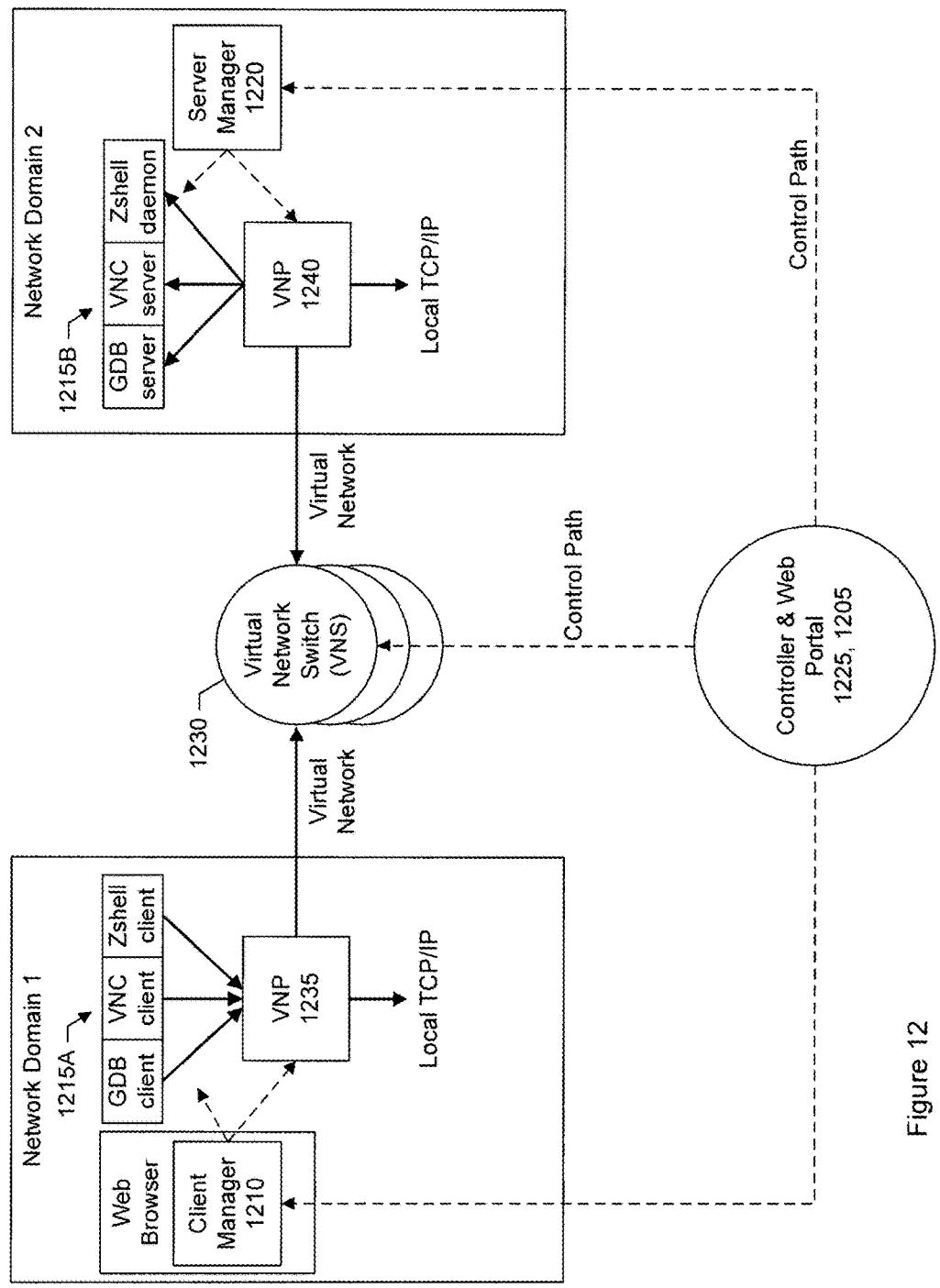
FIG. 12 shows a block diagram of a secure virtual network for secure remote access, debug, and collaboration applications.

FIG. 12 shows a block diagram of another specific implementation of a virtual network platform. The system shown in FIG. 12 is similar to the system shown in FIG. 10. In the system of FIG. 12, however, the platform is further enhanced with a central web portal 1205, a web browser with client manager 1210, and various client-server applications 1215A, B that are managed by the client manager and a server manager 1220. The virtual network interlock capability is built in and enforced by the client manager and server manager to lock the application software and the usage of virtual network.

The platform supports secure remote access, operation, debug, and collaboration without re-engineering or re-provisioning enterprise existing network and security infrastructure. During the access, the enterprise IP (Intellectual Property) and secure data stay behind their layers of firewalls. A specific version of the application software can be locked and used on the remote access platform for security compliance. In a specific implementation, only the packets generated by the authorized access, debug, and collaboration tools are allowed to travel through the virtual network.

The example of the secure remote access platform shown in FIG. 12 includes virtual network controller 1225, a virtual network switch (VNS) 1230, virtual network proxy (VNP) 1235 and 1240 on both client and server sides, respectively, central web portal system 1205, client manager 1210 managing application client software 1215A, and server manager 1220 managing application server software 1215B.

All client-server applications on this platform (e.g. access, collaboration, GDB debug, and Zshell) are controlled end-to-end horizontally between network domains and top-down from application layer to the secure network layer vertically. The client-server application connections are realized via the virtual network infrastructure underneath.

Table K below shows a flow of a specific implementation of the system.

TABLE K

| Step | Description |
|---|---|
| 1 | A user can log on to the web portal via a web browser. Given a privilege control, the user can choose to use an access and collaboration tool (e.g., VNC), a remote debug tool (e.g., GDB), and a secure shell access tool (e.g., Zshell) from links offered on a web page. By clicking the link, the system platform will execute one or more of the following steps 2-8: |
| 2 | A package including the client manager software, application client software, and VNP is dynamically downloaded via web browser plug-in. |
| 3 | Client manager requests security permission from the controller for the operation associated with the link. |
| 4 | Controller allows it (or denies it based on policy) and informs server manager to prepare application server and turn on virtual network with connection controlled by VNP, connecting to VNS. Prior to the connection request, deploy the access server with the server manager and application server software. |
| 5 | Controller informs VNS to allow two connections from VNPs on both the client and server ends. The two connections will be formed in a pair and the data are securely switched in VNS. |
| 6 | Controller informs client manager that the permission granted. |
| 7 | Client manager starts application client software, connecting to VNP, and then connects to VNS via virtual network. |
| 8 | The end-to-end client-server applications are then connected and interlocked with the virtual network. |

In a specific implementation, the virtual network platform is used in conjunction with a debugging application referred to as GNU Project debugger (GDB). In this specific implementation, with this secure remote access platform, a client-server GNU GDB tool can connect between two network domains to perform source code debug without changing any of the underneath network infrastructure. With this capability, the data files stay behind the firewall in a network domain (e.g., second network domain). The source code of the application software under debug stay in another network domain (e.g., first network domain). The data files and source codes are considered sensitive corporate IP and can be prevented from being transferred out of the enterprises.

It can be desirable to ensure that a specific version of the GDB client and software tools are used on this platform. The original GNU GDB tools include some special functions that are considered security violations for many enterprises when used in a cross domain environment. In this specific implementation, a special version of the GDB software with the malicious (or undesired) functions removed can be "locked" in this platform for usage.

In another specific implementation, the virtual network platform is used in conjunction with a desktop sharing application referred to as VNC Access and Collaboration. VNC is very popular and has been widely used in the high tech industry for remote virtual desktop access and collaboration. Over this specific implementation of the secure remote access platform, a special version of VNC can be embedded to support remote access and collaboration function.

More particularly, VNC carries some native features that may be undesirable to the enterprises in terms of security when used in a cross domain environment. A special version of VNC with these features removed can be embedded and "locked" in this platform for usage.

VNC supports a collaboration mode with a view sharing for the virtual desktop. On this specific implementation of the secure remote access platform with web portal a browser control, one can implement a desirable collaboration feature where a "guest" can be invited to join a live VNC session owned by another user. The guest can only join this VNC session when it is live. The owner of the VNC session does not need to release his or her secure password to the guest for signing on. The platform hides the complexity and makes the collaboration session very simple and yet secure.

Another example of a desirable function that can be offered on this specific implementation of the platform is an "administrator enforced join" into any live VNC session. With a proper privilege control on the web portal system, one user can have a high privilege to actively join into a VNC session that is owned by another user.

In another specific implementation, the virtual network platform is used in conjunction with a shell application referred to as Zshell. Zshell is a secure shell feature that allows one party to execute a specific and pre-defined set of shell commands in another domain without opening the network. When two companies are collaborating across domains, frequently a specific set of tasks need to be executed by guests in a secure environment.

However, given the constraints in the modern enterprise environment, the network and computing environment have to be "open" even just to support running a small set of tasks. However, once the network and computing environment are open to support these tasks, it becomes extremely difficult to ensure that only the set of tasks was executed in the environment. The corporate compliance could be compromised in such a scenario.

Zshell is a function designed to avoid the overhead and yet achieve the goal of executing the limited set of tasks via a shell. In this specific implementation, when Zshell is integrated in the secure remote access platform, the Zshell feature along with the "interlock" capability of the platform enables the "guest" to execute only a given set of commands in the remote domain. No other network connection is open. No other computing capability is granted in such a case. The same benefits from avoiding "opening" the network via the "interlock" capability with the virtual network applies to other applications such as and not limited to GDB and VNC.

In this specific implementation, a pre-defined set of shell commands is associated with each server manager. The association can be enforced by the central web portal. The user access of Zshell is then offered through the front-end web browser and client manager. Once the Zshell client tool is connected to the Zshell daemon, the corresponding set of shell commands will be associated by the Zshell daemon to limit the tasks that can be executed by the user. Note that the server manager can be deployed in an access server, where the access server can be easily deployed anywhere inside a company network domain. The programmability of a specific set of commands (i.e., task execution) can be dynamically inserted anywhere inside a corporation for business needs and made available to external guests without compromising security.

In various specific implementations, a novel platform is provided for secure remote access, operation, debug, and collaboration. GDB Debug, VNC Access and Collaboration, and Zshell Secure Access are some examples of client-server applications that can be locked on this platform to support secure functions and features for enterprise remote operations. It should be appreciated, however, that the merits of this platform and technology are not limited to the presented functions and features. The design principles and aspects discussed in this patent application can be applied to many other client-server applications that can be integrated and locked on this platform and achieve business benefits.

To support a fairly complex operations scenario, multiple features on this secure remote access platform can be applied and used in a mixed format. Multiple access servers with different features selected and enabled can be offered in parallel and to users with different role and privilege.

Figure 13:
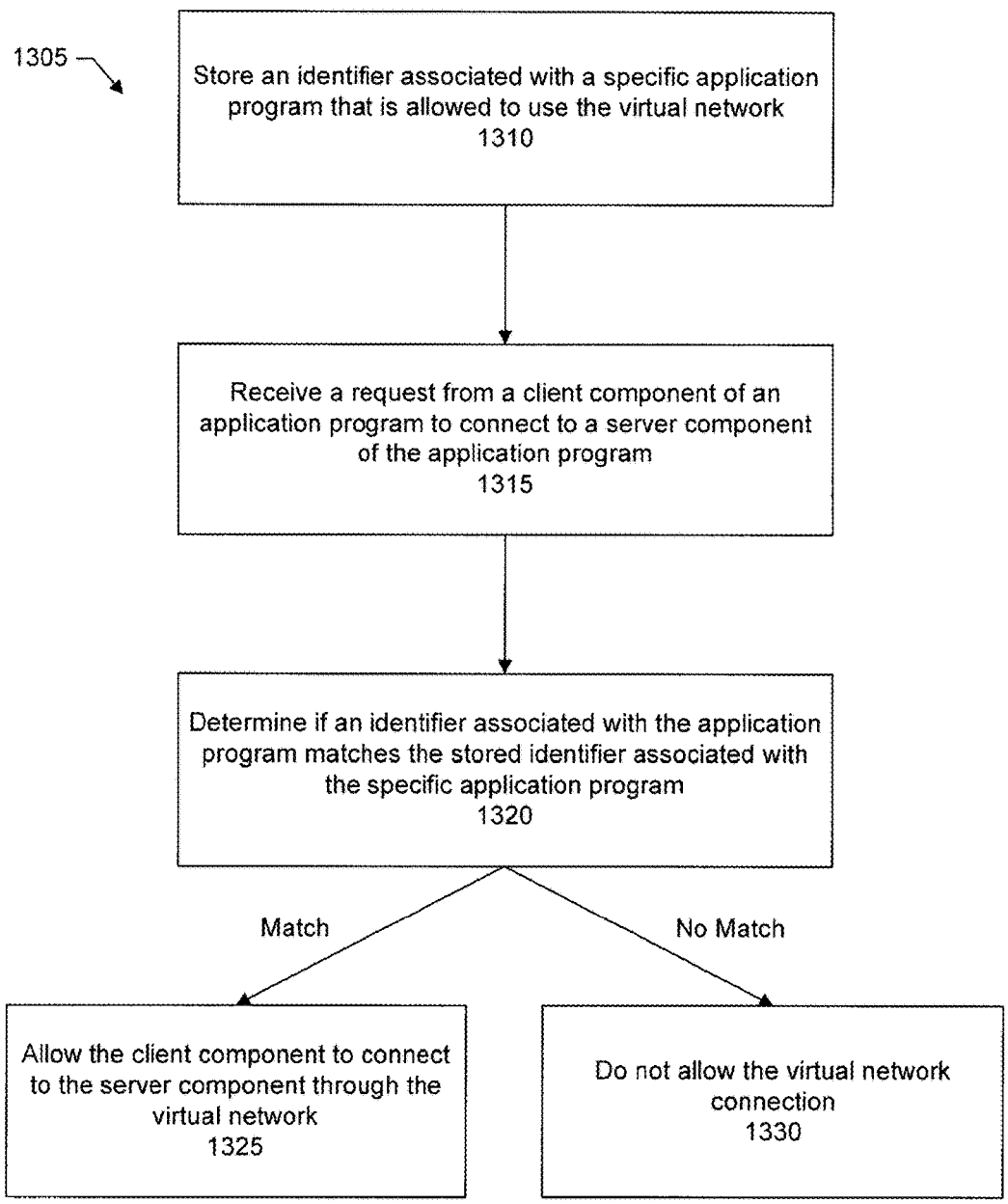
FIG. 13 shows a flow diagram of an "interlock" mechanism of the secure virtual network platform.

FIG. 13 shows an overall flow 1305 of a specific implementation of the "interlock" mechanism. In a step 1310, the system stores an identifier or predetermined identifier associated with a specific application program (or a specific version of the application program) that is authorized or allowed to use the virtual network. The identifier may be calculated by the system. Alternatively, the identifier may be calculated using an algorithm that is external to the system. The identifier can be any unit of data that helps to uniquely identify a particular version of the application program. In a specific implementation, the identifier includes a checksum associated with a particular version of the application program. An identifier for an application can include a signature, hash value, fingerprint, or combinations of these. In a specific implementation, the identifier may be provided to and stored at one or more end points in a network domain.

In a step 1315, a request is received from a client component of an application program to connect to a server component of the application program. For example, the request may be received at an end point module (e.g., client manager) at the end point.

In a step 1320, a determination is made by the respective client or server manager (see, e.g., FIG. 12) as to whether an identifier associated with the application program matches the stored identifier associated with the specific application program. If there is a match, in a step 1325, the client component may be allowed to connect to the server component through the virtual network. In a specific implementation, use of the virtual network is subject to further approval by the controller. In another specific implementation, use of the virtual network is allowed without further approval from the controller. This specific implementation can be desirable in cases where security is less of a concern than, for example, response time and network performance.

Alternatively, if there is not a match, in a step 1330, the client component is not allowed to connect to the server component through the virtual network. In other words, in a specific implementation, an identifier is associated with each application program authorized to use the virtual network. In a specific implementation, when the client application at the first end point in the first network domain attempts to connect to the server application at the second end point in the second network domain via the virtual network, a check is performed to determine if the application is authorized to use the virtual network. The check includes comparing an identifier associated with the application against the list of identifiers associated with the authorized applications (step 1320). If there is a match, a virtual network connection may be allowed between the two end points (step 1325). If there is not a match, the virtual network connection is not allowed (step 1330).

Consider, as an example, table L below. Table L lists the identifiers for application program versions shown in table C.

TABLE L

| Application | Version | Identifier |
|---|---|---|
| GDB Debug | 5.1.3 | ID1 |
| VNC Access and Collaboration | 10.7 | ID2 |
| Zshell Secure Access | 8.4.2 | ID3 |

The example data shown in table L shows the specific versions of the application programs that are authorized or allowed to use the virtual network. From the data above, the application "VNC Access and Collaboration" version 10.7 having the identifier ID2 is allowed use of the virtual network. A different version of the application (e.g., version 9.0) will have a different identifier, e.g., ID7. In this example, version 9.0 of the application will not be allowed to use the virtual network because the identifiers (ID2 and ID7) do not match.

As discussed above, the "interlock" mechanism helps to ensure that only specific applications (or specific versions of applications) will be able to use the virtual network. For example, an application program (e.g., GDB Debug, VNC Access and Collaboration, or Zshell Secure Access) may include functions, services, options, modules, or capabilities that an IT administrator wishes to disable or modify. The disablement or modification can be for any number of reasons. One reason can include security. For example, a function of an application program may be disabled to help prevent employees of the enterprise from using the function to steal sensitive corporate information. Another reason can include application performance. For example, a service of an application program may be disabled to reduce the application size or space requirements, to improve application response time, and so forth.

In another specific implementation, the system stores a list of identifiers associated with banned application programs or application programs that are not allowed to user the virtual network. In this specific implementation, a check includes comparing an identifier associated with the application against a list of identifiers associated with banned or unauthorized applications. If there is a match, a virtual network connection is not allowed between the two end points. If there is not a match, a virtual network connection is allowed between the two end points.

FIGS. 14-15 show flow diagrams for updating the virtual routing tables based on end point changes in a network domain. More particularly, FIG. 14 shows a flow 1405 when an end point is added in a network domain. In a step 1410, the system discovers an addition of a new end point in a network domain.

In a specific implementation, the discovery is facilitated through a cloud manager component of the controller. In this specific implementation, the cloud manager component provides a tool or an automated mechanism that the administrator uses to provision the network with a new end point such as a new virtual machine. The provisioning operation can include providing the new end point with the end point modules and appropriate application software such as, for example, the control daemon, virtual network proxy, client or server manager, and so forth. The end point module in the newly added end point may execute a set of instructions to notify the controller of its existence.

In another specific implementation, the end point may be created within a network domain that may belong to another authoritative entity. For example, the network domain may belong to a third-party cloud services provider. In this specific implementation, the controller includes a programmatic interface that communicates with an application programming interface (API) of the cloud service provider to discover the new end point and information about the new end point. The information can include, for example, an inventory of application programs that have been provided at the new end point, application version information, configuration information, and so forth.

The cloud manager tool can compare the inventory and configuration information of the newly provisioned end point with an approved inventory listing of applications and configurations. This check helps to ensure that the new end point has been provisioned with the appropriate application programs, application program versions, configuration settings, and so forth. If the new end point has not been properly provisioned, the system may prevent the addition of the end point to the virtual network platform. Instead or additionally, the cloud manager tool may provide the new end point with the appropriate application software, configuration settings, end point modules, or combinations of these so that the end point module can be incorporated into the virtual network platform.

In a step 1415, the controller, upon discovering the new end point, automatically updates the virtual routing tables to include the new end point, inside the new end point as well as in other existing end points that relate to this new end point. For example, the controller may make an entry in a virtual routing table of an existing end point to include an IP address and a virtual IP address to connect to the new end point. The IP address can identify the new end point in the domain. The virtual IP address can identify the source device for packets originating from the new end point.

As an example, in the case of the first type of end point connection when adding a new end-point server, the system will add entries in the static virtual routing table that represents all other end-point servers in other network domains that this new server can connect to via the virtual network.

In a step 1420, the updated virtual routing tables are distributed throughout the virtual network platform. The previous virtual routing tables may then be replaced with the updated virtual routing tables.

FIG. 15 shows a flow 1505 when an end point is deleted from a network domain. In a step 1510, the system discovers the deletion of an end point in a network domain. The method of discovery may be similar to the method described in step 1410 (FIG. 14). For example, in a specific implementation, deletion of the end point may be through the cloud manager component of the controller. In this specific implementation, the cloud manager may include a user interface that allows the administrator to identify and delete a particular end point.

In a case where the end point is created in a network domain of a third-party cloud services provider, the cloud manager provisioned by the provider may notify the controller of the deletion. The notification may be a message, email, or other alert. The deletion may be under the direction of the controller or is executed by the external cloud manager. For example, the controller may programmatically (e.g., through an API) instruct the cloud services provider to delete, remove, deactivate, or disable an end point if it is under the direction of the controller.

In a step 1515, the controller, upon discovering that an end point has been deleted from the network domain, automatically updates the virtual routing tables to remove the deleted end point. For example, the controller may remove entries in the virtual routing tables that reference or are associated with the deleted end point.

As an example, in the case of the first type of end point connection, when deleting an end point, the system deletes this end point server and deletes the corresponding entry in all other end point servers. When the application client software is using the virtual network for a connection, the system will then generate an entry in the dynamic virtual routing table where each entry includes more information or updated information as appropriate based on the end point changes.

In a step 1520, the updated virtual routing tables are distributed throughout the virtual network platform. The distribution may be similar to the process described in step 1420 (FIG. 14).

The flow for adding and deleting end points or end point servers accommodates the "application interlock" checking mechanism. As discussed above, in a specific implementation, the system includes a "client manager" that can also control the validated application client and server software. In this specific implementation, when the application client software is triggering the "dynamic virtual routing table", the system will ask or request the client manager to check in the operating system (OS) if the application client software that is creating the network traffic is the one validated by the system. Only the validated applications are allowed when using VNP and the virtual network.

Referring now to FIGS. 5, 7-8, 10, and 12, the architecture of the virtual network platform shown in these figures offers a number of benefits and advantages. In a specific implementation, a controller cluster can be implemented to support control path connections to a very large amount of end points. There can be a master controller that implements and maintains security policy (write and read) in the central database. Cluster controllers may implement read only function for security policy and connect to end points for policy enforcement. In a specific implementation, one controller can connect to multiple virtual network switches in parallel. However, each VNS may connect to only one controller.

A virtual network switch cluster can be implemented to support virtual network connections to a very large amount of end points. In a specific implementation, a VNS is considered as a "slave device" fully controlled by the controller. In this specific implementation, the VNS does not include security intelligence. All security policies are implemented and controlled by the controller. In a specific implementation, there is no inter-dependency among VNS clusters. The lack of interdependency eases scalability. Load balancing can also be easily implemented.

In a specific implementation, a virtual network proxy includes a virtual network gate keeper on an end point that implements the virtual routing table and TCP proxy and reverse proxy functions. In a specific implementation, there is no intelligence for security policy. The VNP is responsible for encryption and decryption of the virtual network transport. The VNP works with and is controlled by the control daemon and client/server manager.

In a modern enterprise environment, the network and infrastructure security have complex requirements. It can be challenging to deploy a client-server application across such an environment without modifying the underneath infrastructure and setting. The secure virtual network platform as discussed in this patent application solves this problem without compromising enterprise security and compliance requirements.

In a specific implementation, the client-server application is provisioned at the virtual network layer and does not require opening the physical firewalls or changing the subnets or network topology underneath. The specific client-server application is provisioned in this virtual layer so that only a particular application is allowed to connect in this layer for security control. The security policy and provisioning setting is at a central control. All connections are automatically verified and executed end-to-end in a closed system. The burden of managing distributed components and assembling them together in a coherent framework is reduced.

The applications of such secure virtual network platform can be enormous. Any new business applications that need to be provisioned across a legacy environment can go to the virtual layer for ease of control, best or good productivity, fast time to market, and ease of security and compliance control. In today's market, many industry verticals are converging and becoming service oriented. There are more and more business collaborations and IT automations across enterprise boundaries. Such a secure virtual network can significantly expedite the business process provisioning and save costs.

As discussed above, the hybrid cloud computing is another important application that can be benefited by this new technology. By definition the hybrid cloud infrastructure spans over multiple network domains with more than one authority. The computing resources in such an environment are dynamically created and deleted on demand. Efficiency in doing so is vital to the success of enterprise operations in a hybrid cloud. A virtual network layer is critical to provision various enterprise applications in such a hybrid cloud environment. It is extremely easy for enterprise IT to provision applications in the proposed virtual network platform. Once the application is provisioned, the virtual network connection and deletion are fully automated along with the dynamic provisioning of end points in the cloud.

Figure 16:
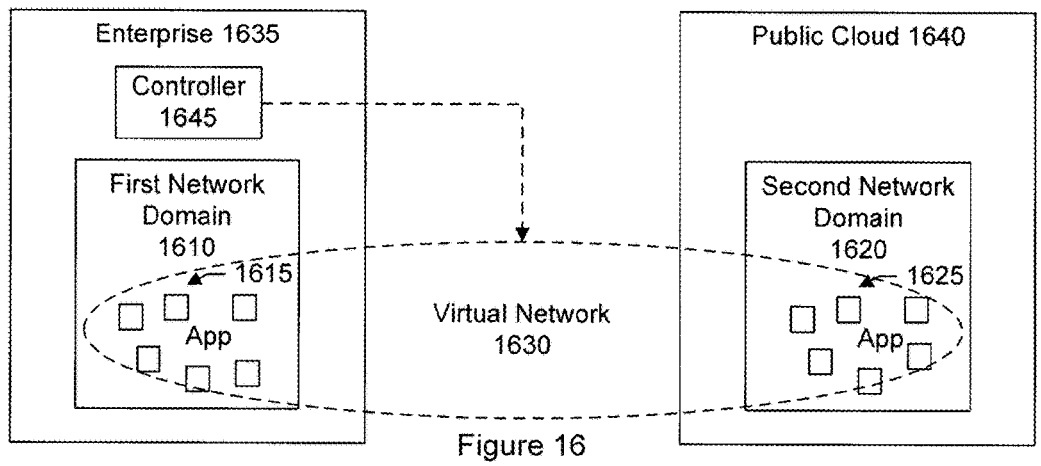
FIG. 16 shows an example of a deployment model for a secure virtual network platform.
Figure 17:
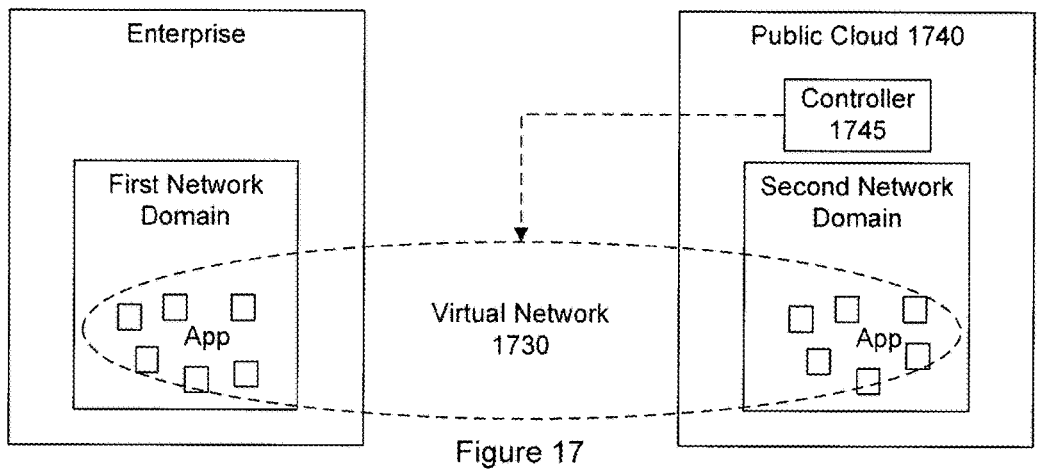
FIG. 17 shows another example of a deployment model for a secure virtual network platform.
Figure 18:
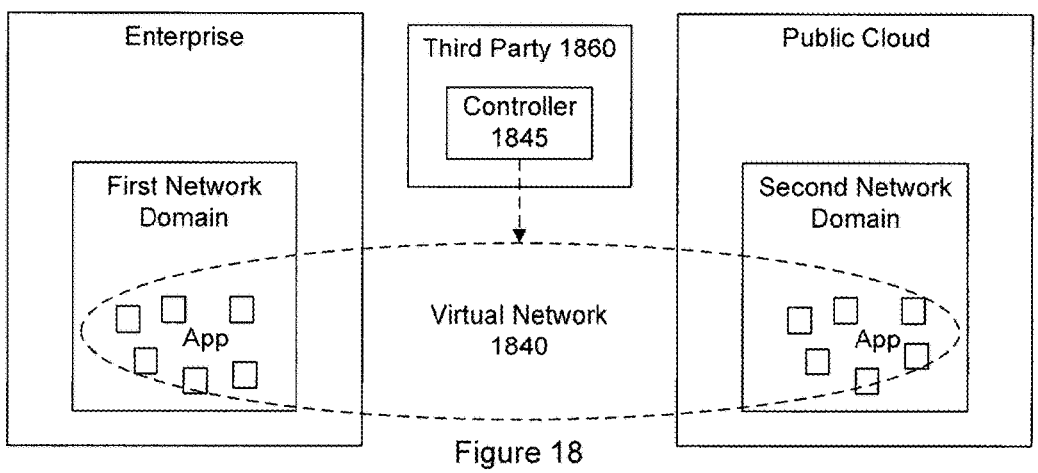
FIG. 18 shows another example of a deployment model for a secure virtual network platform.

FIGS. 16-18 show block diagrams of specific implementations of deployment models for the virtual network platform. FIG. 16 shows a first network domain 1610 including a first set of end points 1615, a second network domain 1620 including a second set of end points 1625, and a virtual network 1630 connecting the first and second end points. The first network domain is part of an enterprise 1635. The second network domain is part of a public cloud provider 1640. In this specific implementation, control 1645 of the virtual network is with the enterprise.

FIG. 17 shows another specific implementation of a deployment model for the virtual network platform. FIG. 17 is similar to FIG. 16. In FIG. 17, however, control 1745 of a virtual network 1730 is with a public cloud provider 1740.

FIG. 18 shows another specific implementation of a deployment model for the virtual network platform. FIG. 18 is similar to FIG. 16. In FIG. 18, however, control 1845 of a virtual network 1840 is with a third party 1860 that provides the services associated with the virtual network.

Referring now to FIG. 11A (step 1125), as discussed above, in a specific implementation, the static routing tables define the traffic that may be allowed to use the virtual network. It should be appreciated, however, that aspects and principles of the invention can be applied to implement static routing tables that define traffic not allowed to use the virtual network. For example, in a specific implementation, there can be a static routing table that identifies, by IP address, data that is to be passed to the local TCP/IP network. In this specific implementation, data not having an IP address defined in the static routing table is transmitted through the virtual network.

In the description above, aspects of the system have been described in the context of a client in one network domain communicating with a server in another network domain. It should be appreciated, however, that aspects of the system can also be applied to the server communicating with the client. Aspects of the system can be applied to a computing node in one network domain communicating with a computing node in another network domain, and vice-versa.

Figure 19:
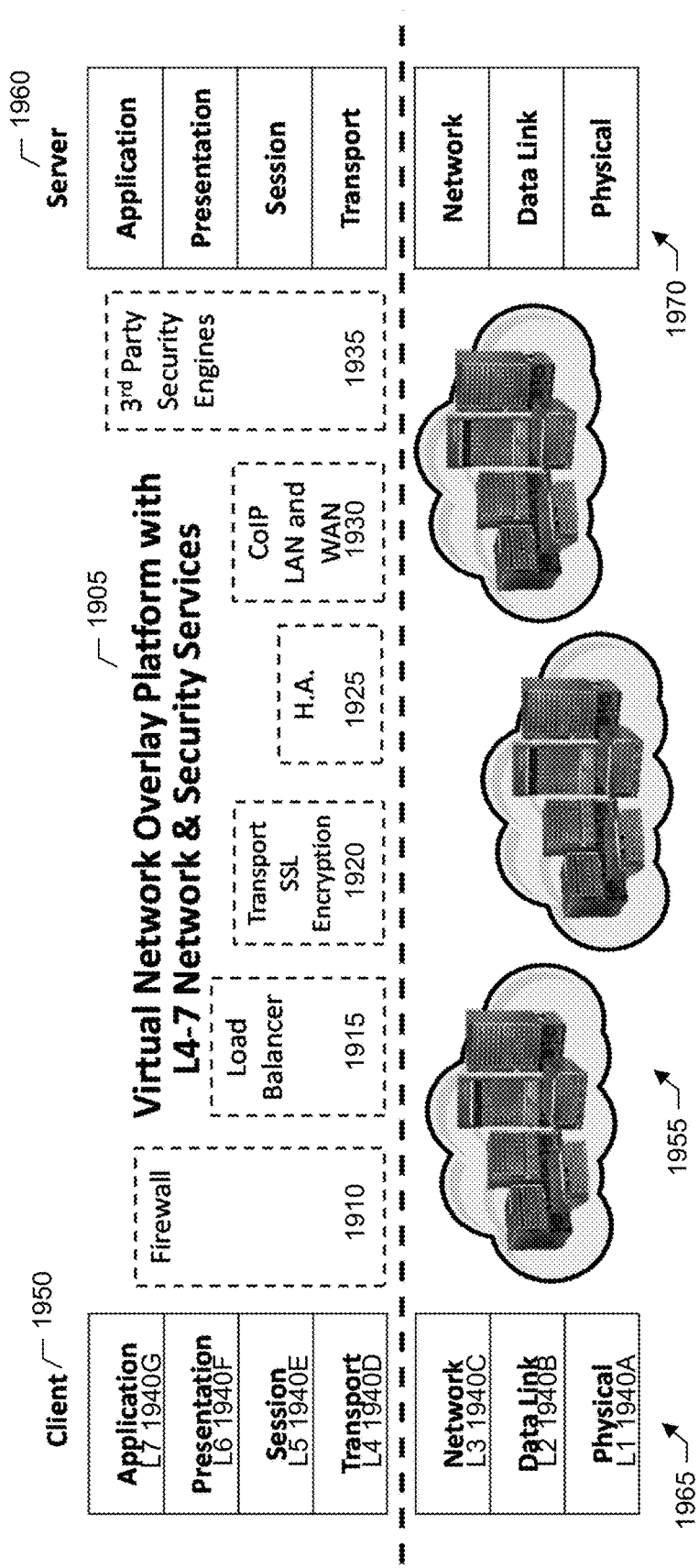
FIG. 19 shows a block diagram of a virtual overlay network system that is positioned as an L4-L7 network service, under some embodiments.

FIG. 19 shows a block diagram of a Cloud over IP (CoIP) system 1905. The CoIP system may be referred to as a virtual overlay network platform. In a specific embodiment, the system provides layer 4 (L4) to layer 7 (L7) network services that can be fully controlled by enterprises and deployed remotely over a hybrid environment, using the under layers but not integrated or coupled with the under layers. Today, enterprises are facing many challenges when connecting to the cloud. The IP network (L3) is fragmented in the cloud outsourcing environment and controlled by various vendors. The security controls are also not unified. It is challenging and not productive for enterprises to implement a unified IP network to support end-to-end connections across the cloud. The CoIP systems and techniques as described herein provides enterprises a unified networking method to instantly connect all endpoint resources (including virtual machines (VMs), containers, servers, and legacy Internet Protocol (IP) addresses) across cloud datacenters, decoupled from the underlying IP and security infrastructures.

In this specific embodiment, the CoIP system is an L4 to L7 network service where session layer and transport layer protocols are utilized to establish L3 IP network connections across multiple cloud datacenters. The lower layer IP networks are used as the IP forwarding fabric, but does not need to be directly controlled or reconfigured by the enterprise customers for multi-tenancy security reasons. The CoIP connections, triggered as a virtual L3 network by the upper layer applications running on the top of the stack, can therefore be established very rapidly across the cloud ecosystems. The CoIP system may be referred to as an overlay network, virtual overlay network, or virtual networking platform. It should be appreciated that the system may be known by any name or identifier.

FIG. 19 shows the seven-layer network stack according to the Open Systems Interconnection model (OSI model). CoIP networking platform and system 1905 is positioned as an L4 to L7 network service, decoupled from the lower L2 and L3 IP network fabric that is fragmented in the cloud.

The decoupled CoIP network (L4 to L7) from the underlying IP network (L2 and L3) is a desirable technology feature in the new cloud outsourcing environment. Specifically, when an end-to-end CoIP connection is established across a hybrid cloud, it does not require building an end-to-end L2/L3 transport to support the CoIP connection. In a multi-tenancy cloud datacenter controlled by a cloud vendor, the direct access to the L2 and L3 IP network is limited to the datacenter administrator only. Some software defined network (e.g., SDN) may be deployed on top of the L2 and L3 network inside a datacenter or a specific network domain to offer some limited programmability to customers via an application programming interface (API). Building the end-to-end L2/L3 IP transport across a hybrid cloud outsourcing environment is the bottleneck in today's market, and the CoIP systems and techniques as described herein addresses this bottleneck.

The security control in such an environment may be referred to as "shared responsibility" by the Infrastructure as a Service (IaaS) cloud service providers. Enterprise customers typically have full control inside the cloud instance (e.g., VM, container, or bare metal server) plus a set of APIs to program a virtual network environment in the specific cloud datacenter where the provisioned cloud instances are allocated within. Advanced network controls such as programming specific routing rules, access control list (ACL) rules, firewall insertions, source/destination network address translation (NAT), network flow mirror, and so forth, however, are not provided. This "shared responsibility" practice changes the way how the enterprise IT works in the cloud compared to the on-premise enterprise environment, which has created significant adoption barriers.

The IP networks inside the enterprise are not easy to change either. Typically the network will have been designed statically and it is under production with corporate compliance auditing conducted constantly on a quarterly or monthly basis. In such an enterprise production environment, it is difficult to "rip and replace" and to implement a new and transparent cloud network for a specific application, owned by a specific business unit, without impacting the production environment. As a result, the productivity of connecting to the cloud has been low due to the interoperation with the legacy infrastructure.

The CoIP network technology, connected in L4 to L7 and decoupled from the underlying IP network fabric, in both the cloud and enterprise environments, addresses this bottleneck and thus can significantly boost productivity.

As shown in FIG. 19, in a specific embodiment, the CoIP system operates in a packet switched network according to a set of protocols implemented in a seven-layer protocol stack. The CoIP system includes various networking and security services, components, modules, or code components including but not limited to firewall 1910, load balancer 1915, transport Secure Socket Layer (SSL) encryption 1920, high-availability (HA) 1925, cloud over IP local area network (LAN) connections and wide area network (WAN) connections 1930, and security engines 1935. The functions are provided as layer 4 to layer 7 network services over the lower level (layer 1 to layer 3) network components.

As will be appreciated by those skilled in the art, the process of sending a message involves dividing the message into a set of packets of fixed or variable length, transmitting each packet individually over the network, and then reassembling the message at the destination. The process can be divided into the seven-layer OSI structure shown in FIG. 19. There is a physical layer 1940A (L1), data link layer 1940B (L2), network layer 1940C (L3), transport layer 1940D (L4), session layer 1940E (L5), presentation layer 1940F (L6), and application layer 1940G (L7).

Each layer of the protocol stack performs a specific function, such as addressing, routing, framing and physical transmission of packets. The lower layers (i.e., network, data link and physical layers) function to provide a physical connection between users or processes, and the upper layers (i.e., application, presentation, session and transport layers) provide actual data exchange between processes, users, or both. Specifically, the physical layer may include low-level networking equipment such as hubs, repeaters, modems, cabling, and so forth. The data link layer checks for physical transmission errors and packages bits into data "frames." The network layer provides routing above the data link layer.

When data arrives at the network layer, the source and destination addresses contained inside each frame are examined to determine if the data has reached its final destination. If the data has reached the final destination, the network layer formats the data into packets delivered up to the transport layer. Otherwise, the network layer updates the destination address and pushes the frame back down to the lower layers.

The transport layer delivers data across network connections using a protocol such as Transmission Control Protocol (TCP). The session layer manages the sequence and flow of events that initiate and terminate network connections. The presentation layer handles syntax processing of message data such as format conversions and encryption and decryption needed to support the application layer above it. The application layer supplies network services to end-user applications or application programs. Network services are typically protocols that work with the user's data. For example, in a Web browser application, the application layer protocol Hypertext Transfer Protocol (HTTP) packages the data needed to send and receive Web page content. Other examples of application layer protocols include File Transfer Protocol (FTP) and Simple Mail Transfer Protocol (SMTP). The application layer provides data to (and obtains data from) the presentation layer.

To transmit the packet from a source system (e.g., client 1950) at one end of a network 1955 to a destination system (e.g., server 1960) at another end of the network, the packet is passed logically downward through the layers of a protocol stack 1965 at the source and then logically upward through the layers of a protocol stack 1970 at the destination. Each layer passes the packet to an adjacent upper or lower level layer depending on whether the packet is being sent or received.

The sending of data over the network includes a data encapsulation process at the source and a data decapsulation process at the destination. For the data to traverse the WAN, the system may involve the encapsulation/decapsulation process more than once. Specifically, during encapsulation, a layer of the protocol stack in the transmitting process may add a respective header to the packet. The header provides information to the corresponding layer in a receiving process at the destination system. Thus, as a packet passes down through the protocol stack on a transmitting system (e.g., source system), the packet may gain additional headers. At the bottom of the stack, the transmitting process may then frame the packet and physically transmit it over the network toward its destination. For example, the transport layer may add a TCP header to the data. The network layer may add an IP header. The data link layer receives a packet from the network layer and is responsible for placing the packet onto the network medium (e.g., cable). The data link layer encapsulates the packet in a frame which may include the hardware address (MAC) of the source and destination, and so forth.

When the packet reaches its destination, a decapsulation process is performed. The packet passes up through the protocol stack of the destination system. Each layer of the protocol stack in the destination system receives information from its associated header and will strip its header from the packet before passing the packet up to the next layer for processing.

Figure 20:
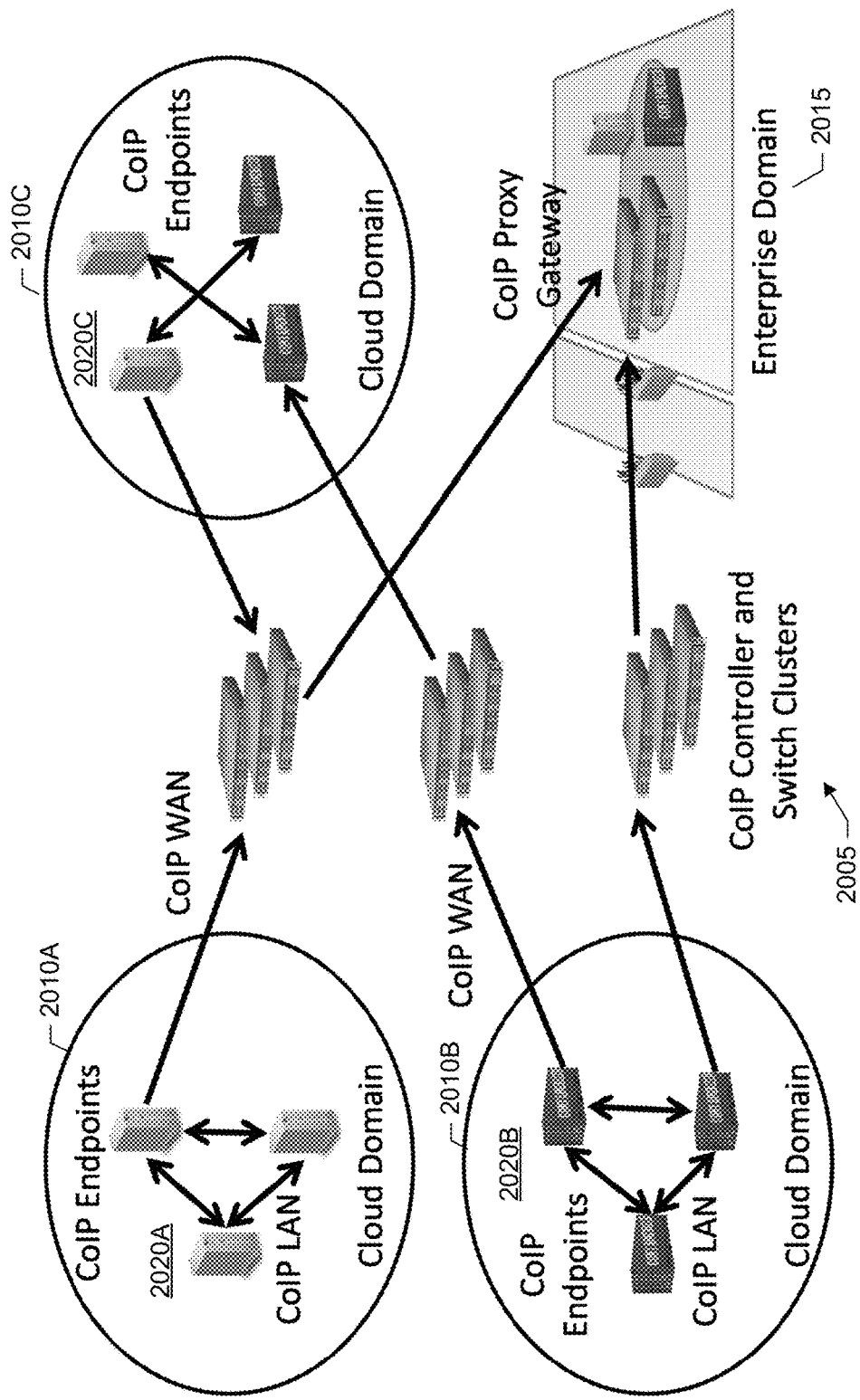
FIG. 20 shows an architecture of the virtual overlay network.

FIG. 20 shows the CoIP architecture according to a specific embodiment. The architecture includes a central array of session layer switches 2005 connecting cloud domains 2010A-C (including enterprise domains 2015) with CoIP endpoints 2020A-C provisioned within. The central array of session layer switches is presented in a logical and central architecture in FIG. 20. In actual deployment, it can include a number of clusters that are deployed in a distributed fashion worldwide along with cloud datacenters or enterprise network domains. The distributed deployment allows enterprises and cloud providers to optimize routing for global WAN connections.

The CoIP endpoint can be a VM, container, server, laptop or desktop, or CoIP Proxy Gateway. In an embodiment, the CoIP Proxy Gateway is a gateway device that bridges the CoIP network plane with the underlying physical IP network plane. The CoIP endpoints can connect via CoIP WAN or CoIP LAN connections. Both CoIP WAN and LAN support IP routing with CoIP addresses or physical IP addresses, and in addition with SSL encryptions. A CoIP address may be referred to as a virtual IP address, layer 5 IP address, or overlay IP address. The CoIP address is presented to the upper layer applications as a virtual L3 IP address.

In an embodiment, the CoIP endpoints connect via CoIP WAN or CoIP LAN using CoIP addresses. The applications running on the CoIP endpoints use CoIP addresses and generate application traffic. Such traffic triggers the CoIP system to create SSL encryption tunnel(s) with the application traffic (using CoIP addresses) encapsulated inside the SSL tunnel. The SSL tunnel(s) is structured using the underlay physical IP addresses and specific port (e.g. 9797) between the source and destination endpoints.

In another embodiment, CoIP endpoints connect via CoIP WAN or CoIP LAN using physical IP addresses. The applications running on the CoIP endpoints use physical IP addresses and generate application traffic. Such traffic triggers the CoIP system to create SSL encryption tunnel(s) with the application traffic (using physical IP addresses) encapsulated inside the SSL tunnel. The SSL tunnel(s) is structured using the underlay physical IP addresses and specific port (e.g. 9797 which is different from the application ports used in the application traffic) between the source and destination endpoints. The SSL encryption tunnel(s) can use both CoIP addresses and the under layer physical IP addresses to build.

On the CoIP architecture, an endpoint can be assigned with a CoIP address, which is an IP address that is specifically routed on the CoIP network plane. The CoIP address may be referred to as a virtual IP address. A CoIP endpoint can connect to a CoIP network plane as well as a physical network plane. In a specific embodiment, when there is an IP address conflict, the CoIP network plane takes precedence for routing. This means when the system runs into a situation where both L5 and L3 routing paths are available, the L5 CoIP routing takes priority. In the network stack, the CoIP system may encounter a situation where a L5 CoIP address is the same as another L3 physical IP address. In such a situation, when a routing decision has to be made, the CoIP address or routing takes precedence. It is recommended, however, that the user who designs the network using CoIP as the L5 overlay, should design the subnets such that L5 and L3 IP address conflicts are avoided. Nonetheless, there may be cases where conflicts may arise. In a specific embodiment, the system defaults to the CoIP routing. In another specific embodiment, the L3 physical IP address routing may take precedence in cases of conflict between a L5 CoIP address and a L3 physical IP address.

The baseline architecture supports a "one-hub" routing and further discussion is provided in U.S. patent application Ser. No. 14/187,091, filed Feb. 21, 2014, now U.S. Pat. No. 9,525,564, issued Dec. 20, 2016, ('564 patent), which is incorporated by reference along with all other references cited. These applications include a detailed discussion of CoIP wide area network (WAN) routing. This disclosure includes a discussion of systems and techniques for CoIP local area network (LAN) routing.

In a specific embodiment, connections across cloud domains (WAN) route through the central switch clusters. CoIP LAN supports local network connections inside a cloud domain that are routed via the low level L2 and L3 network inside the datacenter. In a specific embodiment, the CoIP LAN does not route through the central switch clusters or any other central gateway for optimized local routing performance. The lack of routing through a central switch or other central router facilitates support for a high-performance datacenter network (LAN) implementation in the under layer. Without routing through a central gateway for optimized performance, the tradeoff is more sensitive security control to prevent the man-in-the-middle attack as well as for service isolation. The endpoint authentication and session control are extremely important for the LAN connections from the security perspective. For the local connections inside the cloud domain (i.e., LAN), the user can define the routing method using either the low-level physical IP address or the high-level virtual IP address (i.e., CoIP address). The high-level virtual IP address can be any IP address, static or dynamic, as long as it does not conflict with the local physical IP address inside the local datacenter within the same routing plane for the same application. In a specific embodiment, if there is a conflict for local routing, the virtual IP address takes precedence.

The capability of the CoIP LAN system to support local routing using the virtual network IP (rather than the local datacenter IP) is desirable to assure the application layer transparency. For example, many of the enterprise applications may have hard-coded the low-level physical IP as part of the legacy computing infrastructure. As a result, it can be extremely challenging for an IT department to migrate the applications (including the execution environments, scripts, and so forth) to any other outsourcing cloud environment as the IP address may be an Internet static IP which is constrained by geographic locations. The capability in supporting a virtual routing layer that allows any static or private IP addresses in the cloud overlay network above the physical network removes the geographic location dependency. This capability may be referred to as "network in motion." The hard-coding of the low-level physical IP network within the legacy enterprise applications is a major bottleneck for "virtualization in motion" across hybrid clouds and multi-clouds.

In a specific embodiment, the CoIP plane (LAN and WAN) is designed as an application network which is a closed network and can be provisioned with limited instances that are authenticated to participate. In other words, rather than being an open network with "unlimited endpoints," in this specific embodiment, only authenticated endpoints can participate and use the CoIP plane. This helps to facilitate a very secure system. One CoIP plane is assigned to one application for service isolation, and it is by definition decoupled from other CoIP planes for other applications for network routing. Therefore it is extremely easy to deploy many applications to hybrid cloud environments over CoIP without worrying about IP address conflicts. This is a very desirable feature because it enables a corporate IT department to setup one cloud environment (e.g., AWS, Microsoft Azure, Google Cloud) and then leave it to the Line of Businesses (LOB) to instantiate their cloud endpoints and assign their CoIP addresses without worrying about cross-LOB conflicts. All applications provisioned in this method automatically achieve cloud service isolation for optimized or improved security.

In a specific embodiment, there is a method of managing endpoints within a local area network (LAN) of a single cloud environment. The method includes providing an organization including a first line of business (LOB) having first applications, and a second LOB having second applications; defining a first set of virtual Internet Protocol (IP) addresses for the first LOB, independent of the second LOB; mapping the first set of virtual IP addresses to physical IP addresses of at least a subset of the endpoints for the first LOB; defining a second set of virtual IP addresses for the second LOB, independent of the first LOB; and mapping the second set of virtual IP addresses to physical IP addresses of at least another subset of the endpoints for the second LOB. A condition is allowed whereby a virtual IP address of the first set of virtual IP addresses conflicts with a virtual IP address of the second set of virtual IP addresses because the first and second sets of virtual IP addresses have been defined independently of each other. If the conflicting virtual IP address is associated with an application of the first applications, the method includes routing traffic through the LAN for the first LOB according to the first virtual IP addresses. If the conflicting virtual IP address is associated with an application of the second applications, the method includes routing traffic through the LAN for the second LOB according to the second virtual IP addresses. The physical IP addresses may be provided by a cloud datacenter provider, the cloud datacenter provider being separate or different from the organization.

In another specific embodiment, there is a method of managing applications within a local area network (LAN) of a cloud environment including: associating a first set of virtual IP addresses with a first application; mapping the first set of virtual IP addresses to physical IP addresses of at least a subset of endpoints in the LAN of the cloud environment to create first routing information; associating a second set of virtual IP addresses with a second application; mapping the second set of virtual IP addresses to physical IP addresses of at least another subset of endpoints in the LAN of the cloud environment to create second routing information; routing traffic from the first application through the LAN of the cloud environment according to the first routing information; and routing traffic from the second application through the LAN of the cloud environment according to the second routing information.

CoIP LAN also supports Secure Socket Layer (SSL) encryption tunnels for endpoint-to-endpoint connections. This is a distributed architecture for encryption, rather than a centralized architecture using an encryption gateway (e.g., VPN gateway or Web site gateway). This architecture is seamlessly aligned with the cloud distributed computing architecture. Also, these SSL encryption tunnels are dynamically generated triggered by applications running in the upper layer of the stack in CoIP endpoints. The security is then optimized or improved as there is no static network transport, such as VPN, that can be explored by malicious attacks. It is important to prevent man-in-the-middle attacks in a multi-tenancy cloud datacenter. The SSL encryption key can be generated on each CoIP endpoint and stored inside the real memory, and not saved in any local disk for security considerations. The distributed key system prevents a "single point of failure." For example, if one endpoint is compromised, it will not automatically decrypt all other CoIP LAN traffics. The solution is isolated from applications to applications. So the "cross contamination" is avoided for optimized or improved security.

In a specific embodiment, the CoIP system is a closed network. In this specific embodiment, when two CoIP endpoints are communicating with each other, the control plane will go through a security policy checking and authentication before establishing the connection using either CoIP WAN or CoIP LAN. The authentication method for CoIP WAN is discussed in the '564 patent. This disclosure includes a discussion of authentication for a CoIP LAN system.

In a specific embodiment, an authentication technique is provided to address a CoIP endpoint (e.g., a client) communicating with another CoIP endpoint (e.g., a server). The technique does not limit the system in covering other techniques under this architecture. In this specific embodiment, the CoIP client issues a request to the central controller for security checking and permission. If the controller finds the request is matching with or satisfies the central security policies, it will generate a security token dynamically and inform both the CoIP client and server to use this specific token to build the LAN transport tunnel.

The following includes a discussion of some applications and benefits of the system. In a modern hybrid cloud environment, connecting and protecting all servers, VMs and containers in all distributed computing environments all under one unified network is never easy. It requires enormous amount of efforts from corporate IT to re-engineer the existing corporate networks to work with the new cloud datacenter networks controlled by external IT ecosystem vendors.

Systems and techniques are provided for a CoIP network and security technology that works across the entire IT outsourcing ecosystem. This new network paradigm can be controlled and implemented by the enterprise IT department on the remote cloud datacenters or the on-premise enterprise environments. In a specific embodiment, this virtual network is a L4-7 network that is completely decoupled from the underlying IP networks that are owned and controlled by various cloud vendors. As a result, the enterprise IT department is able to achieve their productivity with orders of magnitudes of improvement.

In a specific embodiment, the CoIP architecture features a one-hub routing interconnecting multiple cloud domains including enterprise environments. This architecture supports CoIP WAN and CoIP LAN connections. The CoIP WAN technology was detailed in the '564 patent. This disclosure includes a discussion of the CoIP LAN authentication, provisioning, and encryption technology. The CoIP LAN architecture supports the under layer high-speed IP networks with a direct connection. It supports distributed encryption for transport security to prevent man-in-the-middle attacks. It also supports secure closed network implementation with central authentication and policy control. The system is agnostic to any cloud datacenters as well as enterprise internal environments.

Figure 21:
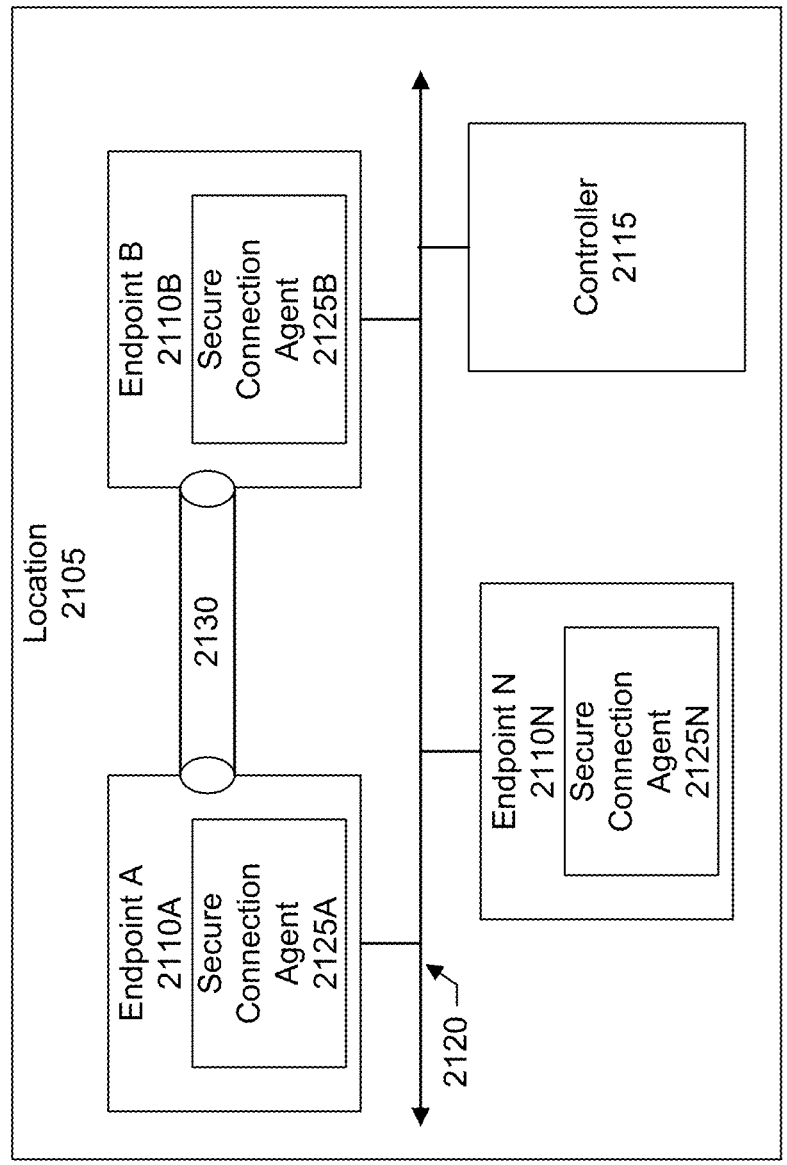
FIG. 21 shows a controller of the virtual overlay network deployed inside a LAN, according to a specific embodiment.

FIG. 21 shows a block diagram of an environment in which the CoIP LAN system may be implemented. In this example, a geographical location 2105 includes a set of endpoints (e.g., endpoints 2110A-2110N), and a controller 2115, that are interconnected by a local area network (LAN) 2120. The endpoints are provisioned with secure connection agents 2125A-N. It should be appreciated that the letter "N" is used to refer to a variable number of items that can change from embodiment to embodiment. The use of the letter "N" with different items or in different contexts in the same figure does not necessarily imply the same number of different items. For example, the quantities among different items may or may not be equal.

Location 2105 may be, for example, a datacenter or an office building or campus. The LAN includes a physical under layer with various networking equipment including layer 2 devices such as switches, bridges, and layer 1 devices such as hubs. The equipment allows for interconnecting the various physical host machines, client machines, server machines, nodes, terminals, and so forth that may be present at the local physical network location. In a LAN, data packets may be transmitted with explicit addresses that are recognized by the destination system for delivery. The endpoints and controller may all be located inside in the same network domain. Generally, there are no firewalls between endpoints and the L2/L3 connectivity is supported inside a LAN. However, in a public shared LAN environment (e.g., a public cloud datacenter) having the security control and tunnel service between endpoints are desirable in such a shared network environment.

Endpoints in a LAN may share a common part of an address, Uniform Resource Locator (URL), or IP address range. A LAN may connect to a WAN through a gateway of the LAN. Because of the shorter distances between endpoints in a LAN environment as compared to a WAN environment, a LAN may be built on Ethernet and other 802.3-family (and 802.11-family) physical layers and data links such as 1000BASE-T, 1000BASE-SX, 1000BASE-LX, and the like. In a WAN environment, the endpoints may be separated by much greater distances and thus communications may be over infrastructure owned by a telecommunication carrier. As such, WANs may include physical and data-link standards generally used by the telecom industry such as optical carrier (OC)-3, synchronous optical networking (SONET), Synchronous Digital Hierarchy (SDH), and the like.

WAN links tend to be lower bandwidth and higher latency than LAN links because of the challenges associated with moving data over long distances reliably. Further, the infrastructure in a LAN environment is generally owned by a single entity such as an enterprise or cloud services provider (e.g., Amazon Web Services, Rackspace, or Microsoft Azure). Infrastructure or portions of the infrastructure in a WAN environment may be owned by a telecom carrier that charges fees for transporting data over their network.

As discussed above, an endpoint may include a server or isolated virtual environment such as a virtual machine or container. Generally, a virtual machine relies on a hypervisor which is typically installed on top of the actual "bare metal" system hardware (e.g., host). Once the hypervisor layer is installed, VM instances can be provisioned from the system's available computing resources. Each VM can then be provisioned with its own unique operating system and workload or application. The OS and applications within a VM may be referred to as guests (e.g., guest OS or guest applications) and the machine on which the VM runs may be referred to as a host.

In a container environment, a host operating system is installed on the system and a container layer (such as Linux Container (LXC) or libcontainer) is installed on top of the host OS. Once the container layer is installed, container instances can be provisioned from the system's available computing resources and enterprise applications can be deployed within the containers. However, every containerized application shares the same underlying operating system (the single host OS).

An endpoint may be responsible for processing workloads, running applications, servicing outside requests (e.g., delivering web pages from local storage to a remote browser), and so forth. There is often a need for endpoints within a LAN to communicate among each other. For example, there can be an enterprise application such as a human resources (HR) application, financial application, email application, collaboration application, and so forth that may implement tier-based computing installed within the LAN. Each application may include multiple tiers of computing and among them a client-server communication model is used. The client component may be installed at one endpoint in the LAN. The server component may be installed on another endpoint in the LAN. The clients initiate communication sessions with servers which await incoming requests. For example, a human resources (HR) web service may have a 3-tier computing architecture including a presentation tier, logic tier, and access tier. All tiers work together to implement the HR web service.

In a specific embodiment, the endpoint agents work with the controller to generate and establish a secure communications tunnel 2130 between two endpoints in the LAN. The secure communications tunnel extends from an endpoint in the LAN to another endpoint in the LAN. The secure tunnel provides end-to-end encryption of traffic (e.g., data packets) between the two endpoints in the LAN.

Figure 22:
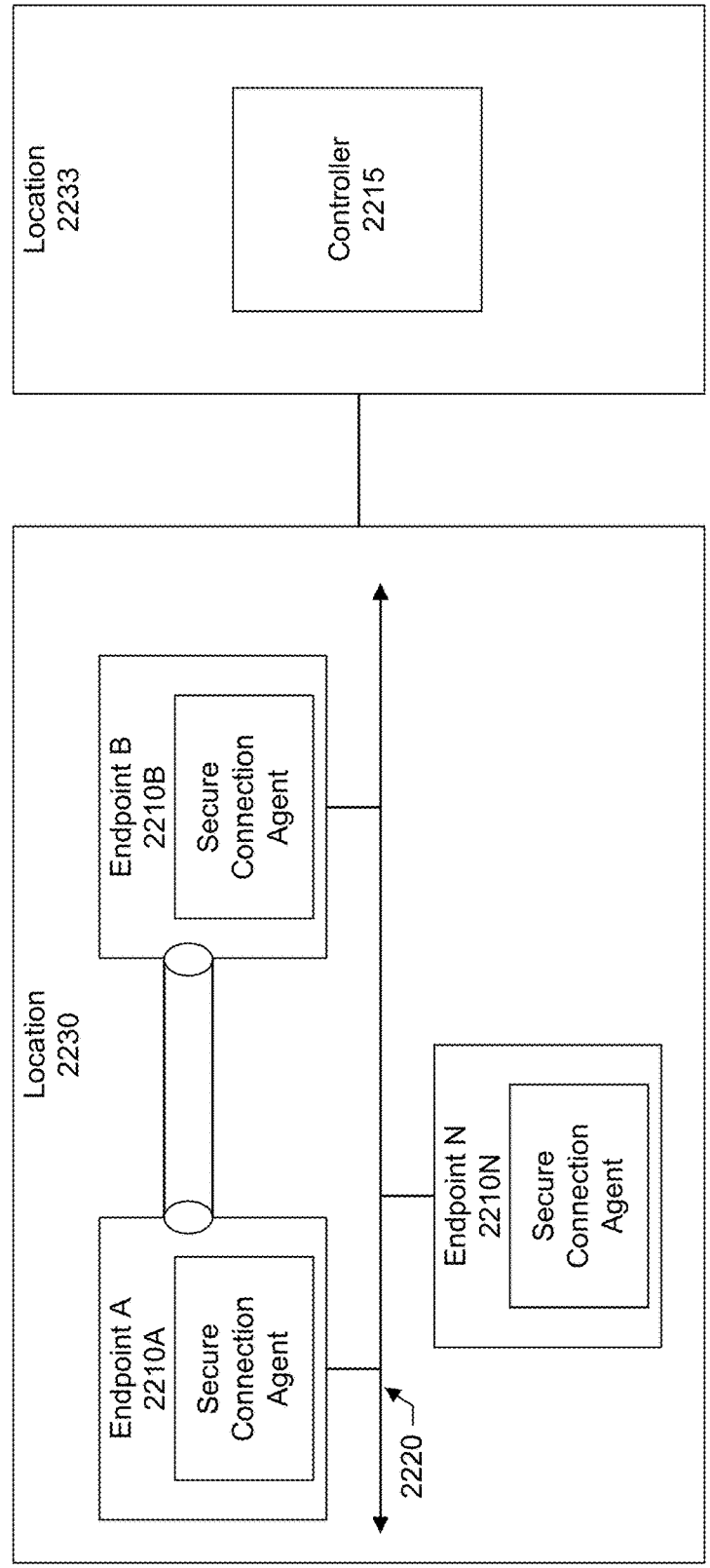
FIG. 22 shows a controller of the virtual overlay network deployed outside a LAN, according to another specific embodiment.

FIG. 22 shows a block diagram of another environment in which the CoIP LAN system may be implemented. The environment shown in FIG. 22 is similar to the environment shown in FIG. 21. In the environment of FIG. 22, however, a controller 2215 is outside or remote from a local area network 2220 connecting endpoints 2210A-N. For example, the endpoints may be located at a first geographical location 2230 (e.g., San Jose) and the controller may be located in a second geographical location 2233 (e.g., San Diego), remote, separate, or different from the first geographical location.

The CoIP system can be implemented in a public cloud, hybrid cloud or multi-cloud environments. In one embodiment, the CoIP controller can be implemented inside the same cloud LAN environment as part of the total cloud orchestration and automation. In another embodiment, the CoIP controller may be implemented in another or different cloud datacenter for automation. However, it can be a multi-cloud implementation so such a controller also connects to endpoints in other cloud datacenters via a WAN. In another embodiment, the controller may be implemented in the enterprise demilitarized zone (DMZ) on the edge of the enterprise corporate network. Such a controller connects to all endpoints in all cloud datacenters via a WAN as well as to the endpoints in the enterprise on-premise environments via a LAN.

Figure 23:
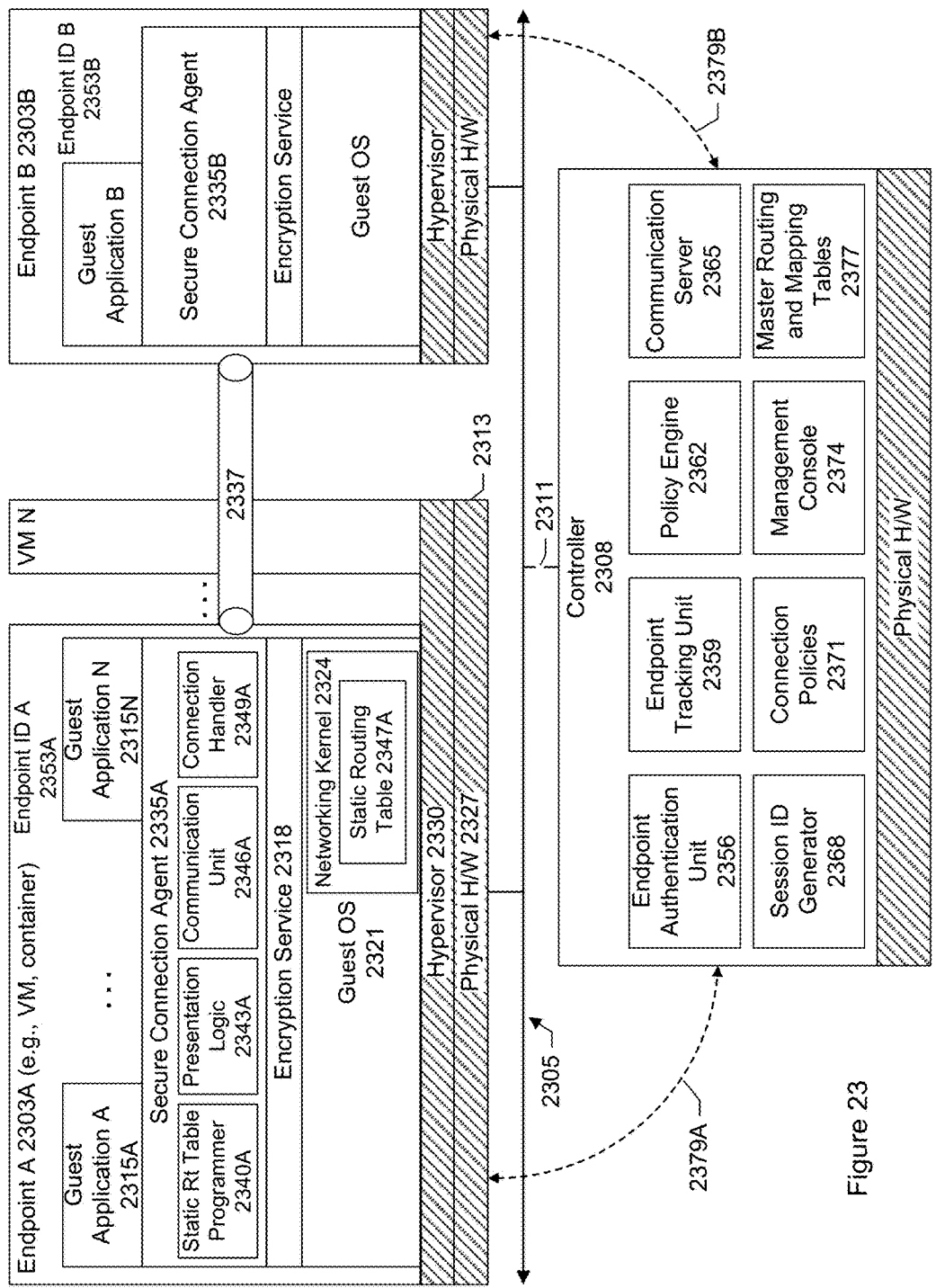
FIG. 23 shows a block diagram of a secure tunnel generated within a LAN, according to specific embodiment.

FIG. 23 shows a more detailed block diagram of a system for secure communications between endpoints in a LAN. This system includes a first endpoint 2303A, and a second endpoint 2303B, connected by a LAN 2305, and a controller 2308. A communication link 2311 connecting the controller to the LAN is shown in broken lines to indicate that in some embodiments the controller is inside the LAN and inside the local firewall (see, e.g., FIG. 21), while in other embodiments, the controller is outside the LAN and outside the local firewall (see, e.g., FIG. 22).

In the example shown in FIG. 23, an endpoint, such as first endpoint A, is a virtual machine running on a host 2313. The host may host any number of virtual machines (or containers, or both). A virtual machine may include any number of guest applications 2315A-N, an encryption service or library 2318, and a guest operating system 2321. The guest operating system includes a networking kernel 2324.

The host may be a general purpose computer including physical hardware 2327. The physical hardware may include a processor, memory, storage (e.g., hard disk, flash storage), network interface, I/O controller, and the like, each of which may be interconnected by a bus architecture of the host system. The host includes virtualization software such as a hypervisor 2330. The hypervisor provides an abstraction of the underlying hardware to the virtual machines and helps to ensure isolation of the hosted VMs. In a specific embodiment, the host machine may be provided with hardware acceleration in order to improve performance during encryption and decryption.

The encryption service provides a security protocol for securing connections between the endpoints in the LAN. Some examples of security protocols include Secure Sockets Layer (SSL), Transport Layer Security (TLS), and others. The networking kernel is responsible for passing incoming packets from the data link layer (layer 2—see, e.g., OSI model, FIG. 19) to the network layer (layer 3) and then to the transport layer (layer 4) if they are for local delivery, or back to the data link layer for transmission when the packets should be forwarded. Outgoing packets that were locally generated are passed from the transport layer (layer 4) to the network layer (layer 3) and then to the data link layer (layer 2) for actual transmission by the network device driver.

Each endpoint (e.g., virtual machine, container, or server) is further provided with a secure connection agent. For example, the first endpoint includes a first secure connection agent 2335A. The second endpoint includes a second connection agent 2335B. A connection agent at an endpoint in the LAN is responsible for receiving a request from an application to connect with another endpoint in the LAN, performing a preliminary security check of the other endpoint, working with the controller to verify that the connection is allowed, and, if allowed, establishing a secure tunnel 2337 between the endpoints in the LAN for the communication.

An agent, such as the first agent 2335A includes a static routing table programmer 2340A, presentation logic 2343A, a communication unit 2346A, and a connection handler 2349A. The static routing table 2347A is received from the controller and programmed into the networking kernel 2324. It includes a list of other destination endpoints that this endpoint is allowed or permitted to connect to.

In a specific embodiment, each endpoint is further assigned an endpoint identifier (ID) by the controller that uniquely identifies the endpoint from all other endpoints in the LAN for endpoint authentication purposes. For example, the first endpoint has been assigned a first endpoint identifier 2353A. The second endpoint has been assigned a second endpoint identifier 2353B, different from the first endpoint identifier. The endpoint ID is different from an IP address that may also be assigned to the endpoint. Since IP addresses can be spoofed, the systems and techniques of the endpoint ID further helps to secure the system by protecting against IP address spoofing.

It should be appreciated that the components and modules shown can be functional entities and there can be many different configurations. For example, the communication unit and connection handler functionalities may be combined into a single code module. In other embodiments, the communication unit and connection handler may reside in separate code modules. The various components and modules of the system may be implemented at any level such as at the application level, operating system level, and so forth.

Static routing table programmer 2340A is responsible for programming, configuring, populating, or updating static routing table 2347A that is located inside networking kernel 2324. For example, the networking kernel may provide OS commands through which the routing table programmer may access to program the static routing table that is inside and maintained in the OS networking kernel 2324. The design of programming of the network kernel to store the static routing table for network search helps to facilitate good performance. Using the OS kernel for searching provides much better performance over conventional searching techniques in the user space.

The static routing table of an endpoint includes a listing of other endpoints or destinations in the LAN or across WAN that the endpoint is allowed to connect to. Given the destination endpoint, the controller determines the connection method via LAN or WAN. The table can further store a mapping between a virtual IP address of an endpoint destination and a physical IP address of the endpoint destination. The static routing table can also store an IP subnet, in addition to individual IP addresses. In a specific embodiment, a virtual IP address is searched against the table. Consider, as an example, that there is a match with the subnet (destination virtual subnet, instead of a virtual IP address). Upon finding a match, the endpoint agent will ask the controller what exactly is the destination physical IP address and with which it will build the SSL tunnel. The virtual IP address will be kept in the encapsulation tunnel and the physical IP address is used for the SSL tunnel itself. Table M below shows an example of a static routing table.

TABLE M

| Destination IP Address (virtual) | Destination IP Address (physical) |
|---|---|
| vIP-B | pIP-BB |
| vIP-D | pIP-DD |
| vIP-F | pIP-FF |
| ... | ... |

A first column of the table lists a virtual IP address of an endpoint destination. A second column of the table lists a corresponding a physical IP address of the endpoint destination. Specifically, each endpoint in the LAN is assigned a virtual IP address and a physical IP address. The physical IP address is an IP address that is routable through the lower layer L2 and L3 IP network fabric. The virtual IP address is an IP address that is routed on the virtual network plane. The virtual IP address can be user-definable, such as by an IT administrator of an enterprise, and mapped to a physical IP address as part of the overlay network design.

The virtual IP address facilitates a decoupling from the underlying network infrastructure and allows for easy migration to other datacenters. For example, in some cases, an enterprise may wish to migrate their applications, workloads, and so forth from their private source datacenter to another target datacenter or cloud services provider (e.g., Amazon Web Services (AWS) or Microsoft Azure). There can be many existing applications, however, which may be tied to the specific servers of the source datacenter. Thus, a migration typically involves an extensive reconfiguration of the existing applications and settings so that they can be successfully hosted by the new target datacenter. For example, there may be changes to subnet designs, IP address assignments, and so forth. A datacenter may host many dozens or hundreds of applications for which changes to network settings may be required.

The virtual IP address techniques of the system, however, allow for migration without having to make changes or extensive changes to the network settings of the applications. For example, after a migration from a source datacenter to a target datacenter, the system can present the application with a virtual IP address. The virtual IP address may be the same IP address that the application used at the original source datacenter. The virtual IP address is mapped to a physical IP address associated with the new target datacenter. This allows application traffic to be properly routed in the new target datacenter.

For example, the source datacenter may include a physical subnet with a unique physical subnet IP address (e.g., 203.0.0.0/24). The target datacenter may include a different physical subnet with a different physical subnet IP address (e.g., 10.228.0.0/24). In an embodiment, the system assigns the new target servers in the target datacenter with virtual IP addresses that are the same as or mimic the physical IP addresses of the old source servers in the source datacenter (e.g., 203.0.0.0/24).

Thus, existing legacy applications configured for a particular subnet (e.g., 203.0.0.0/24), can continue to use those same network settings associated with the old source datacenter and traffic will be properly routed in the new target datacenter because of the mapping of the virtual IP addresses to the physical IP addresses (e.g., 10.228.0.0/24) of the new target datacenter.

The virtual IP address techniques of the system further help to minimize or reduce changes to the underlying network infrastructure of the new target datacenter. Depending upon what datacenter the enterprise wishes to migrate to, the enterprise may not be permitted to make extensive changes to the underlying network infrastructure. For example, if the enterprise wishes to migrate from their own private datacenter to a public cloud (e.g., Amazon Web Services), the enterprise may be very restricted in the types of changes they are allowed to make. For example, generally the enterprise will not be permitted to make changes or substantial changes to the underlying infrastructure and lower network layers. This restriction or substantial restriction is illustrated in FIG. 23 by the diagonal fill patterns. The hard-coding of internet routable IP addresses within applications, devices, or both presents very difficult challenges with respect to migrations and deployments in different locations.

In a specific embodiment, a preliminary security check is performed at the endpoint. Specifically, if the agent determines that the IP address (e.g., virtual IP address) is not listed in the static routing table, the request to connect with the other endpoint in the LAN is denied. Alternatively, if the agent determines that the IP address is listed, the agent issues a request to the controller for further approval. The controller thus provides another layer of security. Further discussion is provided below.

The presentation logic is responsible for presenting the applications with virtual IP addresses and translating between the virtual and physical IP addresses when sending or receiving packets.

The communication unit is responsible for maintaining a live continuous or substantially continuous connection with the controller. For example, the communication unit may repeatedly ping the controller (or vice-versa) such as every 3 seconds or any other frequency as desired. If connectivity between the controller and a particular endpoint is lost, the controller may generate an alert or other notification to the administrator so that the administrator may investigate. As discussed above, the controller can be implemented on a local host computer, in a virtual machine inside the cloud, and is not restricted to being within the local area network.

Connections from the endpoints to a controller positioned outside the LAN can be outbound connections in order to pass through any firewalls surrounding the LAN as firewalls generally allow outbound connections, but block unsolicited inbound requests.

The connection handler is responsible for establishing the secure tunnel with the other endpoint in the LAN upon approval from the controller. In a specific embodiment, the connection handler leverages the encryption services to encrypt the outgoing data packets and decrypt the incoming data packets. The connection handler in conjunction with the encryption service may monitor activity within the secure tunnel and may be responsible for terminating the secure tunnel upon completion of the traffic. For example, the connection handler may terminate the secure tunnel after a timeout period or other period of time in which no traffic is detected, or upon receipt of a close notification (e.g., SSL close notification alert or end-user logout). After the secure tunnel has been terminated, the process of scanning the static routing table and seeking permission from the controller may be repeated in order to reconnect with the destination endpoint. The timeout period can be a user-configurable value. For example, the timeout may be set to 5 seconds, 10 seconds, 5 minutes, 10 minutes, or any other time period as desired.

The controller includes an endpoint authentication unit 2356, endpoint tracking table 2359, policy engine 2362, communication server 2365, session ID generator 2368, connection policies 2371, management console 2374, and master routing and mapping tables 2377. Lines 2379A and 2379B illustrate the control plane or control path between the controller and agents. The controller, through the control plane, is thus fully engaged with the endpoints to receive requests, issue commands and instruction, receive status, issue requests for status, perform system monitoring, and so forth.

For example, if a control plane communication link between the controller and a particular endpoint is lost, the controller can quickly detect that there may be a potential problem with the particular endpoint (e.g., endpoint has been hacked). The controller may generate updated static routing tables where the particular endpoint is omitted and removed from the trusted group for the application and push the updates to the relevant endpoints.

If the endpoint eventually comes back on-line the controller may move the endpoint into a quarantine area or temporarily suspend connections to the endpoint so that an administrator may investigate the endpoint for potential breaches of security. Once the administrator has verified to the controller that the endpoint has not been compromised, the controller may place the endpoint back into production service. The controller may again update the static routing table and push the updates to the affected endpoints.

In a specific embodiment, the control path is always initiated from the endpoints to the controller in a "outbound fashion." So, when the controller is deployed in a WAN environment (see, e.g., FIG. 22), the endpoints communicate with the controller and the traffic will not be blocked by the local edge firewall because the control path is outbound from the endpoints to the controller.

The endpoint authentication unit is responsible for maintaining the endpoint tracking table, generating new endpoint IDs, and authenticating an endpoint using the endpoint ID. Table N below shows an example of information that may be stored in the endpoint tracking table.

TABLE N

| Endpoint ID | IP Address (virtual/physical) | Status | Time and Date Generated |
|---|---|---|---|
| 415 | vIPA/pIPA | Valid | Oct. 7, 2015, 2:04 AM |
| 408 | vIPB/pIPB | Valid | Feb. 3, 2015, 3:30 PM |
| 212 | vIPC/pIPC | Invalid | Oct. 30, 2015, 10:45 PM |
| 215 | vIPD/pIPD | Valid | Dec. 25, 2015, 8:01 PM |
| ... | ... | ... | ... |

A first column of the table stores the endpoint ID. A second column stores the corresponding IP address (virtual, physical, or both associated with the endpoint). A third column stores the status of the endpoint ID (e.g., valid, invalid, or expired). A fourth column stores a timestamp indicating when the endpoint ID was generated.

In a specific embodiment, an approval request for a secure tunnel issued by an endpoint agent is accompanied by the corresponding endpoint ID and IP address of the endpoint (virtual IP address, physical IP address, or both). The endpoint authentication unit scans the endpoint tracking table with the endpoint ID to determine whether or not the endpoint ID is valid or invalid. If the endpoint ID is valid, the check moves on to the Master Routing Table 2377 for connection policy checking. The Master Routing Table maintains an application profile that defines all connection policies for all endpoints among themselves. If the check passes, approval may be granted. If the endpoint ID is not valid, approval is denied. Since the endpoint ID is unique for each endpoint, a received request that specifies a duplicate endpoint ID already currently in use and associated with a different IP address will be denied. Thus, even if a hacker was able to obtain a copy of an endpoint ID in use, the hacker will not be able to connect to another endpoint in the LAN because the system detects or identifies the endpoint ID as a duplicate via the endpoint tracking table.

In a specific embodiment, there is an application profile that is stored in the master routing table. The application profile defines the tier-based connection policies for all endpoints. For a 3-tier human resources (HR) web service as an example, this profile defines how endpoints in tier-1, tier-2, and tier-3 can connect among each other. The connection is via LAN or WAN, and so forth. In this specific embodiment, the endpoint authentication is a first or initial step in a security check. The application profile is a second step, after the first step, in the security check. For example, a tier-1 endpoint cannot connect to tier-3 endpoint directly, although both are authenticated successfully with controller.

An endpoint ID may be generated and assigned to an endpoint as part of an initialization or configuration process of adding or registering the endpoint to the system. In a specific embodiment, if the connection between a particular endpoint and the controller is lost, a new endpoint ID is generated and assigned to the particular endpoint when the connection is restored. The previously assigned endpoint ID may be expired. This helps to further secure the system. Endpoint IDs may retired and new endpoint IDs generated and assigned on a periodic basis.

Once an endpoint ID is retired, it is not to be used again. For example, the timestamp indicating when an endpoint ID was generated allows the system to track the duration of time that an endpoint ID has been in use. After a pre-determined period of time has elapsed, the system may automatically generate and assign a new endpoint ID to an endpoint. For example, new endpoint IDs may be generated every week, every month, or any other frequency as desired for security purposes. The previously assigned endpoint ID may be expired. The endpoint ID functions as a universally unique identifier (UUID). The endpoint ID may be a 128-bit value and formatted according to any competent algorithm or variant. These precautions help to ensure very tight security. For example, even if a hacker was able to obtain an old endpoint ID, that old endpoint ID would be marked as invalid or expired in the endpoint tracking table and the controller would thus deny permission for the secure tunnel.

In a specific embodiment, a method includes storing, at a controller, a table including a listing of endpoint identifiers associated with endpoints in a LAN, and a status of each endpoint identifier; receiving, at the controller, a request for approval to establish a secure tunnel from a first endpoint in the LAN to a second endpoint in the LAN, the request including an endpoint identifier of the first endpoint; and scanning the table with the received endpoint identifier to obtain a status of the endpoint identifier.

In a specific embodiment, the table includes a listing of IP addresses associated with the endpoints, the request includes an IP address of the first endpoint, and the method includes: obtaining from the table an endpoint identifier that matches the received endpoint identifier from the first endpoint; obtaining from the table an IP address corresponding to the matching endpoint identifier in the table; and verifying that the IP address matches the received IP address from the first endpoint.

In a specific embodiment, the table includes a listing of IP addresses associated with the endpoints, the request includes an IP address of the first endpoint, and the method includes: obtaining from the table an IP address that matches the received IP address from the first endpoint; obtaining from the table an endpoint identifier corresponding to the matching IP address in the table; and verifying that the endpoint identifier matches the received endpoint identifier from the first endpoint.

In a specific embodiment, live connections are maintained between the controller and the endpoints, and the method includes: detecting that a live connection between the first endpoint and the controller has been lost; establishing a new live connection between the first endpoint and the controller; after the establishing a new live connection, generating a new endpoint identifier for the first endpoint; assigning the new endpoint identifier to the first endpoint point; and updating the table to indicate that the previously assigned endpoint identifier to the first endpoint has expired, where an IP address associated with the first endpoint before the loss of the live connection is the same as the IP address associated with the first endpoint after the establishing the new live connection.

In a specific embodiment, the connection policies are centrally stored at the controller. A connection policy specifies the context under which permission to establish a secure tunnel will (or will not) be granted. A connection policy may include parameters that identify a specific application or name of application requesting a connection (e.g., Microsoft Exchange, SQL Server, Lotus Notes, and so forth), application type (e.g., email application, database application), time and date, other context data, environment data, temporal conditions, or combinations of these. The values for the parameters may be included in the request for the secure tunnel issued by the endpoint agent. The policy engine is responsible for evaluating one or more of the connection polices to determine whether or not the request for the secure tunnel should be granted or denied. Locating and evaluating the policies centrally at the controller helps to reduce the amount of processing performed by the endpoints.

Upon the controller approving establishing the secure tunnel, the session ID generator is responsible for generating a session ID. The controller distributes the session ID to both the source endpoint that is requesting the secure tunnel (e.g., first endpoint A) and the destination endpoint to which the source endpoint wishes to connect (e.g., second endpoint B). Receipt of the session ID by the destination endpoint provides the destination endpoint with advance notice of the secure tunnel.

In a specific embodiment, the connection agent at the destination endpoint refuses attempts by other endpoints to connect with it unless the destination endpoint has previously received a session ID from the controller as advance notice and the received session ID from the controller matches the session ID provided to the destination endpoint by the source endpoint. In other words, in a specific embodiment, the source endpoint forwards the session ID to the destination endpoint for security authentication purposes. The destination endpoint verifies that the session ID received from the source endpoint matches the session ID received from the controller before agreeing to establish the secure tunnel.

More particularly, the session ID is used by the endpoints to establish and identify the secure tunnel through which a series of related messages may be exchanged between the endpoints. The session ID may be a long, randomly generated string to decrease the probability of obtaining a session ID using a brute-force search. The session ID may be set to expire after a preset time of inactivity. These precautions help to further secure the system.

In an embodiment, the controller is also responsible for maintaining master static routing tables and mapping information correlating virtual and physical IP addresses. In a specific embodiment, an application profile is included as part of the master table. In this specific embodiment, for each endpoint, this table list all other endpoints it can connect to. For example, tier-1 endpoints can connect to tier-2 endpoints via a LAN. Tier-2 endpoints can connect to tier-3 endpoints via a WAN. Tier-1, tier-2, and tier-3 endpoints have their respective virtual IP subnets.

Table O below shows an example of mapping information that may be stored and maintained by the controller. It should be appreciated that the tables depicted below and elsewhere are merely for purposes of illustration and is not intended to be limiting. For example, a particular table or other data structure maintained and stored by the system may include other columns instead of the columns shown, additional columns, or both. The column names may be different or may not be stored in a database. A field in a table may store any data type as appropriate such as strings, integers, Boolean values, abstract data types, composite data types, object types, and so forth.

TABLE O

| IP Address (virtual) | IP Address (physical) |
|---|---|
| vIP-A | pIP-AA |
| vIP-B | pIP-BB |
| vIP-C | pIP-CC |
| vIP-D | pIP-DD |
| vIP-E | pIP-EE |
| ... | ... |

In table O above, a first column stores virtual IP addresses. A second column stores the corresponding physical IP addresses. For example, according to information in table O above, there is a virtual IP address A that corresponds to a physical IP address AA. There is a virtual IP address B that corresponds to a physical IP address BB. There is a virtual IP address C that corresponds to a physical IP address CC, and so forth.

As discussed above, in a specific embodiment, the controller further maintains and stores the application profile information. The application profile information indicates the endpoint-to-endpoint connectivity policy. Given a destination virtual IP address for a connection request, the endpoint searches the local static routing table for performance optimization. If it hits, the endpoint issues a request to the controller for the connection. Given the destination virtual IP address, the controller then checks the application profile (master static routing table) for the connection policy explicitly between the source endpoint and the destination endpoint. If allowed, the connection is granted. With this technique, the performance is optimized as the expensive "search" is done on or at the endpoint (distributed computing), and the light weight "policy check" is done on or at the central controller. This function or operation is for security checking, not for overlay network address mapping.

There can be a one-to-one mapping between the virtual and physical IP addresses. In an embodiment, the mapping provides a relationship between the virtual and physical IP addresses. During a deployment of the virtual network overlay system, an administrator can use the system to define and assign virtual IP addresses to the various servers in a datacenter or other location. These virtual IP addresses can be different from the actual physical IP addresses that have been assigned to the servers.

The system stores mapping information, references, or pointers between a particular virtual IP address and a particular physical IP address that corresponds to the particular virtual IP address. The mapping allows the system to cross-reference between the virtual IP addresses and the physical IP address and vice-versa. In other words, given a virtual IP address, the system can access or consult the mapping to identify the corresponding physical IP address. Given a physical IP address, the system can access or consult the mapping to identify the corresponding virtual IP address.

As discussed, these techniques allow for a decoupling between applications and the underlying physical network including the underlying physical servers, switches, routers, and configuration. The virtual IP addresses are routable within the virtual network plane (e.g., layer 5). The layer 5 virtual IP addressing scheme can be different from the layer 3 IP addressing scheme. An enterprise, during a data center migration, can use the layer 5 virtual IP addressing scheme to maintain the existing network settings of their applications even though the applications, after the migration, will be hosted by a new and different set of servers at the new data center having their own particular layer 3 addressing scheme.

Consider, as an example, that a source data center includes a physical subnet and physical subnet IP address specified as "203.0.0.0/24." Thus, the enterprise's existing applications will be configured to access the subnet specified as "203.0.0.0/24." After a migration to a new destination data center, there may be a completely different physical subnet and physical subnet IP address, e.g., "10.228.0.0/24." In an embodiment, the virtual overlay network can be inserted between the applications and the underlying physical subnet at the new destination data center. The virtual overlay network renders or presents the applications with a virtual IP address or subnet that mimics the enterprise's previously existing subnet (e.g., "203.0.0.0/24"). Thus, no or very little reconfiguration of the applications will be required. The virtual overlay network maps the virtual subnet to the new physical subnet so that information can be routed properly in the new physical subnet.

Specifically, when a data packet associated with a virtual IP address is to be physically routed, the data packet can be passed in a downward direction through the network stack and be wrapped or encapsulated with a physical IP address corresponding to the virtual IP address. This allows the data packet to be physically routed through the lower level network layers. When the data packet reaches its destination, the data packet can be passed in an upward direction through the network stack and unwrapped or decapsulated so that it can be properly routed through the virtual network plane.

Table P below shows an example of a master listing of endpoints in a LAN and other endpoints in the LAN or WAN that an endpoint is allowed to connect to.

TABLE P

| Source | Destination | Connection Method |
|---|---|---|
| Endpoint A | Endpoint B | LAN |
| Endpoint A | Endpoint D | LAN |
| Endpoint A | Endpoint F | LAN |
| Endpoint J | Endpoint B | LAN |
| Endpoint J | Endpoint D | LAN |
| Endpoint K | Endpoint P | WAN |
| . . . | . . . | |

In the table above, a first column of the table identifies a source endpoint. A second column of the table identifies a destination endpoint that the source endpoint is allowed to connect to. For example, according to the sample data in table D above, endpoint A is allowed to connect to endpoints B, D, and F. Endpoint J is allowed to connect to endpoints B and D. Endpoint K is allowed to connect to endpoint P and so forth. The third column shows the LAN or WAN connection methods. The connection methods implement different authentication, routing, and security control mechanisms. The CoIP WAN connection method is discussed in the '564 patent. This application includes a discussion of the LAN connection method. For example, according to the table above, endpoints A and B connect via a LAN procedure as endpoints A and B are in the same local area network. Endpoints K and P connect via a WAN procedure as endpoints K and P are in different networks.

In a specific embodiment, a method includes storing, at a controller, a table including a listing of source endpoints, allowed destination endpoints for the source endpoints, and a specification of connection procedures between the source and allowed destination endpoints. A first connection procedure applies when the source and allowed destination endpoints are in a same local area network (LAN). A second connection procedure, different from the first connection procedure, applies when the source and allowed destination endpoints are in different networks, the first connection procedure thereby specifying a LAN connection, and the second connection procedure thereby specifying a wide area network (WAN) connection. The method further includes receiving, at the controller, a request from a first endpoint to connect with a second endpoint; consulting the table to determine whether to connect the first and second endpoints using the first connection procedure or second connection procedure; if the table indicates the first connection procedure, the first and second endpoints thereby being in the same LAN, connecting the first and second endpoints using the first connection procedure; and if the table indicates the second connection procedure, the first and second endpoints thereby being in different networks, connecting the first and second endpoints using the second connection procedure.

In a specific embodiment, connecting the first and second endpoints using the first connection procedure includes: generating, at the controller, a session identifier; transmitting, from the controller to the first endpoint, the session identifier; and transmitting, from the controller to the second endpoint, a copy of the session identifier. The first endpoint forwards the session identifier to the second endpoint in conjunction with a Secure Socket Layer (SSL) client hello message to the second endpoint. The second endpoint receives the SSL client hello message and verifies that the session identifier received from the first endpoint matches the copy of the session identifier received from the controller. Upon the verification, the second endpoint responds with a server hello message to negotiate establishment of an SSL tunnel between the first and second endpoints.

The method may include receiving, at the second endpoint from the controller, an indication that the first endpoint wishes to connect, the indication including a session identifier; receiving, at the second endpoint from the first endpoint, an SSL client hello message including a session identifier; comparing the session identifier received from the controller with the session identifier received from the first endpoint to determine whether there is a match; if there is a match, agreeing to construct an SSL tunnel with the first endpoint; and if there is not a match, not agreeing to construct the SSL tunnel with the first endpoint.

In a specific embodiment, connecting the first and second endpoints using the second connection procedure includes: instructing the first endpoint to initiate first traffic to a virtual network switch, the first traffic being allowed through a first firewall protecting the first endpoint because the first traffic is outbound from the first endpoint to the virtual network switch; and instructing the second endpoint to initiate second traffic to the virtual network switch, the second traffic being allowed through a second firewall protecting the second endpoint because the second traffic is outbound from the second endpoint to the virtual network switch. The method includes placing, by the virtual network switch, a payload from the first traffic into a reply to the second traffic. Thus, in an embodiment, the WAN method or procedure requires both the source and destination endpoints to pro-actively establish outbound connections toward the switch cluster (e.g. virtual network switch). The LAN method or procedure involves a connection that is one-way.

In a specific embodiment, the controller assembles from the master mapping and allowed connections tables or other data structures, a subset of entries that is distributed to an endpoint as a static routing table. In a specific embodiment, each endpoint may receive a subset of entries that are relevant to that particular endpoint based on the destination endpoints that the particular endpoint is allowed to connect with. This helps to speed the scanning of the static routing tables at the endpoints because there can be a fewer number of entries to scan through as compared to scanning all the entries in the master listing. Depending upon the size of the LAN, there can be many thousands and tens of thousands of entries of potential targets in the master listing, for one given application in service isolation. Distributing relevant subsets of the potential targets to the endpoints helps to improve the speed at which the static routing table can be scanned or searched.

For example, endpoint A may receive a first static routing table listing endpoints B, D, and F as destinations that endpoint A is allowed to connect to. Endpoint P, however, is excluded or omitted from the first static routing table because the master list indicates that endpoint A is not allowed to connect to endpoint P. Endpoint J may receive a second static routing table listing endpoints B and D as destinations that endpoint B is allowed to connect to. Endpoints F and P, however, are excluded or omitted from the second static routing table because the master list indicates that endpoint J is not allowed to connect to endpoints F and P. Endpoint K may receive a third static routing table listing endpoint P as a destination that endpoint K is allowed to connect to. Endpoints B, D, and F, are excluded or omitted from the third static routing table because the master list indicates that endpoint K is not allowed to connect to endpoints B, D, and F.

Thus, depending upon which endpoints a particular endpoint is allowed to connect with, a first static routing table distributed and stored at a first endpoint may be different from a second static routing table distributed and stored at a second endpoint. The number of entries in the first static routing table may be different from or the same as the number of entries in the second static routing table. An entry in the first static routing table may be the same as or different from an entry in the second static routing table. Entries may overlap such as when the first and second endpoints are allowed to connect with a same endpoint. Entries may not overlap such as when each endpoint that the first endpoint is allowed to connect with is different from each endpoint that the second endpoint is allowed to connect with.

These techniques of the virtual overlay network platform provide both performance and security benefits. For example, it may be than an endpoint responsible for processing a workload related to an ERP sales application does not need to connect with an endpoint processing a workload related to an application testing tool. Thus, the static routing table distributed to the endpoint processing the ERP workload may not list the endpoint responsible for processing the application testing workload. So, even if the endpoint processing the ERP workload is hacked, the compromise will not affect the other endpoint because the two endpoints do not route to each other.

The communication server is responsible for maintaining connections with the various endpoints in the LAN, handling distribution of the static routing tables, handling distribution of updates to the static routing tables, handling distribution of new static routing tables that may replace existing static routing tables, receiving requests from the endpoint agents to establish secure tunnels, and distributing the session IDs to the endpoints.

The management console provides an interface for a user, such as an IT administrator, to configure the virtual overlay network system, set up the security policies, display status and health, receive alerts, specify virtual IP addresses, map virtual IP addresses to physical IP addresses, identify which endpoints are allowed to connect to which other endpoints, create connection policies, modify connection policies, delete connection policies, manage application profiles, perform edits and updates to the master routing and mapping tables, and so forth. The management console can provide a single or central location to view system status and make modifications. The management console may provide a graphical user interface (GUI) to be displayed on an electronic screen, programmatic interface (e.g., application programming interface (API)), command line interface, or combinations of these.

Figure 24:
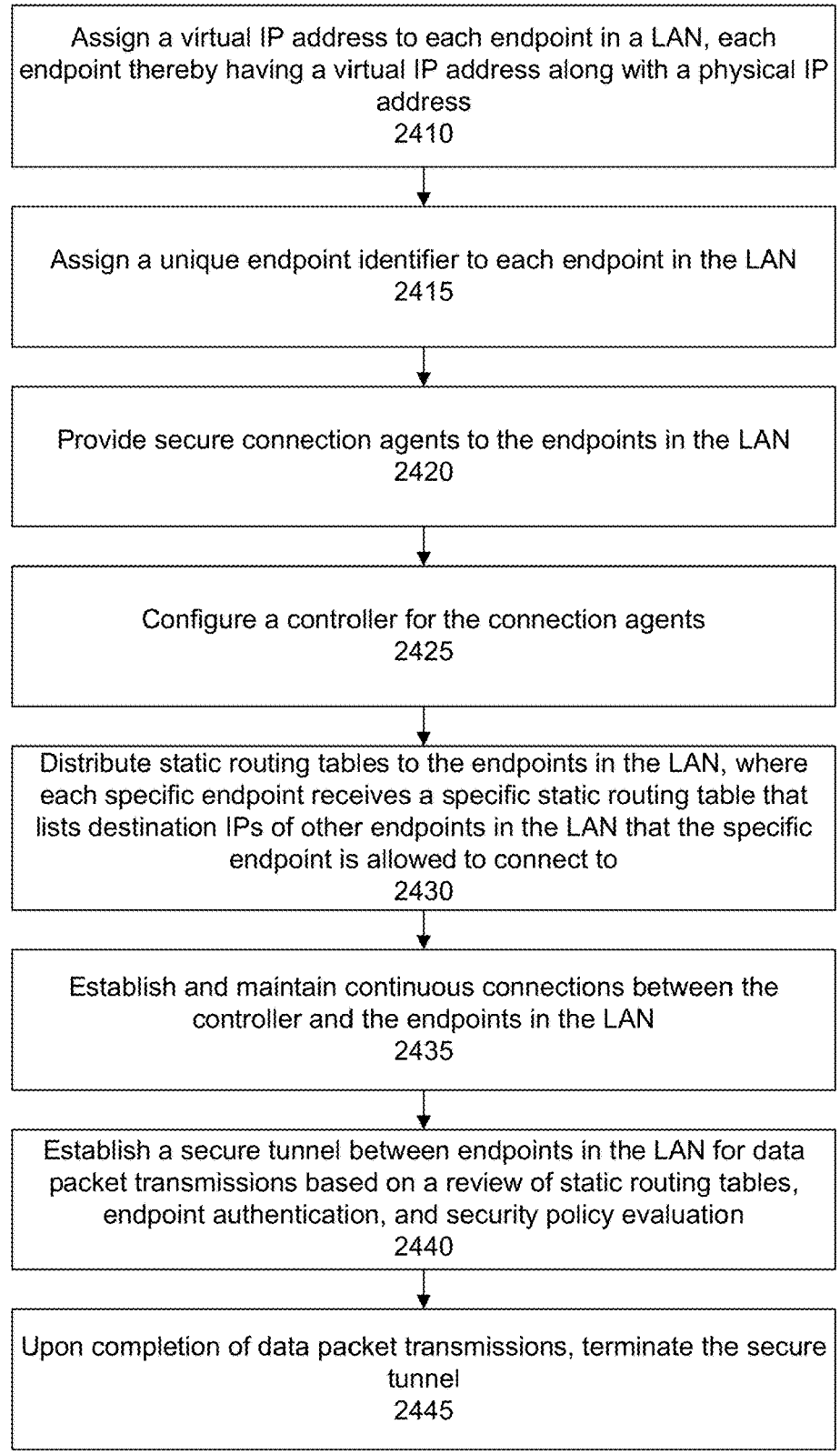
FIG. 24 shows an overall flow diagram of the virtual overlay network, according to a specific embodiment.

FIG. 24 shows an overall flow of the virtual overlay network system. In a step 2410, a virtual IP address is assigned to each endpoint in a LAN, each endpoint thereby having or being associated with a virtual IP address along with a physical IP address. Each endpoint may not be limited to one pair of virtual and physical IP addresses but may have multiple pairs of virtual IP address and physical IP address. For example, each endpoint can have multiple physical IP addresses (just like multiple line cards with multiple network ports) and each physical IP address can match to its individual virtual IP address. However, in an embodiment, each endpoint has only one agent (e.g., single agent) and is associated with one endpoint identifier (ID) (e.g., a single endpoint ID). In a step 2415, a unique endpoint identifier is assigned to each endpoint in the LAN. In a step 2420, secure connection agents are provided to the endpoints in the LAN. For example, the secure connection agents may be installed at the endpoints. In a step 2425, a controller is configured for the connection agents. The configuration may include, for example, identifying the endpoints that the controller is responsible for, specifying connection policies, application profiles, specifying allowed destinations, and so forth.

In a step 2430, static routing tables are distributed to the endpoints in the LAN. Each specific endpoint receives a specific static routing table that lists destination IP addresses of other endpoints in the LAN that the specific endpoint is allowed to connect to. Destination IP addresses of endpoints in the LAN that the endpoint is not allowed to connect to may be excluded or omitted from the static routing table. The static routing tables allow for performing at an endpoint an initial or preliminary security check or verification of whether the endpoint is allowed to connect to another endpoint. This preliminary security check can be performed at the endpoint and thus reduce the number of requests issued by the endpoint to the controller. For example, if the preliminary security check fails at the endpoint (e.g., the endpoint is not allowed to connect to the other endpoint according to the static routing table), the process can end without having to involve the controller. Delegating responsibility for the preliminary screening to the endpoints helps to reduce the number of requests that the controller services and helps to conserve computing resources of the controller.

In a step 2435, continuous or substantially continuous connections are maintained between the controller and the endpoint agents in the LAN.

In a step 2440, when there is a request to connect an endpoint in the LAN with another endpoint in the LAN, a secure tunnel is established between the endpoints for communications. The secure tunnel is established subject to a review of the static routing table, endpoint authentication, and one or more security policy evaluations (e.g., application profile review). In a step 2445, upon completion of the transmissions, the secure tunnel is terminated.

Figure 25:
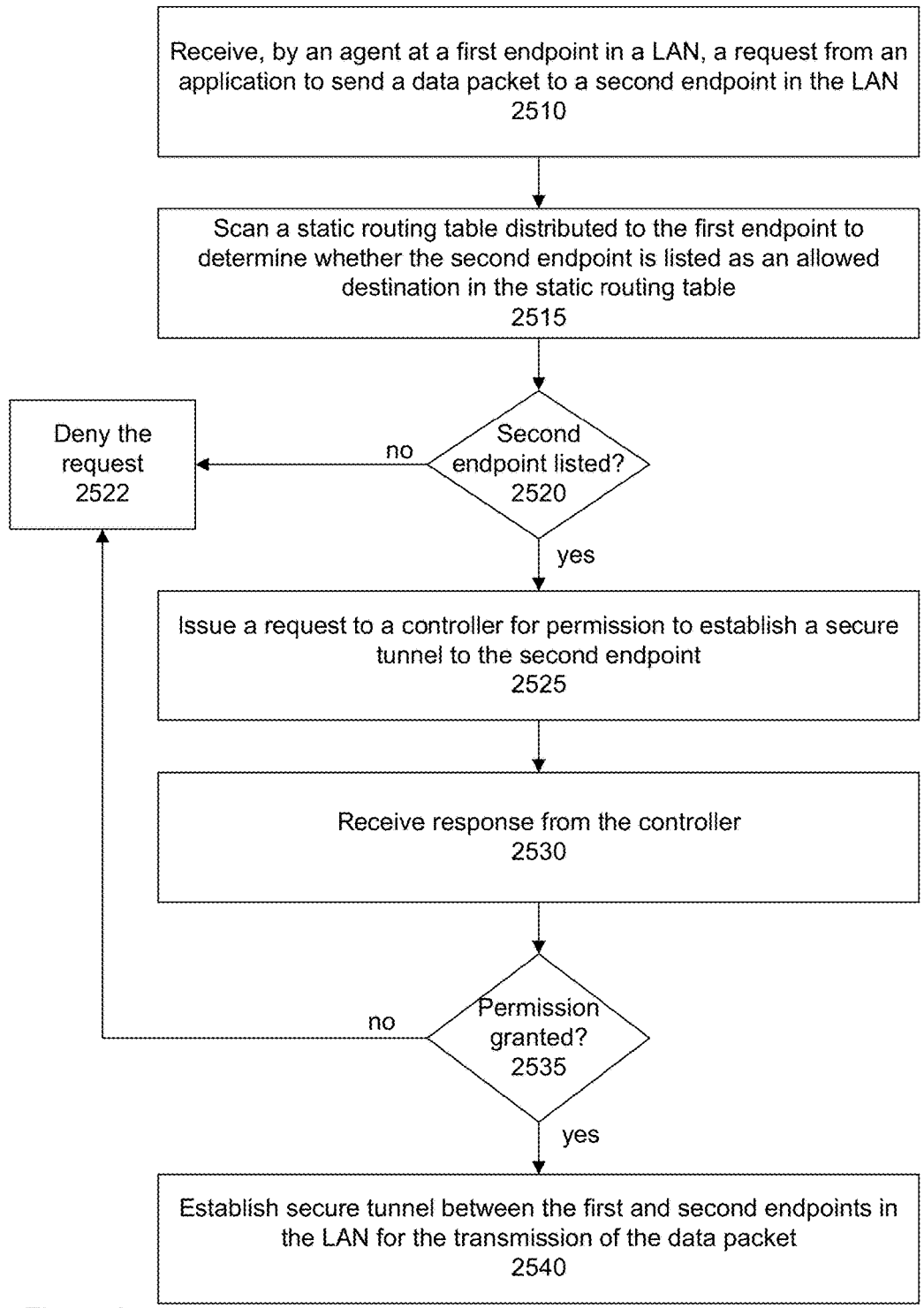
FIG. 25 shows a flow diagram for establishing a secure tunnel within a LAN.

FIG. 25 shows a flow of receiving a connection request at an endpoint. In a step 2510, a first agent at a first endpoint in the LAN receives a request from an application to send a data packet to a second endpoint in the LAN having a second agent. In a step 2515, the first agent causes a scan or search of a static routing table distributed to the first endpoint by the controller and programmed into the networking kernel to determine whether the second endpoint is listed as an allowed destination in the static routing table (step 2520). For example, the first agent may issue a request to the networking kernel for a scan of the static routing table stored inside the networking kernel.

In this specific embodiment, the scanning of the static routing table is performed at the endpoints. Distributing the scanning task to the endpoints can help to improve the scalability of the system because the burden of scanning does not fall upon the controller.

In another specific embodiment, scanning the static routing table is performed at the controller (or performed jointly at the endpoint and controller). In this specific embodiment, the endpoint agent can transmit the destination IP address to the controller through the control plane connecting the controller to the endpoint. The controller searches a static routing table stored at the controller to determine whether the destination IP address is listed as an allowed destination for that endpoint to connect to. If the destination IP address is listed as an allowed destination, the controller may then proceed with further security checks (e.g., security policy evaluation).

Performing the search of the static routing table at the controller can be advantageous in cases where it is desirable to reduce the amount of work performed at an endpoint. Searching the static routing table at the controller can be advantageous in cases where, for example, endpoints in the LAN are frequently changing such as when endpoints are being frequently added, deleted, or reconfigured. In these cases, it may be desirable to not have to push continuous updates of the static routing tables to the various endpoints in the LAN because such activity consumes network bandwidth and other computing resources. Thus, in this specific embodiment, the static routing table may be stored at the controller and not stored at the endpoints.

In a specific embodiment, the request may identify the desired destination via a virtual IP address. Consider, as an example, that a static routing table having the entries shown in table M above has been distributed to the first endpoint. The first agent scans or causes the scanning of the static routing table to determine whether a matching virtual IP address can be found. If a matching virtual IP address cannot be found in the static routing table (e.g., the second endpoint is not listed as an allowed destination for the first endpoint), the request to connect with the second endpoint is denied (step 2522).

Alternatively, if a matching virtual IP address is found in the static routing table (e.g., second endpoint is listed as an allowed destination for the first endpoint), the first agent issues a request to the controller for permission to establish a secure tunnel to the second endpoint (step 2525).

Figure 26:
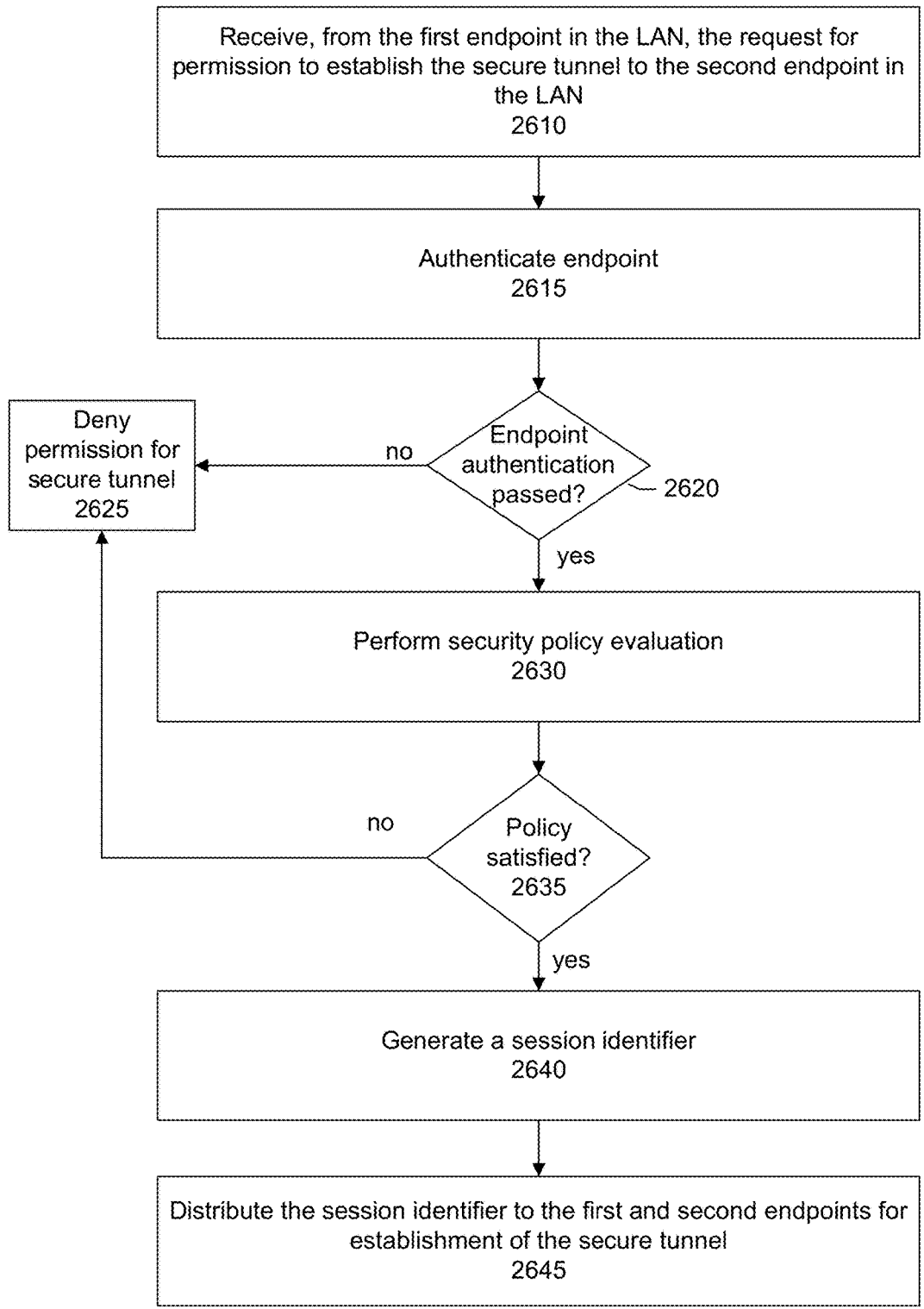
FIG. 26 shows a flow of the controller for establishing the secure tunnel within a LAN.

FIG. 26 shows a flow of the controller for determining whether permission to establish the secure tunnel should be granted or denied. In a step 2610, the controller receives from the first endpoint in the LAN, the request for permission to establish the secure tunnel to the second endpoint in the LAN. In a specific embodiment, the request issued to the controller may be accompanied by an endpoint ID of the first endpoint, a name or other identifier associated with the application or process that wishes to connect to the second endpoint, virtual IP address of the first endpoint, physical IP address of the first endpoint, virtual IP address of the second endpoint, physical IP address of the second endpoint, other context or metadata, or combinations of these.

In a step 2615, the controller performs an authentication of the endpoint based on the received endpoint ID. For example, the controller may consult the endpoint tracking table to determine a status of the received endpoint ID. Based on the status of the received endpoint ID, a determination is made as to whether or not endpoint authentication has passed (step 2620). For example, if the endpoint tracking table indicates that the received endpoint ID is invalid or has expired, permission to establish the secure tunnel may be denied (step 2625).

Alternatively, in a step 2630, if the endpoint tracking table indicates that the received endpoint ID is valid, the controller performs an evaluation of one or more security policies.

The security policy can be but is not limited to tier based computing checking, application service isolation, east-west micro segmentation filtering, and the like.

Figure 27:
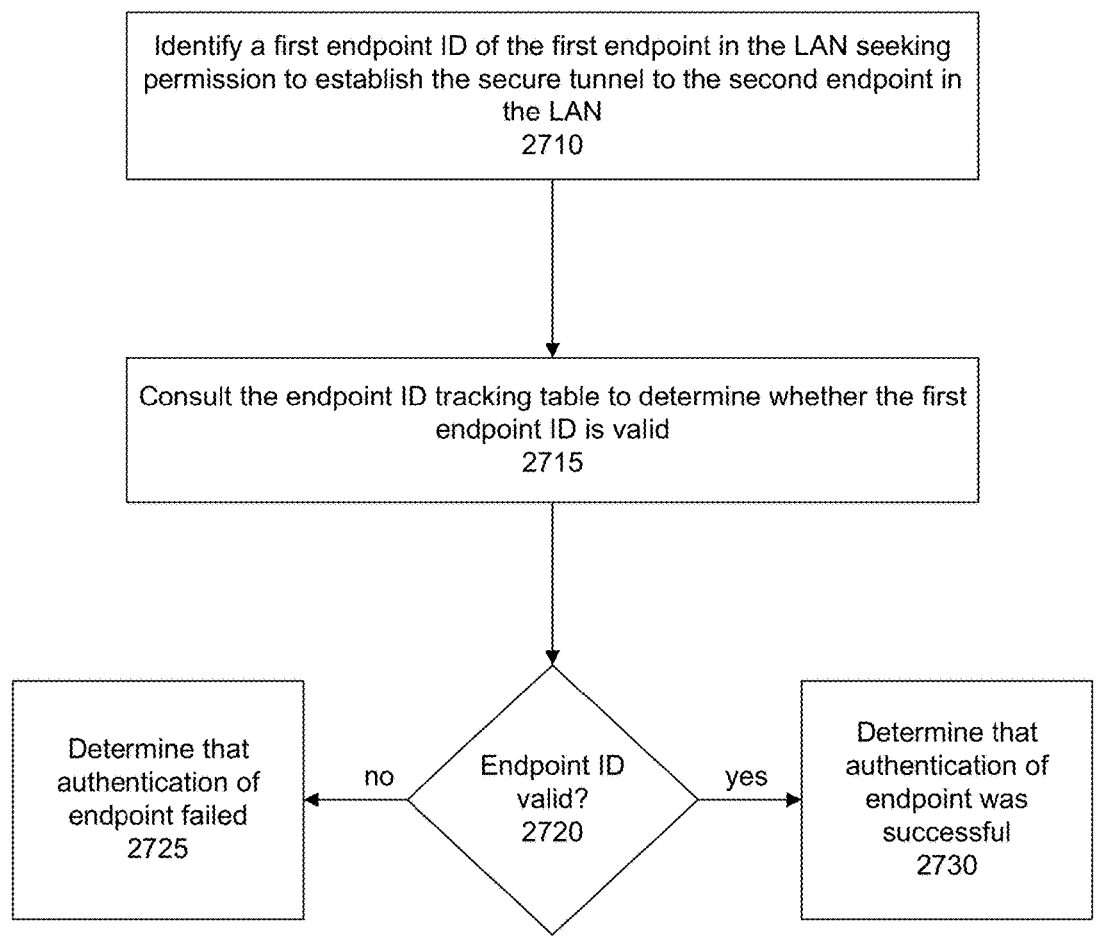
FIG. 27 shows a flow diagram for endpoint authentication.

FIG. 27 shows further detail of a flow for endpoint authentication according to a specific embodiment. In a step 2710, a first endpoint ID of the first endpoint in the LAN seeking permission to establish the secure tunnel to the second endpoint in the LAN is identified. In a step 2715, the endpoint ID tracking table is consulted to determine whether the first endpoint ID is valid (step 2720). If the endpoint ID is not valid, a determination is made that authentication of the endpoint failed (step 2725). If the endpoint ID is valid, a determination is made that authentication of the endpoint was successful (step 2730). The endpoint authentication process can be performed each time the controller receives an approval request for a secure tunnel.

In a specific embodiment, an endpoint ID authentication operation is performed for both the source endpoint as well as the destination endpoint. In a specific embodiment, a method includes maintaining, at a controller, an endpoint identifier tracking table including a listing of endpoints, endpoint identifiers assigned to the endpoints, and status of the endpoint identifiers; receiving, from a source endpoint, a request to connect to a destination endpoint; obtaining, from the endpoint identifier tracking table, a status of an endpoint identifier associated with the source endpoint; obtaining, from the endpoint identifier tracking table, a status of an endpoint identifier associated with the destination endpoint; if both the status of the endpoint identifier associated with the source endpoint and the status of the endpoint identifier associated with the destination endpoint are valid, determining that endpoint authentication has passed; and if any identifier status is not valid, determining that the endpoint authentication has failed.

Figure 28:
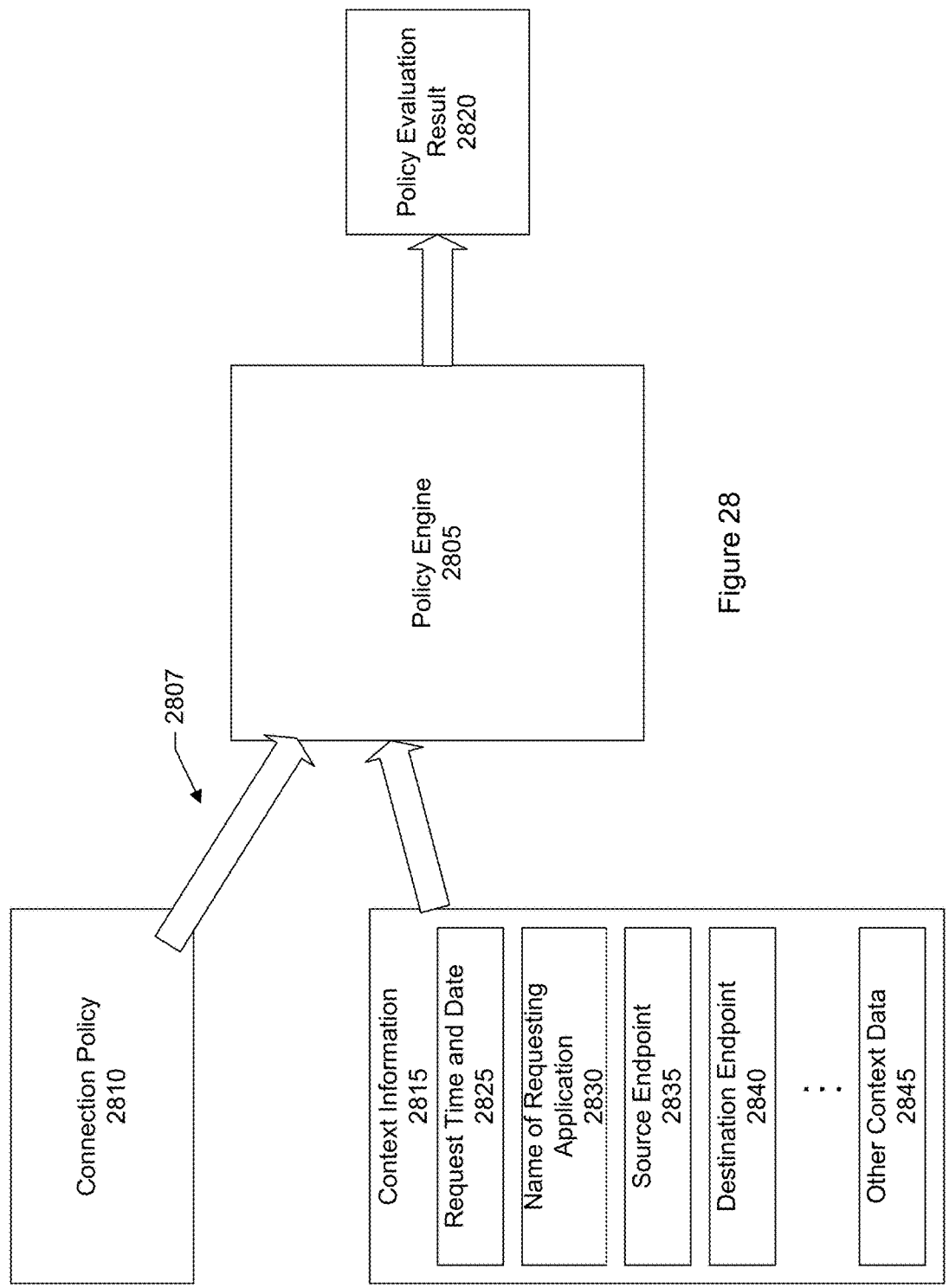
FIG. 28 shows a block diagram of policy evaluation.

FIG. 28 shows a block diagram for secure connection policy evaluation. As shown in the example of FIG. 28, a policy engine 2805 receives 2807 as input a connection policy 2810 and context information 2815, evaluates the connection policy based on the context information, and outputs an evaluation result 2820.

The context information may include a time and date 2825 of the request, a name or other identifier 2830 of the application or process requesting the connection, information 2835 about the source endpoint from which the request was sent, information 2840 about the destination endpoint, other context data or metadata 2845, or combinations of these. Information about the source and destination endpoints may include endpoint identifiers, associated virtual IP addresses, associated physical IP addresses, or combinations of these. Some examples of other context data or metadata may include the type of application making the request to connect, type of data to be sent (e.g., Microsoft Outlook data, Microsoft SharePoint data, Oracle data, SQL Server data, Microsoft Internet Explorer data), log information such as a history of past connection requests. For example, the controller may maintain a historical activity log of past requests. The activity log can be analyzed to detect patterns that may indicate suspicious activity.

In a specific embodiment, a connection policy specifies applications that are allowed to connect to requested endpoint. This provides for a very granular level of control and security because connections to a particular endpoint can be based on both the identity of the destination endpoint and also on the specific application that has requested the connection to the destination endpoint. For example, the source endpoint may provide support for human resources (HR) application and a software testing tool. The destination endpoint may provide support for a component of the HR application such as an employee database. Thus, the static routing table for the source endpoint may specify connecting to the destination endpoint as being allowed so the components of the HR application distributed across the two endpoints can interact. The connection policy may include an application profile.

The controller, however, provides an additional layer of security at the application-level. For example, the connection policy may specify that connection requests by the HR application may be allowed. The connection policy may specify that connection requests by applications other than the HR application should be denied. Thus, in this example, if the context information indicates that the application making the request for the secure tunnel is the HR application, the request may be granted. If, however, the context information indicates that the application making the request is an application not the HR application (e.g., is the software testing tool), the request may be denied.

In a specific embodiment, there are whitelist policies that identify applications, processes, or both that are allowed to connect to particular endpoints. A secure tunnel can be dynamically established on-the-spot based on a qualified application (e.g., application is on the whitelist) for a particular session. For example, a policy may include a listing of identifiers corresponding to applications, processes, or both that are allowed to connect to other endpoints. One example of an identifier includes a checksum associated with the application. Evaluating a policy may include scanning the whitelist to determine whether an identifier for the application matches an identifier in the list. If the application is not listed, the connection may be denied. If the application is listed, the connection may be allowed.

In this specific embodiment, a different session requires the establishment of a new different secure tunnel and thus be accompanied by a different set of encryption keys. In other words, in a specific embodiment, only qualified applications will be able to trigger the tunnel and once traffic has finished, the tunnel is torn down. The tunnel is adaptive and driven by application traffic. The secure tunnel is established within or inside the LAN or between two endpoints in the LAN and thus does not pass through a gateway. In another specific embodiment, there can be blacklist policies that identify applications, processes, or both that are not allowed to connect to particular endpoints.

Security policies can be authored, stored, and evaluated that allow for very fine control over the establishment of the secure tunnel. For example, a security policy may include parameters that specify a connection is allowed only at certain times of the day, on certain days of the week, is allowed only by specific applications, and so forth.

The evaluation result may specify that the request for the secure tunnel should be granted or denied. Alternatively, the evaluation result may specify that another connection policy should be evaluated. For example, if the policy engine determines that the request is suspicious based on, for example, a historical activity pattern, the policy engine may determine that another policy should be evaluated to further discern whether or not the request is genuine or malicious.

In a specific embodiment, a method includes storing, at a controller, a policy specifying one or more applications that are allowed to connect to a destination endpoint; receiving from a source endpoint a request to establish a secure tunnel from the source endpoint to the destination endpoint, where a static routing table at the source endpoint identifies the destination endpoint as being allowed destination, and where the request includes an identification of an application requesting the secure tunnel connection; evaluating the policy to determine whether the application is one of the one or more applications that are allowed to connect to the destination endpoint; if the application is one of the one or more applications specified in the policy, granting the request to establish the secure tunnel; and if the application is not one of the one or more applications specified in the policy, denying the request to establish the secure tunnel.

Referring back now to FIG. 26, in a step 2635, based on the policy evaluation, a determination is made as to whether the policy was satisfied. If the policy was not satisfied, permission for the secure tunnel may be denied (step 2625). Alternatively, if the policy was satisfied, the controller may generate a session identifier (step 2640).

In a step 2645, the session identifier is distributed or transmitted from the controller to the first and second endpoints for establishment of the secure tunnel. In a specific embodiment, the sequence of security checks includes searching a static routing table, which is followed by endpoint authentication, and which is then followed by security policy evaluation. In other words, endpoint authentication is after searching the static routing table. Security policy evaluation is after endpoint authentication. This sequencing of the operations or steps may reflect, in increasing order, the level of computing resources required to perform each step. For example, searching the static routing table may be less compute intensive than performing security policy evaluations. Thus, it may be more efficient to search the static routing table first than to perform a policy evaluation because if the destination IP address is not listed as an allowed destination for the endpoint, there is no need to contact the controller to perform the security policy evaluation.

It should be appreciated, however, that these security operation checks may be performed in any order. An operation may be performed in parallel, concurrently, during, or simultaneously with another operation. For example, in some cases, an enterprise may place a very high priority on speed and performance. In this specific embodiment, the enterprise may wish to configure the virtual network platform so that scanning the static routing table and security policy evaluations are performed in parallel. In this specific embodiment, an endpoint agent may issue a request to the controller for permission to establish a secure tunnel before the endpoint agent has completed the search of the static routing table.

Referring back now to FIG. 25, in a step 2530, a response is received from the controller indicating whether or not permission to establish the secure tunnel was granted. If the response indicates that permission was not granted, the request is denied (step 2522).

Alternatively, in a step 2535, if the response from the controller indicates permission was granted, a secure tunnel is established (step 2540) between the first and second endpoints in the LAN for the transmission of the data packet. In a specific embodiment, a receipt by the first and second endpoints of the session ID from the controller can indicate that permission was granted to establish the secure tunnel.

Figure 29A:
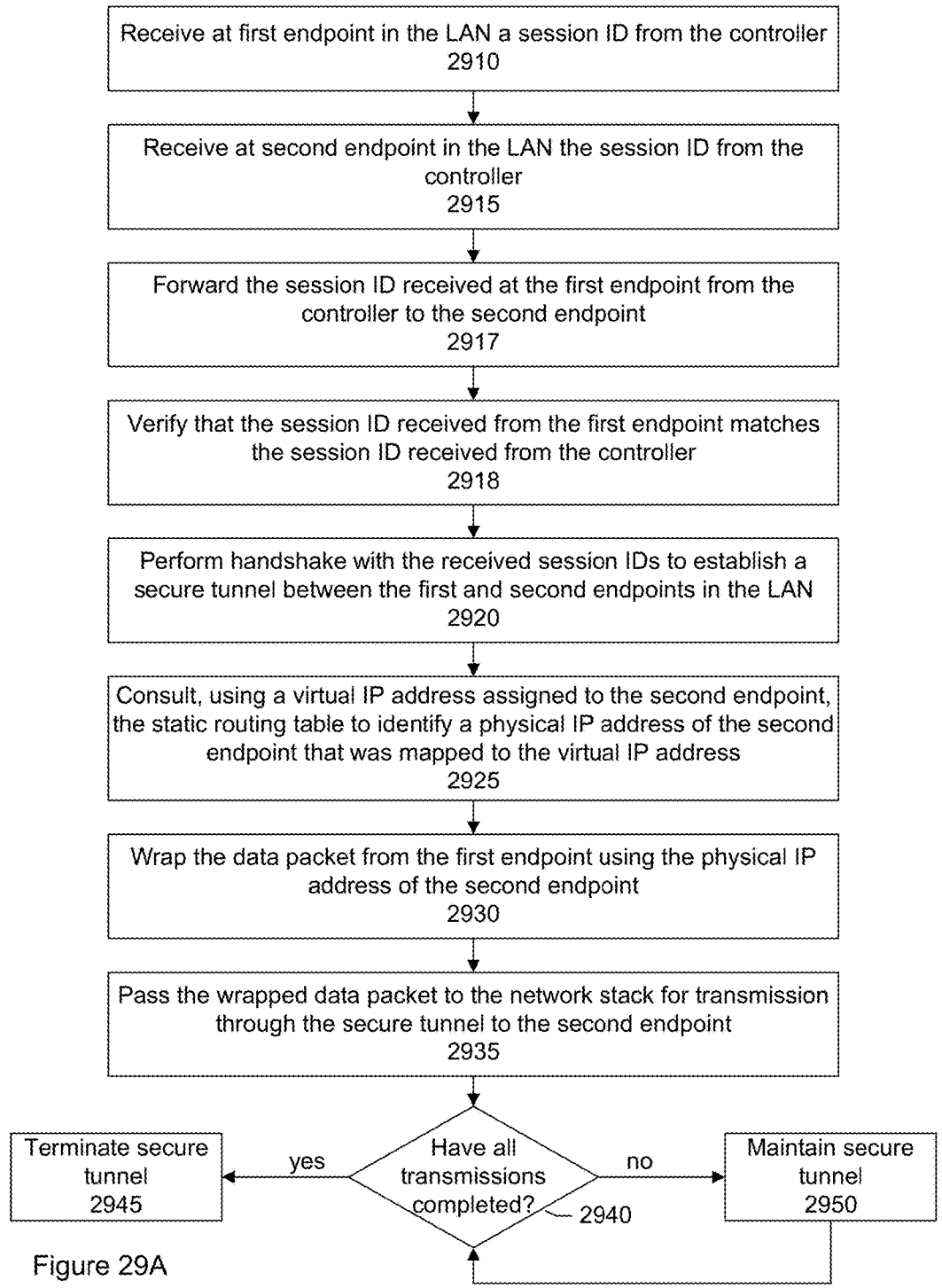
FIG. 29A shows a flow diagram for secure protocol handshake.

FIG. 29A shows a flow for establishing the secure tunnel upon approval from the controller. In a step 2910, the first endpoint in the LAN receives a session ID from the controller. Similarly, in a step 2915, the second endpoint in the LAN receives a copy of the session ID from the controller.

In a step 2917, the session ID received at the first endpoint from the controller is forwarded from the first endpoint to the second endpoint. In a step 2918, a verification or comparison is performed at the second endpoint between the session ID received from the first endpoint and the session ID received from the controller. If, for example, the secure connection agent at the second endpoint determines that the session IDs do not match, the agent denies or blocks an attempt by the first endpoint to connect to the second endpoint.

In an embodiment, if the agent detects a pair of non-matching session IDs, the agent generates an alert to the controller. The controller, in turn, may relay the alert to an administrator, place the first endpoint in a quarantine area, place the second endpoint in the quarantine area, or combinations of these. Once an endpoint is placed into the quarantine area, communications to the endpoint may be blocked, communications from the endpoint may be blocked, or both. For example, the controller may distribute updated static routing tables or other instructions to the remaining endpoints directing them to not connect to the quarantined endpoint, to refuse connections from the quarantined endpoint, or both. The administrator can then further investigate the quarantined endpoint. Thus, the verification of the session IDs helps to thwart malicious attacks such as a man-in-the-middle attack.

If the session IDs match, in a step 2920, the first and second endpoint perform or engage in a handshake (e.g., SSL/TLS handshake) based on the received session IDs to establish the secure tunnel. The handshake protocol allows the first and second endpoints to authenticate each other, negotiate an encryption algorithm and cryptographic keys before the transmission (or receipt) of the data packet payload.

In a specific embodiment, the verification of matching session IDs may be performed as part of the handshake. For example, the first endpoint may initiate the handshake by sending a "client-hello" message to the second endpoint where the "hello" message includes the session ID received by the first endpoint from the controller. The second endpoint, upon receipt of the "client-hello" message including the session ID may compare the session ID from the first endpoint with the session ID the second endpoint received from the controller in order to ensure that the session IDs match.

Upon determining that the session IDs match, the second endpoint may respond to the "client-hello" message with a "server-hello" message. The "server-hello" message may include the session ID that refers to the session being negotiated. The negotiation may continue with the exchange of certificates, encryption keys to encrypt and decrypt the packets, and so forth in order to finish the handshake and begin the secure communication session. The first and second endpoints use the keys to encrypt and decrypt the messages (e.g., data packets) the endpoints send to each other for the duration of the secure session. In a specific embodiment, the endpoint agents leverage the OpenSSL library to secure their communications.

In a specific embodiment, once the handshake is finished, in a step 2925, the first agent at the first endpoint consults its static routing table using the virtual IP address assigned to the second endpoint to identify or cross-reference a physical IP address of the second endpoint that was mapped to the virtual IP address.

In a step 2930, the data packet to be sent from the first endpoint to the second endpoint is wrapped with the physical IP address and a specific port (e.g., 9797 port) assigned to the second endpoint (along with the virtual IP address assigned to the second endpoint). The virtual IP address allows the data packet to be routed within the virtual overlay network plane. The physical IP address allows the data packet to be routed through the lower layer network. In a specific embodiment, to build the SSL tunnel in the physical networking plane, a physical IP address and a pre-specified port (e.g., port 9797) are used to build the tunnel. SSL is a L4 tunnel, where the IP address routes L3 and the port is used for L4.

In a step 2935, the first agent passes the wrapped data packet to the network stack (e.g., network kernel of guest OS) for transmission through the secure tunnel to the second endpoint. The secure tunnel is encrypted and traffic is sent inside through the tunnel between the two endpoints for security. In a specific embodiment, initial communications sent from the first endpoint to the second endpoint can be received at the second endpoint as unsolicited inbound communications because there are no firewalls between the first and second endpoints, the first and second endpoints being in the same LAN.

An advantage of using the network kernel of the guest OS to establish the tunnel at the OS layer rather than at the hypervisor layer includes the reuse and maintenance of code. In particular, the design and architecture of hypervisors or machine virtualization platforms can vary greatly between different virtualization vendors (e.g., VMware versus Microsoft) and even different versions from the same vendor.

Generally, however, vendors design their machine virtualization platforms and subsequent versions to be able to accommodate a wide-range of upper level guest programs, guest operating systems, and so forth. Thus, leveraging the networking kernel at the guest OS level for the routing helps to minimize or reduce the need to maintain different code bases for each specific machine virtualization platform vendor. For example, the same or substantially the same endpoint agent code module may be deployed on machine virtualization platforms provided by two different vendors (e.g., VMware and Microsoft). In a specific embodiment, the agent leverages the kernel routing table for the routing.

Further, accessing the networking kernel of the guest OS, rather than the host OS, helps to facilitate direct communications between a virtual machine and another virtual machine in the LAN, direct communications between a container and another container in the LAN, direct communications between a virtual machine and a container in the LAN, direct communications between a server and a virtual machine in the LAN, direct communications between a server and a container in the LAN, and so forth. Also in a public cloud environment, a customer's direct access to the hypervisor is prohibited for security reasons. There is generally no available cloud service in the market today that allows customers to build a customized tunnel directly from the hypervisor between VMs.

Moreover, the architecture of different operating systems (e.g., Windows Server versus Linux) can be fairly similar whereas the architecture of different machine virtualization platforms may be very different. Thus, for example, the same or substantially the same endpoint agent code module may be deployed within a Windows environment or Linux environment. This helps to lower the overall cost of the virtual overlay network system for the enterprise customers.

In a step 2940, a determination is made as to whether the all transmissions have been completed. In a step 2945, when the transmissions have been completed, the secure tunnel is terminated. Alternatively, in a step 2950, when the transmission have not completed, the secure tunnel is maintained.

There can be a user-configurable timeout period or setting. For example, the timeout period may be set to 5 seconds, 10 seconds, 30 seconds, 60 seconds, 5 minutes, or any other value as desired. If the timeout passes with no activity, the secure tunnel between the two endpoints is torn down. For example, the session IDs may be destroyed, invalidated, or otherwise rendered unusable. This helps to ensure that a hacker will not be able to resurrect the session of a legitimate endpoint and impersonate the endpoint. If the first endpoint wishes to again connect with the second endpoint, the process of checking the static routing table (step 2515, FIG. 25), seeking permission from the controller (step 2525), endpoint authentication (step 2615, FIG. 26), policy evaluation (step 2630, FIG. 26), generating and distributing new session IDs (steps 2640, 2645, FIG. 26), and establishing a new secure tunnel (FIG. 29A) are repeated.

The secure tunnel may be referred to as a dynamic tunnel because it can be established when needed and then immediately torn down when not needed. The secure tunnel is very different from other security techniques such as L3 VPN. For example, VPN is generally always-on, static, deployed between remote sites (e.g., Chicago and Los Angeles) to connect L3 subnets, is not application specific, and provides edge-to-edge, not end-to-end encryption because communications behind the respective VPN gateways are not encrypted. In other words, VPN is a L3 gateway-based system where communications among endpoint neighbors behind the respective gateways of the sites are L4-7 and are not encrypted. VPN is typically deployed as a gateway at the edge of the enterprise network and connects to another edge of a network. VPN is edge box to edge box and traffic and communications among machines inside the enterprise or behind the gateway are not encrypted. VPN deployments also require the purchase of hardware based VPN boxes and time-consuming configuration and provisioning of the VPN boxes. In contrast, the architecture of the virtual network platform is distributed in that encryption and decryption can be performed at the individual host machines. This helps to spread the load and improve overall performance.

In a specific embodiment, systems and techniques for the secure tunnel as described herein, allow for secure endpoint-to-endpoint communications between endpoints (e.g., endpoint neighbors) in a local area network. These endpoints can include virtual machines, containers, or both which an enterprise may provision with a public cloud datacenter (e.g., Amazon AWS, Microsoft Azure, Rackspace, Google Cloud, and others). The secure tunnel can be established between two virtual machines in a LAN environment. The secure tunnel can be established without reconfiguring or without substantially reconfiguring the underlying lower level network. Indeed, an enterprise may not be permitted or be provided the option to reconfigure the underlying lower level network of a public cloud datacenter such as by adding new lower level equipment, reconfiguring existing lower level equipment, or both.

The secure tunnel can be established at the application-level, for a particular session associated with that application, and then torn down. These systems and techniques provide a very high-level of security because connections between endpoint neighbors can be controlled based on the specific application that is requesting the connection between the endpoints. For example, it may be the case that there is no need for an application component associated with a software testing tool to be communicating with a component associated with a human resources (HR) application. The virtual overlay network system, via the connection policies, can thus prevent attempts by the software testing tool to communicate with the HR application, even though both VMs may be deployed in the same cloud datacenter as neighbors, managed by the same IT admin. Tearing down the secure tunnel when not needed (and re-establishing when needed) provides another layer of security because the secure tunnel will not be sitting idle and available for a hacker to potentially infiltrate and transmit malicious packets because the tunnel will have been torn down.

In a specific embodiment, the secure tunnel provides an end-to-end secure communications tunnel. That is, the secure tunnel extends from the first endpoint to the second endpoint. Since the first and second endpoints are both within the same local area network, the secure tunnel may extend from the first to second endpoint without passing through a gateway, Internet gateway, or website to bridge the traffic.

A gateway refers to a network node connecting two networks that may use different protocols, have different subnet architectures, and so forth. It can be a security enforcement or filtering point. An example of a gateway is an Internet gateway. An Internet gateway connects an enterprise network to the Internet. An Internet gateway may act as a security node, variously filling one or more security roles, such as proxy server, firewall or network address translation (NAT) server. In a specific embodiment, for the LAN endpoint-to-endpoint connection, however, the traffic does not go through a gateway. Rather, the traffic flows among endpoints on the same local area network segment. In a LAN, for example, the computers may be connected to the same switch.

In other words, in this specific embodiment, in the LAN routing there is no gateway in the middle and it is a direct end-to-end connection. (WAN routing, however, can include a gateway in the middle. In the WAN routing, there can be a virtual network switch (VNS) connecting two different network domains.)

A data packet to be sent from the first endpoint in the LAN to the second endpoint in the LAN may be encrypted at the first endpoint, remain encrypted during a transmission from the first endpoint to the second endpoint, and not be decrypted until the data packet has arrived at its final destination (e.g., second endpoint).

The systems and techniques of the virtual network platform allow secure tunnels to be established very quickly between two endpoints in a LAN and then torn down very quickly upon completion of the traffic. Thus, the platform can scale to support, for example, many hundreds and thousands of virtual machines inside a datacenter or public cloud datacenter securely communicating among each other through dynamically generated tunnels. That is, traffic between two VMs in a local area network can be encrypted. In such an endpoint-connecting-to-endpoint environment, it is extremely difficult to build static L3 tunnels ahead of time to protect all possible application traffics in the LAN. The L3 network method has exponential complexity, and is not feasible and not practical.

FIGS. 29B-29I show block diagrams of data packets being wrapped (and unwrapped) as they are transmitted back and forth between first endpoint A and second endpoint B. FIGS. 29B-E show the transmission of a data packet from first endpoint A to second endpoint B. FIGS. 29F-I show the transmission of a data packet from second endpoint B to first endpoint A.

Figure 29B:
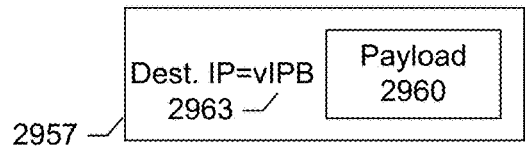
FIG. 29B shows a first state of a data packet when sending from a first to second endpoint.

Referring now to FIG. 29B, this example shows a first state of a data packet 2957 having a payload 2960 from an application that the application has addressed to an IP address 2963. The destination IP address is a virtual IP address identifying the destination as "vIPB."

Figure 29C:
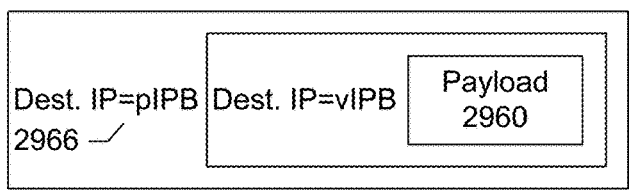
FIG. 29C shows a second state of the data packet when sending from the first to second endpoint.

FIG. 29C shows a second state of the data packet. First endpoint agent A at first endpoint A has wrapped the data packet with a physical IP address ("pIPB") 2966 corresponding to virtual IP address vIPB. In other words, the agent may add an overlay header to the packet where the overlay header specifies the destination IP address as being physical IP address pIPB. The physical IP address allows for routing the data packet through the lower layers of the IP network fabric. The virtual IP address allows for routing in the upper level overlay virtual network plane.

Figure 29D:
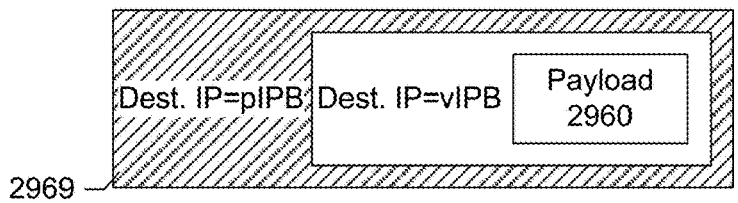
FIG. 29D shows a third state of the data packet when sending from the first to second endpoint.

FIG. 29D shows a third state of the data packet upon receipt at second endpoint B. As the data packet travels upward through the protocol stack the data packet is unwrapped 2969 as indicated the diagonal fill pattern. In other words, the agent may remove the added overlay header (physical IP address pIPB).

Figure 29E:
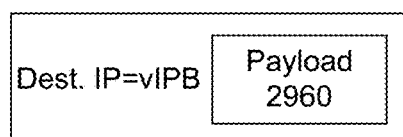
FIG. 29E shows a fourth state of the data packet when sending from the first to second endpoint.

FIG. 29E shows a fourth state of the data packet at second endpoint B with the added overlay header having been removed. Second endpoint agent B at second endpoint B forwards or routes the packet through the overlay virtual network plane to the destination virtual IP address vIPB.

Figure 29F:
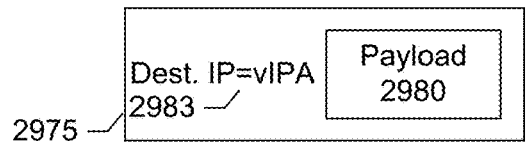
FIG. 29F shows a first state of a data packet when sending from the second to first endpoint.

FIGS. 29F-I show the transmission of a data packet from second endpoint B back to first endpoint A. Referring now to FIG. 29F, this example shows a first state of a data packet 2975 having a payload 2980 from a sending application at second endpoint B where the application has addressed the packet to an IP address 2983. The destination IP address is a virtual IP address identifying the destination as "vIPA."

Figure 29G:
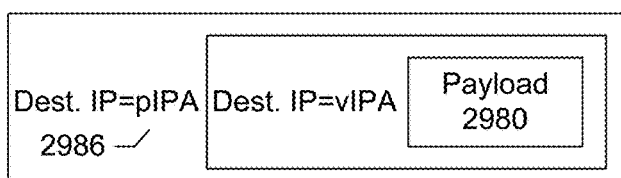
FIG. 29G shows a second state of the data packet when sending from the second to first endpoint.

FIG. 29G shows a second state of the data packet. Second endpoint agent B at second endpoint B has wrapped the data packet with a physical IP address ("pIPA") 2986 corresponding to virtual IP address vIPA. In other words, the agent may add an overlay header to the packet where the overlay header specifies the destination IP address as being physical IP address pIPA. As discussed above, the physical IP address allows for routing the data packet through the lower layers of the IP network fabric. The virtual IP address allows for routing in the upper level overlay virtual network plane.

Figure 29H:
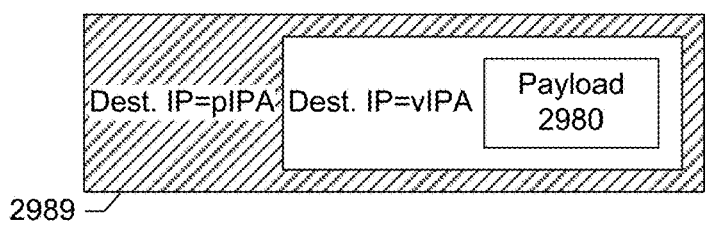
FIG. 29H shows a third state of the data packet when sending from the second to first endpoint.

FIG. 29H shows a third state of the data packet upon receipt at first endpoint A. As the data packet travels upward through the protocol stack the data packet is unwrapped 2989 as indicated the diagonal fill pattern. In other words, the agent may remove the added overlay header (physical IP address pIPA).

Figure 29I:
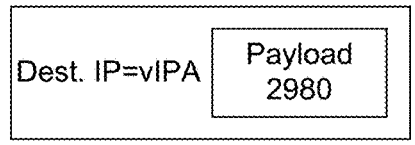
FIG. 29I shows a fourth state of the data packet when sending from the second to first endpoint.

FIG. 29I shows a fourth state of the data packet at first endpoint A with the added overlay header having been removed. First endpoint agent A at first endpoint A forwards or routes the packet through the overlay virtual network plane to the destination virtual IP address vIPA.

Figure 30:
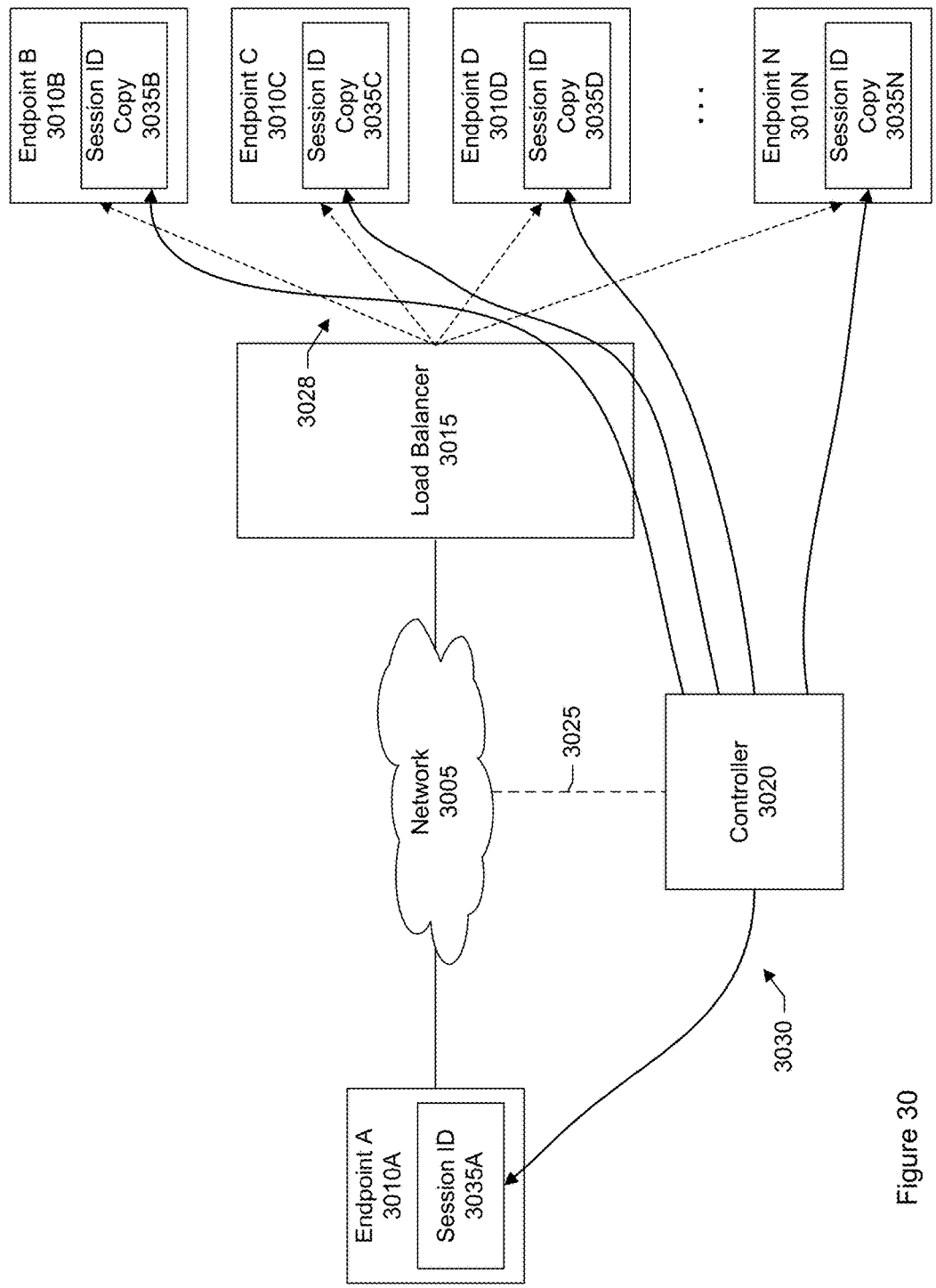
FIG. 30 shows a first state of establishing a secure tunnel in a LAN having a load balancer.

FIG. 30 shows an example for generating a secure tunnel in a LAN environment having a load balancer. In this specific embodiment, a LAN 3005 includes or interconnects an endpoint A 3010A, a load balancer 3015, and any number of endpoints 3010B-N that are managed or represented by the load balancer. Each endpoint includes a secure connection agent. A controller 3020 is connected to each of the endpoint agents. A communication link 3025 is shown with a broken line to indicate that the controller may be inside or outside of the LAN.

The load balancer is responsible for distributing 3028 network or application traffic across endpoints 3010B-N. The load balancer helps to ensure that the endpoints are being used efficiently so that an endpoint is not being over-utilized while another endpoint is being underutilized. In determining which of endpoints 3010B-N should receive a request, the load balancer may rely on any competent algorithm. Some examples of load balancing algorithms include round robin, weighted round robin, least connections, least response time, and others. The controller stores information recognizing the load balancer and the endpoints connected to the load balancer.

In a specific embodiment, when the first endpoint is granted permission to establish a secure tunnel with an endpoint behind or managed by the load balancer by using the load balancer physical IP address as the destination IP address, the controller distributes 3030 a copy of a session ID for the secure tunnel to the first endpoint and also to each of endpoints 3010B-N that are managed by the load balancer because any of endpoints 3010B-N may be potential candidates to be connected via the secure tunnel to the first endpoint. For example, depending on the particular load of the endpoints, the load balancer may select endpoint 3010B to receive the application traffic while endpoints 3010C-N are not selected. Alternatively, endpoint 3010B may be busy servicing other requests or may be otherwise unavailable. In this case, the load balancer may select a different endpoint, such as endpoint 3010D to receive the application traffic.

Thus, because any of endpoints 3010B-N may be potential candidate destination targets for the application traffic coming from the first endpoint, the controller distributes session IDs to each of the endpoints being managed by the controller. For example, a first copy 3035A of the session ID may be distributed by the controller to the first endpoint. A second copy 3035B of the session ID may be distributed to endpoint 3010B. A third copy 3035C of the session ID may be distributed to endpoint 3010C. A fourth copy 3035D of the session ID may be distributed to endpoint 3010D, and so forth.

The load balancer is responsible for ensuring consistent "session distribution" among its servers. The CoIP session is designed as an application session, so it will work with any third party load balancer in this regard. Sending the session ID to a third party load balancer can be challenging because a third party load balancer may not allow the deployment of a CoIP agent on it as an endpoint. For example, a load balancer as provided by Amazon Web Services does not permit the deployment of an outside agent. Thus, the CoIP system is designed to "work" with the third party load balancer without touching it (e.g., without having to install an agent on the load balancer).

Figure 31:
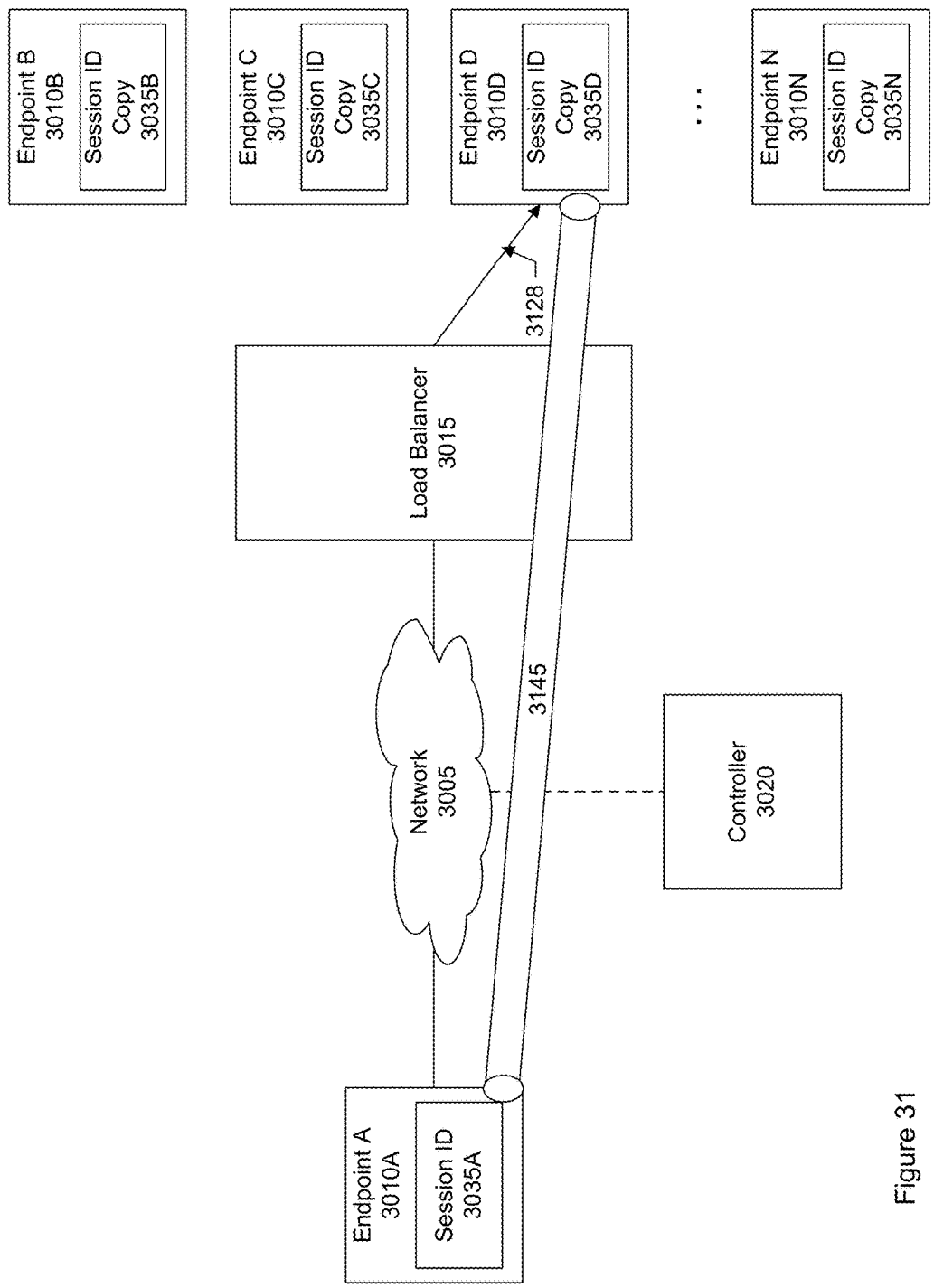
FIG. 31 shows a second state of establishing the secure tunnel in the LAN having the load balancer.

FIG. 31 shows an example of the state of the environment after the load balancer has selected a particular endpoint to receive the application traffic. In the example of FIG. 31, the load balancer has selected endpoint 3010D as the endpoint to receive the application traffic as indicated by an arrow 3128. A secure tunnel 3145 is thus established between first endpoint 3010A and endpoint 3010D. The secure tunnel extends from the first endpoint, through the load balancer, to endpoint 3010D. The copies of the session IDs distributed to the remaining endpoints behind the load balancer may be configured to expire after a pre-determined time in which no handshake request is received.

Figure 32:
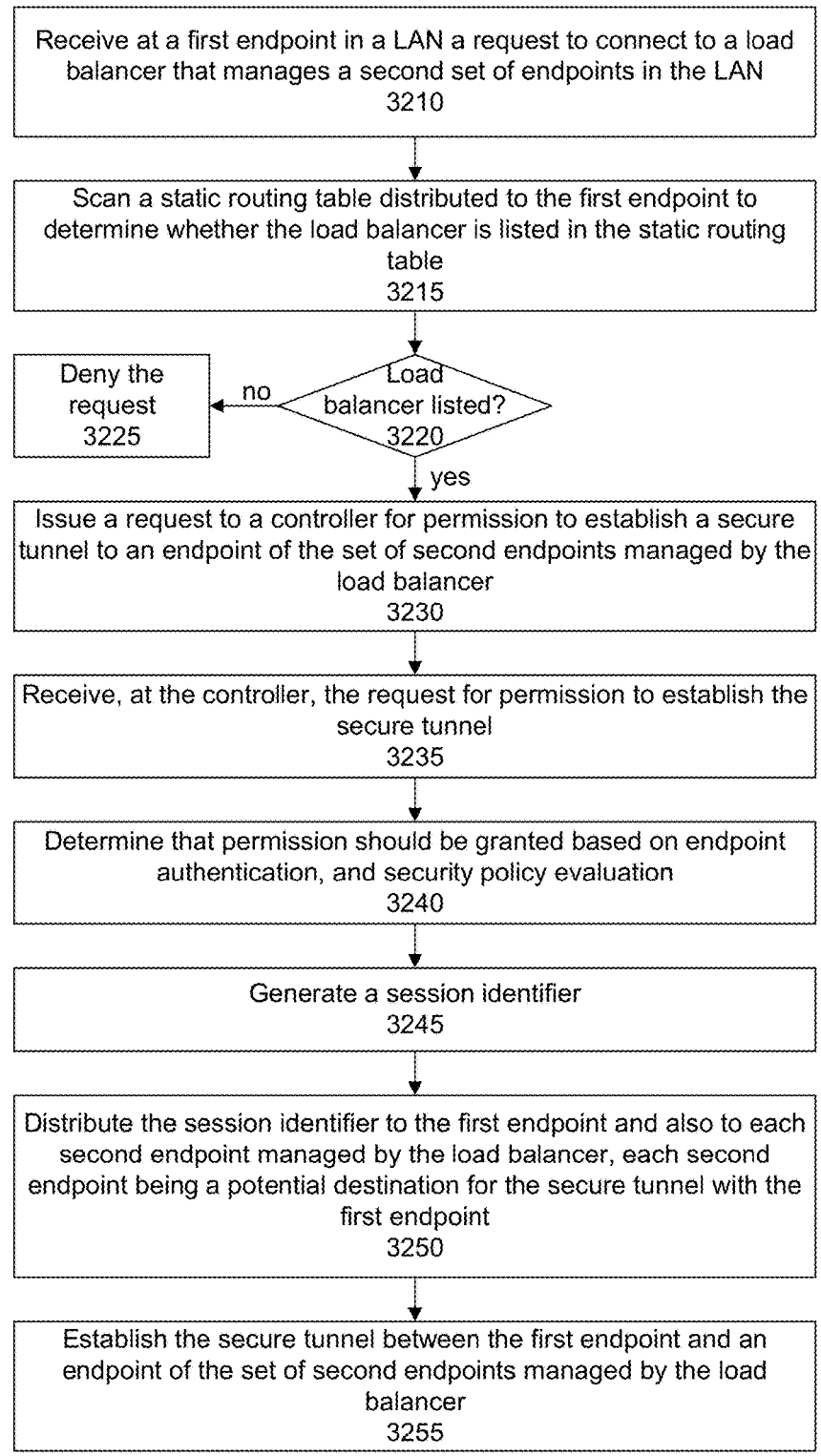
FIG. 32 shows a flow diagram for establishing the secure tunnel in the LAN having the load balancer.

FIG. 32 shows a flow for establishing a secure tunnel in a LAN having a load balancer. In a step 3210, a request is received at a first endpoint in a LAN to connect to a load balancer that manages a second set of endpoints in the LAN. In a step 3215, a static routing table distributed to the first endpoint is scanned to determine whether the load balancer is listed in the static routing table (step 3220). If the load balancer is not listed in the static routing table, the request is denied (step 3225). Alternatively, if the load balancer is listed, in a step 3230, a request for permission to establish a secure tunnel to an endpoint of the set of second endpoints managed by the load balancer is issued from the first endpoint to the controller.

In a step 3235, the controller receives the request for permission to establish the secure tunnel. The controller, upon receiving the request, proceeds to process the security checks to determine whether or not permission to establish the secure tunnel should be granted or denied. For example, the controller may perform one or more of endpoint authentication (step 2615, FIG. 26) or security policy evaluation (step 2630, FIG. 26).

If the security checks pass, in a step 3240, the controller determines that permission to establish the secure tunnel is granted. In a step 3245, the controller generates a session ID. In a step 3250, the controller distributes the session ID to the first endpoint and also to each second endpoint managed by or behind the load balancer because each second endpoint is a potential destination for the secure tunnel with the first endpoint.

In a step 3255, a secure tunnel is established between the first endpoint and an endpoint of the second set of endpoints managed by the load balancer. The session ID distributed to the other remaining endpoints behind the load balancer may be allowed to expire.

In a specific embodiment, the destination IP address that the first endpoint wishes to connect to is specified as the load balancer's physical IP address—and not the virtual IP address for any of the endpoints in the second set of endpoints managed by the load balancer. In other words, the load balancer's physical IP address is saved in the static routing table in the first endpoint. The controller also saves this information in its application profile and master routing table, so it knows a load balancer is on the path before the second set of endpoints. In this design, the load balancer is balancing "CoIP tunnels" and not the real application traffics. The real application is wrapped inside the CoIP tunnel.

In a specific embodiment, a method includes storing, at a controller, information about a plurality of endpoints in a local area network (LAN), the information identifying source endpoints, allowed destination endpoints for the source endpoints, at least one load balancer among the allowed destination endpoints, and a subset of endpoints managed by the at least one load balancer; receiving, from a source endpoint, a request to connect to a destination endpoint; performing a security check to verify that the source endpoint is allowed to connect to the destination endpoint; determining, from the stored information, that the destination endpoint happens to be the at least one load balancer; generating a session identifier; and distributing the session identifier to the source endpoint and also to each endpoint of the subset of endpoints managed by the at least one load balancer.

Figure 33:
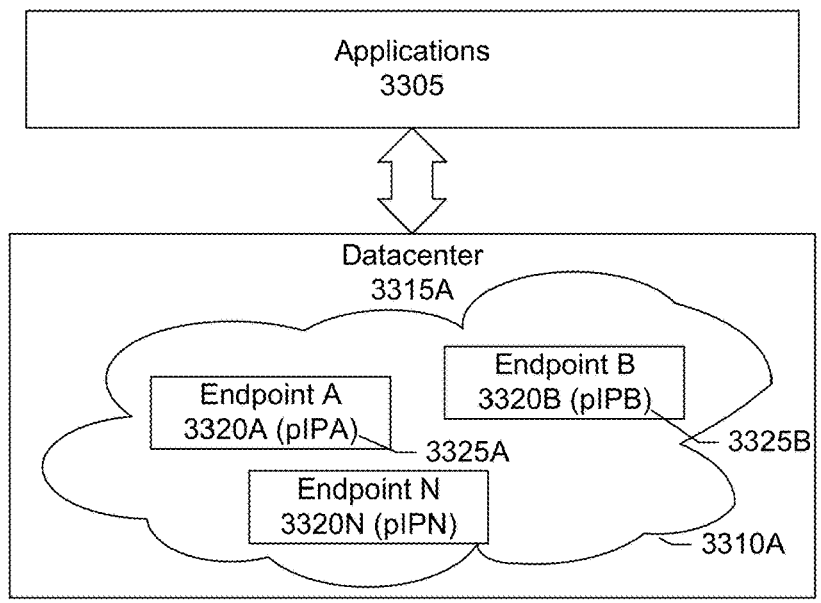
FIG. 33 shows a block diagram of a datacenter.
Figure 34:
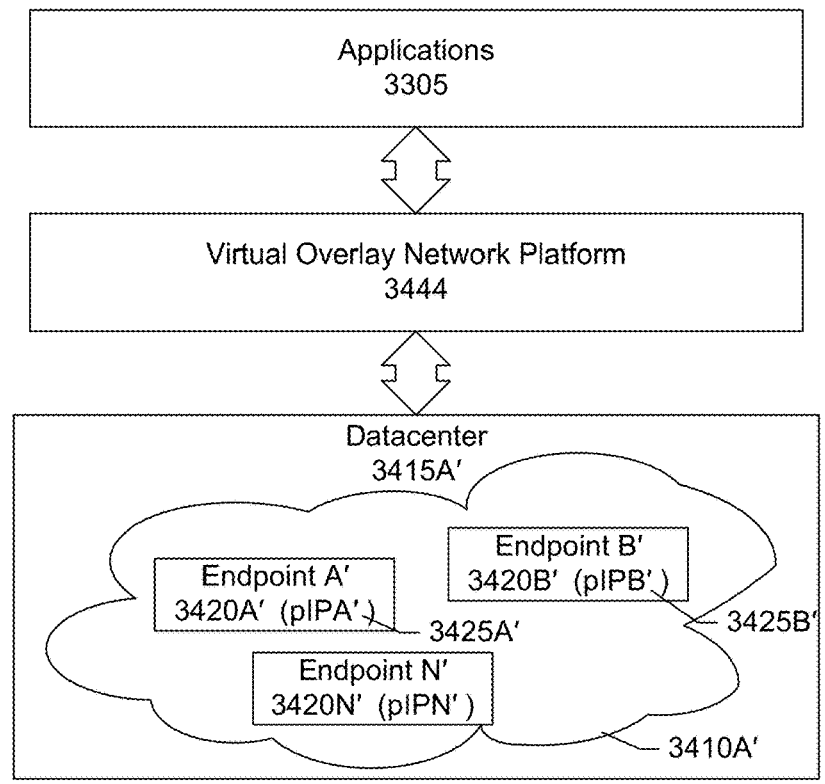
FIG. 34 shows a block diagram of the datacenter having been migrated.

FIGS. 33-34 show an example of migrating a datacenter. In the example of FIG. 33, a set of existing applications 3305 have been configured to access a subnet 3310A at a first datacenter 3315A. The subnet includes a set of endpoints A-N hosting or supporting the existing applications. Each of endpoints A-N may be assigned a particular physical IP address of the first datacenter subnet (e.g., 203.0.0.0/24). For example, an endpoint 3320A may be assigned a physical IP address A 3325A (pIPA), an endpoint 3320B may be assigned a physical IP address B 3325B (pIPB), and so forth. Thus, the network settings and other settings of the existing applications are configured with the physical IP addresses of the first subnet endpoints or servers (e.g., pIPA, pIPB, and so forth).

FIG. 34 shows an example after migrating from first datacenter 3315A to a new datacenter 3415A' having a new physical subnet 3410A'. More particularly, workloads may be migrated from first or previous datacenter 3315A to new datacenter 3415A'. The new physical subnet includes a set of endpoints A'-N'. Each of endpoints A'-N' may be assigned a particular physical IP address of the new physical subnet (e.g., 10.228.0.0/24). For example, an endpoint 3420A' may be assigned a physical IP address A' 3425A' (pIPA'), an endpoint 3420B' may be assigned a physical IP address B' 3425B' (pIPB'), and so forth.

The new datacenter may be geographically remote from the first or previous datacenter. For example, the previous datacenter may be in North Carolina. The new datacenter may be in Nevada. As internet routable IP addresses are generally assigned based on geographical location, the physical IP addresses of the endpoints or servers in the new physical subnet may be very different from the physical IP addresses of the previous datacenter subnet. For example, physical IP address 3325A from the previous datacenter subnet may be different from each of physical IP address 3425A'-N' from the new datacenter subnet (e.g., 203.0.0.0/24 versus 10.228.0.0/24).

In a specific embodiment, a virtual overlay network 3444 is inserted, positioned, or deployed between applications 3305 and endpoints (e.g., servers) A'-N' of the new datacenter subnet in the new datacenter. The virtual overlay network provides, among other components and processes, assignments of virtual IP addresses (vIP) to new endpoints A'-N'—where the virtual IP addresses mimic or are the same as the physical IP addresses of the previous datacenter subnet (e.g., pIPA-pIPN)—a mapping of the virtual IP addresses to the physical IP addresses of the new datacenter subnet (e.g., pIPA'-pIPN'), presentation logic to render the virtual IP addresses to existing applications 3305, and address translation logic to translate between the virtual IP addresses and the physical IP addresses of the new datacenter subnet. The virtual overlay network allows the applications to maintain their existing network settings and configuration parameters while accessing a subnet (new datacenter subnet) that is completely different from the original previous datacenter subnet.

The virtual overlay network allows virtual IP addresses to be mapped and remapped to physical IP addresses of a particular physical subset. The ability to map and remap allows for easy migration to different datacenters without having to reconfigure the network settings of the applications to recognize the new physical subnet of the new datacenter. Routing of traffic from the applications through the new physical subnet, without changing existing network settings of the applications, is permitted through the new physical subnet because the virtual IP addresses are remapped to the new physical IP addresses of the new physical subnet.

In this specific embodiment, the virtual overlay network is built on top of the lower layer L3 IP network fabric. The system handles layer 5 (L5) session management and layer 4 (L4) transport without having to change the lower layer network (L3) IP network fabric. More particularly, there is a layer 5 IP addressing scheme in which virtual IP addresses or CoIP addresses are assigned. This layer 5 IP addressing scheme can be different from the layer 3 IP addressing scheme (e.g., physical IP addressing scheme). In other words, layer 3 includes a physical IP addressing scheme and layer 5 includes a virtual IP addressing or CoIP addressing scheme. An enterprise may not be able to easily change or may be restricted from modifying the layer 3 physical IP addressing scheme. The technique of the layer 5 virtual IP addressing scheme, however, allows for presenting to the upper level applications IP addresses that the applications "think" are the layer 3 IP addresses. That is, a transparency layer is created so that the upper layer applications accessing the layer 5 IP addresses (e.g., virtual, overlay, or CoIP addresses) will believe that they are accessing the layer 3 IP addresses. IT administrators can use the virtual overlay network platform to model the layer 3 IP address in a layer 5 space.

The benefit provided by the layer 5 IP addressing scheme is that these overlay addresses can easily migrate and move to other locations. It is "network in motion" supporting the application workload migration to public cloud, hybrid cloud, or multi-cloud. For example, an endpoint in a network domain can be easily "migrated" to another network domain while still carrying the same IP address because the overlay IP address can be different and decoupled from the under layer physical IP address. Typically, Internet routable IP addresses granted to a local datacenter by a service provider depends on geographical location. For example, a particular routable IP address may be associated with a location in Chicago while another routable IP address may be associated with a location in California. These IP addresses are very difficult to "move" because their backbone routers are geographically fixed.

An enterprise or organization purchases publically routable IP addresses from service providers and their backbone routers renders those IP addresses at that geographic location. A typical subnet may include a block of IP addresses (e.g., 128 IP addresses or 256 IP addresses) that may be publicly routable (e.g., Internet routable) and that are geographically associated as the service provider renders those IP addresses and provides support for routing those IP addresses. The enterprise may purchase these IP addresses and assign them to their various internal machines. For example, there can be a webserver or website that the enterprise maintains. The website may be associated with a public IP address so that it can be accessed globally by the enterprise's employees. It can be very difficult to move that website to a different location (e.g., public cloud datacenter) because the machines, applications, and so forth and are locked to that public IP address. With a tier-based web service, as an example, this public IP address can further be coupled with the backend IP addresses, although the backend IPs are not internet routable. To migrate the entire network with all the couplings can be very complex and be subject to errors and security risks.

Consider, as another example, an enterprise having thousands or even tens of thousands virtual machines all having been assigned IP addresses and thus having a binding with the lower layer IP fabric (e.g., a local Cisco router, a VMware Virtual Network, and so forth). The enterprise may have deployed the machines, perhaps 10 or 20 years ago, in their own Chicago datacenter, but now wishes to shift support to a cloud datacenter provider.

If the enterprise wishes to migrate their datacenter, such as to a cloud datacenter provider (e.g., Amazon AWS), they will be faced with an enormous challenge because all of the enterprise's machines have been associated with the physical IP addresses of the original datacenter. There may be a lack of institutional knowledge regarding the applications and configurations that is lost with the passage of time as employees may have since left or retired. It becomes very difficult to perform a migration of those virtual machines. For example, it may not be possible to migrate the machines and ask that the cloud provider keep the same existing Chicago IP addresses so that the applications running on top will not have to be reconfigured. These applications can be very complex to reconfigure and can require many hours of testing after reconfiguration to ensure that nothing has been missed.

The systems and techniques of the virtual overlay network, however, can allow that same existing Chicago IP address (along with the backend coupled IP addresses if any) to be used in that new datacenter. The overlay network provides for virtual IP addresses that can be different from the physical IP addresses and the virtual IP addresses can "move" or "migrate" to anywhere in the world. The virtual overlay network helps to facilitate the cloud promise of migration, i.e., quickly starting workload processing at one location and then being able to quickly migrate or move the workload (including IP address, security policies, and so forth) to a different machine. In an embodiment, the virtual overlay network operates at the layer 5 session layer and layer 4 transport layer to create secure tunnels for layer 3 transport connections. There are lower level physical IP addresses for layer 3. There are layer 5 IP addresses. The layer 5 IP addresses present themselves like layer 3 IP addresses to the upper layer applications. When the upper layer applications look down (e.g., look down the network stack), they see what looks to be layer 3 IP address, but are actually the layer 5 IP addresses (e.g., virtual IP addresses). The layer 5 IP addresses can support the same identical format used by the layer 3 IP addresses.

The systems and techniques of the virtual overlay network can facilitate future moves or migrations to other datacenters. For example, in a specific embodiment, network settings of an application are configured to recognize an IP address of an existing LAN. The method includes assigning the first endpoint a virtual IP address that matches the IP address of the existing LAN; mapping the virtual IP address to a physical IP address of the existing LAN; after a migration to a new LAN, different from the existing LAN, remapping the virtual IP address to a physical IP address of the new LAN, the existing LAN now being a previous LAN; and routing traffic from the application through the new LAN while the network settings of the application remain configured to recognize the IP address of the previous LAN, where the routing of the traffic is permitted through the new LAN because the virtual IP address that matches the IP address of the previous LAN has been remapped to a physical IP address of the new LAN.

The systems and techniques of the virtual overlay network further allowing constructing multiple (e.g., two or more) virtual subnets within the local area network in a flexible routing scheme without the same limitation or complexity for routing in the L3 physical network. A virtual subnet in the LAN can connect to another virtual subnet in the LAN without worrying about the default gateway or routing table in L3. In other words, in a fully connected LAN environment, the virtual overlay network provides a new and flexible scheme for network routing overlay on top of L3. More particularly, there can be a first endpoint in a first virtual subnet in a LAN. There can be a second endpoint in a second virtual subnet, different from the first virtual subnet, in the LAN. A controller is connected to the first and second endpoints. A secure tunnel, with the approval of the controller, can be established from the first endpoint to the second endpoint. In a specific embodiment, establishment of the secure tunnel can be initiated by a request (e.g., "client hello" handshake) from the first endpoint that is received directly by the second endpoint as inbound traffic because both endpoints may be behind the same firewall as they are part of a LAN. The virtual subnets can further be constructed without the need for router or switching devices to connect the virtual subnets.

The layer 5 IP addressing scheme allows for great flexibility and control over how an organization may define their network. For example, different business units may establish their own layer 5 IP addressing schemes and the virtual overlay network can accommodate IP address collisions. When the organization needs to isolate application services for security, for example in the hybrid cloud or multi-cloud environments, the virtual overlay network can deliver very significant benefits and productivity.

Figure 35:
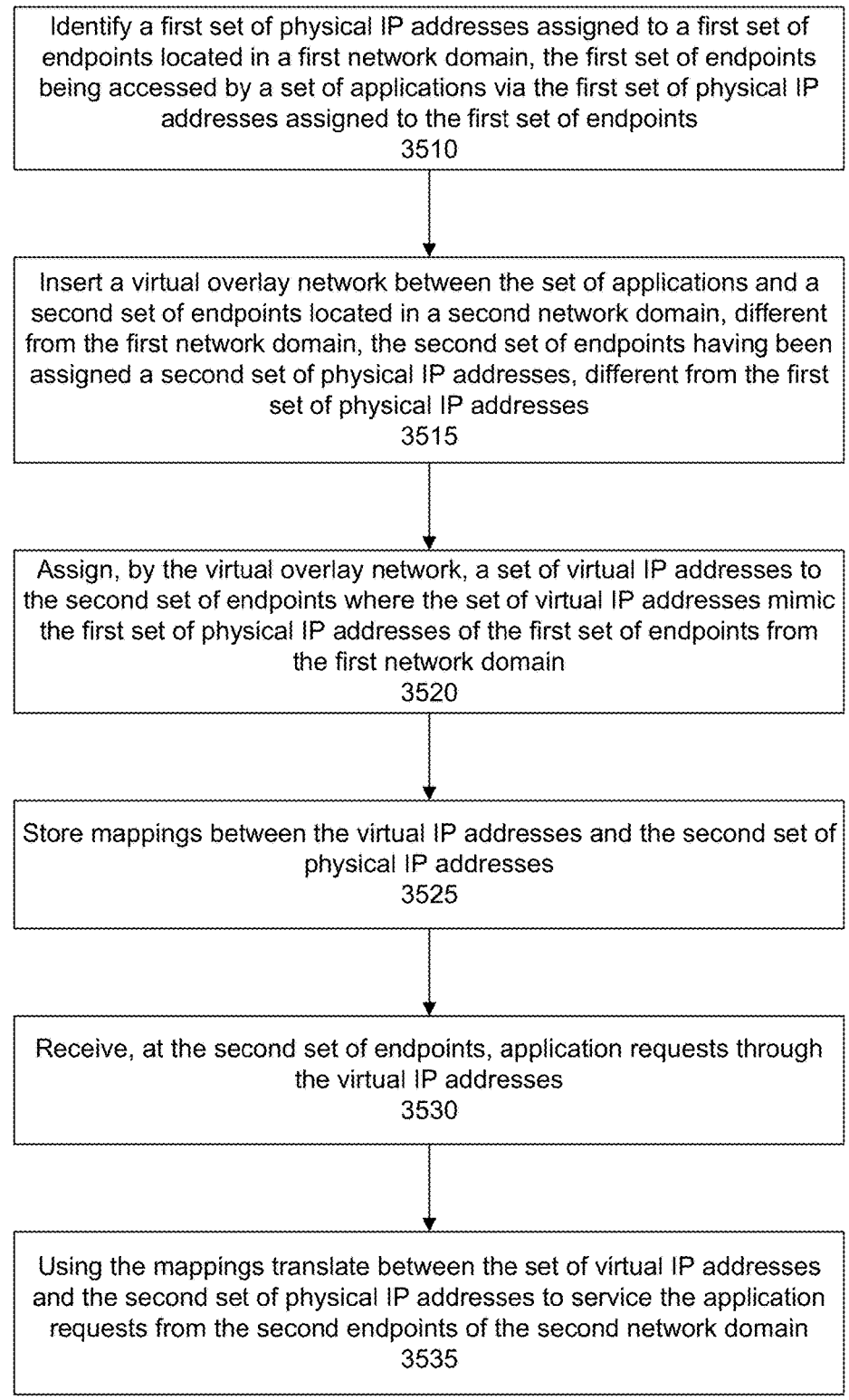
FIG. 35 shows a flow diagram for migrating a datacenter.

FIG. 35 shows a flow for using the virtual overlay network in migrating a datacenter. In a step 3510, a first set of physical IP addresses assigned to a first set of endpoints located in a first network domain are identified. The first set of endpoints are accessed by a set of applications via the first set of physical IP addresses assigned to the first set of endpoints.

In a step 3515, a virtual overlay network is inserted or positioned between the set of applications and a second set of endpoints located in a second network domain, different from the first network domain. The second set of endpoints are assigned a second set of physical IP addresses, different from the first set of physical IP addresses.

In a step 3520, a set of virtual IP addresses are assigned to the second set of endpoints where the set of virtual IP addresses mimic the first set of physical IP addresses of the first set of endpoints from the first network domain.

In a step 3525, mappings between the virtual IP addresses and the second set of physical IP addresses are stored by the virtual overlay network.

In a step 3530, application requests are received at the second set of endpoints through the virtual IP addresses.

In a step 3535, the virtual overlay network uses the mappings to translate between the set of virtual IP addresses and the second set of physical IP addresses (and vice-versa) to service the application requests from the second set of endpoints of the second network domain.

Figure 36:
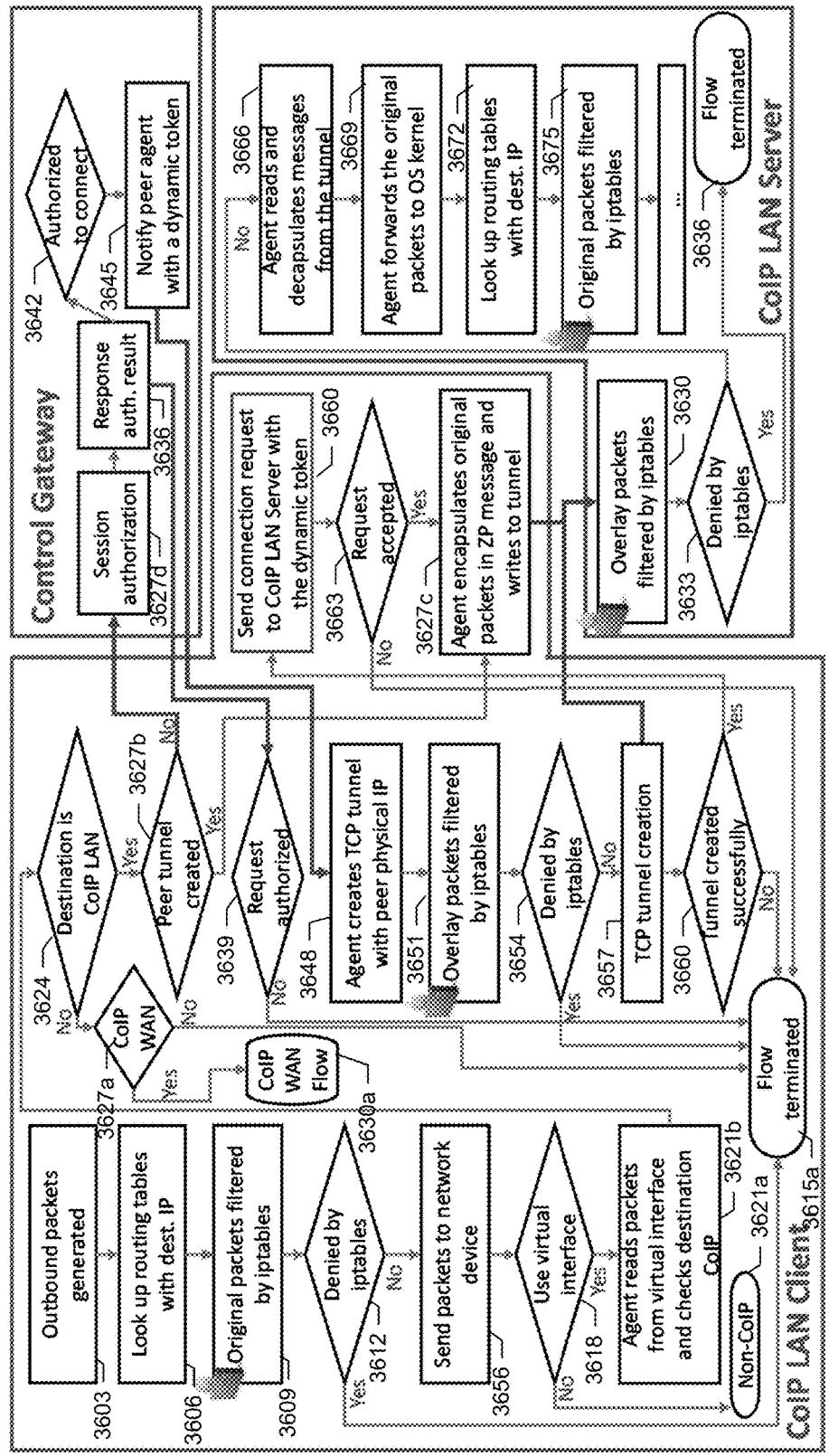
FIG. 36 shows a flow of the virtual overlay network platform according to a specific embodiment.

FIG. 36 shows a detailed flow diagram for how CoIP endpoints (client and server) can create and receive a CoIP LAN tunnel connection by utilizing the OS kernel capabilities (e.g., a secure tunnel connection) according to a specific embodiment. The processes detailed in the flow diagram also allows an endpoint firewall system (e.g., such as that described in U.S. patent application Ser. No. 14/190,019, filed Feb. 25, 2014, now U.S. Pat. No. 9,130,901, issued Sep. 8, 2015, which is incorporated by reference) to be provisioned simultaneously at the endpoints to filter all application traffics, including the CoIP LAN tunnels. The firewall implementation and CoIP LAN are not necessarily coupled in a specific order. For example, in a specific embodiment, the system may be configured to apply the routing and, after applying the routing, apply the firewall filtering. In another specific embodiment, the system may be configured to apply the firewall filter and, after applying the firewall filtering, apply the routing. It should be appreciated that the flow shown in FIG. 36 is presented merely as an example of an implementation is not meant to limit the coverage of the system. There can be many other possible implementations.

Table Q below provides detail for a specific flow in FIG. 36.

TABLE Q

| Step | Description |
| --- | --- |
| 3603 | At the LAN client, outbound packets are generated. |
| 3606 | A lookup is performed of routing tables with the destination IP address. |
| 3609 | The original packets are filtered by IP tables. |
| 3612 | A determination is made as to whether the IP tables have denied. |
| 3615a | If the IP tables indicate denial, the flow is terminated. |
| 3615b | If the IP tables do not indicate denial, the packets are sent to the network device. |
| 3618 | A determination is made as to whether to use the virtual interface. |
| 3621a | If the virtual interface is not to be used, a non-virtual interface is used. |
| 3621b | If the virtual interface is to be used, the agent reads packets from the virtual interface and checks the destination CoIP. |
| 3624 | A determination is made as to whether the destination is in the CoIP LAN. |
| 3627a | If the destination is not in the CoIP LAN, a determination is made as to whether the destination is in the CoIP WAN. |
| 3630a | If the destination is the CoIP WAN, the CoIP WAN flow is triggered. |
| 3615a | If the destination is not in the CoIP WAN, the flow is terminated. |
| 3627b | A determination is made as to whether to create a peer tunnel. |
| 3627c | If the peer tunnel is to be created, the agent encapsulates the original packets in amessage and writes to the tunnel. |
| 3630 | The CoIP packets are filtered by IP tables at the CoIP LAN server. |
| 3633 | A determination is made as to whether the IP tables denied. |
| 3636a | If the IP tables denied, the flow is terminated. |
| 3627d | If the peer tunnel is not created, a session authorization process is triggered at thecontrol gateway. |
| 3636 | A response authorization result is generated. |
| 3639 | If the request is not authorized, the flow is terminated. |
| 3642 | If there is an authorization to connect, the control gateway notifies the peer agent with a dynamic token (3645). |
| 3648 | The agent creates a TCP or UDP tunnel with the peer physical IP address. |
| 3651 | CoIP packets are filtered by IP tables. |
| 3654 | A determination is made as to whether there was a denial by the IP tables. |
| 3615a | If there was a denial, the flow is terminated. |
| 3657 | If there was not a denial, the TCP or UDP tunnel is created. |
| 3615a | If the tunnel was not created successfully, the flow is terminated. |
| 3660 | If the tunnel was created successfully, a connection request is sent to the CoIP LAN server with the dynamic token. |
| 3663 | A determination is made as to whether the request is accepted. |
| 3615a | If the request is not accepted, the flow terminates. |
| 3627c | If the request is accepted, the agent encapsulates the original packets in a message and writes to the tunnel. |
| 3630 | The agent at the CoIP LAN server filters the packets by the IP tables. |
| 3633 | A determination is made as to whether there was a denial by the IP tables. |
| 3666 | If there was no denial, the agent reads and decapsulates messages from the tunnel. |
| 3669 | The agent forwards the original packets to the OS kernel. |
| 3672 | A lookup of the routing tables is performed with the destination IP address. |
| 3675 | The original packets are filtered by IP tables. |

In a specific embodiment, the virtual overlay network provides for firewall filtering within the LAN (e.g., an internal firewall between endpoints in a LAN). The firewall filtering allows blocking certain types of traffic while allowing other types of traffic (e.g., FTP traffic, traffic associated with particular applications (e.g., HR traffic versus QA testing traffic)

Figure 37:
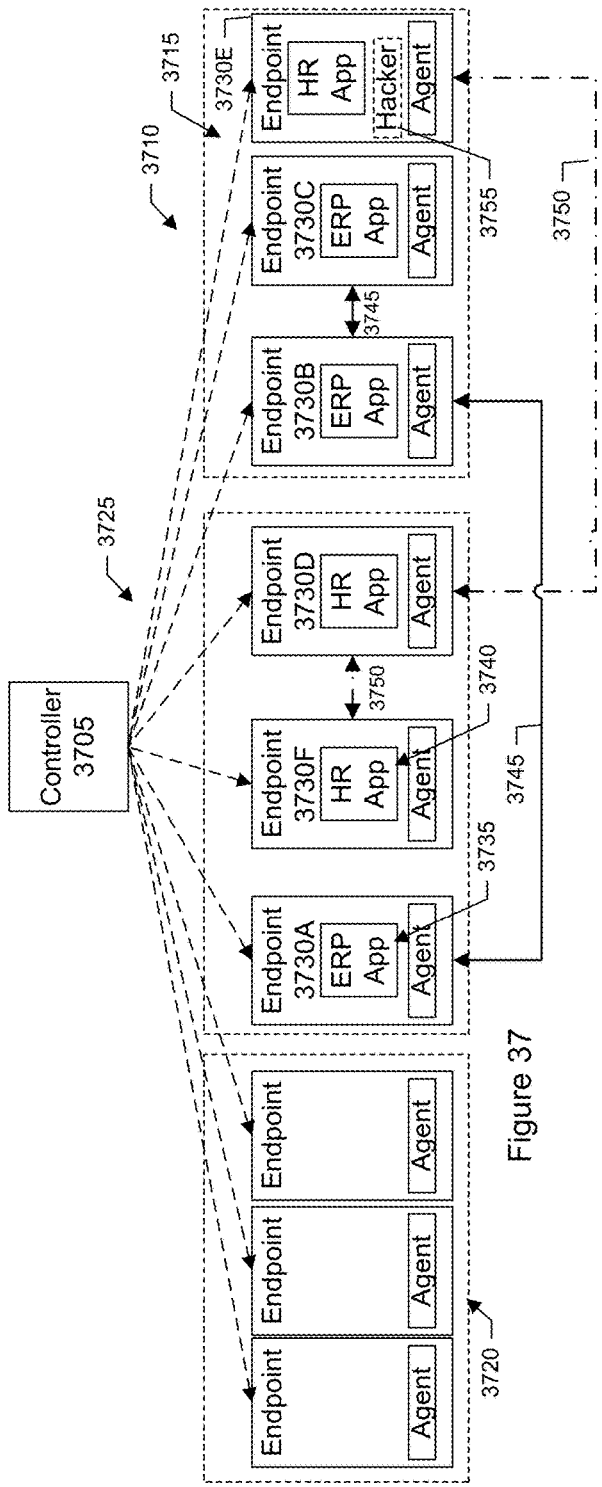
FIG. 37 shows a simplified block diagram of a sanitized network.

FIG. 37 shows a simplified block diagram of an architecture for a sanitized network that can be provided by the virtual overlay network according to another specific embodiment. The network may be referred to as a CoIP session network.

In this system, there is a controller 3705, any number of subnets 3710, and any number of endpoints or groups of endpoints 3715 within a subnet. The endpoints are provisioned with secure connection agents 3720. Control plane connections 3725 between the controller and endpoint agents allow the controller to manage and direct the agents.

This sanitized network helps to eliminate or reduce the need for traditional firewalls because the applications including the processes or commands that the applications can trigger, computing flows, and so forth are pre-certified or pre-defined during a configuration stage.

Specifically, traditional firewalls often require extensive programming and are generally designed as a perimeter type security. In other words, the checkpoints are at the perimeter. For example, a firewall may be erected between two regions where packets are checked only when there is attempt to send across the regions. Generally, there is no checking the particularities or legality of a package when sending within the same region.

A firewall might be suitable in cases where the enterprise's datacenter is on premise, e.g., located in the same building that houses the enterprise's employees. It is very challenging, however, to implement a firewall in a public cloud datacenter because of the many entry points that are present in a public cloud, the distributed and dynamic nature of cloud computing, the many more thousands of endpoints in a cloud environment, and the lack of direct ownership or control over the underlying cloud infrastructure. Previous approaches to implement traditional firewalls in a cloud computing environment have resulted in very fragmented networks that are very difficult to manage.

For example, an endpoint firewall installed onto an enterprise laptop so that the laptop can securely communicate with other endpoints in a cloud environment is extremely difficult to maintain because of the many tens, hundreds, or even thousands of applications that may be running at the endpoints. There is no central management. It is especially difficult to enforce firewall policy as the endpoint laptop migrates or moves because firewalls are typically implemented at the lower layers of the network stack. Firewall engines are also typically very compute intensive because they generally operate by performing deep packet inspection in order to understand behavior and determine whether the packet should be allowed to pass.

As another example of cloud vulnerability, consider a scenario where an enterprise deploys both its engineering development systems and accounting systems outside the enterprise environment and into a cloud environment (e.g., AWS or Azure). Typically, the engineering development system will not have been hardened with security measures because it is a development system. A hacker may be able to exploit the absence of security on a development endpoint and use the compromised development endpoint to infiltrate and contaminate the endpoints running the accounting system.

In a specific embodiment, the overlay network, however, allows an enterprise to interlock validated applications in the network, promote service isolation, and shield applications. The shielding can include shielding applications from other applications (e.g., shield ERP application from CRM and accounting applications; shield CRM application from ERP and accounting applications; or shield accounting application from ERP and CRM applications). The overlay network can be a preventative approach to security rather than a treatment approach to security because only pre-defined traffic may be allowed.

More specifically, in the example shown in FIG. 37, first, second, and third endpoints 3730A-C, respectively, are shown as supporting the execution of a first application 3735 (e.g., an ERP application). Fourth, fifth, and sixth endpoints 3730D-F, respectively, are shown as supporting the execution of a second application 3740 (e.g., an HR application). Solid lines 3745 indicate allowed traffic or communication among the endpoints supporting the ERP application. Dot-dash lines 3750 indicate allowed traffic or communication among the endpoints supporting the HR application.

In an embodiment, the allowed traffic is pre-defined during a configuration stage, i.e., before the production execution or operation of the application. In this example, an administrator has determined that the HR system does not need to communicate with the ERP system and the ERP system does not need to communicate with the HR system. Thus, no computing flows are shown between the HR and ERP endpoints in the example shown in FIG. 37.

In a specific embodiment, during execution of the applications or at the start of initiating communication traffic, the endpoint agents and controller coordinate with each other to validate or obtain the identities of the application (and associated processes) requesting or initiating a connection. In a specific embodiment, identifiers or signatures (e.g., checksums) associated with the application requesting or initiating a connection are collected. The signatures are used to check or identify the application and processes triggered or created by the application. The signatures are compared against a whitelist of authorized signatures. If the signatures match or satisfy the whitelist, the connection is allowed. If the signatures do not match or do not satisfy the whitelist, the connection is not allowed.

Thus, even if a hacker 3755 is able to comprise a root of an endpoint, it will be very difficult to hijack such a sanitized network because the traffic that the hacker may wish to direct into or out of the network will not have been defined as valid. In other words, the hacker will be prevented from penetrating any further into the network through the compromised endpoint. More particularly, in a specific embodiment, the system in addition to the signature verifications also monitors the settings of the network kernel including but not limited to IP table, routing table, or both at the endpoint. Thus, any attempts by the hacker to change the network kernel table are detected via the monitoring. The system further monitors the status of the endpoint agents via the control plane connections. Thus, if the hacker kills a particular endpoint agent, the controller will detect the interruption or loss of connection to the agent and take remediation actions to quarantine or contain the compromised endpoint so that it does not affect the rest of the network.

Figure 38:
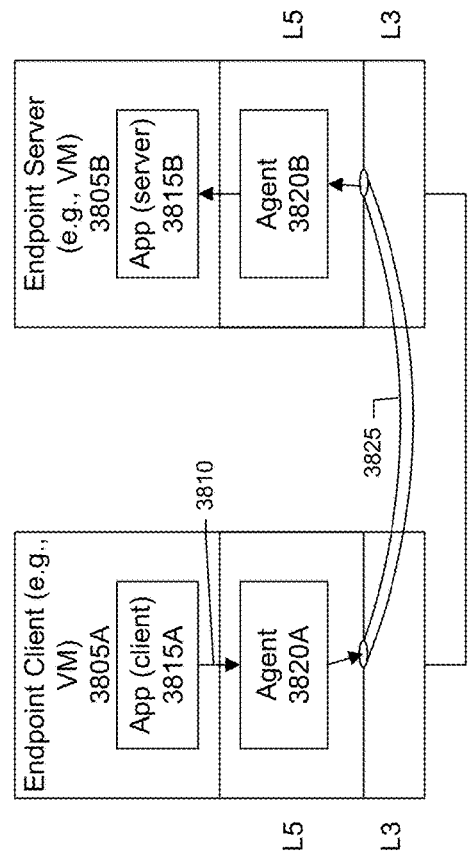
FIG. 38 shows a layer diagram for secure communications between endpoints.

The interlock techniques of the virtual network help to shield the network so that only certain traffic is allowed in the network. Specifically, FIG. 38 shows a layer diagram for sending communications from an endpoint client 3805A to an endpoint server 3805B.

A communication path 3810 is from an application client 3815A, down to a client agent 3820A, into and through a secure tunnel 3825, out the tunnel to a server agent 3820B, and up to an application server 3815B. More particularly, the client agent at the layer 5 (session layer) level receives a request from the client application to connect to the server application. The client agent participates in directing the creation of a layer 3 tunnel to the server. The tunnel may be referred to as an overlay tunnel or CoIP tunnel.

Generally, the layer 3 network is open, however, in a specific embodiment, communications between endpoints are restricted to the CoIP tunnel and other L3 communications can be blocked. This helps to further secure communications between the appropriate endpoints in a cloud environment where there can be many hundreds and thousands of endpoints. The network is shielded as only qualified applications are able to use the network. In a specific embodiment, a first shield is erected over the endpoint OS environment by monitoring the OS network kernel. A second shield is erected over the L3 network by identifying which endpoints can communicate with which other endpoints. A third shield is erected over the application by validating the application's signature (e.g., checksum). Together, these shields create a sanitized network that can replace the traditional firewall.

Figure 39:
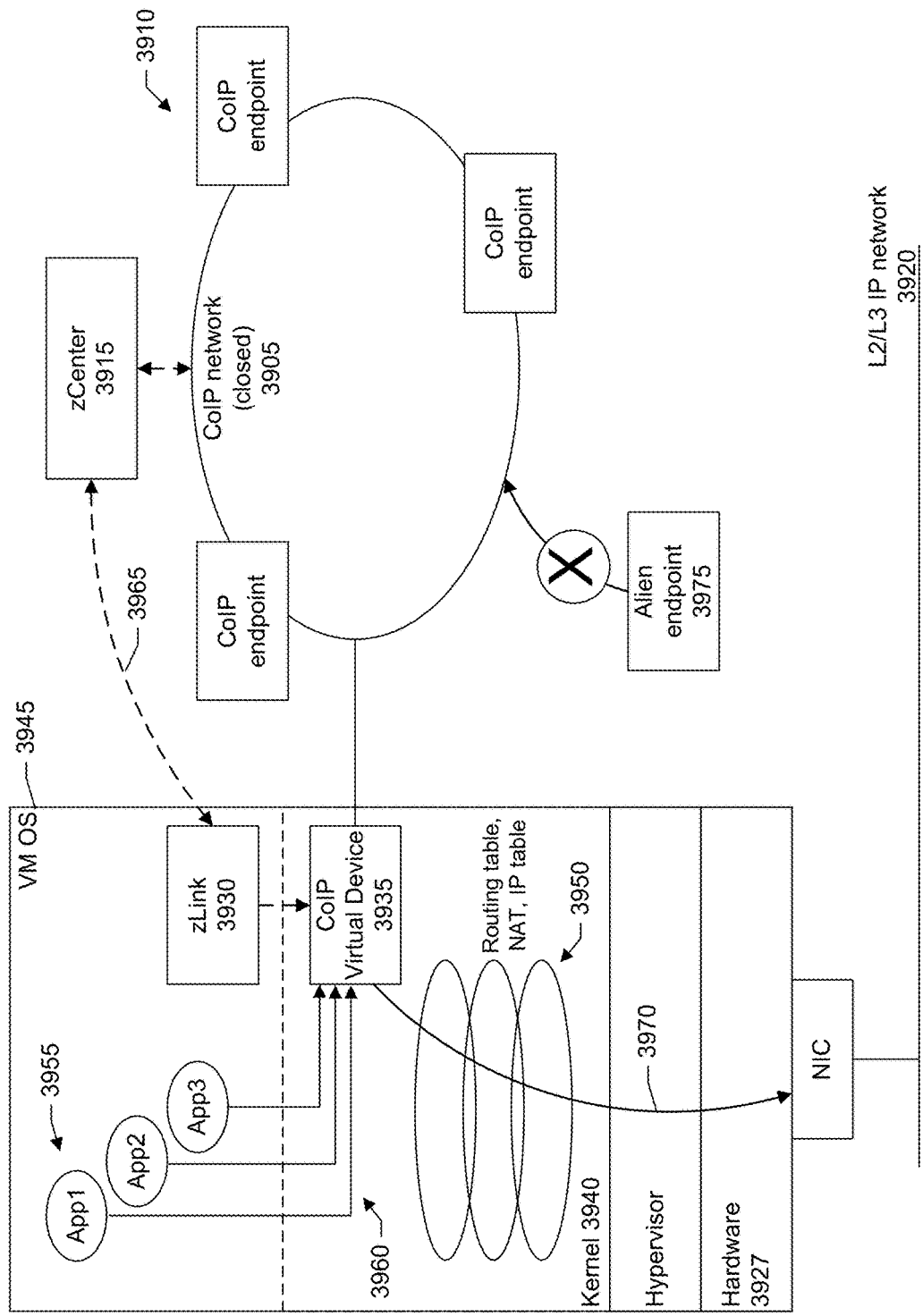
FIG. 39 shows a computing architecture for a CoIP session layer network according to a specific embodiment.

FIG. 39 shows an architecture diagram of a CoIP session layer whitelist/blacklist network according to a specific embodiment of the virtual network platform. The network provides security of endpoints including CoIP endpoints. Specific aspects of the system are implemented in a virtual network platform provided by Zentera Systems of San Jose, Calif. In this specific embodiment, a secure connection agent may be referred to as zLink™ and a controller may be referred to as zCenter™. The system including components of the system may be known by any name or identifier, and this description is provided merely as a sample implementation.

In a specific embodiment, there is an end-to-end secure whitelist/blacklist session network service, called "CoIP session layer whitelist/blacklist network." This network features security-enhanced endpoints established by provisioning whitelist access control over a hybrid environment. This session network service can be automatically provisioned, is driven by applications, and is fully controlled by the enterprise. The whitelist/blacklist techniques enable endpoint security control, root password control, and session network access control. As a result, the endpoint security for hybrid cloud network access is significantly enhanced by decoupling the network control from the OS. A maliciously compromised root will not be able to take over the CoIP session network.

Specifically, as shown in the example of FIG. 39, there is a virtual or CoIP network 3905 that connects a set of (CoIP) endpoints 3910, and a controller (e.g., zCenter) 3915. An underlying lower level network, e.g., L2/L3 IP network, 3920 provides the physical connections. A CoIP endpoint, such as a CoIP endpoint 3925, may include a virtual machine, container, or other isolated virtual environment that is hosted on a physical hardware platform 3927. In an embodiment, the CoIP endpoint includes an agent, e.g., zLink, 3930 connected to a CoIP virtual device 3935 in a kernel space 3940 of an operating system (OS) (e.g., guest OS) 3945 at the endpoint. Within the kernel, there is a network kernel table 3950 providing routing services for the zLink agent virtual device. The network kernel table may store IP networking and routing information and facilitate network address translation (NAT).

The endpoint may further host applications 3955. In an embodiment, when the applications issue requests 3960 to connect with other endpoints or components in the network the requests are received by the zLink agent virtual device. The zLink agent coordinates 3965 with the controller to determine whether the requests to connect should be allowed 3970 or not allowed.

In an embodiment, the CoIP network may be referred to as a closed network in that all endpoints, applications, and computing flows within the CoIP network are pre-defined. This facilitates the creation of a sanitized, micro-segmented, or logically segmented network that provides very tight security. For example, alien endpoints, such as an alien endpoint 3975, which have not been pre-validated may be blocked or prevented joining the network and connecting to other CoIP endpoints in the network. In other words, in a specific embodiment, there are whitelist/blacklist systems and techniques that allow only certain applications and specific usage of the applications on the network. The network facilitates service isolation so that a contaminated or compromised endpoint will not be able to further penetrate other endpoints and applications.

In a specific embodiment, a CoIP session network includes two important networking components, zCenter and zLink, that coordinate and monitor the CoIP session network. zLink is the network endpoint agent and zCenter is the network control manager. FIG. 39 shows the CoIP session network, with the broken lines indicating the whitelist/blacklist service in operation.

In a specific embodiment, zCenter maintains three whitelists and one blacklist. The blacklist, together with the session network whitelist, is used to define the network routing policy by allowing (whitelist) or blocking (blacklist) some certain network protocols for security purposes. The second whitelist, the application interlock whitelist, is used to define legitimate endpoint applications that are allowed to access the CoIP network or underlying physical network. The third is the administration access whitelist for password shielding. In an embodiment, the blacklist is a network access list which is used to block out certain unsecure protocols.

In whitelist/blacklist session networking, there is no end-to-end L2/L3 network transport connection initially. The CoIP network will only be established as an overlay session on top of a physical IP network in response to an on-demand application connection request. The session network uses the session whitelist/blacklist to govern WAN/LAN types and legal CoIP addresses. Therefore, CoIP endpoints are protected from nearby endpoint attacks which can frequently happen in a public cloud datacenter. Once the application finishes using the session network, its CoIP network connection is severed and terminated. In an embodiment, its CoIP network connection is no longer served or disconnected after.

The other component, zLink, sits in all endpoints and is the access point on the CoIP session network for all packets that go through the network. zLink does security monitoring to ensure the host and networking environment complies with the requirements to set up the CoIP network. It also checks the application interlock whitelist for secure network access control. zLink will deny access to the CoIP network as soon as it determines the application failed the approval via the check of the application interlock whitelist. The traffic is rejected and dropped at the CoIP routing plane, thus protecting the CoIP network.

Within the session network, zCenter maintains a periodic monitoring protocol to check the health of each endpoint via zLink through the control plane. Any compromised endpoint detected via zLink will be removed from the CoIP network to prevent the contamination of the application and a potential enterprise network breach. Similarly, any traffic that triggers a violation of the application interlock whitelist/blacklist will be rejected by zLink to prevent an enterprise network breach via the CoIP network. In an embodiment, any compromised endpoint will be put into a CoIP quarantined zone to prevent an enterprise network breach. In an embodiment, any traffic that triggers a violation is denied a CoIP or physical network access from that zLink.

The access whitelist resolves the host root password distribution problem in a container or VM environment hosted in the cloud. Interlocked applications are run with shielded passwords to construct a secure end-to-end whitelist/blacklist session network.

Table R below shows security issues resolved by the whitelist/blacklist session network.

TABLE R

| Cloud Security Challenges | Cloud Security Provided by CoIP |
|---|---|
| OS environment with mixed application and infrastructure on the cloud endpoint — hard to control network and security | Infrastructure control is decoupled from OS inside the cloud endpoint. Application integrity is coupled with strict network access control. |
| Undifferentiated role for cloud endpoint access for provisioning as well as computing | Role-based access control for provisioning vs. computing |
| Lax root control | Strict root control |
| Lax network integrity control | Tightened network integrity control, even with a compromised root |
| User-dependent policy control in distributed computing environments | Automated policy control enforced by centralized control portal |
| Lax endpoint network security | Tightened monitoring of network protocol |

Some embodiments of the CoIP network platform are described in this application according to the following outline:

A) Centralized control and routing network whitelist
B) Endpoint zLink and centrally controlled zCenter interlock for network security
C) Blacklist for network security
D) Endpoint application interlock whitelist
E) User access whitelist shielding A) Centralized Control and Routing Network Whitelist When an enterprise deploys workloads to the public cloud, the enterprise data is placed outside of the traditional corporate perimeter firewall, thus the need for additional security measures. IT administrators want to enforce application policy to protect data and intellectual property and also achieve automation of security policy. IT administrators want to ensure that only allowed applications and data can be deployed to the cloud. Such a requirement calls for tighter network access control in connecting to resources in the cloud.

In a specific embodiment, the CoIP platform uses a centralized security policy whitelist/blacklist method to control routing, resources and applications deployed in a public cloud. Only provisioned endpoints are allowed to access the cloud network, with zCenter acting as the centralized controller for whitelist management.

Establishing the network starts with provisioning zLink as the traffic guard agent within the endpoint that has been registered in the CoIP session network. The control channel is then established between the zLink endpoint and the zCenter central controller—the control channel is interlocked and thus secured. Later, the data communication pipe can be established whenever an application requests a CoIP connection and the security policy is authenticated successfully via the control channel.

If a hacker tries to compromise the zLink process, the connection will be brought down and safely separated from the CoIP network. Bypassing zCenter provisioning is not possible since an always-on control plane connects the specific zLink with zCenter for control and monitoring. In an embodiment, the only way to set up a new zLink is by provisioning it through zCenter. In other words, even with a compromised root, the CoIP network as well as the endpoint network environment are still secured through the zCenter network whitelist. Without a successful provisioning with zCenter and the connection via the overlay virtual network, the remote cloud endpoint cannot access any endpoint on enterprise premise and is blocked outside of the corporate perimeter firewall infrastructure for security.

B) Endpoint zLink and Centrally Controlled zCenter Interlock for Network Security To provide endpoint network security, the CoIP platform uses zCenter interlocked with zLink to periodically monitor network environment settings in the cloud endpoint, with a control that is outside of the endpoint. This interlock provides network security for endpoints through policies that are enforced and defined only by the zCenter central control system. zCenter can be provisioned in the cloud or within an enterprise datacenter.

The way the interlock works is that parameters and signatures (e.g., checksums) for critical data are monitored and verified periodically to detect potential malicious activities that are intended to change the network setting in the endpoint. Critical data includes network interface settings, IP tables and routing tables. If through a compromised root process, critical data has been changed, zLink will detect the change and report the alert via the control channel and may wait for further instructions from zCenter or automatically disengage itself from the CoIP network. There can be many approaches for remediation on zCenter once an alert is detected. The malicious process is thus not able to compromise the CoIP network.

C) Blacklist for Network Security

In the cloud computing environment, container host security is emerging as a critical area of concern because users need root access to deploy applications in hosted containers. VMs, unlike container hosts, do not necessarily require root access.

This requirement of root access on container hosts makes containers vulnerable to attacks by hackers. A compromised root can use an open network connection to scan for data stored in the cloud and the enterprise. In a specific embodiment, the CoIP platform prohibits malicious attacks from endpoints by using a host network blacklist that prevents applications from using certain prohibited network protocols. This provides a higher level of security, guarding against anomalous behavior by enabling zLink's filtering of packet network protocol. Therefore, even a compromised root is not able to use certain malicious network protocols to attack the blacklist-protected network resources.

The CoIP platform protects the attack vector by putting into place a blacklist security perimeter. The blacklist includes network protocols that are excluded from running over a CoIP network connection. The system monitors, captures and analyzes network traffic, to identify behavior prohibited by the blacklist. After confirming a blacklist violation, the network connection is terminated to prevent any further breach. The identification algorithm is composed of protocol traffic pattern recognition and sequence assertion procedures to reduce the likelihood of mis-triggered violations or false positives. The protocol traffic pattern is examined for specific protocol characteristics such as protocol fields and port numbers. The sequence assertion procedure is examined for specific protocol behavior, such as first packet pattern, protocol handshaking, and data transfer behavior.

D) Endpoint Application Interlock Whitelist

A running application may be protected with only a single layer of permission control on an endpoint. Any hacker who gets ahold of the root password can do tremendous damage through a compromised application.

In a specific embodiment, the CoIP platform uses the application interlock whitelist to define and validate the integrity of the specific allowable applications and commands on the host. Thus, another layer of control is added to the conventional permission control—a compromised root cannot start compromised applications, bypass the application interlock whitelist, or issue unallowable commands. The application interlock whitelist integrity is constantly monitored and secured by zLink's verification of the application interlock whitelist checksum. zLink assures that only allowed applications and commands are sending traffic through the CoIP network.

Before a socket connection can be established, zLink verifies the application's signature or identifier (e.g., checksum) to prevent execution of a corrupted or hacked application. The application whitelist is provided by zCenter via the control channel outside of the endpoint, and no hacker can start up an application without confirmation from the application whitelist. Thus, a network socket cannot be used to breach the CoIP network or access data from remote systems.

E) User Access Whitelist Shielding

Today, running a VM or container is compromised with respect to security because the root password is not well-controlled throughout a cloud environment. A user who starts up a container or VM for computing can acquire the root password. This root password is not supposed to be provided to this user who has no corporate privilege to access the cloud infrastructure. This user could use the root access to compromise the cloud network and security intentionally or unintentionally. To overcome this problem, in a specific embodiment, the system uses a user access whitelist to limit root access and distribution for running applications. The whitelist includes a list of preconfigured commands for container or VM provisioning and management that are executable by the centralized system on behalf of designated users without providing the root password to the users. zLink, working as a command proxy, prevents root password distribution.

The whitelist provides a layer of shielding for applications and containers. Any user using a container that does not need a root password for provisioning can be assigned a lower level of privilege. Any user who needs to run a container or VM that requires the host root password can be pre-configured to be part of the root administration privilege group.

The access whitelist provides this shielding layer via password masking. For instance, when users need to execute programs as root, the shielding layer will provide a temporary root alias password to process the request, acting as root with the real root password. The masked root alias password is associated with only that particular user and is not usable as the actual root by any other user. This masked root alias password can only be used via the zCenter system. The user does not have the root access once he/she is accessing the cloud outside of the zCenter system environment; therefore achieving the control of root distribution.

Figure 40:
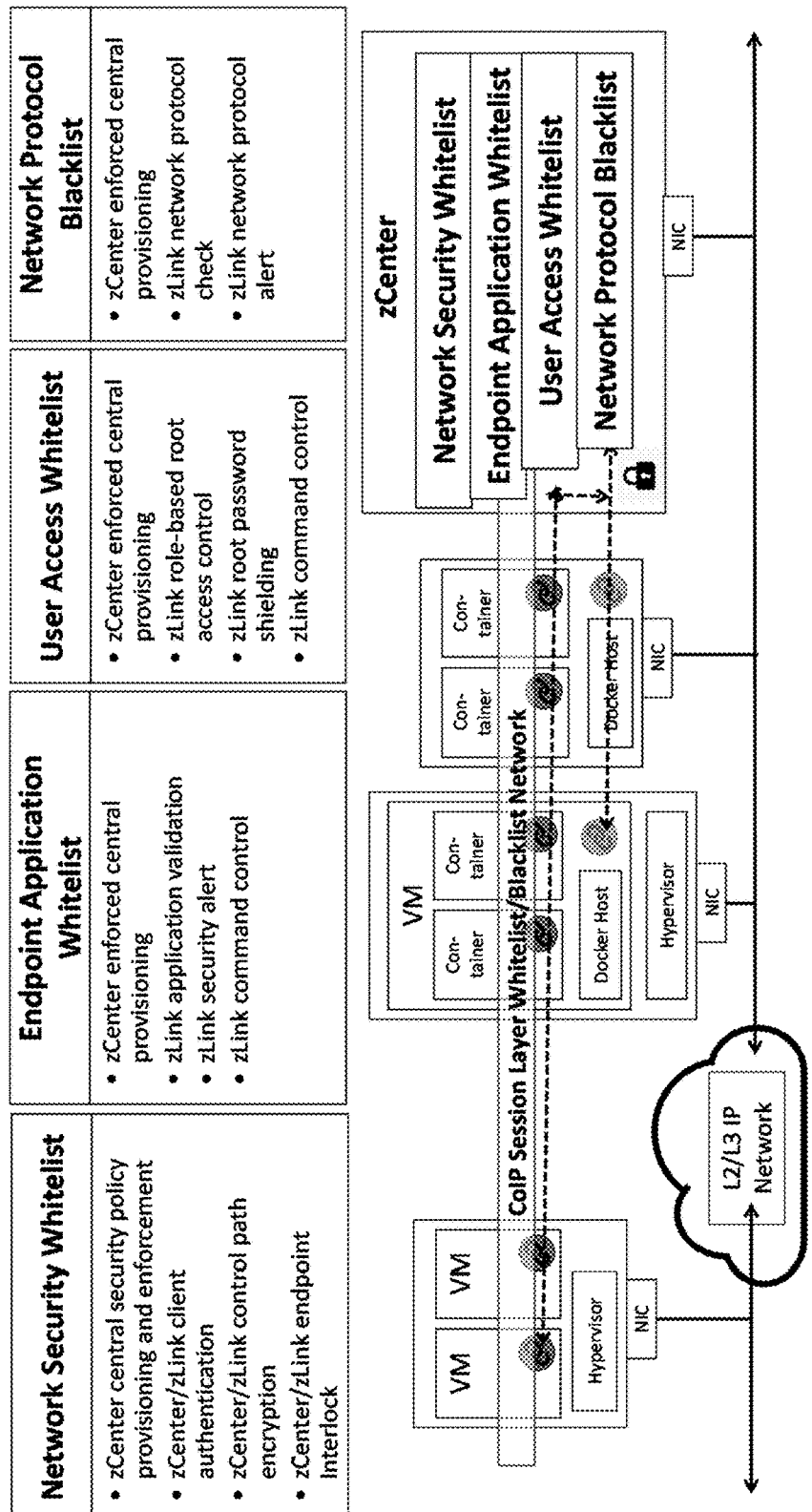
FIG. 40 shows another block diagram of the CoIP session layer network according to a specific embodiment.

Therefore, containers or VMs running under root privilege mode or in user mode are password shielded, and the security risk posed by root password leakage is mitigated by the access control whitelist. The role-based access control and strict root control is shown in FIG. 40.

Applications and Benefits

In a hybrid cloud environment, providing on-demand secure services is important. It requires a unified network and security that provisions and monitors these services. The unified network and security are effective, enforceable, and replicable.

In an embodiment, there is a CoIP end-to-end session layer network and security technology with whitelists/blacklists. This session layer network paradigm is controlled and implemented by the following architecture:

1) zCenter—the centralized controller that manages whitelists/blacklists for network security policy, application interlock and password shielding, interlocked with dispersed cloud endpoints.

2) zLink—the endpoint agent uses an application interlock whitelist while constantly checking endpoint network health and environment integrity. This ensures that no compromised root can change CoIP network policy without detection. A malicious process is not able to compromise and connect through CoIP by changing network interface settings or modifying routing and IP tables.

3) Applications are interlocked with a whitelist provided through zCenter. zLink makes sure that only allowed whitelisted applications can access the CoIP network on the endpoint, and the application is verified before zLink establishes a network connection. zLink also makes sure that blacklisted network protocols cannot use the network resources on the endpoint.

4) The shielding layer protects passwords and applications through the access control whitelist.

This architecture is supported by zCenter's centrally controlled network security whitelist and its monitoring control channel that is interlocked with zLink on all endpoints. The CoIP session layer network includes access whitelisting and password shielding to prevent attacks due to root password misusage.

FIG. 40 shows further detail for the CoIP network platform and shows that the secured endpoints can be servers, VMs, containers, CoIP proxy gateways, or client machines. One example of a platform for building and running containers is Docker. Docker helps to ensure isolation between the containers and host. As shown in the example of FIG. 40, the endpoints including endpoint agents are connected by a CoIP session layer whitelist/blacklist network to a controller (e.g., zCenter). One or more containers may be wrapped by a virtual machine. There is an underlying L2/L3 IP network. There is a first whitelist that may be referred to as a network security whitelist. Features of the network security whitelist include zCenter central security policy provisioning and enforcement, zCenter/zLink client authentication, zCenter/zLink control path encryption, and zCenter/zLink endpoint Interlock. There is a second whitelist that may be referred to as an endpoint application whitelist. Features of the endpoint application whitelist include zCenter enforced central provisioning, zLink application validation, zLink security alert, and zLink command control. There is a third whitelist that may be referred to as a user access whitelist. Features of the user access whitelist include zCenter enforced central provisioning, zLink role-based root access control, zLink root password shielding, and zLink command control. There is a blacklist that may be referred to as a network access blacklist. Features of the network access blacklist include zCenter enforced central provisioning, zLink network protocol check, and zLink network protocol alert. As shown in the example of FIG. 40, these lists including the network security whitelist, endpoint application whitelist, user access whitelist, and network access blacklist may be maintained at the controller.

Figure 41:
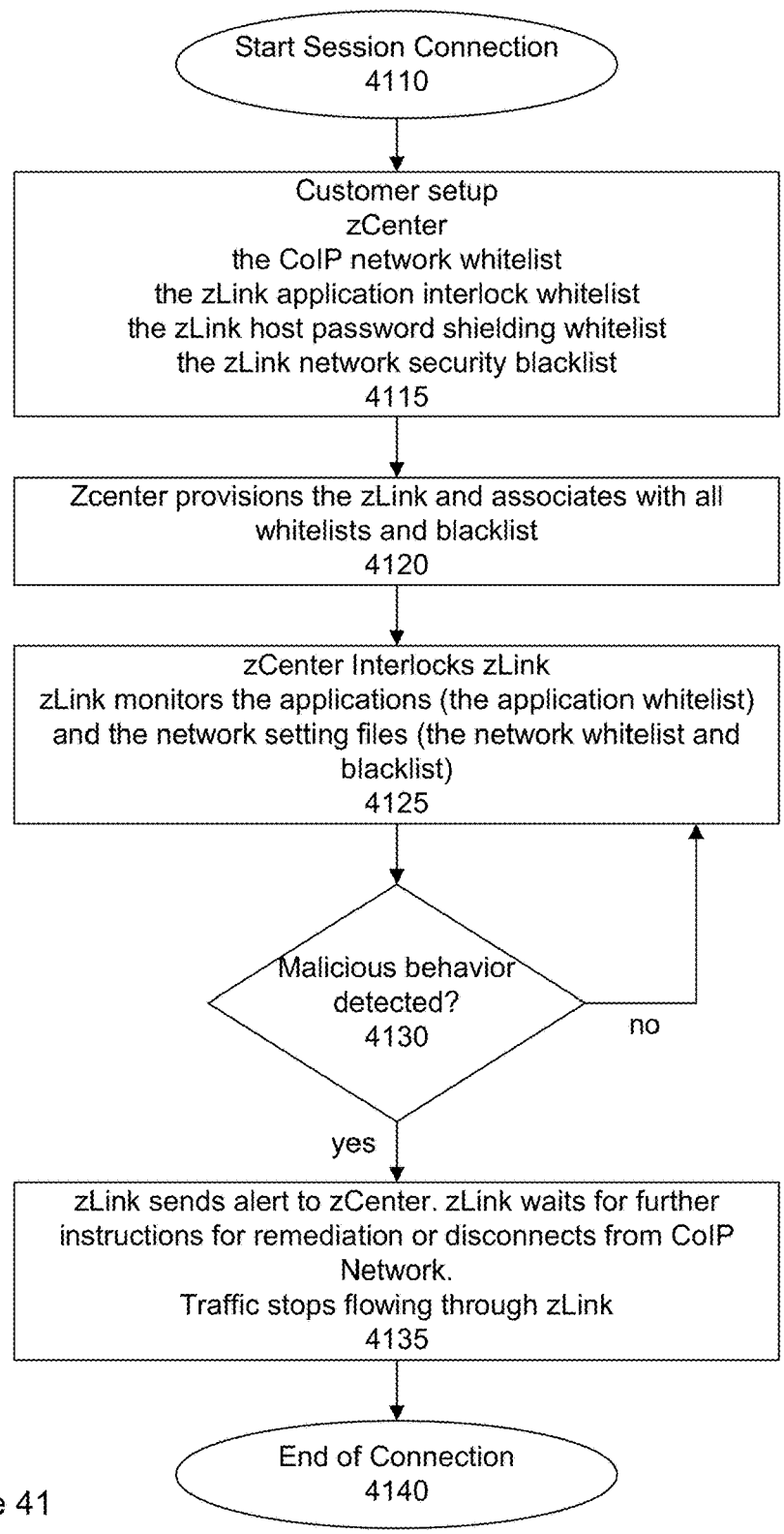
FIG. 41 shows an overall flow of the CoIP session layer network according to a specific embodiment.

FIG. 41 shows the working flow for use of the whitelists and blacklist. In a step 4110, a session connection is started. In a step 4115, a customer accesses zCenter to setup and configure the system. Configuration may include specifying the CoIP network whitelist, zLink application interlock whitelist, zLink host password shielding whitelist, and the zLink network security blacklist. In a step 4120, zCenter provisions the zLink and associates with all whitelists and blacklist. In a step 4125, zCenter interlocks zLink. zLink monitors the applications (the application whitelist) and the network setting files (the network whitelist and blacklist). In a step 4130, a determination is made as to whether malicious behavior is detected. If no malicious behavior is detected, the system continues to monitor. Alternatively, in a step 4135, if malicious behavior is detected zLink sends an alert to zCenter. zLink waits for further instructions for remediation or may disconnect from the CoIP network. Traffic thus stops flowing through zLink. In a step 4140, the connection ends.

CoIP session networking allows the implementation of a private, shielded network with central policy control and highly secured endpoints. Furthermore, the systems and techniques are agnostic to any cloud datacenters and managed hosting datacenters as well as enterprise datacenters.

Figure 42:
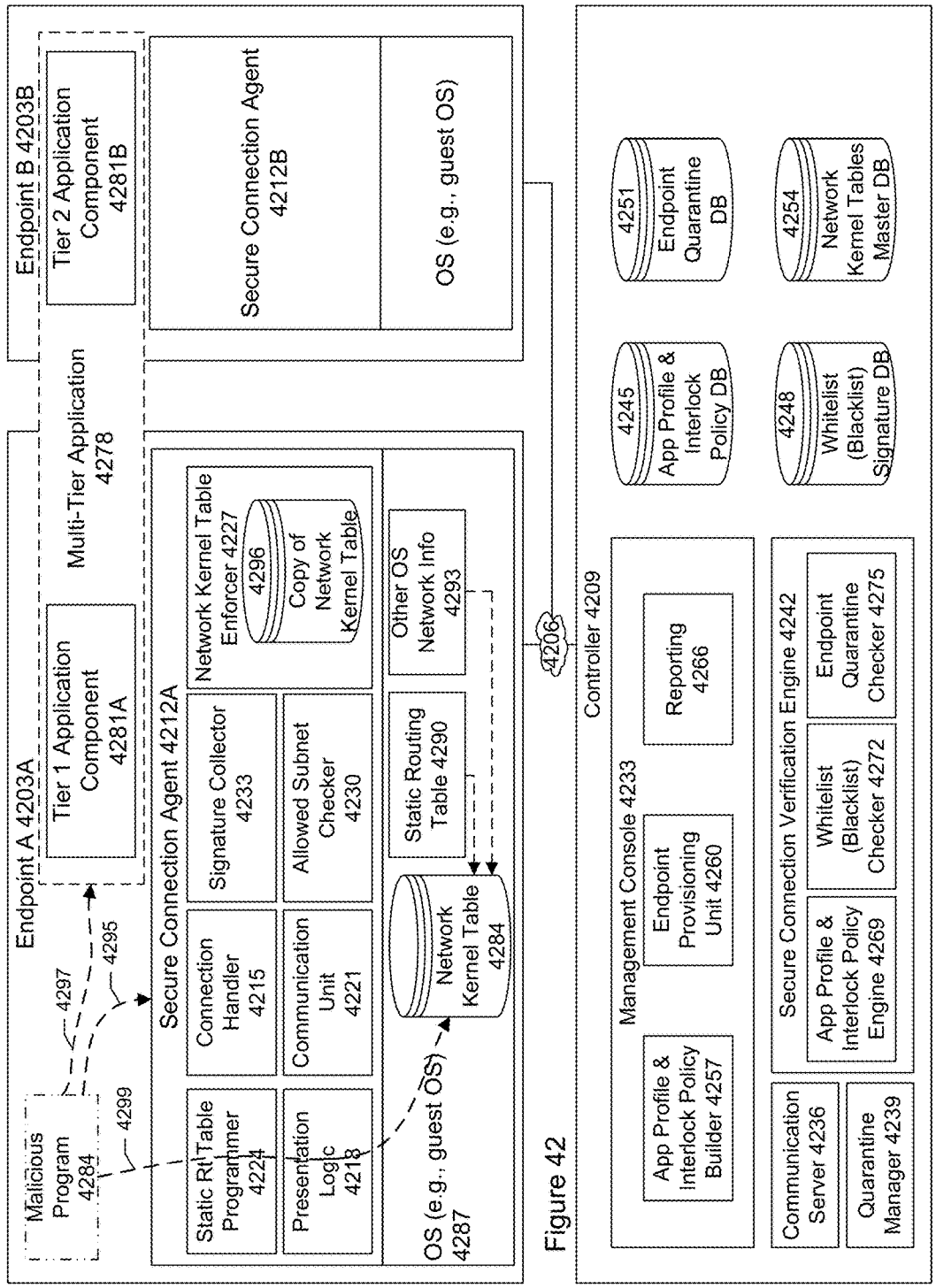
FIG. 42 shows a block diagram of a virtual overlay network platform (or CoIP platform) according to a specific embodiment.

FIG. 42 shows a block diagram of a virtual network system in further detail for securing communications according to a specific embodiment. This system includes a first endpoint 4203A, and a second endpoint 4203B, connected by a network 4206, and a controller 4209. The endpoints, network, and controller may be as discussed above. For example, an endpoint may include a virtual machine, container, or both on a host machine having physical hardware such as a processor, memory, storage, and network interface card (NIC); software such as virtualization software, guest OS, and so forth. The network may be a local area network or wide area network. The controller may be local to or remote from the endpoints.

As shown in the example of FIG. 42, each endpoint has been provisioned with a secure connection agent. Specifically, the first endpoint includes a first secure connection agent 4212A. The second endpoint includes a second secure connection agent 4212B. A secure connection agent, such as the first agent, may include a set of modules similar to those as previously discussed. For example, the first agent may include a connection handler 4215, presentation logic 4218, communication unit 4221, and static routing table programmer 4224. The example of the agent shown in FIG. 42 further includes a network kernel table enforcer 4227, allowed subnet checker 4230, and signature fetcher 4233.

The controller may include a set of modules similar to those as previously discussed and some of which have been omitted from FIG. 42 for purposes of clarity. The example of the controller shown in FIG. 42 includes a management console 4233, communication server 4236, quarantine manager 4239, and secure connection verification engine 4242. The controller further includes storage including application interlock connection policies database 4245, whitelist/blacklist signature database 4248, endpoint quarantine database 4251, and network kernel tables master database 4254.

As discussed, the management console may provide an interface through which a user, such as an administrator, may configure the system and receive alerts. As shown in the example of FIG. 42, the management console may include an application profile builder and processor 4257, endpoint provisioning unit 4260, and reporting 4266.

The secure connection verification engine may include an application profile and application interlock policy engine 4269, whitelist/blacklist checker 4272, and endpoint quarantine checker 4275. As discussed, the components and modules shown can be functional entities and there can be many different configurations.

In a specific embodiment, the endpoints host a multi-tier or n-tier application 4278. A multi-tier application can be used to divide an enterprise application into two or more components that may be separately developed and executed. In general, the tiers in a multi-tier application include a presentation tier, application processing tier, data access tier, and data tier. The presentation tier provides basic user interface and application access services. The application processing tier possesses the core business or application logic. The data access tier provides the mechanism used to access and process data. The data tier holds and manages data that is at rest.

This division allows each component or tier to be separately developed, tested, executed and reused. Application components may be distributed across two or more endpoints. For example, the multi-tier application may include a tier 1 application component 4281A executing at the first endpoint, and a tier 2 application component 4281B executing at the second endpoint. The distribution of the application components helps to ensure scalability, flexibility, availability, and efficiency. For example, components of a tier may execute at a cluster while other components of another tier execute at a different or separate cluster. Resources may be provisioned to each cluster depending upon the workload of a particular tier. If a particular cluster happens to fail (e.g., hard disk crash), the application components may be failed over to another cluster so that business operations can continue with little or no interruption.

The components of a multi-tier application coordinate with each other to provide a service. Since the components may be distributed across various endpoints, groups of endpoints, clusters, and so forth, there is a need for endpoints to connect to each other. Hackers have exploited this need for connectivity.

More particularly, cloud computing promises increases in productivity, collaboration, and efficiency. For example, an enterprise may lease or rent cloud computing processing, services, and storage, rather than purchasing and maintaining the hardware equipment themselves. The shift to cloud computing, however, has opened up new security risks. For example, previously an enterprise might keep all computing and data within a corporate firewall and only grant access to employees within the building perimeter. A cloud such as a public cloud or even a private cloud datacenter has many more points of vulnerability because access is from outside the enterprise firewall and enterprises are often unable to make changes to the underlying infrastructure that belongs to the cloud services provider.

As shown in the example of FIG. 42, an endpoint that has become compromised by a malicious program 4284 can be an entry point to infect and infiltrate other machines. Systems and techniques of the virtual network platform, however, provide various security layers and shields to secure an endpoint, allow only valid computing flows by valid applications, and quickly quarantine an endpoint should it become compromised.

In an embodiment, an administrator of the enterprise can use the application profile builder to construct or define an application profile for an application (e.g., a multi-tier application). The application profile specifies groups or tiers and valid computing flows between the groups or tiers. The application profile describes how the tiers (and thus the endpoints to be provisioned into those tiers) are allowed to communicate with each other. The application profile specifies a configuration of cloud resources and application components along with the computing flow information on how the resources are communicating among them. The application profile may identify computing tiers, groups or server groups or service groups, computing components, and computing flows among the tiers, groups, and components.

In other words, the application profile describes a configuration of computing components (e.g., services), tiers of endpoints supporting the application, and the computing flows among the tiers and components that implement the application. The application profile can also include other components to support network access to the application as well as the administrative access for management purposes. An application profile can describe the computing resources involved in realizing an enterprise application (e.g., web service, enterprise resource planning software (ERP), customer relationship management software (CRM), etc.) running in a cloud or hybrid cloud environment.

An application profile can include but is not limited to multiple cloud domains, and in each one there can be multiple server groups, subnet components (e.g., port 80 coming from the Internet, a virtual private network (VPN) gateway Internet Protocol (IP) address, or simply an IP address for the administrator's desktop machine for support purposes), and other components such as database, load balancers, and so forth.

There can be components identified in the application profile that are singletons or are not part of a group of endpoints. A component may be implemented by a server having a particular function (e.g., load balancer). A component can represent a subnet having an IP address range or a single IP address (e.g., administrator control machine). Another example of component includes a database (e.g., Oracle database). The component (e.g., database) may be offered as a service by the cloud services provider. The IP address associated with the component (e.g., database) can be defined in the application profile so that the endpoints in the groups can connect to that database component. Thus, in the application profile, the component will have an IP address associated with it.

Consider, as another example, a requirement for the first tier to connect to the Internet with port 443 (security port). In other words, inbound traffic will be allowed through port 443 TCP to reach a first tier of secure ecommerce web servers. These network properties can be modeled as components defined as subnet components having an IP address range that is open to all source IPs having port 443. In other words, a component can be used to model a single instance which can include a network subnet, a single load balancer, or a single database. In contrast, an endpoint group or computing tier is empty (e.g., is without virtual machines or containers) during the application profile definition stage. A particular group or tier can represent a collection of endpoints that will each implement similar functions for scalability. During production, specific endpoints may be scheduled into and out of a particular group to accommodate changes in loading, network traffic, and so forth.

Another example of a component includes a load balancer. In some cases, a load balancer will be provided by the cloud services provider. An application profile may define a first computing flow as being from a first load balancer component to a first group, and a second computing flow as being from a second load balancer component to a second group.

Cloud service providers continue to provide more and more infrastructure services to support the enterprise building of an application. These services can be modeled as components in an application profile. For example, a service can include network storage, an attached virtual disk, or a domain name system (DNS) service, each of which can be modeled as components in the application profile. The groups and the components are interconnected via computing flows (e.g., Transmission Control Protocol (TCP), User Datagram Protocol (UDP), etc.) to realize the enterprise application. A data transfer server (e.g., File Transfer Protocol (FTP) server or a Dropbox server) can be defined or modeled as a component as well. A component can include or represent a router, switch, load balancer, generic IP device, server host, disk, interface, database, cluster, web server component, application server, process, DNS (Domain Name System) service, NFS (Network File System) service, LDAP (Lightweight Directory Access Protocol) service, authentication service, monitoring service, searching and indexing service, payment service, messaging service, workflow service, or email service—just to name a few examples.

In a specific embodiment, the application profile builder provides a user interface (e.g., graphical user interface (GUI)) through which an administrator can specify the configuration and computing flows of the endpoint groups or tiers over which the application will be distributed. The GUI tool may provide user controls for defining, creating, identifying, or specifying groups, computing tiers, computing components, and computing flows. The GUI tool may include controls for drag-and-drop and drawing the computing flows. Instead or additionally, the application profile builder may provide an API that allows the user (e.g., administrator) to define the application profile programmatically.

There can be many different types of computing flows. For example, a first type of computing flow between a first group and a second group may allow endpoints (e.g., virtual machines) in the first group to send data (e.g., data packets, communications, connections, requests, messages, or network traffic) to endpoints (e.g., virtual machines) in the second group. A second type of computing flow between a first group and a second group may allow endpoints in the second group to receive data from the endpoints in the first group. The first and second type of computing flows may be referred to as valid, whitelist, legal, allowed, positive, or permitted computing flows.

A third type of computing flow between a first group and a second group may prevent endpoints in the first group from sending data to endpoints in the second group. A fourth type of computing flow between a first group and a second group may prevent endpoints in the second group from receiving data sent by endpoints in the first group. The third and fourth types of computing flows may be referred to as illegal, blocked, disallowed, negative, blacklisted, or not permitted computing flows.

In a specific embodiment, all computing flows that are valid are pre-defined as a part of a configuration process. In this specific embodiment, it is not necessary to explicitly specify the computing flows that are to be blocked in an application profile. In other words, computing flows that have not been pre-defined may, by default, be considered invalid and thus blocked. This type of network may be referred to as a sanitized or logically segmented network.

Table S below shows an example of an application profile for an application named PuffyClouds.

TABLE S

```
<?xml version="1.O" encoding="UTF-8"?>
<cloud-application-configuration>
    <application-name>puffyclouds</application-name>
    <tiers>
        <tier-1>
            <name>load-balancer</name>
        </tier-1>
        <tier-2>
            <name>presentation</name>
        </tier-2>
    </tiers>
    <computing-flows>
        <firstflow>
            <from>tier-1</from>
            <to>tier-2</to>
            <protocol>TCP</protocol>
            <port>5000</port>
        </firstflow>
        <second flow>
            <from>tier-2</from>
            <to>database-component</to>
            <IP-address>IP1 <IP-address>
            <protocol>TCP</protocol>
            <port>6000</port>
        </secondflow>
    </computing-flows>
</cloud-application-configuration>
```

The application profile example above is formatted as an Extensible Markup Language (XML) file. XML is a markup language that defines a set of rules for encoding documents in a format or structure that is both human-readable and machine-readable. In various specific embodiments, the application profile may be provided to the system as an external file that is uploaded to the application profile builder of the controller as an XML file, text file, or other file format. Instead or additionally, the application profile may be created directly within the profile builder such as through a GUI, API, or command line interface.

Figure 43:
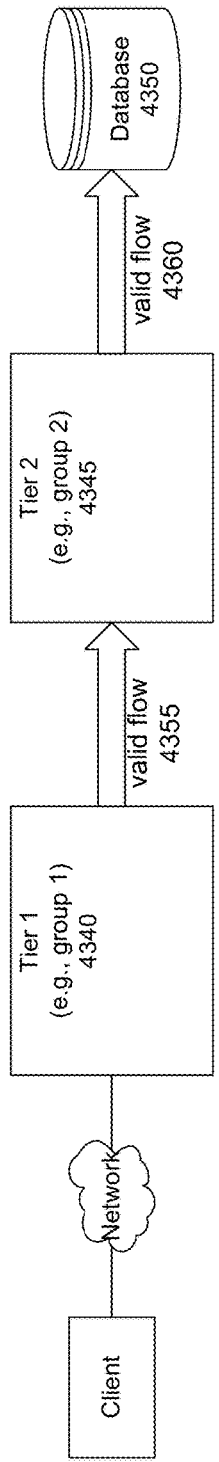
FIG. 43 shows a graphical representation of an application profile including computing flows.

FIG. 43 shows a graphical example of the application profile specified in table S. As shown in the example of FIG. 43, there is a first tier 4340, a second tier 4345, and a component 4350. In the figure, the first and second tiers are shown as boxes or containers that are empty, unoccupied, unfilled, vacant, untenanted, or blank to indicate that the tiers have not yet been provisioned with endpoints. In other words, in a specific embodiment, during the initial application profile definition phase, the tiers (or server groups) specified in the application profile are without endpoints, e.g., virtual machines, as the endpoints have yet to be provisioned in, assigned to, or associated with a particular tier or group. That is, the endpoints may not yet exist.

In this example, the component is a database. According to the computing flows specified in the application profile, there is a first computing flow 4355. A direction of the first computing flow is from the first tier to the second tier. With respect to the first computing flow, the first tier may be considered a source. The second tier may be considered a destination. There is a second computing flow 4360. A direction of the second computing flow is from the second tier to the database. With respect to the second computing flow, the second tier may be considered a source. The database may be considered a destination.

In this example, the first tier is to be provisioned with load balancer machines. The second tier is to be provisioned with presentation machines. The first computing flow connects the load-balancer to the presentation machines using, for example, TCP with port 5000. The second computing flow connects the presentation machines to a component representing a database with an IP address (e.g., IP1) using, for example, TCP with port 6000. Attributes of a computing flow can include a source group or component (e.g., tier 1) and a destination group or component (e.g., tier 2).

A direction of the computing flow can be derived by identifying the source and destination. This "direction" can be important security policy information, indicating what TCP traffic is allowed. For example, consider that a particular VM has a virus. One typical action a virus will do is port scan. Assume that one of the presentation machines has a virus. The moment the virus fires an outbound traffic to the load balancer the traffic will get blocked and will trigger an alert. Likewise, when any other machine, other than the load balancer, in the application profile sends traffic to the presentation machine it will get blocked by the firewall and will trigger the alert. The reason is that this traffic is not defined as part of the legal computing flow on the application profile.

The application profile shown in table S and corresponding graphical example shown in FIG. 43 are merely examples. It should be appreciated that an application profile for the deployment of a complex enterprise application in a cloud-environment can include any number of cloud domains, computing tiers, server groups, components, computing flows, layers, conditions, requirements, specifications, and so forth. A computing tier may represent a group of servers. A computing tier may include one or more groups of servers.

The management console further allows the administrator to define whitelists, blacklists, or both. Defining the whitelists/blacklists may be via the application profile builder or via a separate interface module. A whitelist may include identifiers or signatures of applications, application components, processes, commands, network protocols, or combinations of these that are allowed by the virtual network platform. Conversely, a blacklist may include identifiers, fingerprints, or signatures of applications, application components, processes, commands, network protocols, or combinations of these that are not allowed by the virtual network platform. Defining a blacklist may be optional and is not included in some embodiments.

Figure 44:
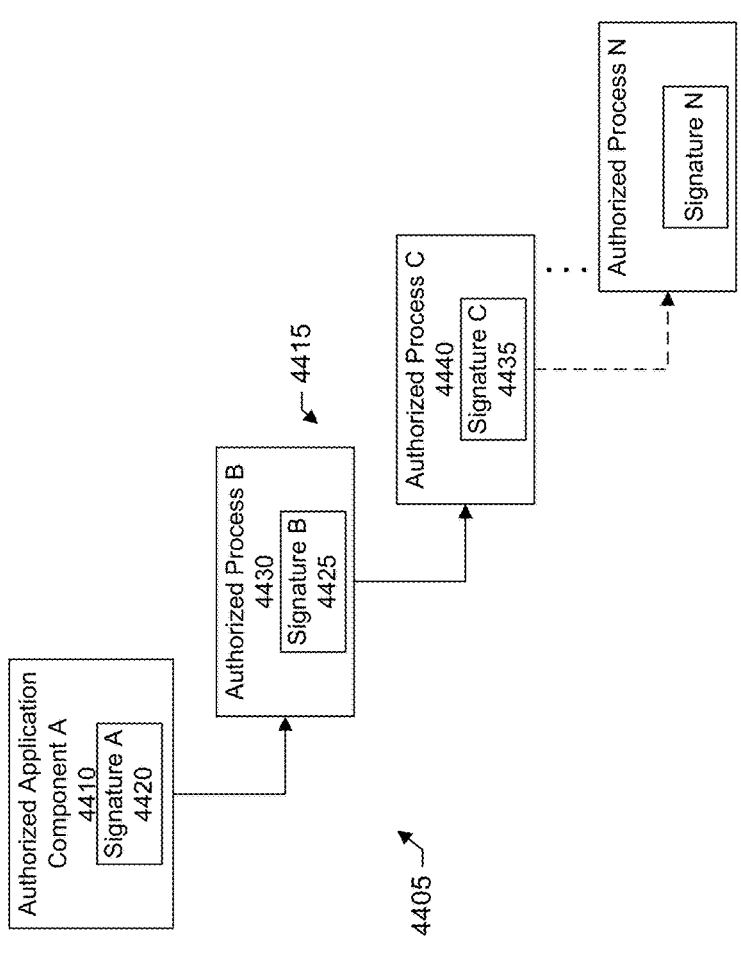
FIG. 44 shows an example of a whitelist tree.

FIG. 44 shows a block diagram of a whitelist 4405. In a specific embodiment, the whitelist is organized or arranged as a hierarchical tree or chain of application components, processes, functions, commands, utilities, protocols, or combinations of these that are authorized to be used on the virtual network platform. In this example, the whitelist specifies an application component 4410 and one or more processes 4415 that may be triggered by the application component. A set of corresponding identifiers, fingerprints, or signatures are associated with the application component and processes. More particularly, FIG. 44 shows a first signature A 4420 associated with application component A, a second signature B 4425 associated with a process B 4430 spawned from the application component, a third signature C 4435 associated with a process C 4440 spawned from process B, and so forth.

For example, during execution of the application component, one or more processes may be started or created which may create one or more sub-processes. The sub-processes, in turn, may create further sub-sub-processes, and so forth. The originating or main process may be referred to as a parent process. A sub-process that is spawned by a parent process may be referred to as a child process. In other words, a process's parent is the process that was responsible for spawning it. A process may run in parallel or concurrently with another process. Instead or additionally, a process may run in series with or after another process.

A process can be the running execution of a program or command. In a specific embodiment, a signature is a checksum that uniquely identifies a particular application component, process, command, or function. The signatures may be calculated using a hash function. Any competent hash function may be used to calculate the signatures. Some examples of hash functions include Secure Hash Algorithm (SHA) including SHA-256, SHA-512, and others. More specifically, a command—like an application component or program—can be stored as a binary or binary file. The binary can be hashed in order to obtain a signature.

In a specific embodiment, the whitelist identifies certain network protocols, utilities, commands, or combinations of these that a specific application is authorized to exercise. For example, SSH, also known as Secure Socket Shell, is a network protocol that provides administrators with a secure way to access a remote computer. SSH may also refer to the suite of utilities that implement the protocol. SSH can be a very powerful tool because of its ability to connect to other computers. As such, there is a potential for misuse.

In an embodiment, the whitelist can be used to restrict SSH to only those specific applications which require its use for legitimate purposes. The whitelisting technique can be applied to interlock specific protocols, port numbers, network protocol types (e.g., TCP port 22, TCP port 17, or UDP), utilities, commands, processes, tools, functions, or combinations of these with specific applications. For example, in cases where the application is authorized to use SSH, there can be a whitelist having a first signature corresponding to the authorized application and a second signature corresponding to the SSH tool. The signatures can be chained or linked together in the whitelist so as to associate that particular command, protocol, or tool (e.g., SSH) with that particular application. During the whitelist check, the controller verifies that the requestor's signatures matches the signatures in the whitelist, and then allows the application to exercise the SSH tool.

For the case where the application is not authorized to use the SSH tool, the whitelist for the application does not include a signature corresponding to the SSH tool. As a result, during the whitelist check, the controller may receive a signature identifying the SSH tool from the requesting endpoint, thereby indicating that the application wishes to use SSH. The controller checks the whitelist associated with the application, determines that the whitelist does not list a corresponding signature for the SSH tool, and then denies the request. Instead or additionally, the SSH signature may be included in a blacklist associated with the application.

In a specific embodiment, a first whitelist is stored and associated with a first application. A second whitelist is stored and associated with a second application, different from the first application. The first whitelist includes first and second signatures. The first signature corresponds to the first application. The second signature corresponds to a utility that the first application is authorized to use. The first signature is a parent of the second signature. The second signature is a child of the first signature. The second whitelist includes a third signature, corresponding to the second application. The second whitelist does not include the second signature. The second application is thereby blocked from using the utility because the second signature corresponding to the utility is not listed in the second whitelist that is associated with the second application. In another specific embodiment, there can be a blacklist stored and associated with the second application. The blacklist includes the second signature corresponding to the utility. The second application is thereby blocked from using the utility because the second signature is listed in the blacklist associated with the second application. In other words, in an embodiment, the controller checks the parent of a particular function to determine whether or not the parent is authorized to exercise that function.

In a specific embodiment, a first whitelist is stored and associated with a first application. A second whitelist is stored and associated with a second application, different from the first application. The first whitelist includes a first signature, corresponding to the first application, and a first port number identifying a port to which the first application can write to. The second whitelist includes a second signature, corresponding to the second application, and does not include the first port number. A request is received to write to the first port. A determination is made as to whether a requestor of the request is from the first or second application. If the request is from the first application, the first whitelist is examined and, based on the examination of the first whitelist, the requestor is permitted to write to the first port. If the request is from the second application, the second whitelist is examined and, based on the examination of the second whitelist, the requestor is not permitted to write to the first port.

The whitelist (blacklist) technique thus allows for very granular control over which specific applications can exercise which specific commands, functions, protocols, and so forth. Well-known ports (e.g., port 53 for DNS services or port 22 for SSH remote login protocol) can be kept open, but restricted for use by only the specific applications that have been authorized by the administrator through the whitelist.

Referring back now to FIG. 42, once the administrator has defined the application profile including identifying computing flows, authorized application components and processes for whitelisting, unauthorized components and processes for blacklisting, or combinations of these, the application profile processing unit processes the application profile to generate application interlock connection policies, static routing tables, and whitelist (blacklist) signatures.

Application interlock connection policies may be stored in database 4245. Table T below shows an example of a data structure storing application interlock connection policies.

TABLE T

| Source Group | Destination Group | Allowed/Not Allowed |
|---|---|---|
| Tier 1 | Tier 2 | Allowed |
| Tier 1 | Data Store | Not Allowed |
| . . . | . . . | . . . |

A first column of the table identifies a source group, a second column identifies a destination group, a third column indicates whether or not the computing flow from the identified source to destination group is allowed or not allowed. For example, according to the sample data shown in table T above, an allowed or valid computing flow is from a tier 1 group to a tier 2 group. In other words, endpoints provisioned into the tier 1 group are allowed to connect to endpoints provisioned into the tier 2 group. A not allowed or invalid computing flow is from the tier 1 group to the data store. In other words, the endpoints provisioned into the tier 1 group will not be allowed to connect directly to or directly access the data store.

Whitelist signatures, blacklist signatures, or both may be stored in database 4048. Table U below shows an example of a data structure storing signatures corresponding to objects (e.g., application components and processes).

TABLE U

| Object | Signature |
|---|---|
| Application Component A | Signature A |
| Process B | Signature B |
| Process C | Signature C |
| . . . | . . . |

Static routing tables may be stored as part of database 4254. Table V below shows an example of a data structure storing static routing tables.

TABLE V

| Static Routing Table | Subnet |
|---|---|
| Static Routing Table A | Subnet A and B |
| Static Routing Table B | Subnet A |
| Static Routing Table C | Subnet A |
| . . . | . . . |

As shown in the example of table V above, in a specific embodiment, a static routing table specifies an IP subnet. A subnetwork or subnet is a logical subdivision of an IP network. Endpoints belonging to a subnet are addressed with a common, identical, most-significant bit-group in their IP address. In other words, a subnet defines a range of IP addresses. A static routing table may specifying any number of subnets (e.g., one, two, three, four, five, ten, twenty, or more than twenty subnets). In the example data from table V above, static routing table A specifies subnets A and B, static routing table B specifies subnet B, and static routing table C specifies subnet A. In a specific embodiment, the static routing tables identify one or more particular subnets that a particular endpoint is allowed or potentially allowed to connect to. For example, static routing table A distributed to a first endpoint indicates that the first endpoint may connect to subnets A and B. Static routing table B distributed to a second endpoint indicates that the second endpoint may connect to subnet A. Static routing table C distributed a third endpoint indicates that the third endpoint may connect to subnet A.

The endpoint provisioning unit is responsible for provisioning the endpoints. The provisioning may include assigning or registering the endpoints to their appropriate tiers or groups according to the application profile, distributing the appropriate static routing tables to the appropriate endpoints according to the application profile, providing the endpoints with secure connection agents, transmitting instructions from the controller to the agents, and other configuration tasks.

The quarantine manager manages the quarantining of endpoints. The endpoint quarantine database stores a listing of IP addresses of endpoints that have been placed in quarantine. The quarantine manager may add an endpoint to the listing based on an indication or determination that the endpoint has been compromised. Indications that the endpoint may have been compromised include the controller receiving an alert from the endpoint agent, the controller determining that a permission request from the endpoint agent to connect to another endpoint should be denied, the controller detecting an interruption in a connection to the endpoint, or the controller receiving input from the administrator that the endpoint should be placed in quarantine.

The reporting unit is responsible for logging (e.g., logging alerts), report generation, and displaying system status. An administrator can use the reporting unit to view alerts sent by an endpoint agent to the controller that may indicate potential hacking activity, view system status, view a listing of active endpoints, view a listing of quarantined endpoints, and view policy enforcement activity (e.g., view instances where requests to connect were blocked). The administrator can then take further steps to investigate the compromised (or potentially compromised) endpoints.

The secure connection verification engine is responsible for evaluating permission connection requests from the endpoint agents. The verification engine, in determining whether to grant or deny a connection request, may check whether certain conditions or policies are satisfied. In a specific embodiment, all conditions or policies must be satisfied before the controller provides permission or authorization to make a connection. In this specific embodiment, if an evaluation by the controller indicates that a condition is not satisfied, the controller denies the connection request.

More particularly, the application profile and interlock policy engine is responsible for evaluating the application interlock connection policies. Evaluation may include obtaining an IP address of the endpoint requesting the connection (e.g., source endpoint), obtaining an IP address of the endpoint to which the source endpoint wishes to connect with (e.g., destination endpoint), identifying a group to which the source endpoint belongs, identifying a group to which the destination endpoint belongs, and checking whether a computing flow specified in the application profile indicates that the group to which the source endpoint belongs to is allowed to connect to the group to which the destination endpoint belongs to. If, for example, no computing flow has been defined that indicates the group to which the source endpoint belongs to is allowed to connect to the group to which the destination endpoint belongs to, the request to connect may be denied.

The whitelist/blacklist checker is responsible for checking the whitelist, blacklist, or both to determine whether the root originator of the connection request and associated processes are listed in the whitelist/blacklist. The checking may include obtaining a signature of the application component that is the originator of the connection request, obtaining signatures of processes or commands triggered, spawned, or created from the application component based on the connection request, and comparing the signatures against the signatures in the whitelist, blacklist, or both.

In a specific embodiment, if any of the obtained signatures do not match the authorized signatures specified in the whitelist, the request to connect may be denied. Thus, even if a malicious program was able to obtain control over or hijack an authorized application, the malicious program would not be able to use the hijacked application to launch processes or commands that might further compromise the network such as by copying out data or attempting to connect to other endpoints because the signatures associated for such processes or commands may not be in the whitelist of authorized processes. In another specific embodiment, if any of the obtained signatures match the signatures specified in the blacklist, the request to connect may be denied.

The endpoint quarantine checker is responsible for checking whether the destination endpoint is in the listing of quarantined endpoints. The checking may include scanning the listing of quarantined endpoints to determine whether an IP address of the destination endpoint is listed. If the IP address of the destination endpoint is listed, the request by the source endpoint to connect to the destination endpoint may be denied. The quarantined list may be implemented in the controller in order to perform a source quarantined check as described below.

In an embodiment, there is a check of the whether the source endpoint is in the listing of quarantined endpoints. Consider, as an example that a source endpoint is in quarantine. Thus, even if a hacker was able to hijack a quarantined source endpoint and issue a request to the controller to connect to another non-quarantined endpoint, the request would be denied because the source endpoint would be in the listing of quarantined endpoints. Quarantine checking may instead or additionally be performed at an endpoint. In an embodiment, the virtual network overlay platform is flexible so that administrators can configure the system as they see fit for the enterprise.

As discussed above, the secure connection agent at the endpoint includes a static routing table programmer. The agent receives a static routing table from the controller and the routing table programmer programs the static routing table into a network kernel table 4284 of OS 4287. The network kernel table facilitates the transmission and receipt of IP packets including encapsulation, and decapsulation, and stores, for example, network interface settings, IP tables, routing tables, destination addresses, gateway addresses, output interfaces, and so forth.

The static routing table received from the controller may be referred to as a CoIP routing table or virtual overlay network table as it stores network information for connecting endpoints via the virtual overlay network. The network kernel table, however, may include other network settings such as other routing information that is separate from the routing information received from the controller and programmed into the network kernel table. For example, the endpoint, in addition to the virtual overlay network, may be connected to other networks such as any number of local area networks, wireless networks (e.g., Wi-Fi), and so forth.

Thus, the network kernel table may be associated with multiple network interfaces and corresponding network settings in addition to the virtual network interface settings associated with the virtual overlay or CoIP network. For example, as shown in FIG. 42, the network kernel table may include first and second portions 4290, 4293, respectively. The first portion includes the static routing table received from the controller and associated with the virtual network interface. The second portion includes other network interfaces, associated network settings, routing tables, IP tables, interface tables, and so forth that are separate from the virtual overlay network. These settings and interfaces may be programmed independently of the programming performed by the static routing table programmer.

The network kernel table enforcer at the endpoint agent is responsible for enforcing the network settings and routing information stored in the network kernel table of the endpoint OS. In a specific embodiment, the enforcer makes a complete copy 4296 of the network kernel table in the OS. The complete copy thus includes the static routing table information received from the controller and other separate network settings for other separate network interfaces. The enforcer stores or maintains the copy of the network kernel table at the endpoint and periodically compares the network kernel table in the OS against the copy to detect tampering. In other words, the copy of the network kernel table may be stored in the real memory of the endpoint.

The enforcer may additionally send the complete copy of the network kernel table to the controller as a further precaution or backup. The controller may thus store and maintain a copy of the network kernel table. The recovery of the endpoint, however, may be performed using the table stored in the endpoint real memory for performance considerations. If, however, the copy of the network kernel table stored at the endpoint becomes corrupted, the copy of the network kernel table stored at the controller can be used to recover the original or previous network settings before the corruption.

The copy of the network kernel table stored at the controller may be used to check or periodically check the integrity of the copy of the network kernel table stored at the endpoint. For example, the endpoint agent may be configured to periodically send its copy of the network kernel table to the controller so that the controller can compare against its stored copy of the endpoint's network kernel table. Instead or additionally, the controller may be configured to periodically request from the endpoint agent the copy of the network kernel table stored at the endpoint. The checking frequency can be configurable such as by the administrator. For example, the administrator may configure the network kernel table checks to occur nightly or during other periods of low activity in order to conserve computing resources. There can be on-demand integrity checks. For example, if the administrator suspects a copy of the network kernel table stored at an endpoint may have been compromised, the administrator can issue a command from the controller to the endpoint agent for an integrity check of the copy of the network kernel table stored at the endpoint. Some network kernel tables may be checked more or less frequently than other network kernel tables. For example, the system may be configured so that specific endpoints or groups of specific endpoints that are particularly critical may undergo more frequent integrity checking of their network kernel table copies as compared to other endpoints or other groups of endpoints that are less critical.

If the malicious program attempts to alter the network kernel table in the OS such as by adding an interface, adding an entry, or changing an existing entry, the enforcer detects the discrepancy. Upon detecting the discrepancy, the enforcer can generate an alert to the controller and also reinforce the original network kernel table in the OS. For example, the enforcer may replace the tampered network kernel table in the OS with the copy of the network kernel table. The network settings of the endpoint are not only secured with respect to the virtual network interface, but also with respect to other network interfaces that the endpoint may connect.

When there is a request to connect to a destination, the allowed subnet checker at the endpoint (or first endpoint) performs a preliminary security check by determining whether the destination falls within an allowed subnet as specified by the static routing table. In this specific embodiment, the static routing table includes one or more IP subnets or subnetworks that the first endpoint may be allowed to connect to. If an IP address of the destination falls within an allowed subnet, e.g., falls within a range of IP addresses defined by the subnet, the connection agent can then issue a request to the controller to perform a further security check. If the IP address of the destination falls outside the allowed subnet, the request to connect to the destination is denied.

In this specific embodiment, the static routing table does not include individual IP addresses of destinations that the endpoint is potentially allowed to connect with. Rather, the static routing table specifies one or more ranges of allowed IP addresses. Storing a subnet or range of IP addresses rather than the individual IP addresses themselves helps to facilitate performance. Specifically, it can be much faster to scan or search a list of subnets as compared to scanning or searching an entire listing of individual IP addresses for a match. Less storage space can be required for storing a subnet as compared to storing all the individual IP addresses that have been assigned within the subnet.

Figure 45:
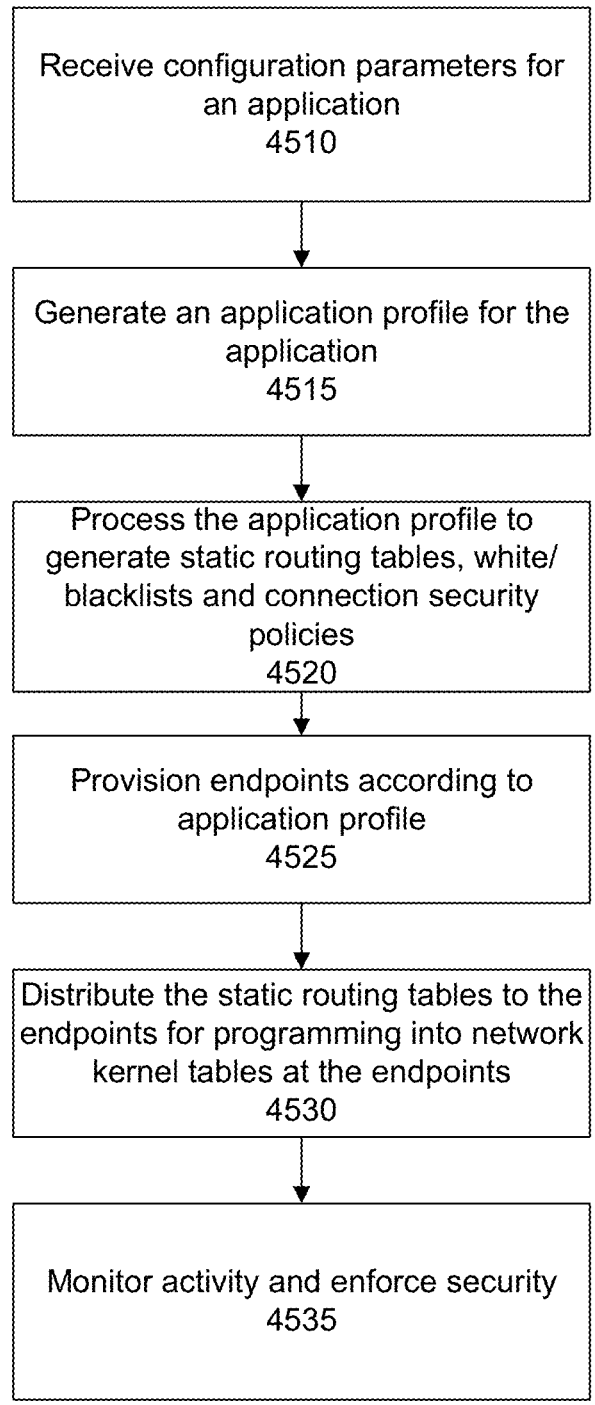
FIG. 45 shows an overall flow of the virtual overlay network platform.

FIG. 45 shows an overall flow of the virtual network platform. In a step 4510, configuration parameters are received for an application (e.g., a multi-tier application). The received parameters may include an identification of application components, network protocols, computing flows and directions, and so forth. The controller may include an interface that allows the administrator to browse and locate the folder path or directory pointing to the application to be used on the virtual network. In a step 4515, the system generates an application profile based on the received configuration parameters. An application profile may be defined for each application that is to use the virtual network platform.

In a step 4520, the system processes the application profile to generate static routing tables, interlock connection security policies, whitelists, blacklists, or combinations of these for the application.

In a step 4525, the endpoints are provisioned according to the application profile. Specifically, the endpoints (e.g., virtual machines, containers, or other components) are placed into the computing tiers or groups specified in the application profile.

Figure 46:
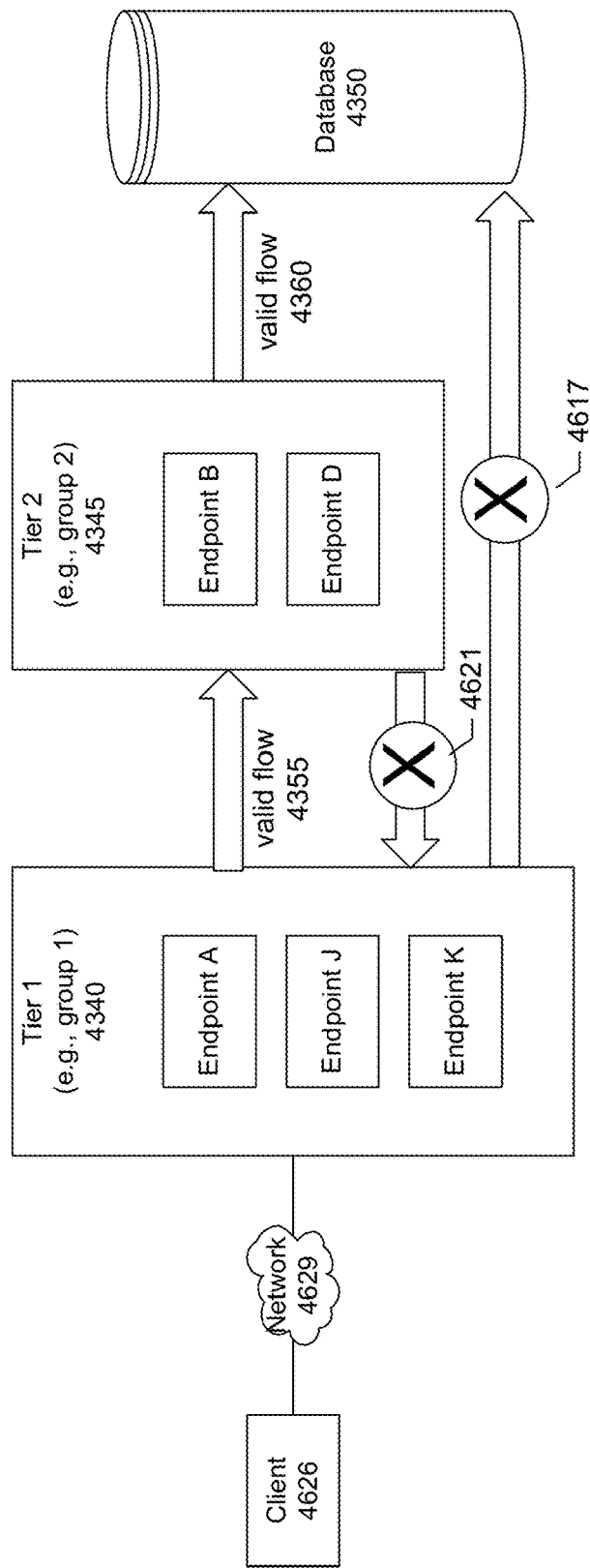
FIG. 46 shows a graphical representation of the application profile shown in FIG. 43 having registered endpoints.

FIG. 46 shows a block diagram showing the provisioning of endpoints into the various groups in the application profile. The block diagram representing the application profile shown in FIG. 46 is similar to the block diagram representation shown in FIG. 43. In FIG. 46, however, endpoints have now been placed into, registered, or associated with the specific tiers or groups specified in the application profile. The endpoints, upon being placed into the respective tier groups inherit the policies and computing flows that have been defined for their respective tier groups.

Specifically, as shown in the example of FIG. 46, endpoints A, J, and K have been provisioned or registered into the tier 1 group defined in the application profile. Endpoints B and D have been provisioned or registered into the tier 2 group defined in the application profile.

Referring back now to FIG. 45, in a step 4530, the system distributes the static routing tables to the endpoints for programming into network kernel tables at the endpoints. The endpoint agents may be pushed from the controller to the endpoints along with the appropriate static routing tables as part of the endpoint registration and configuration process.

In a step 4535, the system monitors and enforces security. Enforcement may include enforcing the computing flow including the direction of the computing flow according to the application profile. For example, referring back now to FIG. 46, the application profile indicates that first computing flow 4355 is from tier 1 to tier 2, and second computing flow 4360 is from tier 2 to the database. Thus, endpoints A, J, and K within the tier 1 group are allowed to connect to endpoints B and D within the tier 2 group according to the first computing flow. Similarly, endpoints B and D within the tier 2 are allowed to access the database according to the second computing flow.

An endpoint in the tier 1 group, however, may be blocked 4617 from directly accessing the database because that computing flow has not been defined as allowed or valid in the application profile. Similarly, an endpoint in the tier 2 group may be blocked 4621 from establishing an independent connection to an endpoint in the tier 1 group because that computing flow or direction of computing flow has not been defined as allowed or valid in the application profile.

The architecture shown in FIG. 46 can be used to support a typical web service where a client 4626 accesses the service through a network 4629 (e.g., Internet). A computing flow or connection policy may specify parameters such as TCP port number, traffic direction, IP address, and so forth. A connection request that is blocked may be accompanied by an alert notification to the administrator so that the administrator can further investigate. For example, an attempt by a source to connect to a particular IP address that, according to the computing flow policy is not permitted, may generate an alert notification.

An application profile further supports the creation of an administrative group or class so that the administrator can access, as desired, any of the endpoints in any of the groups for administrative, debug, and cloud service purposes using, for example, a specific protocol (e.g., TCP port 22, SSH, and so forth). Further, because computing flows or directions are also defined, the virtual network platform can block unsolicited, outbound, or proactive communications from the endpoints to the administrative machine but allow unsolicited, outbound, or proactive communications from the administrative machine to the endpoints. The application profile may include other connections for administration, debug, or cloud service purposes, beyond the tier applications. In other words, in an embodiment, the application profile defines all "legal" connections for all purposes as a whitelist of security.

Below is an overall flow of the overlay network according to a specific embodiment.

Step 1: Define in controller an application profile including connection policies. In a specific embodiment, the administrator defines within the controller connection policies for an application. A connection policy specifies what tier or group can communicate with another tier or group. A tier or group may endpoints or components (e.g., database). Consider, as an example, an HR client-server application that includes a website. The application includes various software components that coordinate amongst themselves to provide web services. Thus, a connection policy may specify that a tier 1 group may connect to a tier 2 group. A tier 2 group may connect to a tier 3 group (e.g., database).

Step 2: Register endpoints into the application profile. In other words, endpoints with the installed application may be registered into the various groups defined in the application profile. As discussed above, computing flows among the groups will have already been pre-defined. Further, the application including components installed in the endpoints will have been pre-validated based on their signatures (e.g., checksums).

Step 3: Enforcement. The enforcement may include, for example, interlocking the application to the network according the application profile and application signatures, enforcing the routing tables, shutting down other local networks, and restricting communications to pre-defined flows (e.g., a tier 1 group is allowed to communicate directly with a tier 2 group; a tier 1 group is not allowed to communicate directly with a tier 3 group; a tier 2 group is not allowed to communicate directly with a tier 1 group— e.g., the tier 2 group is not allowed to proactively communicate with the tier 1 group).

Using the application signatures, the virtual network platform can track and identify the applications (and application components) associated with each tier group and installed at each endpoint. This helps to facilitate service isolation as a group of endpoints hosting a particular application can be prevented from connecting to other groups of endpoints hosting a different application and vice-versa. The signatures further help to prevent malicious programs from making connections because the malicious programs will fail the signature checks.

A routing table may define both allowed neighbor destinations for an endpoint and a direction of the traffic, computing, or communication flow. For example, a routing table for a first endpoint may specify information that allows the first endpoint to send an unsolicited communication to a second endpoint, i.e., without having initially been contacted or requested by the second endpoint. A routing table for a second endpoint may specify information that blocks or prevents the second endpoint from sending an unsolicited communication to a first endpoint, but allows the second endpoint to send a communication as a reply to an initial or previous request from the first endpoint.

Figure 47:
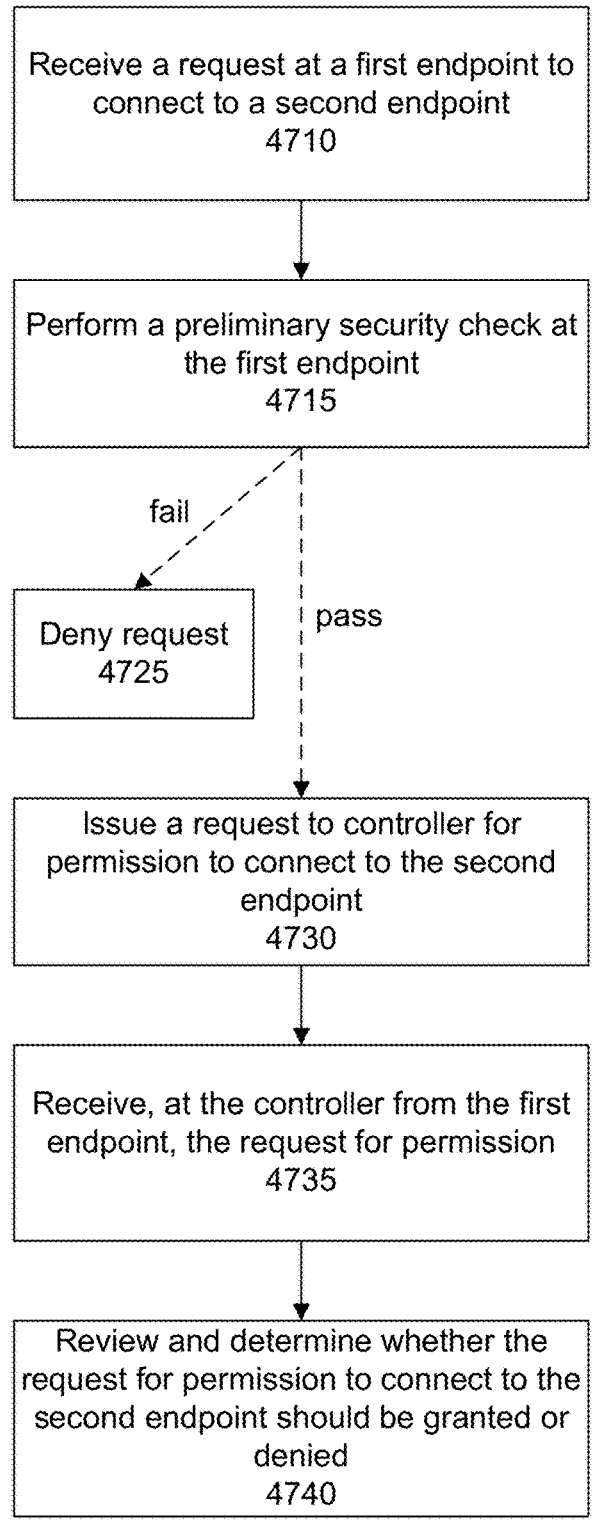
FIG. 47 shows a flow of an endpoint connection request according to a specific embodiment.

FIG. 47 shows an overall flow of an endpoint connection request. In a step 4710, a request is received by an endpoint agent at a first endpoint to connect to a second endpoint. In a step 4715, a preliminary security check is performed at the first endpoint. If the preliminary security check fails, the request is denied (step 4725). If the preliminary security check passes, the agent issues a request to the controller for permission to connect to the second endpoint (step 4730). In a step 4735, the controller receives from the first endpoint the permission request. In a step 4740, the controller reviews the request and determines whether the request for permission to connect to the second endpoint should be ultimately granted or denied.

FIG. 48 shows further detail of a flow for the preliminary security check that may be performed at the endpoint (e.g., first endpoint). Upon receiving the request to connect to the second endpoint, in a step 4815, the first endpoint agent determines whether an IP address of the second endpoint falls within an IP subnet identified as being an allowed destination for the first endpoint. The first agent may scan or cause a scan of the network kernel table programmed at the first endpoint to determine whether the IP address is in the IP subnet from the network kernel table.

As an example, consider that the allowed IP subnet defines a range of IP addresses from 192.168.100.0 to 192.168.100.9, and the IP address of the second endpoint is 192.169.100.100. In this scenario, the preliminary security check fails because the IP address 192.169.100.100 is outside the IP address range 192.168.100.0 to 192.168.100.9. Thus, the request is denied (step 4825).

Alternatively, consider that the IP address of the second endpoint is 192.168.100.6. In this scenario, the preliminary security check passes because the IP address 192.168.100.6 is within or inside the IP address range 192.168.100.0 to 192.168.100.9. If the preliminary security check passes, in a step 4830, the first endpoint agent gathers, fetches, or collects signatures associated with a requestor of the request.

For example, the agent may issue calls or commands to the operating system to identify a process tree associated with the request. The agent may traverse the tree to identify a child process, parent of the child process, and so forth until the originating requestor has been identified. Once the agent has identified the associated processes and requestor, the agent may apply or cause a hashing function to be applied to the processes and requestor to obtain the corresponding signatures. In a specific embodiment, the signature whitelist is pushed from the controller to the endpoint agent so that the agent can determine what signatures to collect.

In an embodiment, the endpoint agent interrogates the OS (or, more specifically, the active process table of the OS)

using a child process associated with the connection request to identify a parent process of the child process. The parent process, in turn, is used to interrogate the OS and identify a grandparent process, the grandparent process, in turn, is used to interrogate the OS and identify a great grandparent process, and so forth until the entire chain has been climbed or traced and the originating or root requestor program or process is identified. Signatures are then gathered for the originating requestor program and processes spawned from the originating requestor.

In a step 4835, after gathering or collecting the signatures, the agent at the first endpoint issues a request to the controller for permission to connect to the second endpoint. The request may include the collected signatures, IP address of the first endpoint, IP address of the second endpoint, protocol information, or combinations of these.

FIG. 49 shows further detail of a flow for determining at the controller whether the permission request should ultimately be granted or denied. The controller, upon receiving the permission request from the first endpoint (step 4910), consults the application profile connection policies to determine whether the first endpoint connecting to the second endpoint is a valid computing flow (step 4915). Based on the IP addresses assigned to the first and second endpoints, the controller may identify a first group that the first endpoint belongs to, a second group that the second endpoint belongs to, and whether the computing flow from the first group to the second group is a valid computing flow as defined by the application profile connection policies.

If the computing flow from the first group to the second group has not been defined or has been defined as invalid, the permission request is denied (step 4920). Alternatively, if the computing flow is valid, in a step 4925, the controller consults the whitelist to determine whether the collected signatures received with the permission request match the authorized signatures specified in the whitelist. In an embodiment, if any signature does not match the permission request is denied (step 4920). The signatures allow the virtual network platform to recognize the application and associated processes that are attempting to use the network. Applications and processes that are not recognized can be blocked from using the network.

Alternatively, if all signatures match, the security check advances to checking or consulting the listing of quarantined endpoints to determine whether the second endpoint is listed (step 4930). The listing is searched with the IP address of the second endpoint. If the second endpoint is on the quarantine list, the permission request is denied (step 4920). Alternatively, if the second endpoint is not listed on the quarantine list, the controller grants the request for permission to connect to the second endpoint (step 4935). In an embodiment, signature checks include a checking of a blacklist. In this specific embodiment, if there is a matching signature with a blacklisted signature (e.g., blacklisted network protocol), the permission request to connect is denied.

As an example, consider a scenario where the malicious program seeks to scan the neighbors of the compromised endpoint by reading the network kernel table at the compromised endpoint. Upon discovering the neighbors, the malicious program may then probe each of the neighbors and make an attempt to contact a neighbor from the compromised endpoint using, for example, a Secure Socket Shell (SSH) protocol or SSH client program to connect to the endpoint. An SSH client is a software program that uses the secure shell protocol to connect to another computer.

In this example, the preliminary security check performed by the agent at the compromised endpoint may pass because the requested destination neighbor endpoint is within the allowed subnet as specified in the network kernel table of the compromised endpoint. The agent may thus proceed to collect the signatures associated with the request for evaluation by the controller. The collected signatures may include the signature of the SSH client program requestor—rather than a signature of the authorized application (e.g., ERP application). Thus, when the controller evaluates the received signatures from the agent at the compromised endpoint, the signature of the SSH client program may not match the authorized signatures from the whitelist. As a result, the controller will deny the permission request by the compromised endpoint to connect to the neighbor endpoint.

As another example, consider a scenario where the malicious program at the compromised endpoint is able to discover the secure tunnel being used by the authorized application. The malicious program kills the authorized application in order to use the secure tunnel to infiltrate the destination neighbor endpoint. In this case, the preliminary security check at the agent may again pass, and the agent again proceeds to collect signatures for the controller. The collected signatures, however, may include that of the malicious program rather than the authorized application. Thus, when the controller evaluates the received signatures from the agent at the compromised endpoint, the signature of the malicious program may not match the authorized signatures from the whitelist. As a result, the controller will deny the permission request by the compromised endpoint to connect to the neighbor endpoint.

As another example, consider a scenario where the application interlock policies database stores information indicating that a (first) source group includes endpoint IP address A, endpoint IP address J, and endpoint IP address K; a (second) destination group includes endpoint IP address A, endpoint IP address D; and a computing flow from the source to destination group is valid. A whitelist identifies application component A as having signature A and a process created by application component A as having signature B; and a listing of quarantined endpoints includes endpoint IP address X, endpoint IP address Y, and endpoint IP address Z.

Consider, further, that the permission request from the first endpoint agent identifies the first endpoint as having IP address A, the second endpoint has having IP address B, the originating requestor as having a signature A, and a process created by the originating requestor as having signature B.

In this example, a first security condition regarding the computing flow is satisfied (step 4915). Specifically, in this example, the controller identifies the first endpoint as being in the first (source) group because IP address A belongs to the first group. The controller identifies the second endpoint as being in the (second) destination group because IP address B belongs to the second group. And, a computing flow from the first to second group is indicated as valid.

A second security condition regarding the whitelist check is also satisfied (step 4925). Specifically, in this example, the whitelist signatures of A and B match the received signatures A and B from the permission request. In other words, whitelisted application component A with signature A matches signature A of the originating requestor; and whitelisted process with signature B created from whitelisted application component matches signature B for the process created from the originating requestor.

A third security condition regarding the quarantine check is also satisfied (step 4930). Specifically, in this example, the IP address of the second endpoint (IP address B) is not in the listing of quarantined endpoints (e.g., IP address X, IP address Y, and IP address Z).

Thus, in this example, the first endpoint is allowed by the controller to connect to the second endpoint as all the security checks or conditions have been satisfied.

As another example, consider that the second endpoint has an IP address Q rather than IP address B. In this example, the first security condition (step 4915) fails because the second endpoint does not belong to the second group having IP addresses B and D.

As another example, consider that the signature of the originating requestor is signature R rather than signature A. In this example, the second security condition (step 4925) fails because a search of the signature whitelist would not find signature R as being an authorized signature in the whitelist of signatures A and B.

As another example, consider that the second endpoint has an IP address Y rather than IP address B. In this example, the third security condition (step 4930) fails because a search of the quarantine list would find the second endpoint as being in the listing of quarantined endpoints.

These instance-level security checks provide very tight security while also ensuring good performance and conservation of resources such as network bandwidth. For example, referring back now to FIG. 42, in a specific embodiment, the endpoint agent and controller are modeled in a master/slave relationship or primary/secondary relationship. In this relationship, there is a primary program, i.e., the controller, which controls one or more secondary programs, i.e., the agents. The direction of control is from the primary to the secondary. A benefit of this model is that even if the endpoint agent were to become compromised 4295 by the malicious program, it would be very difficult for the compromised agent to independently act because the design of the agent relies on the controller for direction and instruction. For example, in an embodiment, it is the responsibility of the controller to perform a set of final security checks and evaluations before a connection is allowed to be established.

An attempt 4297 by the malicious program to hijack the valid application will also be thwarted because of the computing flow and whitelist checking at the controller. For example, the malicious program will not be able to redirect the valid application to an unauthorized destination because the computing flow to the unauthorized destination will not be recognized by the controller. The malicious program will not be able to conduct a spoofing attack using the valid application to execute unauthorized processes because the whitelist signature checks will fail during the signature matching check. Similarly, the signature matching check will fail if the malicious program replaces the authorized application binary with a malicious application binary because the two binaries will produce two different signatures when hashed.

Performing the preliminary security check at the endpoint regarding whether the requested destination falls within the allowed subnet helps to reduce the amount of network traffic between the agent and controller. Specifying a subnet rather than individual IP addresses can help to reduce the number and frequency of routing table updates. For example, during production operation, endpoints may be continuously and dynamically provisioned, deployed, shutdown, or decommissioned in order to rapidly respond to changing workloads or other demands. Depending on the frequency of changes, it can be very taxing on the network to distribute static routing table updates—especially in cases where there is a large number of endpoints to update (e.g., hundreds, thousands, or many thousands of endpoints).

Specifying subnets in the static routing tables, however, can reduce the number of updates because it may not be necessary to distribute an update if a destination endpoint is being added to an existing subnet since an IP address of the newly added destination endpoint would fall within the range of IP addresses specified by the existing subnet. In other words, a destination subnet can be a static network that all potential endpoints (not yet provisioned in the cloud) will live inside as the destinations that the source endpoint can connect to.

That is, in an embodiment, the static routing table includes a "subnet" which is a static network definition before having any endpoint provisioned in the subnet. The static routing table programmed in the endpoint has the static "subnet" information. In this embodiment, all the endpoint instances and their connectivity information (security or other whitelist requirements) are kept in the central controller as an instance-level security checking, checked by the controller. This architecture uses a static table in the endpoint to do a fast search to make sure the destination IP address is covered by the "subnet." If the IP address is covered by the subnet, then the central controller will only spend time to check the source and destination instances and their connection policies. This design and architecture helps to facilitate good performance.

In an embodiment, the static routing table stores one or more "subnets" and not a list of individual IP addresses. When, for example, a destination endpoint is moved into quarantine, the subnet on the source endpoint may stay the same, but the central controller will reject a connection request from the source endpoint to the destination endpoint because the destination endpoint will be in the listing of quarantined endpoints.

In an embodiment, on the destination endpoint that is in the quarantine, the static routing will be reset to empty and no connection will be approved at the endpoint level. The central controller will also not approve any connection either.

In another specific embodiment, a static routing table may instead or additionally include specific or individual allowed destination IP addresses. For example, if the number of endpoints is relatively small, an enterprise may wish to specify individual IP address. In this specific embodiment, when the controller determines that an endpoint is to be quarantined, the controller may send an updated static routing table to one or more other endpoints in which an IP address of the quarantined endpoint has been removed. In this specific embodiment, the preliminary security check performed at an endpoint to contact the quarantined endpoint would immediately fail because the IP address of the quarantined endpoint would not be listed in the updated static routing table as an allowed destination.

The security checks performed by the controller may proceed in any order, proceed in a serial fashion (e.g., one after the other), or proceed in parallel or concurrently with another security check. For example, in a specific embodiment, a first security check includes checking the application profile connection policies (step 4915), a second security check is performed after the first security check passes and includes checking the whitelist (step 4925), a third security check is performed after the second security check passes and includes checking the quarantine listing. In various other specific embodiments, one of the first, second, or third security checks is performed before or after another of the first, second, or third security checks. One of the first, second, or third security checks is performed concurrently with, during, or while another one of the first, second, or third security checks is being performed. A fourth security check may include checking a blacklist.

Figure 50:
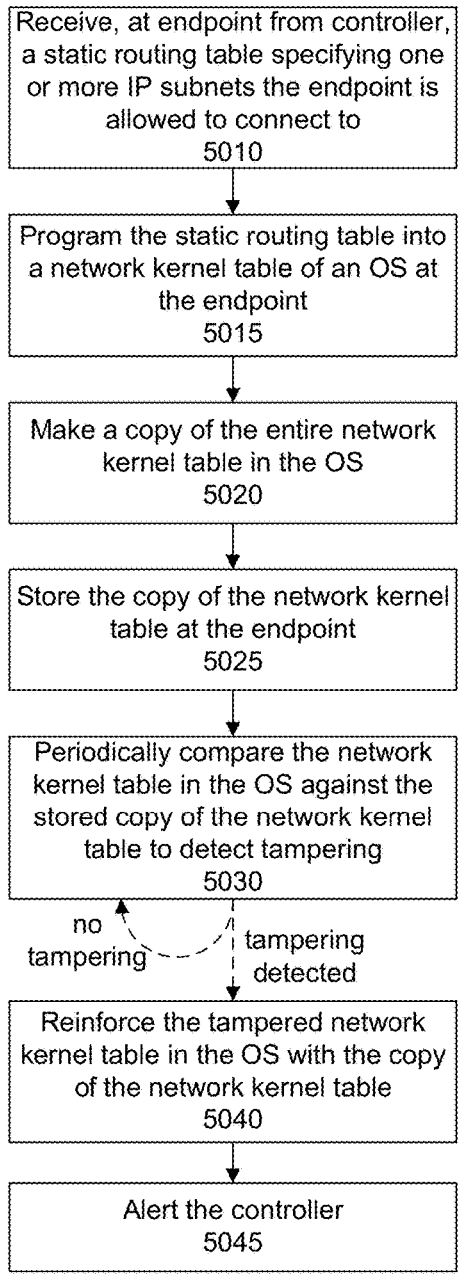
FIG. 50 shows a flow for preventing tampering of the network OS settings at an endpoint according to a specific embodiment.

FIG. 50 shows further detail of a flow for monitoring and enforcing the network kernel routing table at an endpoint. In a step 5010, an endpoint receives from the controller a static routing table specifying one or more IP subnets that the endpoint may be allowed to connect to. In a step 5015, an endpoint agent programs the static routing table into a network kernel table of an OS (e.g., guest OS) at the endpoint.

In a step 5020, the agent makes a complete copy or snapshot of the entire network kernel table or entire network environment settings in the OS. In a specific embodiment, the copying is performed after the programming of the static routing table into the network kernel table is complete and after other network settings have also been programmed into the network kernel table. The copying may be performed after the endpoint is placed into service or upon instruction from the controller.

Specifically, as discussed, the network kernel table may include other portions having other networking interfaces, networking settings, routing information, and so forth that are separate from the portion of the network kernel table having the programmed static routing table from the controller. These other network interfaces may be used, for example, to allow the endpoint to connect to other networks or network interfaces in addition to the virtual network platform. Thus, the copy of the network kernel table may include both the portion having the static routing table received from the controller (e.g., virtual network overlay portion), and other portions having other networking information and settings not provided by the controller, but still authorized by the enterprise (e.g., other authorized physical networks).

In a step 5025, the endpoint agent stores or maintains the copy of the network kernel table at the endpoint. The endpoint agent may additionally transmit the copy to the controller as a further precaution. If, for example, the copy of the network kernel table at the endpoint is corrupted, the controller can push its copy to the endpoint.

In a step 5030, the endpoint agent periodically compares the network kernel table in the OS against the stored copy of the network kernel table to detect tampering. For example, referring back now to FIG. 42, in some cases the malicious program may attempt to alter 4299 the network kernel table in the OS such as by changing an existing network setting entry, adding an entry, deleting an entry, and so forth. These attempts to alter the network kernel table, however, can be detected by comparing the network kernel table in the OS with the previously stored copy of the network kernel table.

If tampering of the network kernel table is detected, the agent (or network kernel table enforcer at the agent) can automatically and immediately undertake remediation actions to reinforce the original network settings using the previously stored copy of the network kernel table (e.g., copy of network kernel table stored at endpoint). If any discrepancies are discovered during the comparison such as a change in network configurations or settings, addition of new network settings, a change in the number of network configurations, and so forth, the endpoint agent can replace the tampered network kernel with the previously stored copy of the network kernel table. In other words, the original network settings can be recovered using the copy of the network kernel table. The agent can also alert the controller (step 5045) so that further investigations can be made.

The frequency of the comparison can be a user-configurable value. For example, the administrator may configure the comparison to be every two, three, four, five, or ten seconds or at any other frequency as desired.

Periodically checking the integrity of the network kernel table can help to prevent the table from being reprogrammed with unauthorized routing information and other networking rules that may identify an unauthorized destination. This helps to prevent a hacker from transferring data out of the compromised endpoint to the unauthorized destination. Further, because the integrity the entire network kernel table is checked, the agent can detect discrepancies to any portion of the table (i.e., both the portion provided by the controller and other portions not provided by the controller, but still authorized by the enterprise).

In a specific embodiment, the network kernel table may be programmed to allow only connections using the virtual overlay network platform and block all other connections at the local network. In this specific embodiment, the blocking may be accomplished by identifying or programming a specific port, e.g., port 9797, in the routing table for the building of the secure tunnel and configuring the local physical network to support only that specific port, e.g., port 9797.

Figure 51:
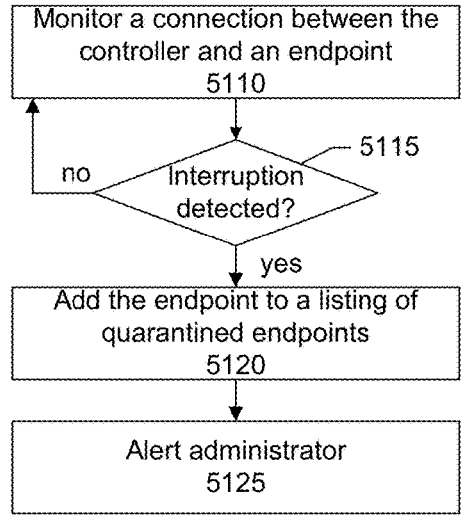
FIG. 51 shows a flow for detecting a potential compromise of an endpoint.

FIG. 51 shows a flow for tracking health or status of an endpoint. In a step 5110 a connection between the controller and the endpoint agent is continuously monitored. For example, the controller may periodically poll or ping the controller over the connection for updates. Instead or additionally, the endpoint agent may be configured to periodically check-in with the controller. For example, the controller may check in with the endpoint agent (or vice-versa) every one, two, three, four, or five seconds or at any other frequency as desired. The frequency can be a user-configurable value.

In a step 5115, a determination is made as to whether there was an interruption in the connection. For example, there can be a predetermined or preconfigured threshold time period or timeout period within which the endpoint agent must respond to the controller with a status update (e.g., five, ten, or fifteen seconds or any other time period as desired). If, for example, the controller issues a status update request to the endpoint agent and does not receive a status update from the controller within the threshold time period to respond, the controller may determine that there is a potential problem at the endpoint.

When an interruption in the connection is detected, the controller may add the endpoint to a listing of quarantined endpoints (step 5120) and alert the administrator (step 5125).

For example, referring back now to FIG. 42, in some cases the malicious program may attempt to kill 4295 the endpoint agent. If the endpoint agent is killed, the controller will be able to detect that there may be a potential problem with the endpoint based on the interruption in the connection between the controller and endpoint agent. The controller can then undertake remediation actions to isolate the potentially compromised endpoint.

In another specific embodiment, the endpoint agent reports back to the controller with information including CPU usage, running processes, storage usage, or combinations of these. The controller examines the information for anomalies. For example, the controller may compare the reported CPU usage against a model of expected CPU usage. If the reported CPU usage exceeds the expected CPU usage by a threshold amount, the controller can generate an alert and place the endpoint into quarantine. An unexpected level of CPU usage, running processes, or both may indicate a potentially compromised endpoint.

Figure 52:
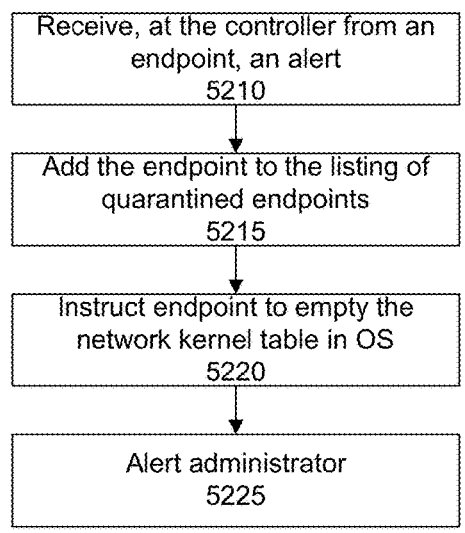
FIG. 52 shows a flow for remediation when an endpoint has potentially been compromised according to a specific embodiment.

FIG. 52 shows a flow for handling an endpoint that may have been compromised. In a step 5210, the controller receives from an endpoint an alert. For example, the alert may have been triggered based on the endpoint agent discovering a tampering of the network kernel table. In response, in a step 5215, the controller adds an IP address of the endpoint to a listing of quarantined endpoints. Thus, other endpoints when requesting permission from the controller to connect to the endpoint will be denied permission to connect to the endpoint because the endpoint will be listed in the listing of quarantined endpoints.

In a step 5220, the controller instructs the endpoint to empty or delete its network kernel table in the OS. This provides another layer of security because without the network kernel table, the malicious program will not be able to make connections. In a step 5225, an alert notification (e.g., email or text) is generated and sent to the administrator.

In a specific embodiment, a method for securing, through a virtual network, a public cloud provided by a cloud services provider for an enterprise includes: providing a plurality of agents for a plurality of endpoints, the plurality of endpoints to be hosted by a plurality of server machines in the public cloud provided by the cloud services provider for the enterprise; providing a controller that connects to the plurality of agents; storing, at the controller, a whitelist identifying components of a multi-tiered application authorized by the enterprise to use the virtual network; defining an application profile for the multi-tiered application, the application profile specifying valid computing flows between components of a tier of the multi-tiered application and components of another tier of the multi-tiered application, the components of the tier to be executed at an endpoint, and the other components of the other tier to be executed at another different endpoint; provisioning the plurality of endpoints according to the application profile, the provisioning comprising generating a plurality of static routing tables for the plurality of endpoints, a static routing table for an endpoint comprising at least one Internet Protocol (IP) subnet; distributing a first static routing table, and a first agent to a first endpoint, wherein when a request is received at the first endpoint to connect to a second endpoint, the first agent determines whether an IP address of the second endpoint falls within the at least one IP subnet; if the IP address of the second endpoint falls within the at least one IP subnet, receiving, at the controller from the first agent, a request to perform a security check; and in response to the security check request, checking the whitelist to determine whether a requestor of the request to connect to the second endpoint is listed as a component of the multi-tiered application authorized to use the virtual network.

The method may include determining that the requestor of the request to connect to the second endpoint is not listed in the whitelist as a component of the multi-tiered application authorized to use the virtual network; and upon the determination, not allowing the connection to the second endpoint.

The method may include programming the first static routing table into a network kernel table of an operating system (OS) executing at the first endpoint, the network kernel table comprising other routing information that is separate from the first static routing table; generating a copy of the network kernel table, the copy of the network kernel table thereby comprising the first static routing table distributed by the controller, and the other routing information that is separate from the first static routing table; maintaining, at the first endpoint, the copy of the network kernel table; sending another copy of the network kernel table to the controller for storage at the controller; periodically comparing the network kernel table in the OS against the copy of the network kernel table maintained at the first endpoint to detect tampering of the network kernel table in the OS; and upon detecting tampering, reinforcing the tampered network kernel table in the OS with the copy of the network kernel table maintained at the first endpoint, and issuing an alert to the controller.

The method may include maintaining continuous connections between the controller and the plurality of agents; detecting that a first continuous connection between the controller and the first agent at the first endpoint has been interrupted; and based on the interruption, placing the first endpoint into quarantine.

The method may include placing, by the controller, a third endpoint into quarantine; after the placing the third endpoint into quarantine, receiving, at the controller from the first agent at the first endpoint, a request to connect to the third endpoint, the request to connect to the third endpoint being received at the controller because the first agent has determined that an IP address of the third endpoint falls within the at least one IP subnet; and denying the request to connect to the third endpoint because the third endpoint is in quarantine.

In an embodiment, the components of the multi-tiered application identified in the whitelist are arranged as a tree, the tree comprises authorized parent and child processes associated with the component of the multi-tiered application authorized to use the virtual network, and signatures corresponding to the authorized processes, wherein the request to perform the security check comprises signatures of processes spawned from the requestor, and wherein the checking the whitelist comprises comparing a signature of a process spawned from the requestor with a signature of an authorized process listed in the whitelist.

The method may include in response to the security check request, checking the application profile to determine whether a computing flow from the first endpoint to the second endpoint is a valid computing flow according to the application profile. The method may include in response to the security check request, checking a listing of endpoints that have been quarantined to determine whether an IP address of the second endpoint is in the listing. An endpoint may include a container. An endpoint may include a virtual machine.

In another specific embodiment, a method for using a virtual network to connect a plurality of endpoints in a cloud environment includes: providing a controller that connects to the plurality of endpoints; defining application profiles for applications authorized to use the virtual network, the application profiles comprising specifications of valid computing flows between groups of endpoints; provisioning the plurality of endpoints according to the application profiles, the provisioning comprising generating, by the controller, a plurality of static routing tables for the plurality of endpoints, a static routing table for an endpoint comprising at least one Internet Protocol (IP) subnet that the endpoint will be allowed to connect to; programming the static routing table provided by the controller into a portion of a network kernel table of an operating system (OS) at the endpoint, the network kernel table comprising other portions having other routing information not provided by the controller; making a copy of the network kernel table, the copy of the network kernel table thereby comprising the portion having the static routing table provided by the controller, and the other portions having the other routing information not provided by the controller; maintaining, at the endpoint, the copy of the network kernel table; sending another copy of the network kernel table to the controller; periodically comparing the network kernel table in the OS and the copy of the network kernel table to detect tampering of the network kernel table in the OS; and upon detecting tampering, replacing the tampered network kernel table in the OS with the copy of the network kernel table maintained at the endpoint, and issuing an alert to the controller.

The method may include after the issuing an alert to the controller, receiving, at the endpoint from the controller, an instruction to reset the network kernel table to empty. The method may include upon receiving the alert at the controller, adding an IP address identifying the endpoint to a list of quarantined endpoints. In an embodiment, the endpoint is a first endpoint and the method includes receiving, at the first endpoint, a request to connect to a second endpoint; determining, at the first endpoint, whether an IP address of the second endpoint falls within a range of IP addresses specified by the at least one IP subnet; and if the IP address of the second endpoint falls within the range of IP addresses specified by the at least one IP subnet, issuing a request to the controller for permission to connect with the second endpoint, wherein the request comprises an IP address of the first endpoint, the IP address of the second endpoint, and a signature of a requestor that requested the connection to the second endpoint.

In an embodiment, the endpoint is a first endpoint and the method includes storing, at the controller, a whitelist comprising a plurality of authorized signatures, the plurality of authorized signatures corresponding to components of a multi-tiered application authorized to use the virtual network, and processes authorized to be triggered based on the components; receiving, at the first endpoint, a request to connect to a second endpoint; requesting a check of the network kernel table in the OS to determine whether an IP address of the second endpoint is in the at least one IP subnet; receiving an indication from the OS that the IP address of the second endpoint is in the at least one IP subnet; gathering a plurality of signatures comprising a signature of a requestor of the request to connect to the second endpoint, and a signature of a process triggered by the request; issuing a request to the controller for permission to connect with the second endpoint, the request for permission to connect comprising the plurality of signatures, an IP address of the first endpoint, and an IP address of the second endpoint; and allowing, by the controller, the first endpoint to connect to the second endpoint when a plurality of conditions are satisfied, wherein a first condition is satisfied when the IP address of the first endpoint is in a first group of endpoints, the IP address of the second endpoint is in a second group of endpoints, and a valid computing flow specified in an application profile indicates that the first group is allowed to connect to the second group, a second condition is satisfied when the signature of the requestor of the request matches an authorized signature of a component according to the whitelist, and the signature of the process triggered by the requestor matches an authorized signature of a process authorized to be triggered according to the whitelist, and a third condition is satisfied when the IP address of the second endpoint is not found in a list of quarantined endpoints.

In another specific embodiment, there is a method for pre-defining a secure virtual network to connect endpoints in a public cloud provided by a cloud services provider for an enterprise and, after the pre-defining, enforcing security to allow only connections that were pre-defined, the pre-defining comprising: storing, at a controller, a whitelist comprising plurality of authorized signatures corresponding to applications and processes authorized by the enterprise to use the secure virtual network; defining application profiles for the applications, the application profiles specifying valid subnetworks and computing flows between groups of endpoints for the applications; generating static routing tables based on the valid subnetworks for endpoints that are to be provisioned; provisioning the plurality of endpoints into the valid subnetworks according to the application profiles, the provisioning comprising distributing the static routing tables to the endpoints; and the enforcing security comprising: receiving, at a first endpoint, a request to connect to a second endpoint; determining, at the first endpoint, whether an IP address of the second endpoint is within a valid subnetwork specified by a static routing table at the first endpoint; after determining that the IP address of the second endpoint is within the valid subnetwork, issuing, from the first endpoint to the controller, a request to perform a security check; receiving, at the controller, the request to perform the security check; and allowing, in response to the security check, the first endpoint to connect to the second endpoint when a plurality of conditions are satisfied, wherein a first condition is satisfied when an IP address of the first endpoint is in a first group of endpoints, the IP address of the second endpoint is in a second group of endpoints, and a computing flow according to an application profile indicates the first group is allowed to connect to the second group, a second condition is satisfied when a signature of a requestor of the request to connect, and a signature of a process triggered by the requestor matches authorized signatures specified in the whitelist, and a third condition is satisfied when the IP address of the second endpoint is not found in a list of quarantined endpoints.

The method may include programming the static routing table into a network kernel table of an operating system (OS) at the first endpoint, the network kernel table comprising other routing information in addition to routing information from the static routing table; making a copy of the network kernel table, the copy of the network kernel table thereby comprising the routing information from the static routing table, and the other routing information; storing, at the first endpoint, the copy of the network kernel table; periodically comparing the network kernel table in the OS against the copy of the network kernel table stored at the first endpoint to detect tampering of the network kernel table in the OS; and upon detection of tampering, reinforcing the tampered network kernel table in the OS with the copy of the network kernel table stored at the first endpoint. The reinforcing the tampered network kernel table may include replacing the tampered network kernel table with the copy of the network kernel table.

The method may include upon the detection of tampering, issuing an alert to the controller, wherein the controller, in response to the alert, adds an IP address of the first endpoint to a list of quarantined endpoints. The method may include upon the detection of tampering, issuing an alert to the controller, wherein the controller, in response to the alert, instructs the first endpoint to empty a network kernel table in an operating system (OS) at the first endpoint, wherein the network kernel table comprises the static routing table distributed to the first endpoint, and other routing information in addition to the static routing table.

In another specific embodiment, there is a system for securing, through a virtual network, a public cloud provided by a cloud services provider for an enterprise comprising: a processor-based system executed on a computer system and configured to provide a plurality of agents for a plurality of endpoints, the plurality of endpoints to be hosted by a plurality of server machines in the public cloud provided by the cloud services provider for the enterprise; provide a controller that connects to the plurality of agents; store, at the controller, a whitelist identifying components of a multi-tiered application authorized by the enterprise to use the virtual network; define an application profile for the multi-tiered application, the application profile specifying valid computing flows between components of a tier of the multi-tiered application and components of another tier of the multi-tiered application, the components of the tier to be executed at an endpoint, and the other components of the other tier to be executed at another different endpoint; provision the plurality of endpoints according to the application profile, the provisioning comprising generating a plurality of static routing tables for the plurality of endpoints, a static routing table for an endpoint comprising at least one Internet Protocol (IP) subnet; distribute a first static routing table, and a first agent to a first endpoint, wherein when a request is received at the first endpoint to connect to a second endpoint, the first agent determines whether an IP address of the second endpoint falls within the at least one IP subnet; if the IP address of the second endpoint falls within the at least one IP subnet, receive, at the controller from the first agent, a request to perform a security check; and in response to the security check request, check the whitelist to determine whether a requestor of the request to connect to the second endpoint is listed as a component of the multi-tiered application authorized to use the virtual network.

In another specific embodiment, there is a computer program product, comprising a non-transitory computer-readable medium having a computer-readable program code embodied therein, the computer-readable program code adapted to be executed by one or more processors to implement a method for using a virtual network to connect a plurality of endpoints in a cloud environment including: providing a controller that connects to the plurality of endpoints; defining application profiles for applications authorized to use the virtual network, the application profiles comprising specifications of valid computing flows between groups of endpoints; provisioning the plurality of endpoints according to the application profiles, the provisioning comprising generating, by the controller, a plurality of static routing tables for the plurality of endpoints, a static routing table for an endpoint comprising at least one Internet Protocol (IP) subnet that the endpoint will be allowed to connect to; programming the static routing table provided by the controller into a portion of a network kernel table of an operating system (OS) at the endpoint, the network kernel table comprising other portions having other routing information not provided by the controller; making a copy of the network kernel table, the copy of the network kernel table thereby comprising the portion having the static routing table provided by the controller, and the other portions having the other routing information not provided by the controller; maintaining, at the endpoint, the copy of the network kernel table; sending another copy of the network kernel table to the controller; periodically comparing the network kernel table in the OS and the copy of the network kernel table to detect tampering of the network kernel table in the OS; and upon detecting tampering, replacing the tampered network kernel table in the OS with the copy of the network kernel table maintained at the endpoint, and issuing an alert to the controller.

In another specific embodiment, there is a method for transmitting code for pre-defining a secure virtual network to connect endpoints in a public cloud provided by a cloud services provider for an enterprise and, after the pre-defining, enforcing security to allow only connections that were pre-defined, the pre-defining comprising: storing, at a controller, a whitelist comprising plurality of authorized signatures corresponding to applications and processes authorized by the enterprise to use the secure virtual network; defining application profiles for the applications, the application profiles specifying valid subnetworks and computing flows between groups of endpoints for the applications; generating static routing tables based on the valid subnetworks for endpoints that are to be provisioned; provisioning the plurality of endpoints into the valid subnetworks according to the application profiles, the provisioning comprising distributing the static routing tables to the endpoints; and the enforcing security comprising: receiving, at a first endpoint, a request to connect to a second endpoint; determining, at the first endpoint, whether an IP address of the second endpoint is within a valid subnetwork specified by a static routing table at the first endpoint; after determining that the IP address of the second endpoint is within the valid subnetwork, issuing, from the first endpoint to the controller, a request to perform a security check; receiving, at the controller, the request to perform the security check; and allowing, in response to the security check, the first endpoint to connect to the second endpoint when a plurality of conditions are satisfied, wherein a first condition is satisfied when an IP address of the first endpoint is in a first group of endpoints, the IP address of the second endpoint is in a second group of endpoints, and a computing flow according to an application profile indicates the first group is allowed to connect to the second group, a second condition is satisfied when a signature of a requestor of the request to connect, and a signature of a process triggered by the requestor matches authorized signatures specified in the whitelist, and a third condition is satisfied when the IP address of the second endpoint is not found in a list of quarantined endpoints.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for securing, through a virtual network, a public cloud provided by a cloud services provider for an enterprise comprising:

providing a plurality of agents for a plurality of endpoints, the plurality of endpoints to be hosted by a plurality of server machines in the public cloud provided by the cloud services provider for the enterprise;

providing a controller that connects to the plurality of agents;

storing, at the controller, a whitelist identifying components of a multi-tiered application authorized by the enterprise to use the virtual network;

defining an application profile for the multi-tiered application, the application profile specifying valid computing flows between components of a tier of the multi-tiered application and components of another tier of the multi-tiered application, the components of the tier to be executed at an endpoint, and the other components of the other tier to be executed at another different endpoint;

provisioning the plurality of endpoints according to the application profile, the provisioning comprising generating a plurality of static routing tables for the plurality of endpoints, a static routing table for an endpoint comprising at least one Internet Protocol (IP) subnet;

distributing a first static routing table, and a first agent to a first endpoint, wherein when a request is received at the first endpoint to connect to a second endpoint, the first agent determines whether an IP address of the second endpoint falls within the at least one IP subnet;

when the IP address of the second endpoint falls within the at least one IP subnet, receiving, at the controller from the first agent, a request to perform a security check;

in response to the security check request, checking the whitelist to determine whether a requestor of the request to connect to the second endpoint is listed as a component of the multi-tiered application authorized to use the virtual network; and when the requestor of the request to connect to the second endpoint is not listed in the whitelist as a component of the multi-tiered application authorized to use the virtual network, denying the connection to the second endpoint.

2. The method of claim 1 comprising:
determining that the requestor of the request to connect to the second endpoint is not listed in the whitelist as a component of the multi-tiered application authorized to use the virtual network; and
upon the determination, not allowing the connection to the second endpoint.

3. The method of claim 1 comprising:
programming the first static routing table into a network kernel table of an operating system (OS) executing at the first endpoint, the network kernel table comprising other routing information that is separate from the first static routing table;
generating a copy of the network kernel table, the copy of the network kernel table thereby comprising the first static routing table distributed by the controller, and the other routing information that is separate from the first static routing table;
maintaining, at the first endpoint, the copy of the network kernel table;
sending another copy of the network kernel table to the controller for storage at the controller;
periodically comparing the network kernel table in the OS against the copy of the network kernel table maintained at the first endpoint to detect tampering of the network kernel table in the OS; and
upon detecting tampering, reinforcing the tampered network kernel table in the OS with the copy of the network kernel table maintained at the first endpoint, and issuing an alert to the controller.

4. The method of claim 1 comprising:
maintaining continuous connections between the controller and the plurality of agents;
detecting that a first continuous connection between the controller and the first agent at the first endpoint has been interrupted; and
based on the interruption, placing the first endpoint into quarantine.

5. The method of claim 1 comprising:
placing, by the controller, a third endpoint into quarantine;
after the placing the third endpoint into quarantine, receiving, at the controller from the first agent at the first endpoint, a request to connect to the third endpoint, the request to connect to the third endpoint being received at the controller because the first agent has determined that an IP address of the third endpoint falls within the at least one IP subnet; and
denying the request to connect to the third endpoint because the third endpoint is in quarantine.

6. The method of claim 1 wherein the components of the multi-tiered application identified in the whitelist are arranged as a tree, the tree comprises authorized parent and child processes associated with the component of the multi-tiered application authorized to use the virtual network, and signatures corresponding to the authorized processes,
wherein the request to perform the security check comprises signatures of processes spawned from the requestor, and
wherein the checking the whitelist comprises comparing a signature of a process spawned from the requestor with a signature of an authorized process listed in the whitelist.

7. The method of claim 1 comprising:
in response to the security check request, checking the application profile to determine whether a computing flow from the first endpoint to the second endpoint is a valid computing flow according to the application profile.

8. The method of claim 1 comprising:
in response to the security check request, checking a listing of endpoints that have been quarantined to determine whether an IP address of the second endpoint is in the listing.

9. The method of claim 1 wherein an endpoint comprises a container.

10. The method of claim 1 wherein an endpoint comprises a virtual machine.

11. A method for pre-defining a secure virtual network to connect endpoints in a public cloud provided by a cloud services provider for an enterprise and, after the pre-defining, enforcing security to allow only connections that were pre-defined, the pre-defining comprising:
storing, at a controller, a whitelist comprising plurality of authorized signatures corresponding to applications and processes authorized by the enterprise to use the secure virtual network;
defining application profiles for the applications, the application profiles specifying valid subnetworks and computing flows between groups of endpoints for the applications;
generating static routing tables based on the valid subnetworks for endpoints that are to be provisioned;
provisioning the plurality of endpoints into the valid subnetworks according to the application profiles, the provisioning comprising distributing the static routing tables to the endpoints; and the enforcing security comprising:

receiving, at a first endpoint, a request to connect to a second endpoint;

determining, at the first endpoint, whether an IP address of the second endpoint is within a valid subnetwork specified by a static routing table at the first endpoint;

after determining that the IP address of the second endpoint is within the valid subnetwork, issuing, from the first endpoint to the controller, a request to perform a security check;

receiving, at the controller, the request to perform the security check; and allowing, in response to the security check, the first endpoint to connect to the second endpoint when a plurality of conditions are satisfied, wherein a first condition is satisfied when an IP address of the first endpoint is in a first group of endpoints, the IP address of the second endpoint is in a second group of endpoints, and a computing flow according to an application profile indicates the first group is allowed to connect to the second group, a second condition is satisfied when a signature of a requestor of the request to connect, and a signature of a process triggered by the requestor matches authorized signatures specified in the whitelist, and a third condition is satisfied when the IP address of the second endpoint is not found in a list of quarantined endpoints.

12. The method of claim 11 comprising:

programming the static routing table into a network kernel table of an operating system (OS) at the first endpoint, the network kernel table comprising other routing information in addition to routing information from the static routing table;

making a copy of the network kernel table, the copy of the network kernel table thereby comprising the routing information from the static routing table, and the other routing information;

storing, at the first endpoint, the copy of the network kernel table;

periodically comparing the network kernel table in the OS against the copy of the network kernel table stored at the first endpoint to detect tampering of the network kernel table in the OS; and upon detection of tampering, reinforcing the tampered network kernel table in the OS with the copy of the network kernel table stored at the first endpoint.

13. The method of claim 12 wherein the reinforcing the tampered network kernel table comprises replacing the tampered network kernel table with the copy of the network kernel table.

14. The method of claim 12 comprising:

upon the detection of tampering, issuing an alert to the controller, wherein the controller, in response to the alert, adds an IP address of the first endpoint to a list of quarantined endpoints.

15. The method of claim 12 comprising:

upon the detection of tampering, issuing an alert to the controller, wherein the controller, in response to the alert, instructs the first endpoint to empty a network kernel table in an operating system (OS) at the first endpoint, wherein the network kernel table comprises the static routing table distributed to the first endpoint, and other routing information in addition to the static routing table.

* * * * *